US011997316B2

United States Patent
Tsukuba

(10) Patent No.: US 11,997,316 B2
(45) Date of Patent: May 28, 2024

(54) IMAGE PROCESSING APPARATUS AND METHOD FOR CURBING DETERIORATION IN CODING EFFICIENCY

(71) Applicant: SONY CORPORATION, Tokyo (JP)

(72) Inventor: Takeshi Tsukuba, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/888,943

(22) Filed: Aug. 16, 2022

(65) Prior Publication Data
US 2022/0394299 A1    Dec. 8, 2022

Related U.S. Application Data

(63) Continuation of application No. 16/468,451, filed as application No. PCT/JP2017/045042 on Dec. 15, 2017, now abandoned.

(30) Foreign Application Priority Data

Dec. 28, 2016    (JP) ................................. 2016-256732

(51) Int. Cl.
  *H04N 19/61*    (2014.01)
  *H04N 19/107*    (2014.01)
  (Continued)

(52) U.S. Cl.
  CPC .......... *H04N 19/61* (2014.11); *H04N 19/107* (2014.11); *H04N 19/12* (2014.11); *H04N 19/176* (2014.11); *H04N 19/186* (2014.11); *H04N 19/70* (2014.11)

(58) Field of Classification Search
  None
  See application file for complete search history.

(56) References Cited

U.S. PATENT DOCUMENTS 8,098,940 B2    1/2012    Etoh et al.
9,167,265 B2    10/2015    Nakaya
(Continued)

FOREIGN PATENT DOCUMENTS

CN    1257614 C    5/2006
CN    103238328 A    8/2013
(Continued)

OTHER PUBLICATIONS

Chen et al., Algorithm Description of Joint Exploration Test Model 4, Joint Video Exploration Team (JVET) of ITU-T SG 16 WP 3 and ISO/IEC JTC 1/SC 29/WG 11, Oct. 15-21, 2016, pp. 1-36, 4th Meeting: Chengdu, CN.
(Continued)

*Primary Examiner* — Michael J Hess
(74) *Attorney, Agent, or Firm* — Paratus Law Group, PLLC

(57) ABSTRACT

There is provided an image processing apparatus and method that can curb deterioration in coding efficiency. An inverse orthogonal transform of chrominance is performed using information regarding the inverse orthogonal transform of chrominance derived on the basis of information regarding an inverse orthogonal transform of luminance. For example, information regarding the orthogonal transform includes an adaptive primary transform flag indicating whether an adaptive primary transform of adaptively selecting one from a plurality of different orthogonal transforms and using the selected transform as a primary transform is to be applied to a transform block to be processed. The present disclosure can be applied to, for example, an image processing apparatus, an image encoding apparatus, an image decoding apparatus, or the like.

14 Claims, 77 Drawing Sheets

| LUMINANCE | CHROMINANCE | | EFFECT |
|---|---|---|---|
| | Cb | Cr | |
| ADAPTIVE PRIMARY TRANSFORM FLAG apt_flag[Y] | apt_flag[Cb] | apt_flag[Cr] | • IMPROVEMENT IN CODING EFFICIENCY OF CHROMINANCE (Cb/Cr) • REDUCTION IN OVERHEAD |
| PRIMARY TRANSFORM IDENTIFIER pt_idx[Y] | pt_idx[Cb] | pt_idx[Cr] *MAY BE COMMON FOR Cb/Cr | • IMPROVEMENT IN CODING EFFICIENCY OF CHROMINANCE (Cb/Cr) • REDUCTION IN OVERHEAD |
| SECONDARY TRANSFORM IDENTIFIER st_idx[Y] | chroma_st_idx *COMMON FOR Cb/Cr | | • REDUCTION IN OVERHEAD OF CORRESPONDING SYNTAX SIGNALED FOR CHROMINANCE (Cb/Cr) |
| TRANSFORM SKIP FLAG ts_flag (transform_skip_flag) | ts_flag[Cb] | ts_flag[Cr] | • REDUCTION IN OVERHEAD OF CORRESPONDING SYNTAX SIGNALED FOR CHROMINANCE (Cb/Cr) |

(51) Int. Cl.
*H04N 19/12* (2014.01)
*H04N 19/176* (2014.01)
*H04N 19/186* (2014.01)
*H04N 19/70* (2014.01)

(56) References Cited

U.S. PATENT DOCUMENTS

| | | | |
|---|---|---|---|
| 2012/0230394 A1* | 9/2012 | Lu | H04N 19/61 375/E7.126 |
| 2014/0056357 A1* | 2/2014 | Tanizawa | H04N 19/186 375/240.12 |
| 2014/0056362 A1 | 2/2014 | Mrak et al. | |
| 2015/0016516 A1* | 1/2015 | Saxena | H04N 19/593 375/240.12 |
| 2015/0249828 A1* | 9/2015 | Rosewarne | H04N 19/136 375/240.02 |
| 2016/0219290 A1* | 7/2016 | Zhao | H04N 19/136 |
| 2017/0085917 A1* | 3/2017 | Hannuksela | H04N 19/136 |
| 2017/0127090 A1* | 5/2017 | Rosewarne | H04N 19/159 |
| 2017/0272748 A1* | 9/2017 | Seregin | H04N 19/159 |
| 2017/0280163 A1* | 9/2017 | Kao | H04N 19/593 |
| 2018/0124420 A1* | 5/2018 | Lee | H04N 19/105 |
| 2020/0036990 A1* | 1/2020 | Andersson | H04N 19/40 |

FOREIGN PATENT DOCUMENTS

| | | |
|---|---|---|
| CN | 103404141 A | 11/2013 |
| CN | 104067622 A | 9/2014 |
| CN | 108781282 A | 11/2018 |
| EP | 2652954 A | 10/2013 |
| EP | 3434013 A | 1/2019 |
| JP | 2002-314428 A | 10/2002 |
| JP | 2013-021557 A | 1/2013 |
| JP | 2014-523175 A | 9/2014 |
| JP | 2019-509684 A | 4/2019 |
| KR | 10-2014-0027932 A | 3/2014 |
| KR | 10-2018-0122361 A | 11/2018 |
| WO | WO 2011/155332 A1 | 12/2011 |
| WO | WO 2013/008800 A1 | 1/2013 |
| WO | WO 2013/088687 A1 | 6/2013 |
| WO | WO 2017/165391 A1 | 9/2017 |

OTHER PUBLICATIONS

Saxena et al., CE7: Mode-Dependent DCT/DST for 4x4 Chroma Blocks, Joint Collaborative Team on Video Coding (JCT-VC) of ITU-T SG 16 WP3 and ISO/IEC JTC1/SC29/WG11, Nov. 21-30, 2011, pp. 1-6, 7th Meeting, Geneva, CH.
Cohen et al., CE7: Summary Report of Core Experiment on Additional Transforms, Joint Collaborative Team on Video Coding (JCT-VC) of ITU-T SG 16 WP3 and ISO/IEC JTC1/SC29/WG11, Nov. 21-30, 2011, pp. 1-10, $7^{th}$ Meeting: Geneva, CH.
Nov. 20, 2019, European Search Report issued for related EP Application No. 17887195.0.
Chen et al., Algorithm Description of Joint Exploration Test Model 1, Joint Video Exploration Team (JVET) of ITU-T SG 16 WP 3 and ISO/IEC JTC 1/SC 29/WG 11, Oct. 19-21, 2015, pp. 1-25, 1st Meeting: Geneva, CH.
Choi et al., Adaptive Multiple Transform for Chroma, Joint Video Exploration Team (JVET) of ITU-T SG 16 WP 3 and ISO/IEC JTC 1/SC 29/WG 11, Feb. 20-26, 2016, pp. 1-6, 2nd Meeting: San Diego, USA.
Seregin et al., EE2: Grouped signalling for transform, Joint Video Exploration Team (JVET) of ITU-T SG 16 WP 3 and ISO/IEC JTC 1/SC 29/WG 11, Oct. 15-21, 2016, pp. 1-4, $4^{th}$ Meeting: Chengdu, CN.
Chen et al., Algorithm Description of Joint Exploration Test Model 3, Joint Video Exploration Team (JVET) of ITU-T SG 16 WP 3 and ISO/IEC JTC 1/SC 29/WG 11, May 26-Jun. 1, 2016, pp. i-34, JVET-C1001_v3, 3rd Meeting: Geneva, CH.

\* cited by examiner

FIG. 1

Four pre-defined transform candidate sets ( LUT_TrSetToTrTypeIdx )

| TrSetIdx | Transform Candidates | |
|---|---|---|
| | pt_{hor,ver}_flag==0 | pt_{hor,ver}_flag==1 |
| 0 | 4 (DST-VII) | 2 (DCT-VIII) |
| 1 | 4 (DST-VII) | 3 (DST-I) |
| 2 | 4 (DST-VII) | 1 (DCT-V) |
| 3 | 2 (DCT-VIII) | 4 (DST-VII) |
| 4 | DCT-II | |

- TrSetIdx 0–2: FOR INTRA PREDICTION
- TrSetIdx 3: FOR INTER PREDICTION
- TrSetIdx 4: CASE IN WHICH ADAPTIVE PRIMARY TRANSFORM IS NOT APPLIED

*TrTypeIdx==0 CORRESPONDS TO DCT-II

FIG. 2

| TrType Idx | Transform Type | Basis function $T_i(j)$, $i, j = 0, 1, \ldots, N-1$ |
|---|---|---|
| 0 | DCT-II | $T_i(j) = \omega_0 \cdot \sqrt{\dfrac{2}{N}} \cdot \cos\left(\dfrac{\pi \cdot i \cdot (2j+1)}{2N}\right)$, where $\omega_0 = \begin{cases} \sqrt{\dfrac{2}{N}} & i=0 \\ 1 & i \neq 0 \end{cases}$ |
| 1 | DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{2}{N}} & i=0 \\ 1 & i \neq 0 \end{cases}$, $\omega_1 = \begin{cases} \sqrt{\dfrac{2}{N}} & j=0 \\ 1 & j \neq 0 \end{cases}$ |
| 2 | DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| 3 | DST-I | $T_i(j) = \sqrt{\dfrac{2}{N+1}} \cdot \sin\left(\dfrac{\pi \cdot (i+1) \cdot (j+1)}{N+1}\right)$ |
| 4 | DST-VII | $T_i(j) = \sqrt{\dfrac{4}{2N+1}} \cdot \sin\left(\dfrac{\pi \cdot (2i+1) \cdot (j+1)}{2N+1}\right)$ |

$N = 2, 4, 8, 16, \ldots, 2^{**}M$

IN TERMS OF IMPLEMENTATION, VALUE OF EACH COEFFICIENT $T_i(j)$ OF ORTHOGONAL TRANSFORM IS HELD AT INTEGER PRECISION OF k bit

FIG. 3

Selected (H)orizontal and (V)ertical transform sets for each Intra prediction mode (LUT_IntraModeToTrSet)

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 0 | 0 |
| H | 2 | 2 | 2 | 2 | 2 | 1 | 0 | 1 | 0 | 1 | 0 | 1 | 0 | 1 | 2 | 2 | 34 |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 2 | 0 | 2 | 0 | 0 | 0 | 0 |

| Intra Mode | 53 | 54 | 55 | 56 | 57 | 58 | 59 | 60 | 61 | 62 | 63 | 64 | 65 | 66 | 67 (=IntraBC) | 4 (=InterTrSetIdx) | 4 (=InterTrSetIdx) |
|---|---|---|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 | 1 | 1 | |
| H | 0 | 0 | 1 | 0 | 1 | 0 | 1 | 0 | 1 | 0 | 1 | 0 | 1 | 0 | 1 | | 1 |

```
transform_unit( x0,y0,log2TBWSize,log2TBHSize ) {                                    Descriptor
    for( compID=0; compIDknumFieldChannel ; compID++ ){
        cbf[x0][y0][compID]                                                          ae(v)      } SYN11
        if( cbf[x0][y0][compID] ){
            if( cbf[x0][y0][COMPONENT_Y] && apt_enabled_flag ){
                apt_flag[x0][y0]                                                     ae(v)      } SYN12
            }
            log2TBWSize = compID==COMPONENT_Y? log2TBWSizeL : log2TBWSizeL>>1
            log2TBHSize = compID==COMPONENT_Y? log2TBHSizeL : log2TBHSizeL>>1                   } SYN13
            residual_coding( x0,y0,log2TBWSize,log2TBHSize,compID)
        }
        ...
    }
    ...
}
```

B cbf[x0][y0][compID] : ENCODED BLOCK FLAG.
FLAG INDICATING WHETHER THERE ARE ONE OR MORE NON-ZERO
COEFFICIENTS IN TRANSFORM BLOCK OF SIGNAL OF COLOR SPACE SPECIFIED BY compID.
IN CASE OF 1 (TRUE), THERE ARE ONE OR MORE NON-ZERO COEFFICIENTS
IN CORRESPONDING TRANSFORM BLOCK.
IN CASE OF 0 (FALSE), THERE IS NO NON-ZERO COEFFICIENT
IN CORRESPONDING TRANSFORM BLOCK.

apt_enabled_flag: ADAPTIVE PRIMARY TRANSFORM ENABLED FLAG
INFORMATION REGARDING PERMISSION OF ADAPTIVE PRIMARY TRANSFORM.
IN CASE OF 1 (TRUE), IT INDICATES THAT INFORMATION REGARDING ADAPTIVE PRIMARY
TRANSFORM CAN BE PRESENT IN ENCODED DATA.
IN CASE OF 0 (FALSE), IT INDICATES THAT NO INFORMATION REGARDING ADAPTIVE PRIMARY
TRANSFORM IS PRESENT IN ENCODED DATA.

apt_flag: ADAPTIVE PRIMARY TRANSFORM FLAG
FLAG INDICATING WHETHER ADAPTIVE PRIMARY TRANSFORM IS TO BE APPLIED TO
TRANSFORM BLOCK OF LUMINANCE.
IN CASE OF 1 (TRUE), IT INDICATES APPLICATION OF ADAPTIVE PRIMARY TRANSFORM.
IN CASE OF 0 (FALSE), IT INDICATES NO APPLICATION OF ADAPTIVE PRIMARY TRANSFORM.
IN CASE IN WHICH THERE IS NO apt_flag IN ENCODED DATA, VALUE OF apt_flag IS SET TO 0.

FIG. 5

| | Descriptor |
|---|---|
| residual_coding( x0, y0, log2TBWSize, log2TBHSize, compID ) { | |
|   if( ts_enabled_flag && !transquant_bypass_flag && | |
|     ( log2TBSize <= log2MaxTSSize )) | |
|     ts_flag [x0][y0][compID] | ae(v)   } SYN21 |
|   ... syntaxes related to last_pos_[x, y], | |
|   coeff_sbk_flag/sig_flag/gr1_flag/gr2_flag/coeff_abs_level_remaining/coeff_sign_flag ... | |
|   if((apt_flag[x0][y0] && !transquant_bypass_flag && !ts_flag[x0][y0][compID] | |
|     && compID==COMPONENT_Y && numSig >= ptNumSigTH && | |
|     max(log2TBWSize, log2TBHSize)<= maxPTSize) | |
|     pt_idx[x0][y0] | ae(v)   } SYN22 |
|   ... | |
|   if((st_enabled_flag[x0][y0] && !transquant_bypass_flag && !ts_flag[x0][y0][compID] | |
|     && compID==COMPONENT_Y && numSig >= stNumSigTH )) | |
|     st_idx[x0][y0] | ae(v)   } SYN23 |
| } | |

FIG. 6

| LUMINANCE | CHROMINANCE | | EFFECT |
| --- | --- | --- | --- |
| | Cb | Cr | |
| ADAPTIVE PRIMARY TRANSFORM FLAG apt_flag[Y] | apt_flag[Cb] | apt_flag[Cr] | • IMPROVEMENT IN CODING EFFICIENCY OF CHROMINANCE (Cb/Cr) • REDUCTION IN OVERHEAD |
| PRIMARY TRANSFORM IDENTIFIER pt_idx[Y] | pt_idx[Cb] | pt_idx[Cr] *MAY BE COMMON FOR Cb/Cr | • IMPROVEMENT IN CODING EFFICIENCY OF CHROMINANCE (Cb/Cr) • REDUCTION IN OVERHEAD |
| SECONDARY TRANSFORM IDENTIFIER st_idx[Y] | chroma_st_idx *COMMON FOR Cb/Cr | | • REDUCTION IN OVERHEAD OF CORRESPONDING SYNTAX SIGNALED FOR CHROMINANCE (Cb/Cr) |
| TRANSFORM SKIP FLAG ts_flag (transform_skip_flag) | ts_flag[Cb] | ts_flag[Cr] | • REDUCTION IN OVERHEAD OF CORRESPONDING SYNTAX SIGNALED FOR CHROMINANCE (Cb/Cr) |

FIG. 7

| No. | INFER apt_flag OF CHROMINANCE FROM LUMINANCE | ADAPTIVE PRIMARY TRANSFORM FLAG apt_flag[compID]/pt_idx[compID] OF CHROMINANCE ||||||| REMARK | EFFECT |
|---|---|---|---|---|---|---|---|---|---|---|
| | | IntraPredModeY == IntraPredModeC |||| OTHER CONDITION ||| | |
| | | INTRA CU ||| INTER CU | FLAG INDICATING WHETHER INFORMATION OF LUMINANCE IS TO BE USED FOR CHROMINANCE | SIZE OF SHORT SIDE OF TRANSFORM BLOCK IS GREATER THAN OR EQUAL TO THRESHOLD VALUE | PICTURE HEIGHT/PICTURE WIDTH OF TRANSFORM BLOCK IS GREATER THAN OR EQUAL TO THRESHOLD VALUE | | |
| | | NO ADDITIONAL CONDITION | IntraPredModeY == IntraPredModeC | IntraPredModeY == IntraBC IntraPredModeC | | | | | | |
| #0 | | x | | | x | | | | CHROMINANCE IS OMITTED AT ALL TIMES | |
| #1 | x | | | | | | | | INFERENCE FROM LUMINANCE | IMPROVEMENT IN CODING EFFICIENCY |
| #2 | x | | | | x | | | | OMITTED ONLY IN INTER | IMPROVEMENT IN CODING EFFICIENCY |
| #3 | x | | x | | x | | | | | REDUCTION IN CODE AMOUNT |
| #4 | x | | | x | x | | | | | REDUCTION IN CODE AMOUNT |
| #5 | x | | | | x | x | | | | REDUCTION IN CODE AMOUNT |
| #6 | x | | | | | | x | | | REDUCTION IN CIRCUIT SCALE |
| #7 | x | | | | | | | x | | REDUCTION IN CIRCUIT SCALE |
| #8 | x | | | | | | | x | | · IMPROVEMENT IN CODING EFFICIENCY · REDUCTION IN CIRCUIT SCALE |

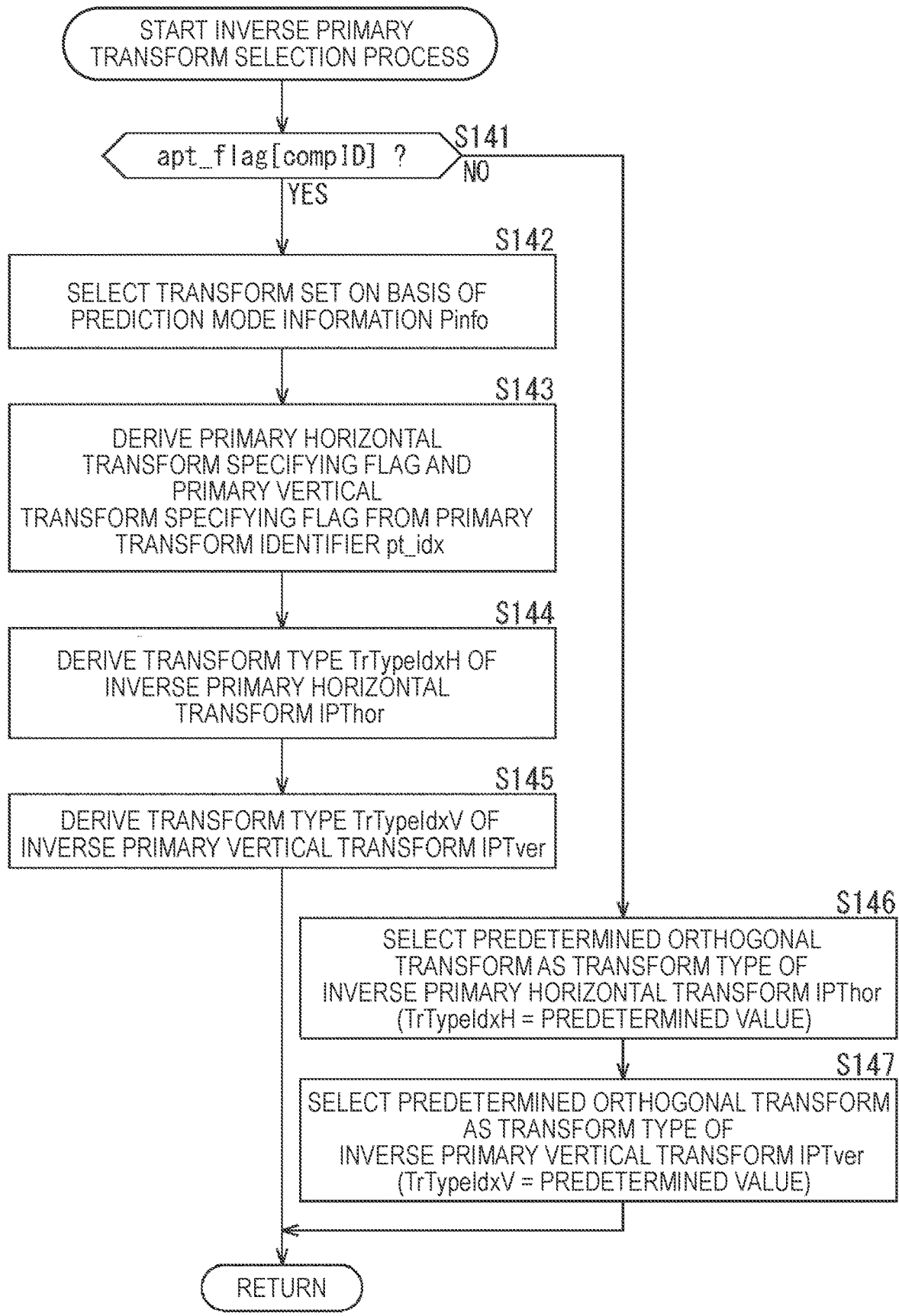

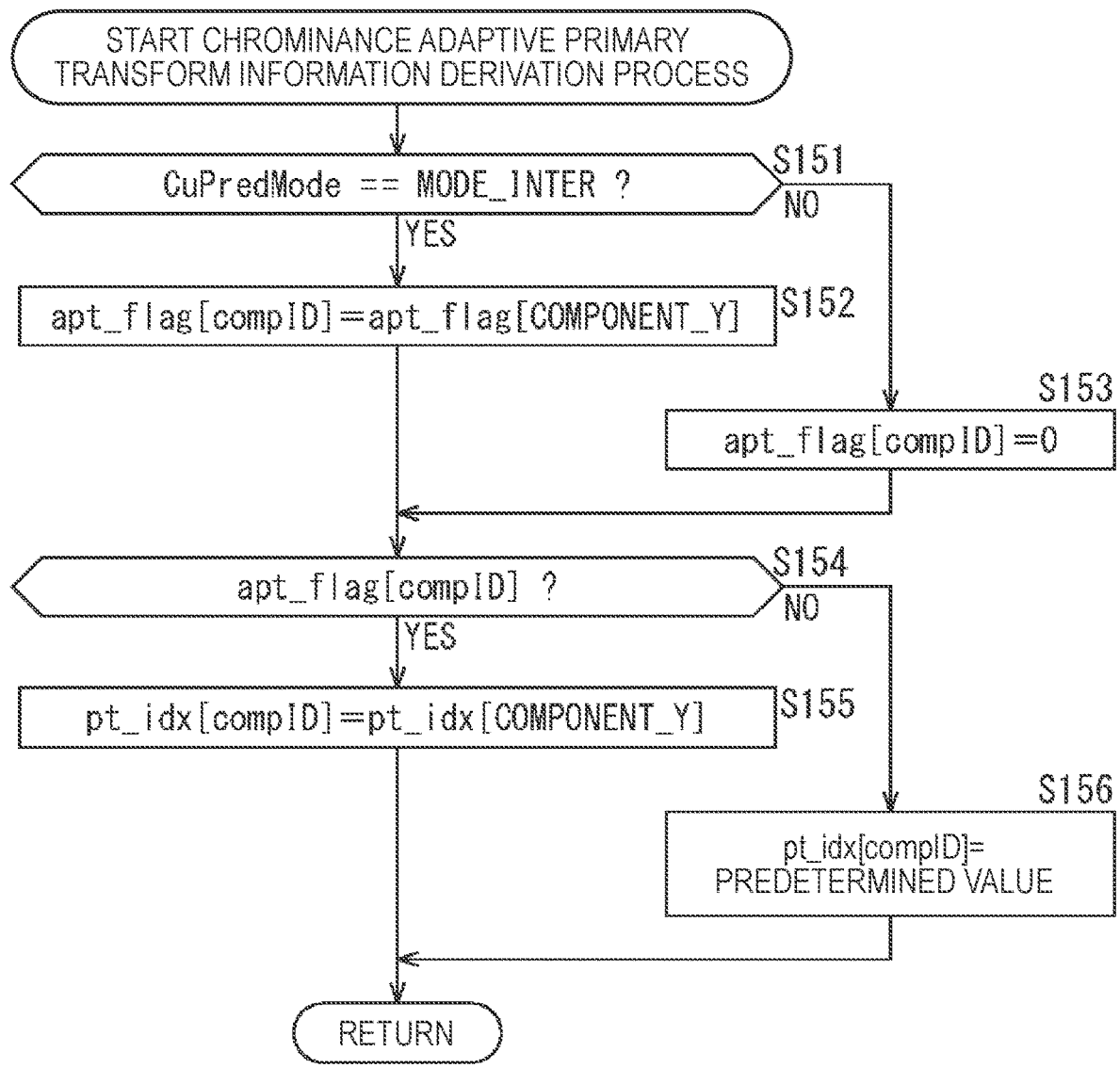

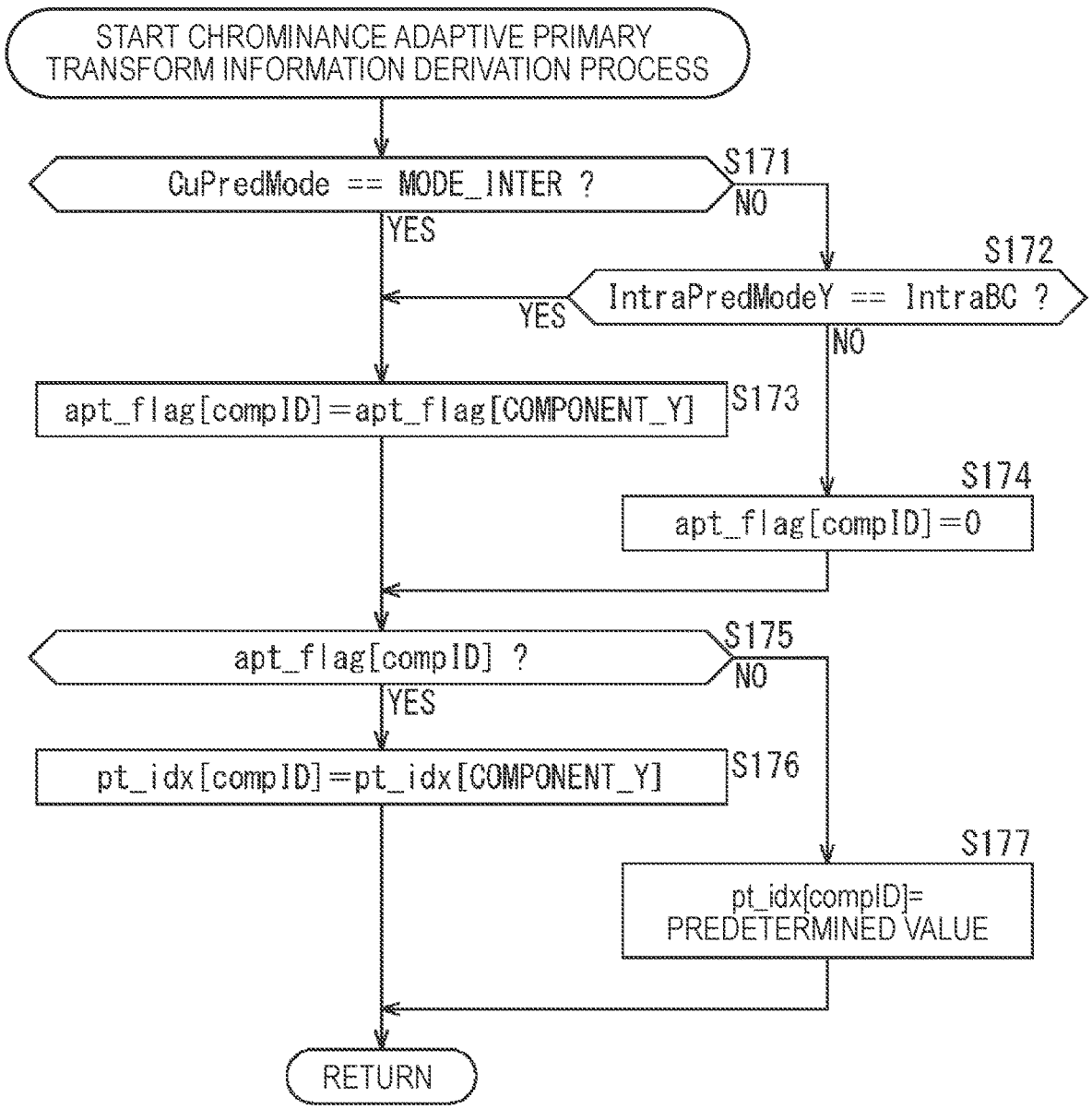

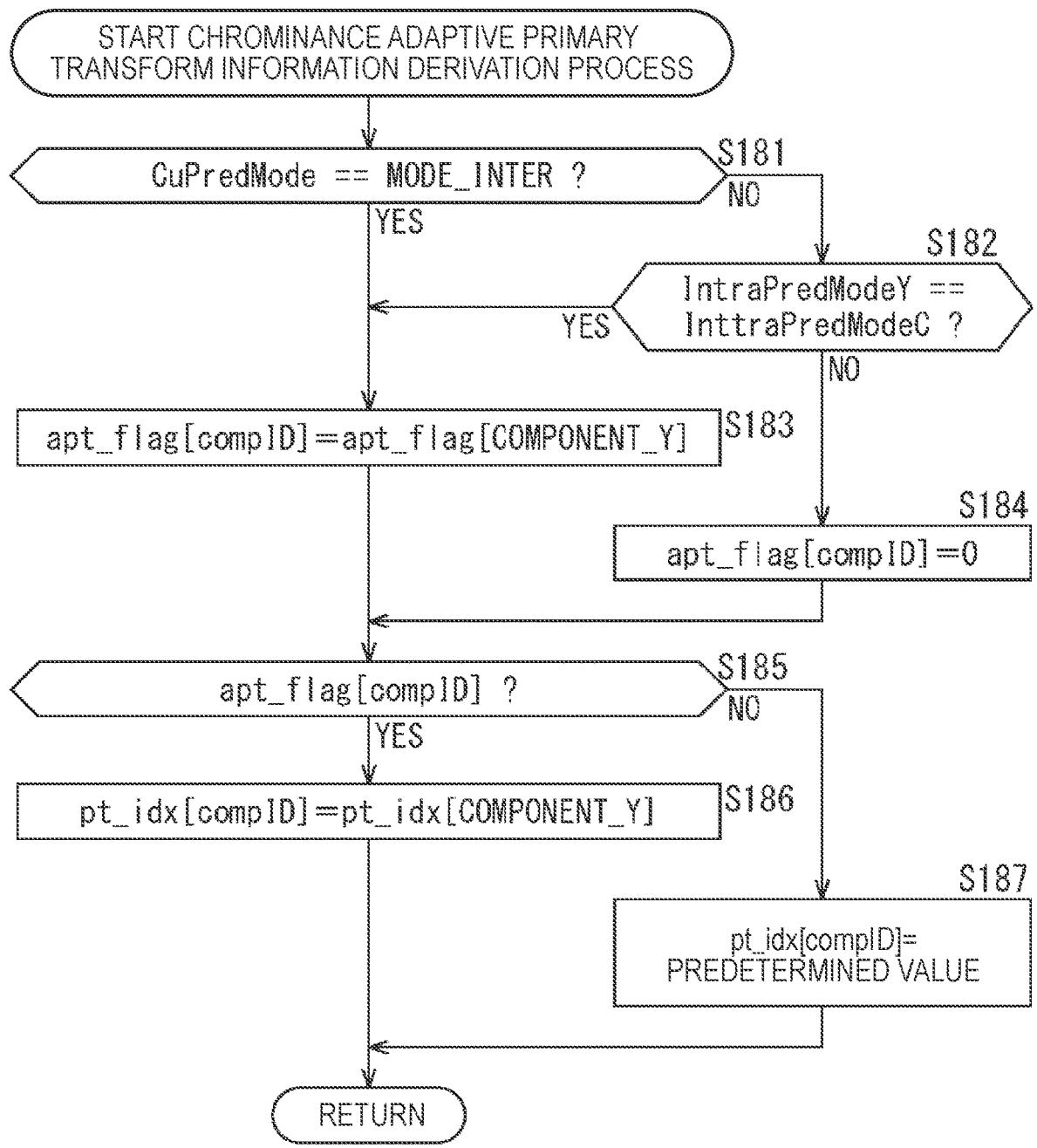

FIG. 20

```
transform_unit( x0,y0,log2TBWSizel,log2TBHSizel ) {                               Descriptor
    ...
    for(compID=0; compID<numValidchannel; compID++){
        cbf[x0][y0][compID]                                                       ae(v)
        if( cbf[x0][y0][compID] ){
            log2TBWSize = compID==COMPONENT_Y? log2TBWSizel : log2TBWSizel>>1
            log2TBHSize = compID==COMPONENT_Y? log2TBHSizel : log2TBHSizel>>1
            apt_flag[x0][y0][compID]                                              ae(v)
        }
        residual_coding( x0,y0,log2TBWSize, log2TBHSize,compID)
    }
}
```

A cbf[x0][y0][compID] : ENCODED BLOCK FLAG.
FLAG INDICATING WHETHER THERE ARE ONE OR MORE NON-ZERO
COEFFICIENTS IN TRANSFORM BLOCK OF SIGNAL OF COLOR SPACE SPECIFIED BY compID.
IN CASE OF 1 (TRUE), THERE ARE ONE OR MORE NON-ZERO COEFFICIENTS
IN CORRESPONDING TRANSFORM BLOCK.
IN CASE OF 0 (FALSE), THERE IS NO NON-ZERO COEFFICIENT
IN CORRESPONDING TRANSFORM BLOCK.

apt_enabled_flag: ADAPTIVE PRIMARY TRANSFORM ENABLED FLAG
INFORMATION REGARDING PERMISSION OF ADAPTIVE PRIMARY TRANSFORM.
IN CASE OF 1 (TRUE), IT INDICATES THAT INFORMATION REGARDING ADAPTIVE PRIMARY
TRANSFORM CAN BE PRESENT IN ENCODED DATA.
IN CASE OF 0 (FALSE), IT INDICATES THAT NO INFORMATION REGARDING ADAPTIVE PRIMARY
TRANSFORM IS PRESENT IN ENCODED DATA.

apt_flag[x0][y0][compID]: ADAPTIVE PRIMARY TRANSFORM FLAG
FLAG INDICATING WHETHER ADAPTIVE PRIMARY TRANSFORM IS TO BE APPLIED
TO TRANSFORM BLOCK OF SIGNAL OF COLOR SPACE SPECIFIED BY compID.
IN CASE OF 1 (TRUE), IT INDICATES APPLICATION OF ADAPTIVE PRIMARY TRANSFORM.
IN CASE OF 0 (FALSE), IT INDICATES NO APPLICATION OF ADAPTIVE PRIMARY TRANSFORM.
IN CASE IN WHICH THERE IS NO apt_flag IN ENCODED DATA, VALUE OF apt_flag IS SET TO 0.

| | Descriptor |
|---|---|
| residual_coding( x0, y0, log2TBWSize, log2TBHSize, compID ) { | |
|   if( ts_enabled_flag && !transquant_bypass_flag && | |
|     ( log2TBSize <= log2MaxTSSize ) ) | |
|     ts_flag [x0][y0][compID] | ae(v)  ⎫ SYM11 |
|   ... | |
|   if( compID!=COMPONENT_Y && apt_flag[x0][y0][COMPONENT_Y] && !ts_flag[x0][y0][compID] && | |
|     !transquant_bypass_flag) | |
|     chroma_apt_info_infer_flag [x0][y0][compID] | ae(v)  ⎫ SYM12 |
|   } | |
|   ... syntaxes related to last_pos_{x, y}, | |
|   coeff_sbk_flag/sig_flag/gr1_flag/gr2_flag/coeff_abs_level_remaining/coeff_sign_flag ... | |
|   if((apt_flag[x0][y0][compID] && !transquant_bypass_flag && !ts_flag[x0][y0][compID] | |
|     && compID==COMPONENT_Y ) && numSig >= ptNumSigTH )) | ⎫ SYM13 |
|     pt_idx[x0][y0][compID] | ae(v) |
| } | |

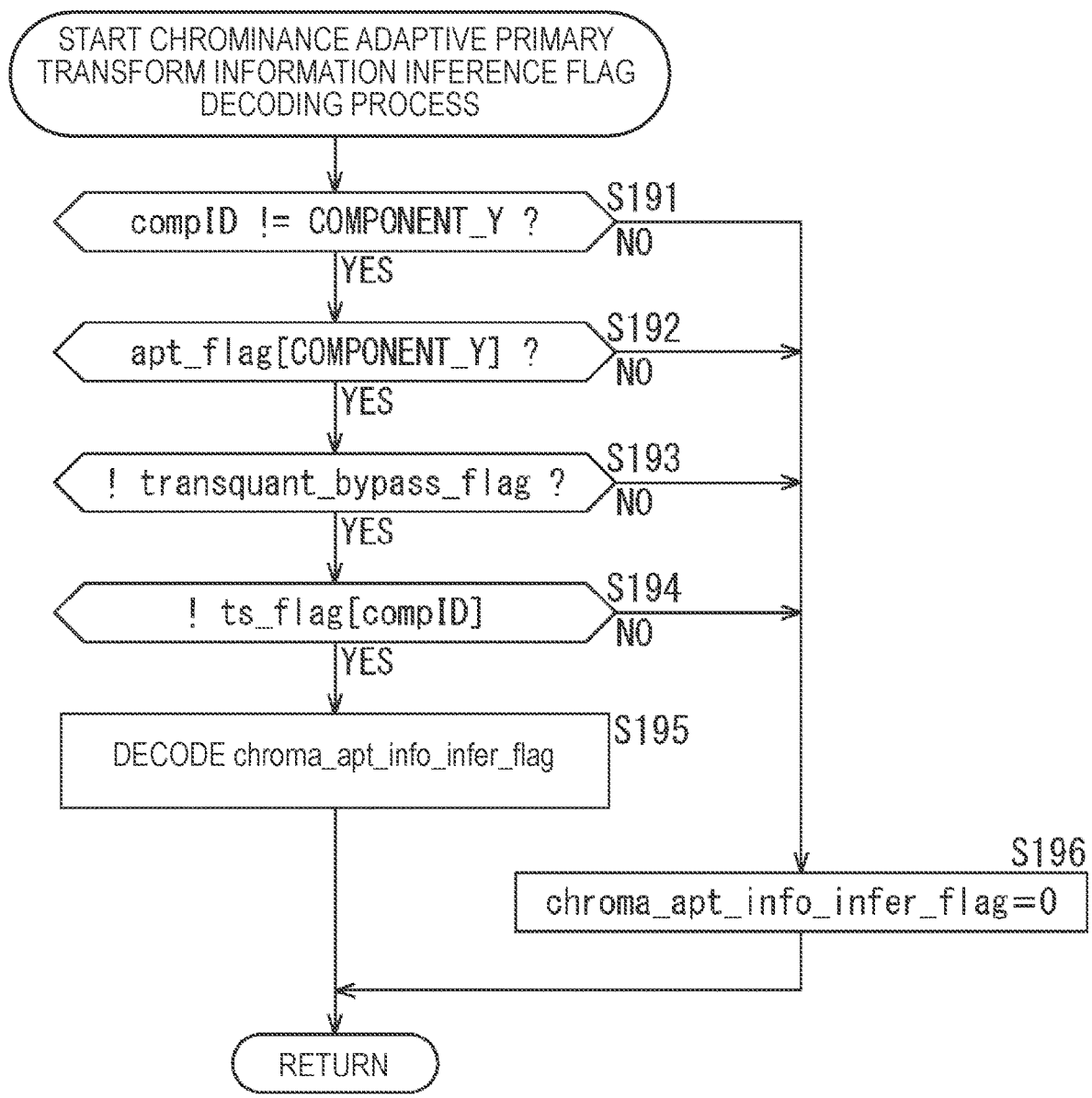

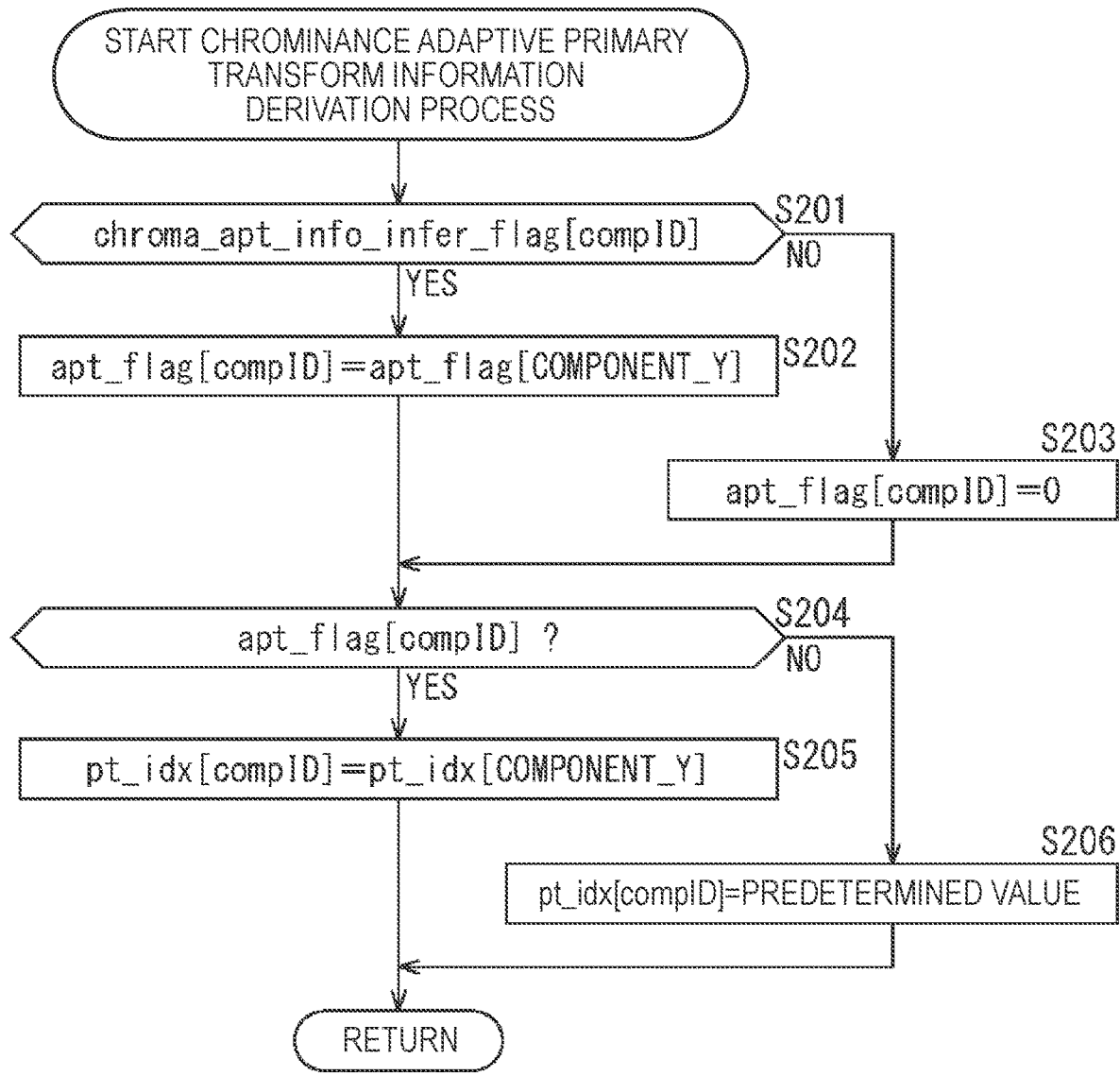

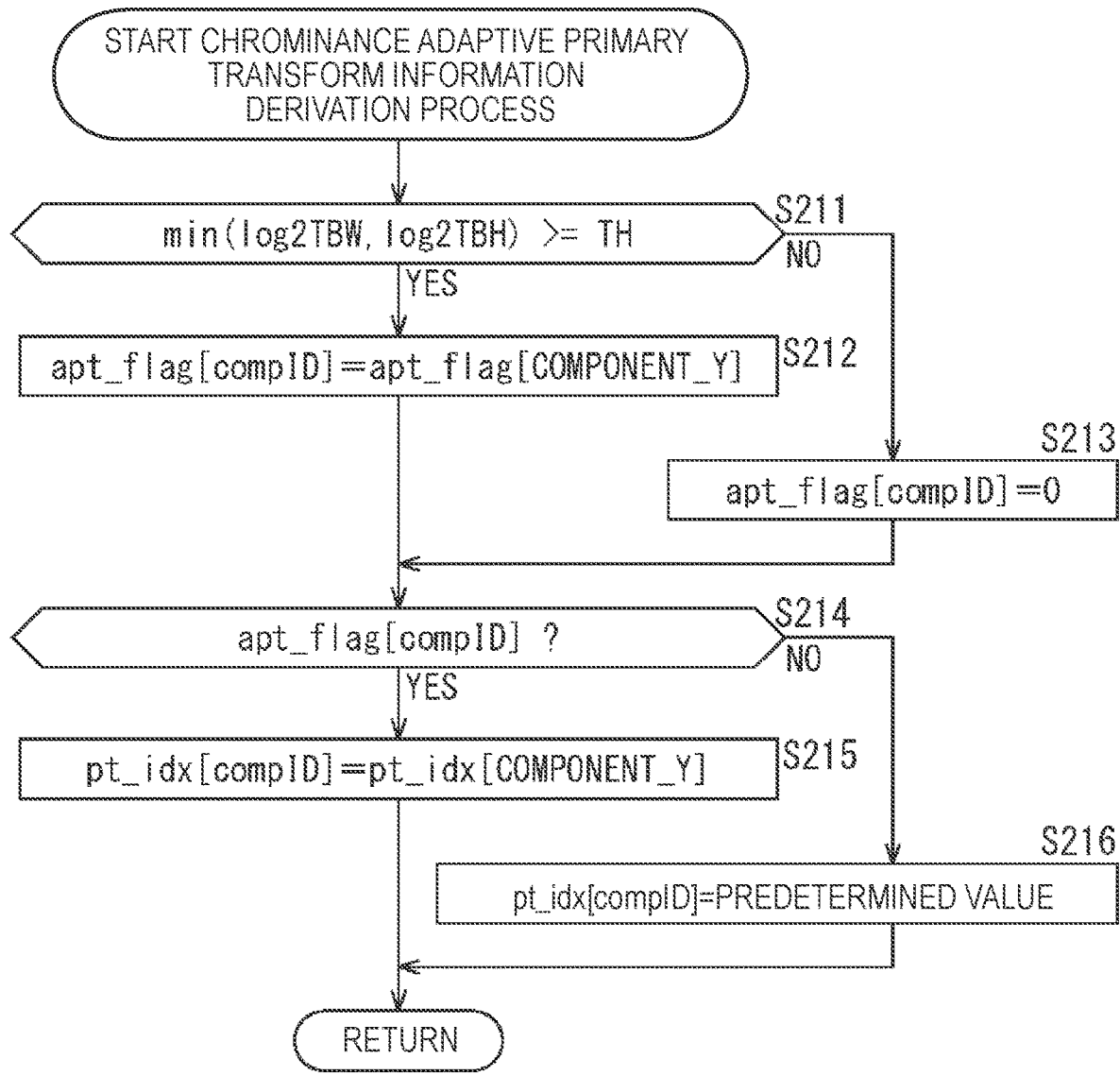

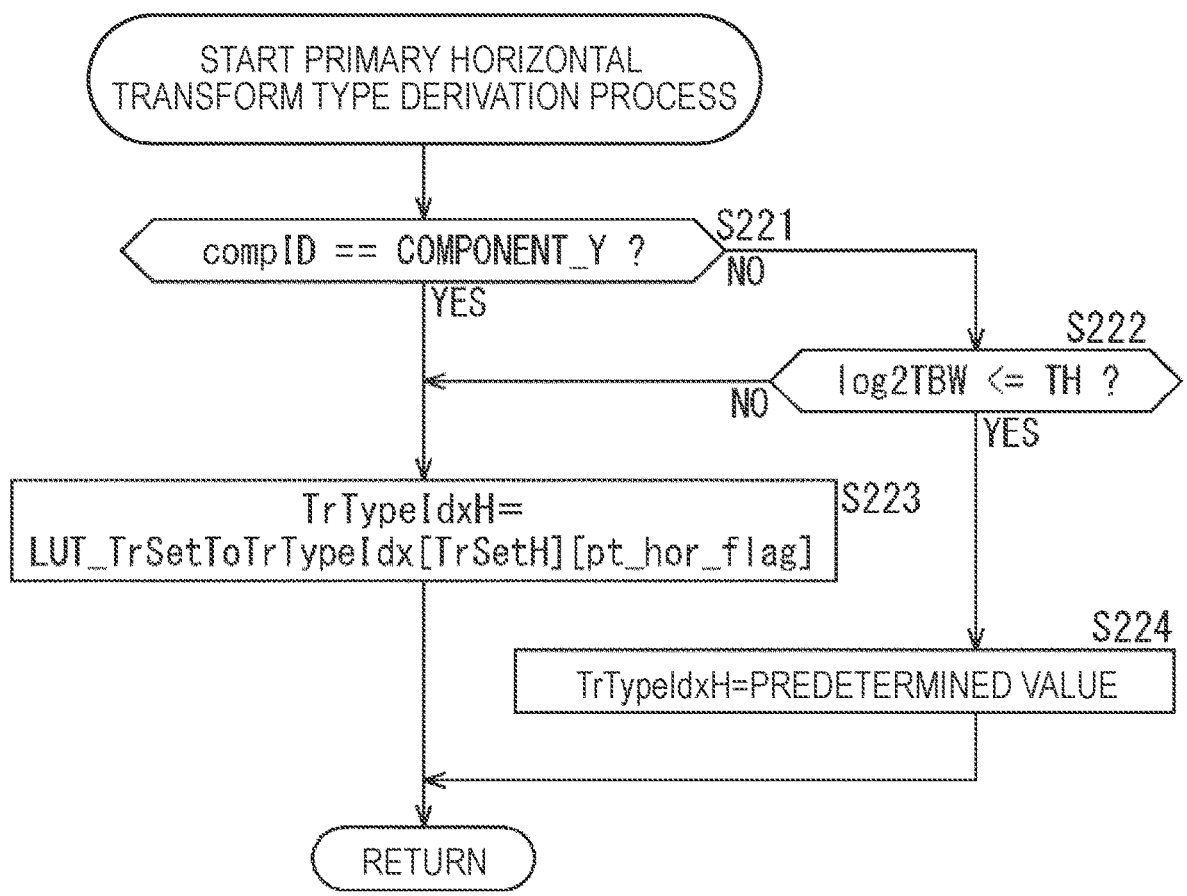

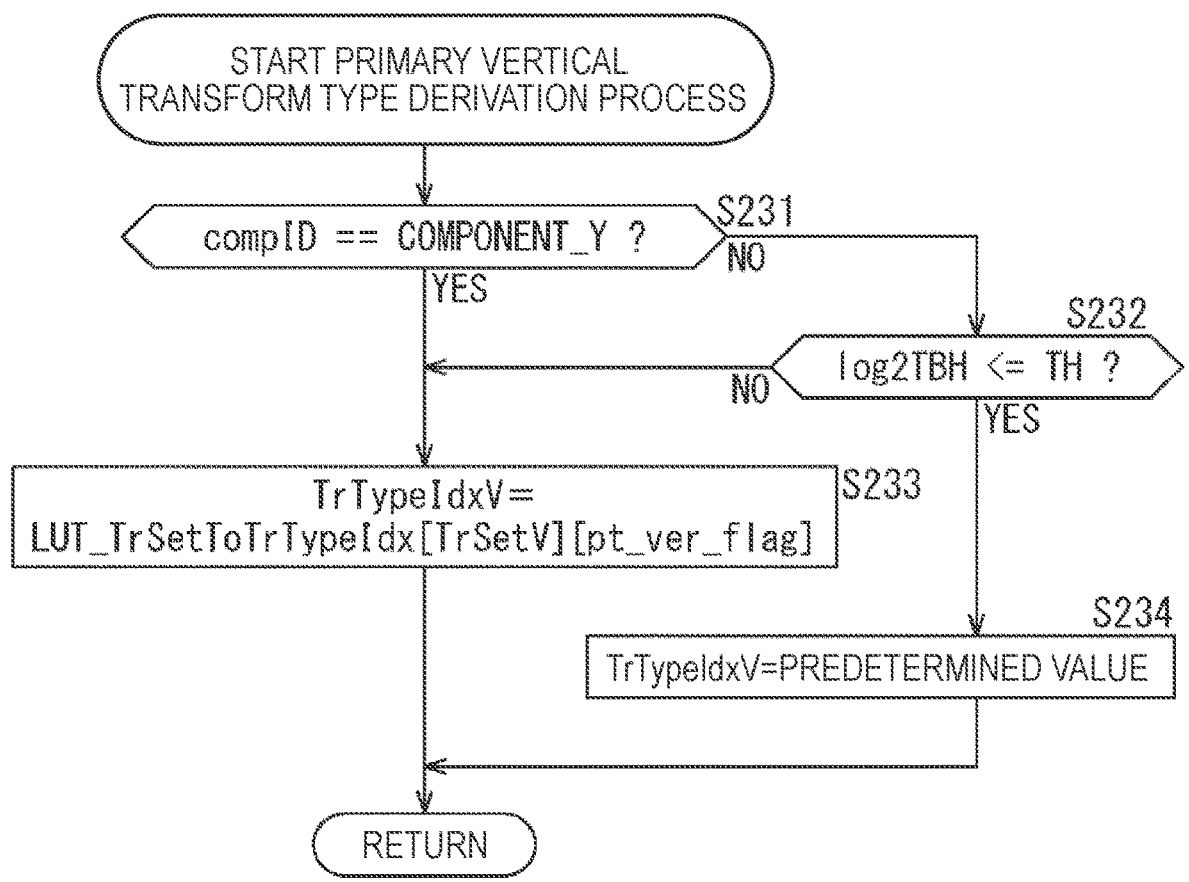

FIG. 27

| No. | Inference of chrominance from luminance | Condition for omitting transform skip flag ts_flag[Cb/Cr] of chrominance ||||| Other characteristics: Flag indicating whether information of luminance is to be used for chrominance | Remark | Effect |
|---|---|---|---|---|---|---|---|---|---|
| | | INTRA CU ||| INTER CU | | | | |
| | | No additional condition | IntraPredModeY == IntraPredModeC | IntraPredModeY == IntraBC | | | | | |
| #0 | | | | | | | | SIGNALING AT ALL TIMES | |
| #1 | x | x | | | x | | | OMIT ENCODING OF TRANSFORM SKIP OF CHROMINANCE AT ALL TIMES | REDUCTION IN OVERHEAD |
| #2 | x | | | | x | | | OMITTED ONLY IN INTER | IMPROVEMENT IN CODING EFFICIENCY OF INTRA |
| #3 | x | | x | | x | | | | REDUCTION IN OVERHEAD |
| #4 | x | | | x | x | | | | REDUCTION IN OVERHEAD |
| #5 | x | | | | | x | | SIGNALING IN COMMON FOR Cb/Cr | REDUCTION IN OVERHEAD |

FIG. 28

| | Descriptor |
|---|---|
| residual_coding( x0, y0, log2TBWSize, log2TBHSize, compID ) { | |
|   if( ts_enabled_flag && !transquant_bypass_flag && | |
|     ( log2TBSize <= log2MaxTSSize ) && compID==COMPONENT_Y) { | |
|     ts_flag [x0][y0][compID] | ae(v) } SYN21 |
|   ... syntaxes related to last_pos_(x, y), | |
|   coeff_sbk_flag/sig_flag/gr1_flag/gr2_flag/coeff_abs_level_remaining/coeff_sign_flag ... | |
|   if((apt_flag[x0][y0] && !transquant_bypass_flag && !ts_flag[x0][y0][compID] | |
|     && compID==COMPONENT_Y && numSig >= ptNumSigTH && | |
|     max(log2TBWSize, log2TBHSize)(<= maxPTSize) | |
|     pt_idx[x0][y0] | ae(v) } SYN22 |
|   ... | |
|   if((st_enabled_flag[x0][y0] && !transquant_bypass_flag && !ts_flag[x0][y0][compID] | |
|     && compID==COMPONENT_Y && numSig >= stNumSigTH )) | |
|     st_idx[x0][y0] | ae(v) } SYN22 |
|   ... | |

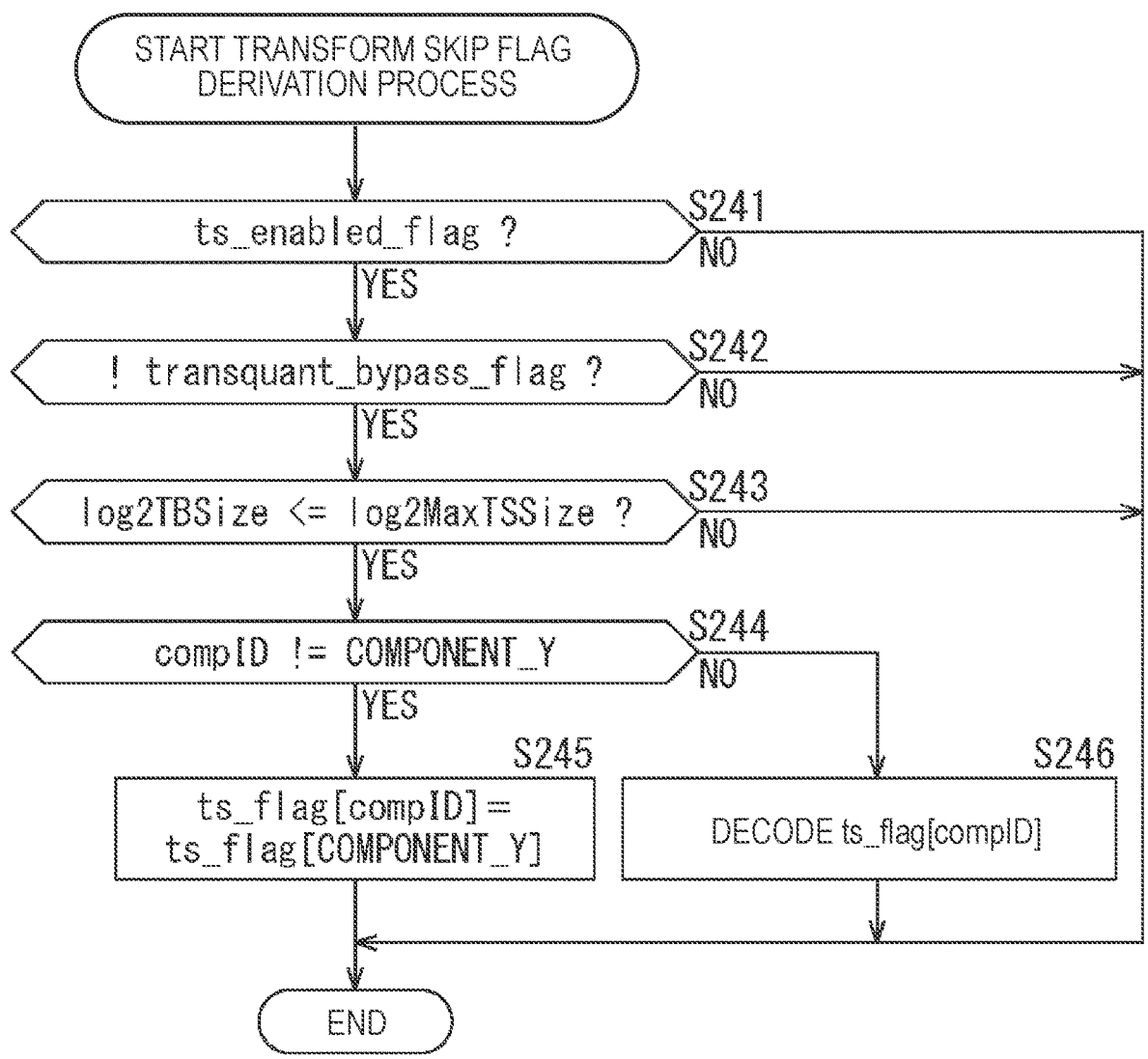

FIG. 30

| | Descriptor |
|---|---|
| residual_coding( x0, y0, log2TBWSize, log2TBHSize, compID ) { | |
|   if( ts_enabled_flag && !transquant_bypass_flag && | |
|     ( log2TBSize <= log2MaxTSSize ) && | |
|     (CuPredMode==MODE_INTRA || CuPredMode==MODE_INTER && compID==COMPONENT_Y)) | |
|     ts_flag[x0][y0][compID] | ae(v) |  ⎫ SYN21
|   ... syntaxes related to last_pos_[x,y], | |
|   coeff_sbk_flag/sig_flag/gr1_flag/gr2_flag/coeff_abs_level_remaining/coeff_sign_flag ... | |
|   if((apt_flag[x0][y0] && !transquant_bypass_flag && !ts_flag[x0][y0][compID] | |
|     && compID==COMPONENT_Y && numSig >= ptNumSigTH && | |  ⎫ SYN22
|     max(log2TBWSize, log2TBHSize)<= maxPTSize) | |
|     pt_idx[x0][y0] | ae(v) |
|   ... | |
|   if((st_enabled_flag[x0][y0] && !transquant_bypass_flag && !ts_flag[x0][y0][compID] | |
|     && compID==COMPONENT_Y && numSig >= stNumSigTH )) | |  ⎫ SYN22
|     st_idx[x0][y0] | ae(v) |
|   ... | |

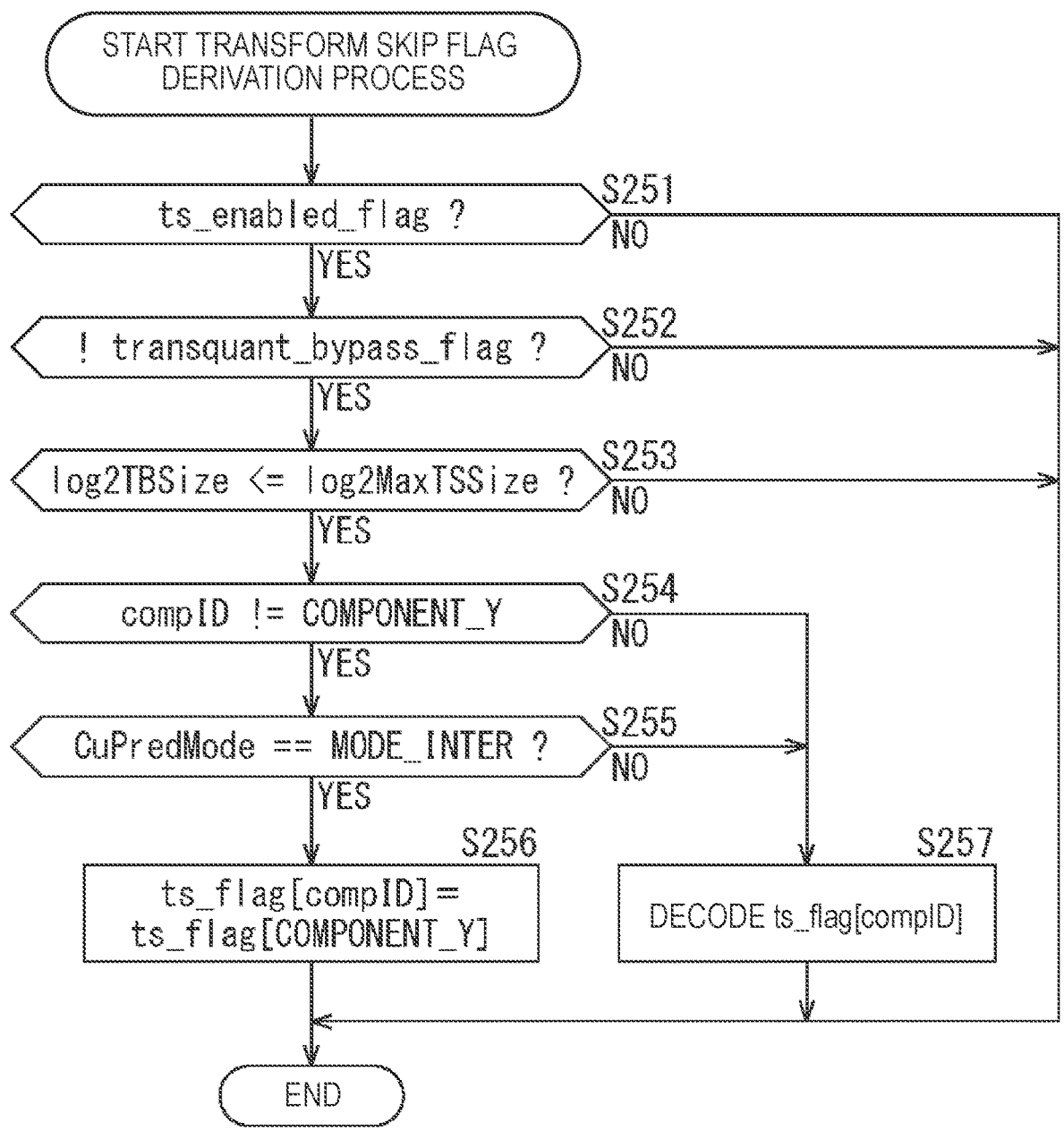

FIG. 32

| | Descriptor |
|---|---|
| residual_coding( x0, y0, log2TBWSize, log2TBHSize, compID ) { | |
|   if( ts_enabled_flag && !transquant_bypass_flag && | |
|     ( log2TBSize <= log2MaxTSSize ) && | |
|     ( CuPredMode==MODE_INTRA && compID==COMPONENT_Y \|\| | |
|       CuPredMode==MODE_INTRA && compID!=COMPONENT_Y && IntraPredModeY!=IntraPredModeC | } SYN21 |
|       CuPredMode==MODE_INTER && compID==COMPONENT_Y) ) | |
|     ts_flag [x0][y0][compID] | ae(v) |
|   ... syntaxes related to last_pos_[x,y], | |
|     coeff_sbk_flag/sig_flag/gr1_flag/gr2_flag/coeff_abs_level_remaining/coeff_sign_flag ... | |
|   if( (apt_flag[x0][y0] && !transquant_bypass_flag && !ts_flag[x0][y0] && | |
|     && compID==COMPONENT_Y && numSig >= ptNumSigTH && | } SYN22 |
|     max(log2TBWSize, log2TBHSize)<= maxPTSize) | |
|     pt_idx[x0][y0] | ae(v) |
|   ... | |
|   if( (st_enabled_flag[x0][y0] && !transquant_bypass_flag && !ts_flag[x0][y0][compID] | |
|     && compID==COMPONENT_Y && numSig >= stNumSigTH )) | } SYN22 |
|     st_idx[x0][y0] | ae(v) |
|   ... | |
| } | |

FIG. 34

| | Descriptor |
|---|---|
| residual_coding( x0, y0, log2TBWSize, log2TBHSize, compID ) { | |
| if( ts_enabled_flag && !transquant_bypass_flag && | |
| ( log2TBSize <= log2MaxTSSize ) && | |
| ( CuPredMode==MODE_INTRA && compID==COMPONENT_Y \|\| | |
| CuPredMode==MODE_INTRA && compID!=COMPONENT_Y && IntraPredModeY!=IntraBC | |
| CuPredMode==MODE_INTER && compID==COMPONENT_Y )) | |
| ts_flag [x0][y0][compID] | ae(v) |
| ... syntaxes related to last_pos_[x,y], | |
| coeff_sbk_flag/sig_flag/gr1_flag/gr2_flag/coeff_abs_level_remaining/coeff_sign_flag ... | |
| if( apt_flag[x0][y0] && !transquant_bypass_flag && !ts_flag[x0][y0] && | |
| && compID==COMPONENT_Y && numSig >= ptNumSigTH && | |
| max(log2TBWSize, log2TBHSize)<= maxPTSize) | |
| pt_idx[x0][y0] | ae(v) |
| ... | |
| if((st_enabled_flag[x0][y0] && !transquant_bypass_flag && !ts_flag[x0][y0] | |
| && compID==COMPONENT_Y && numSig >= stNumSigTH )) | |
| st_idx[x0][y0] | ae(v) |
| } | |

SYM21: ts_flag row
SYM22: pt_idx row
SYM22: st_idx row

FIG. 36

| | Descriptor |
|---|---|
| transform_unit( x0, y0, log2TBWSizeL, log2TBHSizeL) | |
| ... | |
|   for (compID=0; compID<numValidChannel; compID++) { | |
|     cbf[x0][y0][compID] | ae(v) |
|     if( cbf[x0][y0][compID] ) { | |
|       if( cbf[x0][y0][COMPONENT_Y] && apt_enabled_flag ) { | |
|         apt_flag[x0][y0] | ae(v) |
|       } | |
|       if (ts_flag[x0][y0][COMPONENT_Y] && compID==COMPONENT_Cb) | |
|         chroma_ts_info_infer_flag[x0][y0] | ae(v) |
|       log2TBWSize = compID==COMPONENT_Y? log2TBWSizeL : log2TBWSizeL>>1 | |
|       log2TBHSize = compID==COMPONENT_Y? log2TBHSizeL : log2TBHSizeL>>1 | |
|       residual_coding( x0, y0, log2TBWSize, log2TBHSize, compID) | |
|     } | |
|   } | |
| ... | |

FIG. 37

| | Descriptor |
|---|---|
| residual_coding( x0, y0, log2TBWSize, log2TBHSize, compID ) {<br>  if( ts_enabled_flag && ! transquant_bypass_flag &&<br>    ( log2TBSize <= log2MaxTSSize ) &&<br>    ( compID!=COMPONENT_Y && !chroma_ts_info_infer_flag)) | |
|     ts_flag [x0][y0][compID] | ae(v) |
|   ... syntaxes related to last_pos_(x, y),<br>  coeff_sbk_flag/sig_flag/gr1_flag/gr2_flag/coeff_abs_level_remaining/coeff_sign_flag ... | |
|   if((apt_flag[x0][y0] && !transquant_bypass_flag && !ts_flag[x0][y0][compID]<br>    && compID==COMPONENT_Y && numSig >= ptNumSigTH &&<br>    max(log2TBWSize, log2TBHSize)<= maxPTSize) | |
|     pt_idx[x0][y0] | ae(v) |
|   ... | |
|   if((st_enabled_flag[x0][y0] && !transquant_bypass_flag && !ts_flag[x0][y0][compID]<br>    && compID==COMPONENT_Y && numSig >= stNumSigTH )) | |
|     st_idx[x0][y0] | ae(v) |
| } | |

SYN21 (ts_flag row)
SYN22 (pt_idx row)
SYN22 (st_idx row)

FIG. 39

SECONDARY TRANSFORM IDENTIFIER st_idx[Cb/Cr] OF CHROMINANCE

| No. | Inference of chrominance from luminance | Condition for omitting transform skip flag of chrominance | | | | Other characteristics | Remark | Effect |
|---|---|---|---|---|---|---|---|---|
| | | Intra CU | | | Inter CU | Flag indicating whether information of luminance is to be used for chrominance | | |
| | | No additional condition | IntraPredModeY == IntraPredModeC | IntraPredModeY == IntraBC | | | | |
| #0 | × | | | | | | SIGNALING ONE st_idx (chroma_st_idx) for Cb/Cr | |
| #1 | × | × | | | | | | Reduction in overhead |
| #2 | × | | | | × | | | Improvement in coding efficiency of intra |
| #3 | × | | × | | × | | | Reduction in overhead |
| #4 | × | | | × | × | | | Reduction in overhead |
| #5 | × | | | | | × | | Reduction in overhead |

FIG. 40

| | Descriptor |
|---|---|
| transform_unit( x0, y0, log2TBWSizeL, log2TBHSizeL) | |
| ... | |
|   for (compID=0; compID<numValidChannel; compID++) { | |
|     cbf[x0][y0][compID] | ae(v) |
|     if( cbf[x0][y0][compID] ) { | |
|       if( cbf[x0][y] [COMPONENT_Y] && apt_enabled_flag ) { | |
|         apt_flag[x0][y0] | ae(v) |
|       } | |
|       log2TBWSize = compID==COMPONENT_Y? log2TBWSizeL : log2TBWSizeL>>1 | |
|       log2TBHSize = compID==COMPONENT_Y? log2TBHSizeL : log2TBHSizeL>>1 | |
|       residual_coding( x0, y0, log2TBWSize, log2TBHSize, compID) | |
|     } | |
|   } | |
|   numNonZeroCoeffY = 0 | |
|   numNonZeroCoeffC = 0 | |
|   if (!ts_flag[COMPONENT_Y]) | |
|     numNonZeroCoeffY = countNonZeroCoeff (COMPONENT_Y) | |
|   if ((st_enabled_flag[x0][y0] && !transquant_bypass_flag && | |
|     numNonZeroCoeffY >= stNumNonZeroCoeffTH )) { | |
|     st_idx[x0][y0] | ae(v) |
|   } | |
|   if (!ts_flag[x0][y0][COMPONENT_Cb]) | |
|     numNonZeroCoeffC = countNonZeroCoeff (COMPONENT_Cb) | |
|   if (!ts_flag[x0][y0][COMPONENT_Cr]) | |
|     numNonZeroCoeffC += countNonZeroCoeff (COMPONENT_Cr) | |
|   if ((st_enabled_flag[x0][y0] && !transquant_bypass_flag && | |
|     numNonZeroCoeffC >= stNumNonZeroCoeffTH )) { | |
|     chroma_st_idx[x0][y0] | ae(v) |
|   } | |
| } | |

FIG. 41

```
transform_unit( x0, y0, log2TBWSizeL, log2TBHSizeL)                                    Descriptor
...
  numNonZeroCoeffY = 0
  numNonZeroCoeffC = 0
  if (!ts_flag[COMPONENT_Y])
    numNonZeroCoeffY = countNonZeroCoeff (COMPONENT_Y)
  if((st_enabled_flag[x0][y0] && !transquant_bypass_flag &&
     numNonZeroCoeffY >= stNumNonZeroCoeffTH )) {
    st_idx[x0][y0]                                                                      ae(v)
  }
  if (!ts_flag[x0][y0][COMPONENT_Cb])
    numNonZeroCoeffC = countNonZeroCoeff (COMPONENT_Cb)
  if (!ts_flag[x0][y0][COMPONENT_Cr])
    numNonZeroCoeffC += countNonZeroCoeff (COMPONENT_Cr)
  if((st_enabled_flag[x0][y0] && !transquant_bypass_flag &&
     numNonZeroCoeffC >= stNumNonZeroCoeffTH )) {
    chroma_st_idx[x0][y0] = st_idx[x0][y0]
  }
}
```

FIG. 43

```
transform_unit( x0, y0, log2TBWSize, log2TBHSize) {                              Descriptor
  ...
  numNonZeroCoeffY = 0
  numNonZeroCoeffC = 0
  if (!ts_flag[COMPONENT_Y])
    numNonZeroCoeffY = countNonZeroCoeff (COMPONENT_Y)
  if((st_enabled_flag[x0][y0] && !transquant_bypass_flag &&
      numNonZeroCoeffY >= stNumNonZeroCoeffTH ) ) {
    st_idx[x0][y0]                                                               ae(v)
  }
  if (!ts_flag[x0][y0][COMPONENT_Cb])
    numNonZeroCoeffC = countNonZeroCoeff (COMPONENT_Cb)
  if (!ts_flag[x0][y0][COMPONENT_Cr])
    numNonZeroCoeffC += countNonZeroCoeff (COMPONENT_Cr)
  if((st_enabled_flag[x0][y0] && !transquant_bypass_flag &&
      numNonZeroCoeffC >= stNumNonZeroCoeffTH ) ) {
    if (CuPredMode==MODE_INTRA)
      chroma_st_idx[x0][y0]                                                      ae(v)
    else
      chroma_st_idx[x0][y0] = st_idx[x0][y0]
  }
}
```

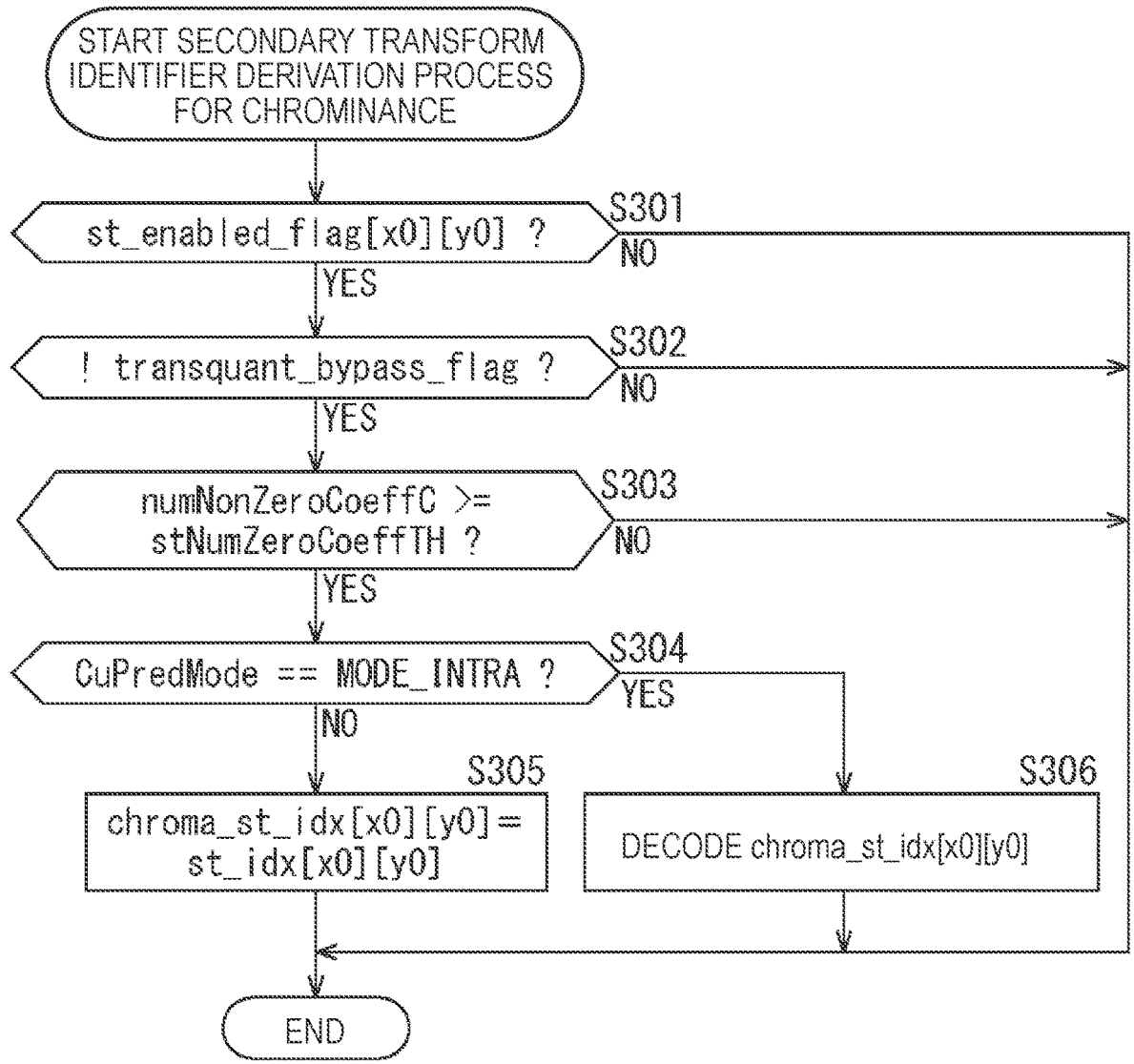

FIG. 45

| | Descriptor |
|---|---|
| transform_unit( x0, y0, log2TBWSizeL, log2TBHSizeL) { | |
| ... | |
|   numNonZeroCoeffY = 0 | |
|   numNonZeroCoeffC = 0 | |
|   if (!ts_flag[COMPONENT_Y) | |
|     numNonZeroCoeffY = countNonZeroCoeff (COMPONENT_Y) | |
|   if((st_enabled_flag[x0][y0] && !transquant_bypass_flag && | |
|     numNonZeroCoeffY >= stNumNonZeroCoeffTH )) { | |
|     st_idx[x0][y0] | ae(v) |
|   } | |
|   if (!ts_flag[x0][y0][COMPONENT_Cb]) | |
|     numNonZeroCoeffC = countNonZeroCoeff (COMPONENT_Cb) | |
|   if (!ts_flag[x0][y0][COMPONENT_Cr]) | |
|     numNonZeroCoeffC += countNonZeroCoeff (COMPONENT_Cr) | |
|   if((st_enabled_flag[x0][y0] && !transquant_bypass_flag && | |
|     numNonZeroCoeffC >= stNumNonZeroCoeffTH )) { | |
|     if ((CuPredMode==MODE_INTRA && IntraPredModeY!=IntraPredModeC)) | |
|       chroma_st_idx[x0][y0] | ae(v) |
|     else | |
|       chroma_st_idx[x0][y0] = st_idx[x0][y0] | |
|   } | |

FIG. 47

```
transform_unit( x0, y0, log2TBWSizeL, log2TBHSizeL)                      Descriptor
  ...
  numNonZeroCoeffY = 0
  numNonZeroCoeffC = 0
  if (!ts_flag[COMPONENT_Y])
    numNonZeroCoeffY = countNonZeroCoeff (COMPONENT_Y)
  if((st_enabled_flag[x0][y0] && !transquant_bypass_flag &&
      numNonZeroCoeffY >= stNumNonZeroCoeffTH )) {
    st_idx[x0][y0]                                                         ae(v)
  }
  if (!ts_flag[x0][y0][COMPONENT_Cb])
    numNonZeroCoeffC = countNonZeroCoeff (COMPONENT_Cb)
  if (!ts_flag[x0][y0][COMPONENT_Cr])
    numNonZeroCoeffC += countNonZeroCoeff (COMPONENT_Cr)
  if((st_enabled_flag[x0][y0] && !transquant_bypass_flag &&
      numNonZeroCoeffC >= stNumNonZeroCoeffTH )) {
    if ((CuPredMode==MODE_INTRA && IntraPredModeY!=IntraBC))
      chroma_st_idx[x0][y0]                                                ae(v)
    else
      chroma_st_idx[x0][y0] = st_idx[x0][y0]
  }
```

FIG. 49

| | Descriptor |
|---|---|
| transform_unit( x0, y0, log2TBWSizeL, log2TBHSizeL ) | |
| ... | |
| numNonZeroCoeffY = 0 | |
| numNonZeroCoeffC = 0 | |
| if (!ts_flag[COMPONENT_Y) | |
| numNonZeroCoeffY = countNonZeroCoeff (COMPONENT_Y) | |
| if((st_enabled_flag[x0][y0] && !transquant_bypass_flag && | |
| numNonZeroCoeff >= stNumNonZeroCoeffTH )) { | |
| st_idx[x0][y0] | ae(v) |
| } | |
| if (!ts_flag[x0][y0][COMPONENT_Cb) | |
| numNonZeroCoeffC = countNonZeroCoeff (COMPONENT_Cb) | |
| if (!ts_flag[x0][y0][COMPONENT_Cr) | |
| numNonZeroCoeffC += countNonZeroCoeff (COMPONENT_Cr) | |
| if((st_enabled_flag[x0][y0] && !transquant_bypass_flag && | |
| numNonZeroCoeff >= stNumNonZeroCoeffTH )) { | |
| chroma_st_idx_infer_flag[x0][y0] | ae(v) |
| if ( !chroma_st_idx_infer_flag[x0][y0] ) | |
| chroma_st_idx[x0][y0] | ae(v) |
| else | |
| chroma_st_idx[x0][y0] = st_idx[x0][y0] | |
| } | |

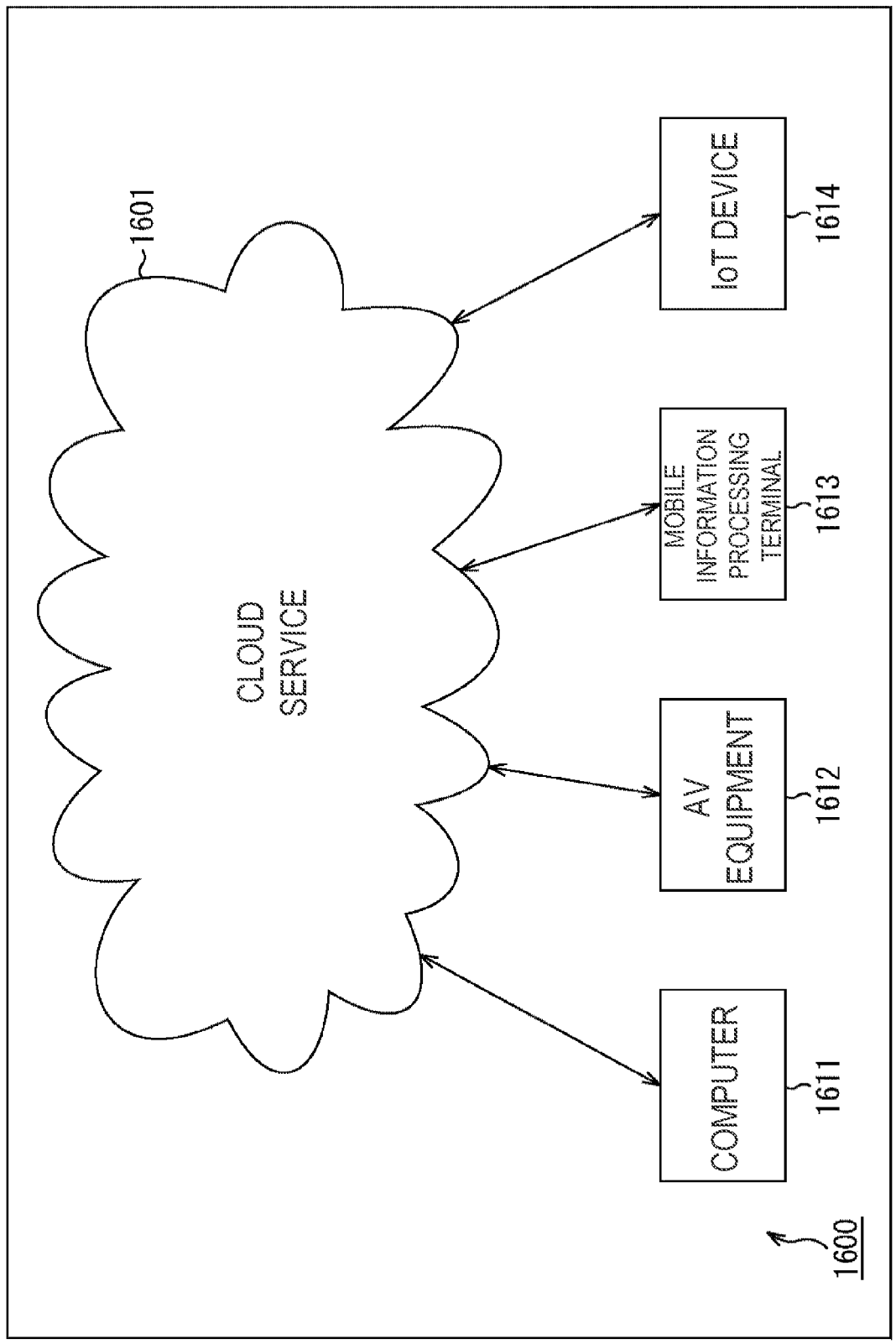

IMAGE PROCESSING APPARATUS AND METHOD FOR CURBING DETERIORATION IN CODING EFFICIENCY

CROSS REFERENCE TO PRIOR APPLICATION

This application is a continuation of U.S. patent application Ser. No. 16/468,451 (filed on Jun. 11, 2019), which is a National Stage Patent Application of PCT International Patent Application No. PCT/JP2017/045042 (filed on Dec. 15, 2017) under 35 U.S.C. § 371, which claims priority to Japanese Patent Application No. 2016-256732 (filed on Dec. 28, 2016), which are all hereby incorporated by reference in their entirety.

TECHNICAL FIELD

The present disclosure relates to an image processing apparatus and method, and particularly to an image processing apparatus and method that can curb deterioration in coding efficiency.

BACKGROUND ART

In the related art, an adaptive primary transform (Adaptive Multiple Core Transforms or AMT) for 20 adaptively selecting a primary transform from a plurality of different orthogonal transforms for each of a primary transform in a horizontal direction PThor (which is also referred to as a primary horizontal transform) and a primary transform in a vertical direction PTver (which is also referred to as a primary vertical transform) of each transform unit (TU) for luminance is described (e.g., refer to Non-Patent Literature 1).

CITATION LIST

Non-Patent Literature

Non-Patent Literature 1: Jianle Chen, Elena Alshina, Gary J. Sullivan. Jens-Rainer, and Jill Boyce, "Algorithm Description of Joint Exploration Test Model 4" JVET-D1001_v3, Joint Video Exploration Team (JVET) of ITU-T SG 16 WP 3 and ISO/IEC JTC 1/SC 29/WG 11 $4^{th}$ Meeting at Chengdu. China, Oct. 15 to 21, 2016

DISCLOSURE OF INVENTION

Technical Problem

However, in Non-Patent Literature 1, although the adaptive primary transform can be applied only to luminance (Y), it is not applied to chrominances (Cb and Cr). Thus, there is concern of the coding efficiency of the primary transform for the chrominances deteriorating more in comparison to that for luminance.

The present disclosure takes the above circumstances into consideration and aims to curb deterioration in coding efficiency.

Solution to Problem

An image processing apparatus of a first aspect of the present technology is an image processing apparatus including: an inverse orthogonal transform unit configured to perform an inverse orthogonal transform of chrominance using information regarding the inverse orthogonal transform of chrominance derived on the basis of information regarding an inverse orthogonal transform of luminance.

The information regarding the inverse orthogonal transform can include an adaptive primary transform flag indicating whether an adaptive inverse primary transform of adaptively selecting one from a plurality of different inverse orthogonal transforms and using the selected transform as an inverse primary transform is to be applied.

A value of the adaptive primary transform flag of chrominance can be set to a value of the adaptive primary transform flag of luminance.

The information regarding the inverse orthogonal transform can include a primary transform identifier indicating which inverse primary transform is to be applied to inverse primary transforms in a vertical direction and a horizontal direction.

A value of the primary transform identifier of chrominance can be set to a value of the primary transform identifier of luminance in a case in which the adaptive primary transform flag of chrominance is true, and can be set to a predetermined value in a case in which the adaptive primary transform flag of chrominance is false.

The inverse orthogonal transform unit can perform the inverse primary transform as the inverse orthogonal transform.

The inverse orthogonal transform unit can perform an inverse primary horizontal transform which is the inverse primary transform in the horizontal direction and an inverse primary vertical transform which is the inverse primary transform in the vertical direction as the inverse orthogonal transform.

A value of the adaptive primary transform flag of chrominance can be set to a value of the adaptive primary transform flag of luminance in a case in which a prediction type of a coding block to which a transform block to be processed belongs is inter prediction.

A value of the adaptive primary transform flag of chrominance can be set to a value of the adaptive primary transform flag of luminance in a case in which a prediction type of a coding block to which a transform block to be processed belongs is inter prediction or a case in which the prediction type is intra prediction of which a prediction mode is intra block copy.

A value of the adaptive primary transform flag of chrominance can be set to a value of the adaptive primary transform flag of luminance in a case in which a prediction type of a coding block to which a transform block to be processed belongs is inter prediction or a case in which the prediction type is intra prediction in which prediction modes for luminance and chrominance match each other.

A value of the adaptive primary transform flag of chrominance can be set to a value of the adaptive primary transform flag of luminance in a case in which a chrominance adaptive primary transform information inference flag indicating whether the adaptive primary transform flag of chrominance is to be inferred on the basis of the adaptive primary transform flag of luminance is true.

A value of the adaptive primary transform flag of chrominance can be set to a value of the adaptive primary transform flag of luminance in a case in which a size of a short side of a transform block to be processed of chrominance is greater than or equal to a predetermined threshold value.

The inverse orthogonal transform unit can be configured to perform an inverse primary horizontal transform which is an inverse primary transform in a horizontal direction and an inverse primary vertical transform which is an inverse primary transform in a vertical direction as the inverse orthogonal transform, a transform type of the inverse primary horizontal transform can be set on the basis of a horizontal transform set and a primary horizontal transform specifying flag in a case in which a size of a picture width of a transform block to be processed of chrominance is greater than a predetermined threshold value, and a transform type of the inverse primary vertical transform can be set on the basis of a vertical transform set and a primary vertical transform specifying flag in a case in which a size of a picture height of the transform block to be processed of chrominance is greater than a predetermined threshold value.

The information regarding the inverse orthogonal transform can include a transform skip flag indicating whether an inverse orthogonal transform process is to be skipped.

A value of the transform skip flag of chrominance can be set to a value of the transform skip flag of luminance.

The information regarding the inverse orthogonal transform can include a secondary transform identifier indicating which inverse secondary transform is to be applied.

A value of the secondary transform identifier of chrominance can be set to a value of the secondary transform identifier of luminance.

An image processing method of the first aspect of the present technology is an image processing method including: performing an inverse orthogonal transform of chrominance using information regarding the inverse orthogonal transform of chrominance derived on the basis of information regarding an inverse orthogonal transform of luminance.

An image processing apparatus of a second aspect of the present technology is an image processing apparatus including: an orthogonal transform unit configured to perform an orthogonal transform of chrominance using information regarding the orthogonal transform of chrominance derived on the basis of information regarding an orthogonal transform of luminance.

An image processing method of the second aspect of the present technology is an image processing method including: performing an orthogonal transform of chrominance using information regarding the orthogonal transform of chrominance derived on the basis of information regarding an orthogonal transform of luminance.

In the image processing apparatus and method of the first aspect of the present technology, an inverse orthogonal transform of chrominance is performed using information regarding the inverse orthogonal transform of chrominance derived on the basis of information regarding an inverse orthogonal transform of luminance.

In the image processing apparatus and method of the second aspect of the present technology, an orthogonal transform of chrominance is performed using information regarding the orthogonal transform of chrominance derived on the basis of information regarding an orthogonal transform of luminance.

Advantageous Effects of Invention

According to the present disclosure, images can be processed. Particularly, deterioration in coding efficiency can be curbed.

BRIEF DESCRIPTION OF DRAWINGS

FIG. 1 is a diagram illustrating a correspondence relation between transform sets and selected orthogonal transforms.

FIG. 2 is a diagram illustrating a correspondence relation between types of orthogonal transform and functions to be used.

FIG. 3 is a diagram illustrating a correspondence relation between transform sets and prediction modes.

FIG. 4 is a diagram illustrating an example of syntax and semantics of a transform unit.

FIG. 5 is a diagram illustrating an example of syntax of residual_coding.

FIG. 6 is a diagram illustrating examples of parameters of chrominance derived using values of luminance.

FIG. 7 is a diagram illustrating an example of a derivation method of adaptive primary transform flags of chrominance.

FIG. 16 is a flowchart describing an example of the flow of an inverse primary transform selection process.

FIG. 17 is a flowchart describing an example of the flow of a chrominance adaptive primary transform information derivation process.

FIG. 18 is a flowchart describing an example of the flow of a chrominance adaptive primary transform information derivation process.

FIG. 19 is a flowchart describing an example of the flow of a chrominance adaptive primary transform information derivation process.

FIG. 20 is a diagram illustrating an example of syntax and semantics of a transform unit.

FIG. 21 is a diagram illustrating an example of syntax of residual_coding.

FIG. 22 is a flowchart describing an example of the flow of a chrominance adaptive primary transform information inference flag decoding process.

FIG. 23 is a flowchart describing an example of the flow of a chrominance adaptive primary transform information derivation process.

FIG. 24 is a flowchart describing an example of the flow of a chrominance adaptive primary transform information derivation process.

FIG. 25 is a flowchart describing an example of the flow of a primary horizontal transform type derivation process.

FIG. 26 is a flowchart describing an example of the flow of a primary vertical transform type derivation process.

FIG. 27 is a diagram illustrating an example of a derivation method for a transform skip flag of a chrominance.

FIG. 28 is a diagram illustrating an example of syntax of residual_coding.

FIG. 29 is a flowchart describing an example of the flow of a transform skip flag derivation process.

FIG. 30 is a diagram illustrating an example of syntax of residual_coding.

FIG. 31 is a flowchart describing an example of the flow of a transform skip flag derivation process.

FIG. 32 is a diagram illustrating an example of syntax of residual_coding.

FIG. 34 is a diagram illustrating an example of syntax of residual_coding.

FIG. 36 is a diagram illustrating an example of syntax and semantics of a transform unit.

FIG. 37 is a diagram illustrating an example of syntax of residual_coding.

FIG. 39 is a diagram illustrating an example of a secondary transform identifier derivation method of a chrominance.

FIG. 40 is a diagram illustrating an example of syntax of a transform unit.

FIG. 41 is a diagram illustrating an example of syntax of a transform unit.

FIG. 43 is a diagram illustrating an example of syntax of a transform unit.

FIG. 44 is a flowchart describing an example of the flow of a secondary transform identifier derivation process for a chrominance.

FIG. 45 is a diagram illustrating an example of syntax of a transform unit.

FIG. 47 is a diagram illustrating an example of syntax of a transform unit.

FIG. 49 is a diagram illustrating an example of syntax of a transform unit.

FIG. 77 is a block diagram illustrating one example of a schematic configuration of a network system.

MODE(S) FOR CARRYING OUT THE INVENTION

Figure 8:
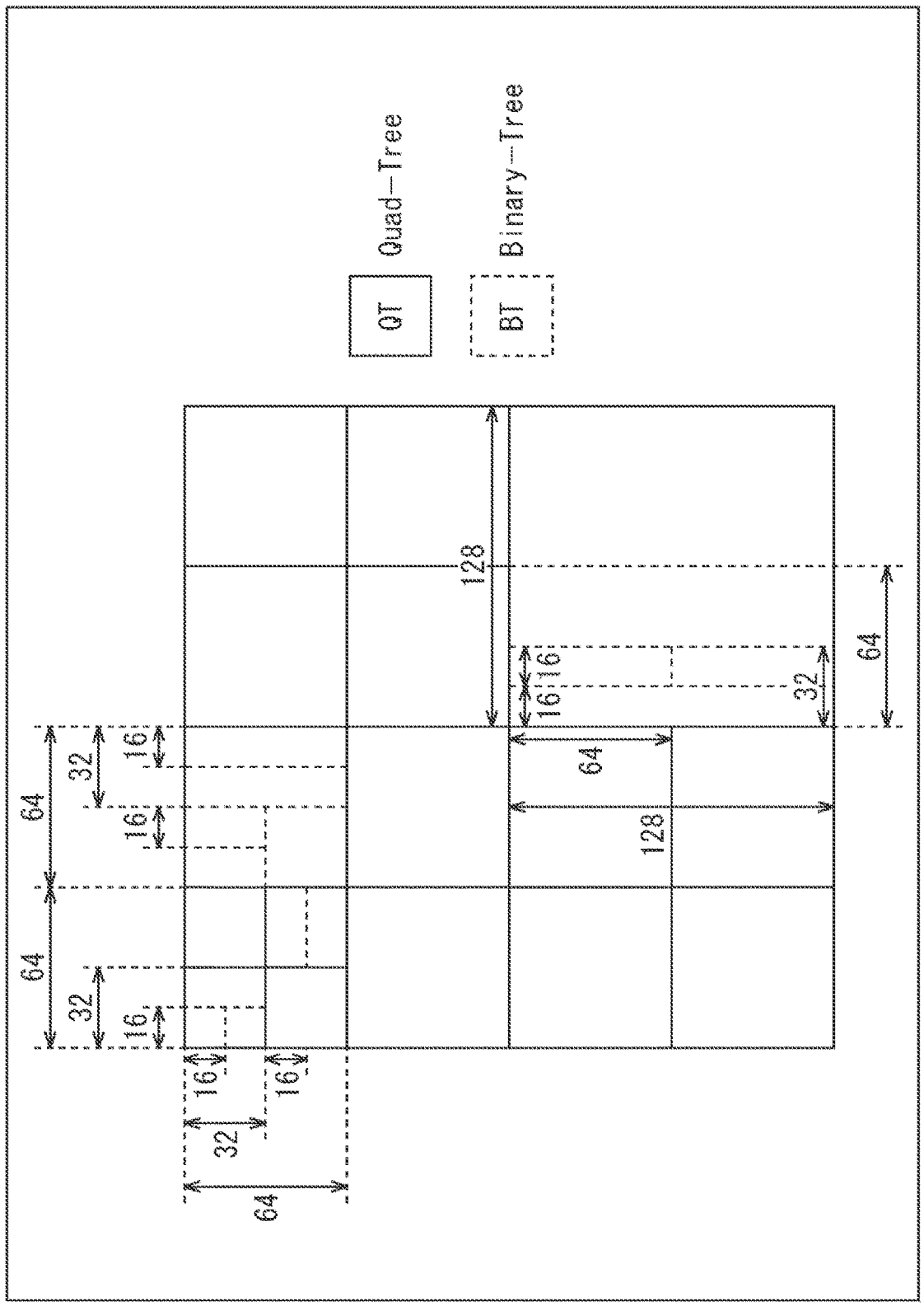
FIG. 8 is a diagram illustrating shapes of a CU, a PU, and a TU.

Exemplary embodiments for implementing the present disclosure (which will be referred to as embodiments below) will be described below. Note that description will be provided in the following order.

1. Orthogonal transform of chrominance
2. First embodiment (image decoding apparatus, apt_flag, and pt_idx)
3. Second embodiment (image decoding apparatus and ts_flag)
4. Third embodiment (image decoding apparatus and st_idx)
5. Fourth embodiment (image encoding apparatus, apt_flag, and pt_idx)
6. Fifth embodiment (image encoding apparatus and ts_flag)
7. Sixth embodiment (image encoding apparatus and st_idx)
8. Others 1. Orthogonal Transform of Chrominance <Primary Transform>

In the test model described in Non-Patent Literature 1 (Joint Exploration Test Model 4 (JEM 4)), for the purpose of improving coding efficiency of a 4K high-resolution image or the like, the maximum size of a coding tree unit (CTU) is expanded from 128×128 to 256×256. Furthermore, as a structure of block division, in addition to quadtree split of the related art, binary trees in the horizontal/vertical directions have been introduced, and accordingly, rectangular transform blocks have also been introduced in addition to square transform blocks.

In addition, in the JEM 4, an adaptive primary transform (Adaptive Multiple Core Transforms (AMT)) of adaptively selecting a primary transform from a plurality of different orthogonal transforms for each primary transform in a horizontal direction PThor (which is also referred to as a primary horizontal transform) and a primary transform PTver in a vertical direction (which is also referred to as a primary vertical transform) of each transform block for luminance is disclosed.

More specifically, in a case in which an adaptive primary transform flag apt_flag (which is also referred to as amt_flag, cu_pt_flag, or emt_flag) indicating whether or not an adaptive primary transform for luminance is to be executed in the unit of a transform block of luminance (which is also referred to as a luminance transform block) is 0 (false), a discrete cosine transform (DCT)-II or a discrete sine transform (DST)-VII is (uniquely) decided using mode information as an orthogonal transform applied to a horizontal primary transform and a vertical primary transform.

On the other hand, in a case in which, for example, an adaptive primary transform flag apt_flag of luminance is 1 (true) as in the table (LUT_TrSetToTrTypIdx) illustrated in FIG. 1, a transform set TrSet including orthogonal transforms serving as candidates for the primary transform in each of the horizontal direction (x direction) and the vertical direction (y direction) is selected from four candidates (Transform Set Idx=0 to 3). The DST-VII, the DCT-VIII, and the like illustrated in FIG. 1 indicate types of orthogonal transform, and each of the functions shown in the table of FIG. 2 is used for them.

Note that, in the table of FIG. 2, identifiers corresponding to orthogonal transforms of respective types (transform type identifier TrTypeIdx) are defined. For example, if a type of orthogonal transform (Transform Type) is DCT-II, 0 is allocated as a value of the transform type identifier TrTypeIdx.

Selection (decision) of a transform set TransformSet varies depending on a prediction type of a coding unit (CU: which is also referred to as a unit of coding) to which a transform block to be processed belongs. For example, if the prediction type is intra prediction, selection is made on the basis of intra prediction mode (IntraPredMode) as illustrated in the table of FIG. 3 (LUT_IntraModeToTrSet). For example, selection is made to set a transform set identifier TrSetIdx for designating a transform set TrSet corresponding to a transform set (TrSetH or TrSetV) of each direction as illustrated in the following formulas (1) and (2).

$$TrSetH=LUT\_IntraModeToTrSet[IntraPredMode][H\ (=0)] \quad (1)$$

$$TrSetV=LUT\_IntraModeToTrSet[IntraPredMode][V\ (=1)] \quad (2)$$

Here, TrSetH represents a transform set of a primary horizontal transform PThor (also referred to as a primary horizontal transform set), and TrSetV represents a transform set of a primary vertical transform PTver (also referred to as a primary vertical transform set). In addition, a lookup table LUT_IntraModeToTrSet represents the correspondence table of FIG. 3. The first array of the lookup table LUT_IntraModeToTrSet[ ][ ] has an intra prediction mode IntraPredMode as an argument and the second array has {H=0, V=1} as an argument.

In a case of the intra prediction mode number 18 (IntraPredMode=18), the transform set of the transform set identifier TrSetIdx=2 indicated in the table (LUT_TrSetToTrTypeIdx) of FIG. 1 is selected as a primary horizontal transform set TrSetH, and the transform set of the transform set identifier TrSetIdx=0 indicated in the table of FIG. 1 is selected as a primary vertical transform set TrSetV.

If the prediction type is inter prediction, a transform set identifier TrSetIdx for designating a transform set TrSet for inter prediction (=InterTrSetIdx) is set for the transform sets in each of the directions (TrSetH and TrSetV) as in the following formulas (3) and (4). For example, the value of InterTrSet is 3 in the case of the table of FIG. 1.

$$TrSetH=InterTrSetIdx \quad (3)$$

$$TrSetV=InterTrSetIdx \quad (4)$$

Furthermore, which orthogonal transform in the selected transform set TrSet is to be applied to the primary horizontal transform is selected using a primary horizontal transform specifying flag pt_hor_flag. In addition, which orthogonal transform in the selected transform set TrSet is to be applied to the primary vertical transform is selected using a primary vertical transform specifying flag pt_ver_flag. For example, these are derived from the definition table of transform sets (LUT_TrSetToTrTypeIdx) illustrated in FIG. 1 using the primary {horizontal, vertical} transform set TrSet {H,V}, and the primary {horizontal, vertical} transform specifying flag pt_{hor, ver}_flag as arguments as illustrated in the following formulas (5) and (6).

$$TrTypeIdxH=LUT\_TrSetToTrTypeIdx[TrSetH][pt\_hor\_flag] \quad (5)$$

$$TrTypeIdxV=LUT\_TrSetToTrTypeIdx[TrSetV][pt\_ver\_flag] \quad (6)$$

In the case of an intra prediction mode number 18 (IntraPredMode=18), since the value of the transform set identifier TrSetIdx of the primary horizontal transform set TrSetH is 2 on the basis of the table of FIG. 3, an orthogonal transform to be applied to the primary horizontal transform is selected (designated) from the transform set having the transform set identifier TrSetIdx==2 on the transform set definition table LUT_TrSetToTrTVpeIdx of FIG. 1. That is, in a case in which the primary horizontal transform specifying flag pt_hor_flag is 0, the value "4" of the transform type identifier TrTypeIdx indicating DST-VII is set for the horizontal transform type identifier TrTypeIdxH designating the type of the orthogonal transform of the primary horizontal transform PThor as illustrated in FIG. 1, and in a case in which the primary horizontal transform specifying flag pt_hor_flag is 1, the value "1" of the transform type identifier TrTypeIdx indicating DCT-V is set for the horizontal transform type identifier TrTypeIdxH.

Note that a primary transform identifier pt_idx is derived from the primary horizontal transform specifying flag pt_hor_flag and the primary vertical transform specifying flag pt_ver_flag using the following formula (7).

$$pt\_idx=(pt\_ver\_flag<<1)+pt\_hor\_flag \quad (7)$$

That is, the upper 1 bit of the primary transform identifier pt_idx corresponds to the primary vertical transform specifying flag and the lower 1 bit corresponds to the value of the primary horizontal transform specifying flag. Encoding is performed by applying arithmetic coding to a bin string of the derived primary transform identifier pt_idx and generating a bit string. Note that the upper 1 bit of the pt_idx may be set as the primary horizontal transform specifying flag and the lower 1 bit may be set as the primary vertical transform specifying flag.

On the other hand, an adaptive primary transform is not applied to transform blocks of chrominance (Cb and Cr), and DCT-II is selected at all times as a type of orthogonal transform such as the primary horizontal transform and the primary vertical transform.

A of FIG. 4 is an example of a syntax table of a transform unit TU, and B of FIG. 4 shows an example of semantics corresponding thereto. In the syntax shown in A of FIG. 4, the residual data presence flag cbf[x0][y0][compID] (coded_block_flag) shown in the row denoted by reference symbol SYN11 is a flag indicating whether or not there are one or more non-zero coefficients in a transform block of a color signal designated with a color signal identifier compID as illustrated in B of FIG. 4. In a case in which the flag is 1 (true), it indicates that there are one or more non-zero coefficients in the corresponding transform block, and in a case in which the flag is 0 (false), it indicates that there is no non-zero coefficient in the transform block. Note that there also is a case in which a residual data presence flag cbf[x0][y0][COMPONENT_Y] for luminance is referred to as cbf_luma (cbf_luma=cbf[x0][y0][COMPONENT_Y]) for the sake of convenience.

In addition, the adaptive primary transform enabled flag apt_enabled_flag shown in A of FIG. 4 is information regarding permission for an adaptive primary transform as illustrated in B of FIG. 4. In a case in which the value of the flag is 1 (true), it indicates that information regarding the adaptive primary transform is present in the encoded data. In addition, in a case in which the value of the flag is 0 (false), it indicates that no information regarding the adaptive primary transform is present in the encoded data.

In addition, the adaptive primary transform flag apt_flag of the luminance transform block shown in the row denoted by reference symbol SYN12 in the syntax shown in A of FIG. 4 is a flag indicating whether or not the adaptive primary transform is to be applied to the transform block of luminance as illustrated in B of FIG. 4. In a case in which the value of the flag is 1 (true), the adaptive primary transform is applied, and in a case in which the value of the flag is 0 (false), the application primary transform is not applied. As illustrated in the syntax table of A of FIG. 4, in the case in which the residual data presence flag cbf_lum of luminance is "1" (i.e., true) and the adaptive primary transform enabled flag apt_enabled_flag is "1" (i.e., true), the adaptive primary transform flag apt_flag of luminance is encoded (decoded). In a case in which there is no apt_flag in encoded data, the value of apt_flag is interpreted to be 0.

Furthermore, in the syntax shown in A of FIG. 4, the residual data residual_coding ( ) of the transform block of the color signal designated with the color signal identifier compID shown in the row denoted by reference symbol SYN13 is encoded (decoded) in a case in which the residual data presence flag of the corresponding color signal is 1 (true).

FIG. 5 illustrates an example of syntax of residual_coding. In the syntax table shown in FIG. 5, the primary transform identifier pt_idx for luminance denoted by reference symbol SYN22 is encoded (decoded) in a case in which, the adaptive primary transform flag apt_flag of luminance is 1 (true), a transform quantization bypass flag transquant_bypass_flag is 0 (false), a transform skip flag ts_flag is 0 (false), and a color signal identifier compID indicates luminance (compID==COMPONENT_Y) and in a case in which the total number of non-zero coefficients present in a transform block numSig is greater than or equal to a predetermined threshold value ptNumSigTH and a long side of the transform block (max (log2TBWSize, log2TBHSize)) is equal to or smaller than a predetermined threshold value maxPTSize as illustrated in the syntax table. In a case in which there is no primary transform identifier pt_idx for luminance in the encoded data, the value of pt_idx is interpreted as 0.

In Non-Patent Literature 1, although the adaptive primary transform can be applied only to luminance (Y), it is not applied to chrominances (Cb and Cr). Thus, there is concern of the coding efficiency of the primary transform for the chrominances deteriorating more in comparison to that for luminance.

On the other hand, it is conceivable to explicitly encode, for example, an adaptive primary transform flag apt_flag and a primary transform identifier pt_idx for each transform block of a chrominance (Cb or Cr), similarly to luminance (Y). However, in the case of this method, since an adaptive primary transform flag apt_flag and a primary transform identifier pt_idx for a chrominance is encoded, there is concern of the code amount increasing and coding efficiency deteriorating.

Note that, also in this case, on the encoding side, it is necessary to determine a mode for selection/non-selection of an adaptive primary transform and determination of a primary transform identifier for each of color signals (Y, Cb, and Cr), and thus there is concern of the processing amount increasing. In addition, also on the decoding side, the adaptive primary transform flag apt_flag and the primary transform identifier pt_idx should be decoded for each of the color signals (Y, Cb, and Cr), and thus there is concern of the processing amount increasing.

<Use of Parameter of Luminance>

Thus, information regarding an (inverse) orthogonal transform for a chrominance is derived on the basis of information regarding an (inverse) orthogonal transform for luminance. That is, using the information regarding the (inverse) orthogonal transform for a chrominance derived on the basis of the (inverse) orthogonal transform for luminance, the (inverse) orthogonal transform for a chrominance is performed. For example, using the information regarding the (inverse) orthogonal transform for a chrominance derived on the basis of the (inverse) orthogonal transform for luminance, an (inverse) orthogonal transform unit that performs the (inverse) orthogonal transform for a chrominance is provided in an image processing apparatus.

In this manner, it is possible to omit encoding and decoding of the information regarding the (inverse) orthogonal transform for a chrominance, and thus an increase in the code amount can be curbed, and deterioration in coding efficiency can be prevented. In addition, an increase in a load of encoding and decoding can be curbed as well. Note that, in the present specification, an orthogonal transform and an inverse orthogonal transform are inverse processes with respect to each other, and it is assumed that data that has not been orthogonally transformed can be restored by, for example, performing an inverse orthogonal transform on the orthogonally transformed data. In addition, although information regarding an orthogonal transform is information to be used in the orthogonal transform, there also is a case in which the information can be used in the inverse orthogonal transform. In addition, although information regarding an inverse orthogonal transform is information to be used in the inverse orthogonal transform, there also is a case in which the information can be used in the orthogonal transform. That is, in the present specification, there is a case in which information regarding an orthogonal transform and information regarding the inverse orthogonal transform refer to the same information (the information regarding both transforms may include the same information). The same also applies to the relations between a primary transform and the inverse primary transform, and a secondary transform and the inverse secondary transform.

Content of the information regarding the (inverse) orthogonal transform is arbitrary. For example, as illustrated in the table of FIG. 6, the information may include an adaptive primary transform flag apt_flag indicating whether an adaptive (inverse) primary transform to be used as an (inverse) primary transform by adaptively selecting any of a plurality of different inverse orthogonal transforms is applied to a transform block to be processed. In addition, the information may also include a primary transform identifier pt_idx indicating which (inverse) primary transform is to be applied to the (inverse) primary transforms in the vertical direction and the horizontal direction.

For example, by deriving each of an adaptive primary transform flag apt_flag[Cb] of a chrominance (Cb) and an adaptive primary transform flag apt_flag[Cr] of a chrominance (Cr) on the basis of an adaptive primary transform flag apt_flag [Y] of luminance, it is possible to curb deterioration in coding efficiency of the chrominance (Cb/Cr). In addition, it is also possible to curb an increase in overhead for the code amount. In addition, for example, by deriving each of a primary transform identifier of the chrominance (Cb) pt_idx[Cb] and a primary transform identifier of the chrominance (Cr) pt_idx[Cr] on the basis of a primary transform identifier of luminance pt_idx[Y], it is possible to curb deterioration in coding efficiency of the chrominance (Cb/Cr). In addition, it is also possible to curb an increase in overhead for the code amount. Note that a primary transform identifier of a chrominance may be common for (shared between) Cb and Cr.

Further description will be provided with reference to the table of FIG. 7. In the related art, an adaptive (inverse) primary transform is not employed for a chrominance, and an adaptive primary transform flag apt_flag and a primary transform identifier pt_idx for the chrominance are omitted at all times as indicated in the row of No. #0. Since no adaptive (inverse) primary transform is used in such cases, there is concern of coding efficiency deteriorating as described above.

On the other hand, an adaptive (inverse) primary transform may be set to be applicable to the chrominance, and further an adaptive primary transform flag apt_flag and a primary transform identifier pt_idx for the chrominance can be inferred from an adaptive primary transform flag apt_flag and a primary transform identifier pt_idx for luminance at all times as indicated in the row of No. #1. For example, a value of an adaptive primary transform flag apt_flag[Cb/Cr] of a chrominance may be set to a value of an adaptive primary transform flag apt_flag [Y] of luminance. In addition, for example, in a case in which the adaptive primary transform flag apt_flag[Cb/Cr] of the chrominance is true, a value of a primary transform identifier pt_idx[Cb/Cr] of a chrominance may be set to a value of a primary transform identifier pt_idx[Y] of luminance, and in a case in which the adaptive primary transform flag apt_flag[Cb/Cr] of the chrominance is false, a value of the primary transform identifier pt_idx[Cb/Cr] of the chrominance may be set to a predetermined value. In this manner, not only can an adaptive (inverse) primary transform be applied to a chrominance, but transmission (encoding and decoding) of the adaptive primary transform flag apt_flag and the primary transform identifier pt_idx of the chrominance can also be omitted, and thus deterioration in coding efficiency can be curbed. In addition, an increase in a load of encoding and decoding can be curbed as well.

In addition, in a case in which an adaptive (inverse) primary transform is set to be applicable to the chrominance as well and further, for example, the prediction type of a coding block to which a transform block to be processed belongs is inter prediction (CuPredMode==MODE_INTER), the value of the adaptive primary transform flag apt_flag[Cb/Cr] of a chrominance may be set to the value of the adaptive primary transform flag apt_flag [Y] of luminance, and in a case in which the prediction type of the coding block is intra prediction, the adaptive primary transform flag apt_flag[Cb/Cr] of the chrominance may be set to 0 (false) as indicated in the row of No. #2. In this manner, not only can the adaptive (inverse) primary transform be applied to the chrominance, but also the adaptive primary transform flag of luminance can be used only in the case of the inter prediction mode in which tendencies of residual signals are similar, and thus it is possible to curb deterioration in coding efficiency.

Furthermore, in a case in which the adaptive (inverse) primary transform is set to be applicable to the chrominance as well and further, for example, the prediction type of the coding block to which the transform block to be processed belongs is inter prediction or intra prediction in which the prediction modes for luminance and the chrominance match each other, the value of the adaptive primary transform flag apt_flag[Cb/Cr] of a chrominance may be set to the value of the adaptive primary transform flag apt_flag [Y] of luminance as indicated in the row of No. #3, and in a case in which the prediction type of the coding block is intra prediction in which the prediction modes for luminance and the chrominance do not match each other, the adaptive primary transform flag apt_flag[Cb/Cr] of the chrominance may be set to 0 (false). In this manner, not only can the adaptive (inverse) primary transform be applied to the chrominance, but also the adaptive primary transform flag of luminance can be used only in the case of the prediction mode in which tendencies of residual signals are similar, and thus it is possible to curb deterioration in coding efficiency.

In addition, in a case in which the adaptive (inverse) primary transform is set to be applicable to the chrominance as well and further, for example, the prediction type of the coding block to which the transform block to be processed belongs is inter prediction or intra prediction of which the prediction mode is intra block copy as indicated in the row of No. #4, the value of the adaptive primary transform flag apt_flag[Cb/Cr] of a chrominance may be set to the value of the adaptive primary transform flag apt_flag [Y] of luminance, and in a case in which the prediction type of the coding block is intra prediction of which the prediction mode is not intra block copy (IntraBC; also referred to as "in-screen motion compensation), the value of the adaptive primary transform flag apt_flag[Cb/Cr] of the chrominance may be set to 0 (false). In this manner, not only can the adaptive (inverse) primary transform be applied to the chrominance, but also the adaptive primary transform flag of luminance can be used only in the case of the prediction mode in which tendencies of residual signals are similar, and thus it is possible to curb deterioration in coding efficiency.

In addition, in a case in which the adaptive (inverse) primary transform is set to be applicable to the chrominance as well and further, for example, a chrominance adaptive primary transform information inference flag chroma_apt_info_infer_flag indicating whether the adaptive primary transform flag apt_flag[Cb/Cr] of a chrominance is inferred on the basis of the adaptive primary transform flag apt_flag [Y] of luminance is 1 (true) as indicated in the row of No. #5, the adaptive primary transform flag apt_flag[Cb/Cr] of the chrominance may be set to the value of the adaptive primary transform flag apt_flag[Y] of luminance, and in a case in which the chrominance adaptive primary transform information inference flag chroma_apt_info_infer_flag is 0 (false), the value of the adaptive primary transform flag apt_flag[Cb/Cr] of a chrominance may be set to 0 (false). In this manner, it is possible to explicitly control whether or not the value of the adaptive primary transform flag of luminance is to be used using the chrominance adaptive primary transform information inference flag chroma_apt_info_infer_flag. Therefore, it is possible to cause the value of the adaptive primary transform flag of luminance to be used only in a case in which sufficiently large effects can be easily obtained, and thus the deterioration in coding efficiency can be further curbed.

In addition, in a case in which the adaptive (inverse) primary transform is set to be applicable to the chrominance as well and further, for example, the size of a short side of the transform block to be processed is greater than or equal to a predetermined threshold value as indicated in the row of No. #6, the value of the adaptive primary transform flag apt_flag[Cb/Cr] of a chrominance may be set to the value of the adaptive primary transform flag apt_flag [Y] of luminance, and in a case in which the size of the short side of the transform block is smaller than the threshold value, the value of the adaptive primary transform flag apt_flag[Cb/Cr] of a chrominance may be set to 0 (false). In this manner, since it is possible not to apply the adaptive (inverse) primary transform to a transform block from which sufficiently large effects are not obtained, and thus the deterioration in coding efficiency can be further curbed, and it is possible to avoid an unnecessary increase in a circuit scale resulting from an application of the adaptive (inverse) primary transform to a small transform block to the extent that sufficiently large effects are not obtained.

In addition, the adaptive (inverse) primary transform is set to be applicable to the chrominance as well and further, for example, the size of the picture width of a transform block with the chrominance to be processed is equal to or smaller than a predetermined threshold value as indicated in the row of No. #7, the transform type of the (inverse) primary horizontal transform may be set to a predetermined transform type, and in a case in which the size of the picture width of the transform block is greater than the threshold value, the transform type of the (inverse) primary horizontal transform may be set on the basis of a horizontal transform set and a primary horizontal transform specifying flag. Likewise, in a case in which the size of the picture height of the transform block with a chrominance to be processed is equal to or smaller than a predetermined threshold value, the transform type of the (inverse) primary vertical transform may be set to a predetermined transform type, and in a case in which the size of the picture height of the transform block is greater than the threshold value, the transform type of the (inverse) primary vertical transform may be set on the basis of a vertical transform set and a primary vertical transform specifying flag. In this manner, it is possible not to apply the adaptive (inverse) primary transform to the transform block that is narrow to the extent that sufficiently large effects are not obtained (the (inverse) primary transform in the width direction), and thus the deterioration in coding efficiency can be further curbed, and it is possible to avoid an unnecessary increase in a circuit scale resulting from an application of the adaptive (inverse) primary transform to a narrow transform block to the extent that sufficiently large effects are not obtained.

Note that it is also possible to arbitrarily combine each of the cases described above. For example, the case in the row of No. #2 may be combined with row of No. #7, like the case in the row of No. #8. In this manner, effects obtained in each of the cases can be exhibited. In addition, each of the above-described cases can also be combined with another case that is not described above. For example, in a case in which the prediction type of a coding block to be processed is intra prediction in the case of the row of No. #2, the adaptive primary transform flag apt_flag[Cb/Cr] of a chrominance may be transmitted (signaled). That is, encoding and decoding of the adaptive primary transform flag apt_flag[Cb/Cr] of a chrominance are performed in this case. In addition, in a case in which the value of the adaptive primary transform flag apt_flag[Cb/Cr] of a chrominance is 1 (true), the adaptive primary transform identifier pt_idx [Cb/Cr] of a chrominance is further transmitted (signaled). That is, encoding and decoding of the adaptive primary transform identifier pt_idx[Cb/Cr] of a chrominance are performed in this case.

<Shape of CU, PU, and TU>

Shapes of a coding unit (CU), a prediction unit (PU), and a TU which are partial regions (processing units) of a moving image in a bit stream (encoded data) will be described here. The CUs, PUs, and transform units (TUs) illustrated in FIG. 8 are CUs, PUs, and TUs of a quad tree plus binary tree (QTBT) described in JVET-C0024, "EE2.1: Quadtree plus binary tree structure integration with JEM tools." Specifically, in block division for CUs, one block can be divided into not only four (=2×2) sub-blocks but also two (=1×2 or 2×1) sub-blocks. In other words, by recursively repeating division of one block into four or two sub-blocks in block division for CUs, a tree structure in a quad tree (Quad-Tree) shape or a binary tree (Binary-Tree) shape in a horizontal direction or a vertical direction is consequently formed.

As a result, there is a possibility of a CU having a square shape as well as a rectangular shape. For example, in a case in which a size of a largest coding unit (LCU) is 128×128, there is a possibility of a size of a CU (a size in a horizontal direction w×a size in a vertical direction h) being a size of a square such as 128×128, 64×64, 32×32, 16×16, 8×8, or 4×4 as well as a size of a rectangle such as 128×64, 128×32, 128×16, 128×8, 128×4, 64×128, 32×128, 16×128, 8×128, 4×128, 64×32, 64×16, 64×8, 64×4, 32×64, 16×64, 8×64, 4×64, 32×16, 32×8, 32×4, 16×32, 8×32, 4×32, 16×8, 16×4, 8×16, 4×16, 8×4, or 4×8 as illustrated in FIG. 8. Note that a PU and a TU have the same possibility as a CU.

Furthermore, a TU includes a transform block of luminance (Y) and a transform block of a chrominance (Cb/Cr). In a case in which a color format is 4:2:0 (e.g., YUV420), the proportion of a picture size of a chrominance to a picture size of luminance with respect to a picture height and a picture width is ½. Thus, if the size of a transform block of luminance is 8×4, the size of a corresponding transform block of a chrominance is 4×2. In addition, in a case in which a color format 4:2:2 (e.g., YUV422), the proportion of a picture size of a chrominance to a picture size of luminance is ½ with respect to a picture height and 1 with respect to a picture width. Thus, if the size of a transform block of luminance is 8×4, the size of a transform block for a corresponding chrominance is 8×2. In addition, in a case in which a color format is 4:4:4 (e.g., YUV444), the proportion of the picture size of a chrominance to the picture size of luminance is 1 with respect to the picture height and 1 with respect to the picture width. Thus, if the size of a transform block of luminance is 8×4, the size of a transform block of a corresponding chrominance is 8×4.

Note that, with respect to I-slices, luminance (Y) and chrominance (Cb/Cr) may be encoded as different CUs. Since the luminance and chrominance can have different CU division structures in this case, an effect of improving coding efficiency of I-slices is exhibited. Although description will be provided below on the assumption that information of luminance and chrominance is included in the same CU for the sake of convenience, the invention is not limited thereto.

2. First Embodiment

<Image Decoding Apparatus>

Figure 9:
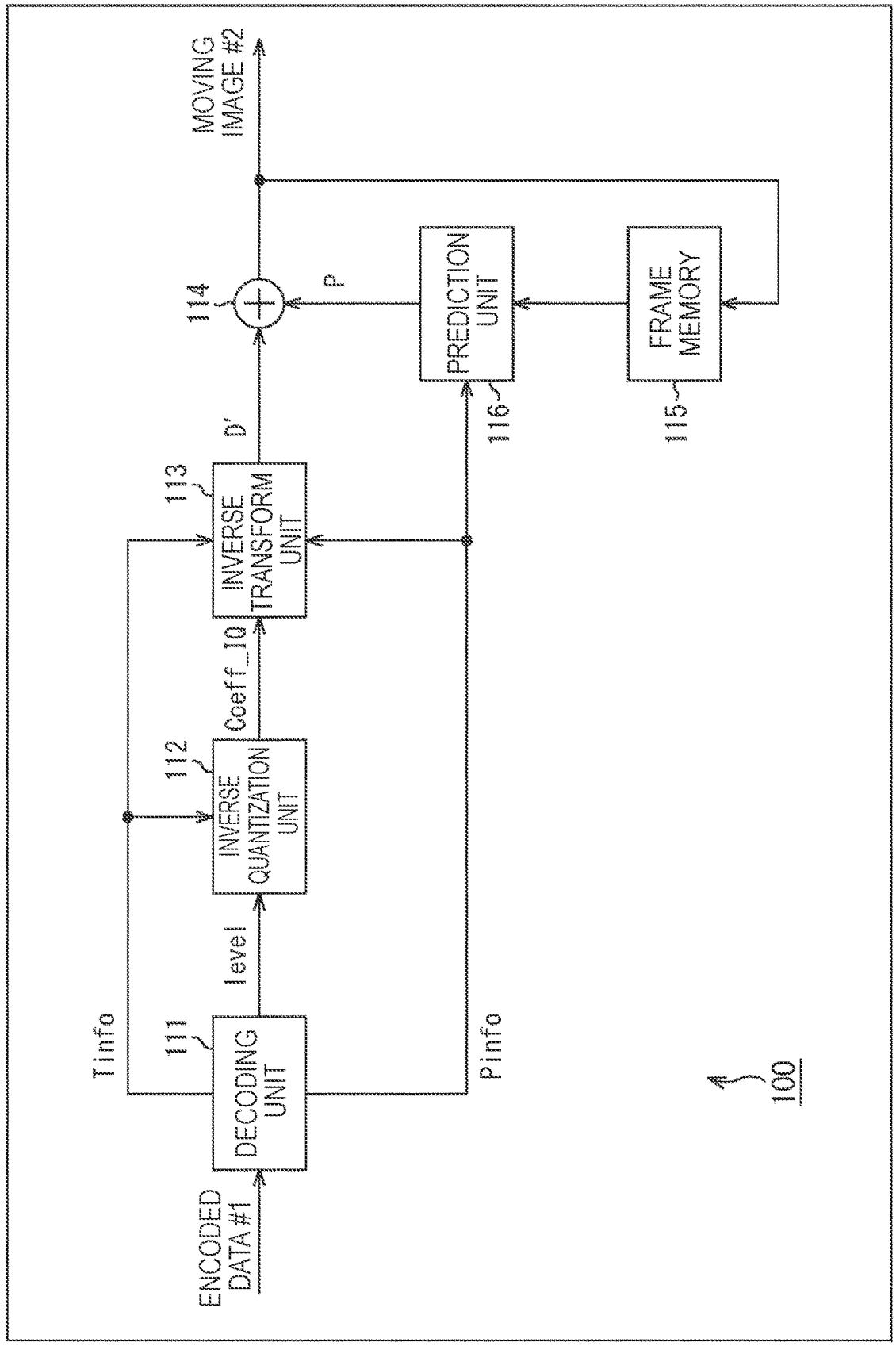
FIG. 9 is a block diagram illustrating an example of the main configuration of an image decoding apparatus.

FIG. 9 is a block diagram illustrating an example of a configuration of an image decoding apparatus which is an aspect of an image processing apparatus to which the present technology has been applied. The image decoding apparatus 100 illustrated in FIG. 9 is an apparatus that decodes encoded data obtained by encoding a predictive residual of an image and a predictive image as in the AVC or HEVC. The image decoding apparatus 100 implements, for example, a technology proposed by HEVC or the Joint Video Exploration Team (VET).

In FIG. 9, the image decoding apparatus 100 has a decoding unit 111, an inverse quantization unit 112, an inverse transform unit 113, an arithmetic operation unit 114, a frame memory 115, and a prediction unit 116. Note that the prediction unit 116 has an intra prediction unit and an inter prediction unit which are not illustrated. The image decoding apparatus 100 is an apparatus for generating a moving image #2 by decoding encoded data #1 (a bit stream).

The decoding unit 111 receives an input of the encoded data #1 and performs variable length decoding on a syntax value of each of syntax elements from a bit string of the encoded data #1 in accordance with a decision of a syntax table. Furthermore, each syntax element includes information such as header information Hinfo, prediction mode information Pinfo, transform information Tinfo, and residual information Rinfo.

Header information Hinfo such as VPS/SPS/PPS/slice header SH includes information that defines image sizes (a picture width PicWidth and a picture height PicHeight), bit depths (luminance bitDepthY and chrominance bitDepthC), a maximum value of a CU size MaxCUSize/a minimum value thereof. MinCUSize, a maximum depth of quadtree split (also referred to as quad-tree split) MaxQTDepth/a minimum depth thereof MinQTDepth, a maximum depth of binary tree split (binary-tree split) MaxBTDepth/a minimum depth thereof MinBTDepth, a maximum value of a transform skip block MaxTSSize (also referred to as a maximum transform skip block size), an on/off flag of each encoding tool (also referred to as an enabled flag), and the like.

As an on/off flag of an encoding tool included in the header information Hinfo, for example, an on/off flag for transform and quantization processes which will be introduced below. Note that the on/off flag of the encoding tool can also be interpreted as a flag indicating whether or not syntax for the encoding tool is present in encoded data. In addition, in a case in which a value of the on/off flag is 1 (true), it indicates that the encoding tool is available, and in a case in which a value of the on/off flag is 0 (false), it indicates that the encoding tool is not available. Note that the interpretation of the value of the flag may be reversed.

An adaptive primary transform enabled flag apt_enabled_flag (also referred to as adaptive_primary_transform_enabled_flag, adaptive_pt_enabled_flag, of amt_enabled_flag) is a flag indicating whether an encoding tool that can select an adaptive primary transform (also referred to as an adaptive primary transform) as one of a transform process and an inverse process thereto is available.

A secondary transform enabled flag st_enabled_flag is a flag indicating whether an encoding tool that performs a secondary transform/an inverse secondary transform as one of a transform process and an inverse process thereto is available or not.

A transform quantization bypass enabled flag transquant_bypass_enabled_flag is a flag indicating whether an encoding tool that skips a transform and a quantization/an inverse quantization and an inverse transform as one of a transform/quantization and inverse processes thereto is available or not.

A transform skip flag enabled flag ts_enabled_flag is a flag indicating whether or not two-dimensional transform skip or one-dimensional transform skip is available as one of a transform process and an inverse process thereto. The two-dimensional transform skip is an encoding tool that skips an orthogonal transform and an inverse process (inverse orthogonal transform) thereto including a primary transform and a secondary transform. In addition, the one-dimensional transform skip is an encoding tool that skips a primary transform in a horizontal direction or a vertical direction and an inverse transform (inverse primary transform) corresponding thereto among primary transforms, and a secondary transform and an inverse secondary transform thereto.

The prediction mode information Pinfo further includes a PU size (a prediction block size) of a PU to be processed PUSize, intra prediction mode information IPinfo (e.g., prev_intra_luma_pred_flag, mpm_idx, rem_intra_pred_mode in 7.3.8.5 Coding Unit syntax of JCTVC-W1005, a luminance intra prediction mode IntraPredModeY and a chrominance intra prediction mode IntraPredModeC derived from the syntax, etc.), motion prediction information MVinfo (e.g., merge_idx, merge_flag, inter_pred_idc, ref_idx_LX, mvp_lX_flag, X={0,1}, and mvd with reference to 7.3.8.6 Prediction Unit Syntax of JCTVC-W1005) and the like.

In addition, the transform information Tinfo may include syntax of, for example, a picture width size TBWidth and a picture height size TBHeight of a transform block to be processed, a transform quantization bypass flag transquant_bypass_flag indicating whether or not (inverse) transform and (inverse) quantization processes are to be skipped, a transform skip flag ts_flag indicating whether or not two-dimensional transform skip is to be applied, an adaptive primary transform flag apt_flag indicating whether an adaptive primary transform is to be applied to a target transform block, a primary transform identifier pt_idx indicating which (inverse) primary transform is to be applied between (inverse) primary transforms in the vertical direction and the horizontal direction, a secondary transform identifier st_idx (also referred to as dnsst_idx, nsst_idx, or rot_idx) indicating which (inverse) secondary transform is to be applied, a scan identifier scanIdx, a quantization parameter qp, a quantization matrix scaling_matrix, and the like. Note that, instead of the picture width size TBWidth and the picture height size TBHeight of the transform block to be processed, and a logarithmic value of each of TBWidth and TBHeight having 2 as the base log2TBWidth (also referred to as log2TBWSize or log2TBW) or log2TBHeight (also referred to as log2TBHSize or log2TBH).

The residual information Rinfo may include, for example, a residual data presence/absence flag (cbf (coded_block_flag)), a last non-zero coefficient X coordinate (last_sig_coeff_x_pos), a last non-zero coefficient Y coordinate (last_sig_coeff_y_pos), a sub-block non-zero coefficient presence/absence flag (coded_sub_block_flag), a non-zero coefficient presence/absence flag (sig_coeff_flag), a flag indicating whether the level of a non-zero coefficient is greater than 1 (gr1_flag) (also referred to as a GR1 flag), a flag indicating whether the level of a non-zero coefficient is greater than 2 flag (gr2_flag) (also be referred to as a GR2 flag), a sign indicating the positivity/negativity of a non-zero coefficient (sign_flag) (also referred to as a sign symbol), the remaining level of a non-zero coefficient (coeff_abs_level_remaining) (also referred to as a non-zero coefficient remaining level), and the like.

The decoding unit 111 derives a quantized transform coefficient level level of each coefficient position in each transform block with reference to residual information Rinfo. The decoding unit 111 supplies prediction mode information Pinfo, quantized transform coefficient level level, and transform information Tinfo obtained from decoding to each block. For example, the decoding unit 111 supplies the prediction mode information Pinfo to the inverse transform unit 113 and the prediction unit 116, the quantized transform coefficient level level to the inverse quantization unit 112, and the transform information Tinfo to the inverse transform unit 113 and the inverse quantization unit 112.

The inverse quantization unit 112 receives an input of the transform information Tinfo and the quantized transform coefficient level level, performs scaling (inverse quantization) on the value of the quantized transform coefficient level level on the basis of the transform information Tinfo, and outputs the transform coefficient that has undergone inverse quantization Coeff_IQ to the inverse transform unit 113.

The inverse transform unit 113 receives an input of the transform coefficient Coeff_IQ, the transform information Tinfo, and the prediction mode information Pinfo, applies an inverse transform on the transform coefficient Coeff_IQ on the basis of the transform information Tinfo, the prediction mode information Pinfo, and the like, derives a predictive residual D', and outputs the predictive residual to the arithmetic operation unit 114. Note that the inverse transform is the inverse process of the transform process performed on the encoding side or the like. For example, an inverse orthogonal transform such as an inverse process to an orthogonal transform performed on an encoding side or the like is included in the inverse transform. In addition, in a case in which a primary transform or a secondary transform is performed as an orthogonal transform on the encoding side, for example, an inverse primary transform which is an inverse process to the primary transform, an inverse secondary transform which is an inverse process to the secondary transform, or the like is included in the inverse transform. Details of the inverse transform unit 113 will be described below.

The arithmetic operation unit 114 receives an input of the predictive residual D' and a predictive image P supplied from the prediction unit 116, adds the predictive residual D' to the predictive image P (predictive signal) corresponding to the predictive residual D' as illustrated in the following formula (8), derives a local decoded image Rec, and supplies the local decoded image to the frame memory 115 or the outside of the image decoding apparatus 100.

$$Rec=D'+P \tag{8}$$

The frame memory 115 receives an input of the local decoded image Rec supplied from the arithmetic operation unit 114, reconstructs a decoded image in each picture unit, and then stores the decoded image in the frame memory 115. The frame memory 115 reads the decoded image specified by the prediction mode information Pinfo of the prediction unit 116 as a reference image from the buffer, and supplies the decoded image to the prediction unit 116. In addition, the frame memory 115 may store the header information Hinfo, the prediction mode information Pinfo, the transform information Tinfo, and the like relating to the generation of the decoded image in the buffer inside the frame memory.

The prediction unit 116 receives an input of the prediction mode information Pinfo, generates the predictive image P using, as a reference image, the decoded image stored in the frame memory 115 specified by the prediction mode information Pinfo using a prediction method specified by the prediction mode information Pinfo, and outputs the predictive image to the arithmetic operation unit 114.

<Inverse Transform Unit>

Figure 10:
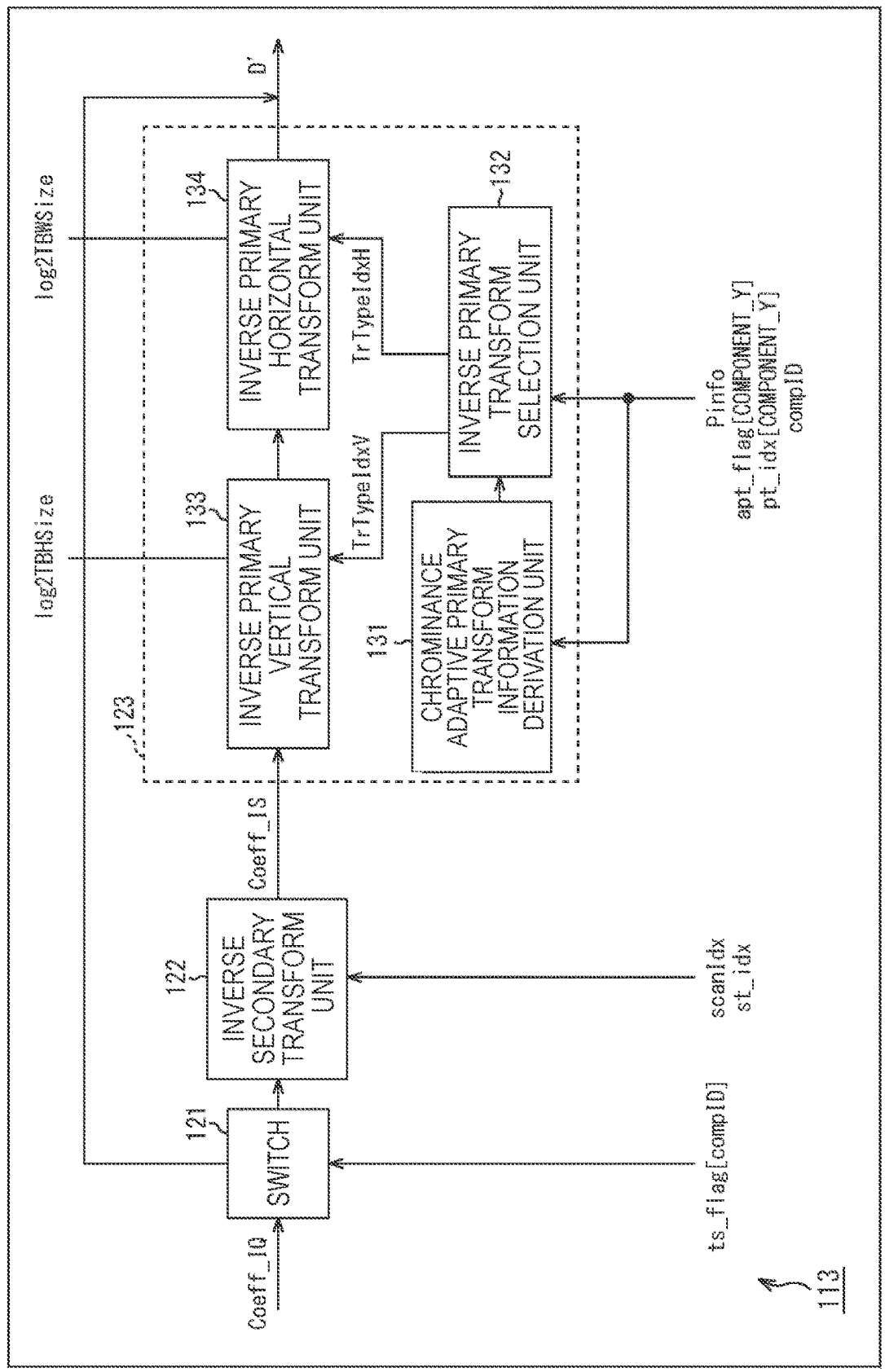
FIG. 10 is a block diagram illustrating an example of the main configuration of an inverse transform unit.

FIG. 10 is a block diagram illustrating an example of the main configuration of the inverse transform unit 113 of the image decoding apparatus 100 of FIG. 9. The inverse transform unit 113 includes a switch 121, an inverse secondary transform unit 122, and an inverse primary transform unit 123 as illustrated in FIG. 9.

The switch 121 receives a transform coefficient Coeff_IQ and a transform skip flag ts_flag[compID]. In a case in which the value of the transform skip flag ts_flag[compID] is NO_TS (=0), that is, in a case in which transform skip is not applied, the switch 121 outputs the transform coefficient Coeff_IQ to the inverse secondary transform unit 122. In addition, in a case in which the value of the transform skip flag ts_flag[compID] is 2D_TS (=1), that is, in a case in the flag indicates applying two-dimensional transform skip, the switch 121 skips the inverse secondary transform unit 122 and the inverse primary transform unit 123, and outputs the transform coefficient Coeff_IQ as predictive residual D'.

The inverse secondary transform unit 122 performs a process relating to an inverse secondary transform that is the inverse process to a secondary transform which is a predetermined transform process, for example, an orthogonal transform, or the like. For example, the inverse secondary transform unit 122 receives an input of a secondary transform identifier st_idx, a scan identifier scanIdx indicating a scanning method of a transform coefficient and the transform coefficient Coeff_IQ, derives a transform coefficient Coeff_IS (also referred to as a primary transform coefficient Coeff_P) that has undergone an inverse secondary transform, and supplies the transform coefficient to the inverse primary transform unit 123. More specifically, in a case in which the secondary transform identifier st_idx indicates applying the inverse secondary transform (st_idx>0), the inverse secondary transform unit 122 executes the process of the inverse secondary transform corresponding to the secondary transform identifier st_idx on the transform coefficient Coeff_IQ, and outputs the transform coefficient Coeff_IS that has undergone the inverse secondary transform. In a case in which the secondary transform identifier st_idx indicates not applying the inverse secondary transform (st_idx==0), the inverse secondary transform unit 122 skips the inverse secondary transform and outputs the transform coefficient Coeff_IQ as the transform coefficient Coeff_IS that has undergone the inverse secondary transform.

The inverse primary transform unit 123 performs a process relating to an inverse primary transform that is the inverse process to a primary transform that is a predetermined transform process, for example, an orthogonal transform. For example, the inverse primary transform unit 123 receives inputs of a color signal identifier compID, adaptive primary transform flag apt_flag [COMPONENT_Y] of luminance, a primary transform identifier of luminance pt_idx[COMPONENT_Y], prediction mode information Pinfo, sizes of a transform block (a logarithmic value of the picture width log2TBWSize and a logarithmic value of the picture height log2TBHSize), and the transform coefficient Coeff_IS that has undergone the inverse secondary transform. The inverse primary transform unit 123 selects the type of the inverse primary horizontal transform TrTypeIdxH and the type of the inverse primary vertical transform TrTypeIdxV of a color signal specified by the color signal identifier compID with reference to the prediction mode information Pinfo, the color signal identifier compID, the adaptive primary transform flag apt_flag [COMPONENT_Y] of luminance, the primary transform identifier of luminance pt_idx[COMPONENT_Y], and primary transform identifier of luminance pt_idx[COMPONENT_Y], performs an inverse primary vertical transform defined by the inverse primary vertical transform type TrTypeIdxV and the picture height log2TBHSize of the transform block and the inverse primary horizontal transform defined by the inverse primary horizontal transform type TrTypeIdxH and the picture width log2TBWSize of the transform block on the transform coefficient Coeff_IS that has undergone the inverse secondary, and then derives and outputs the predictive residual D' that has undergone the inverse primary transform.

<Inverse Primary Transform Unit>

Figure 11:
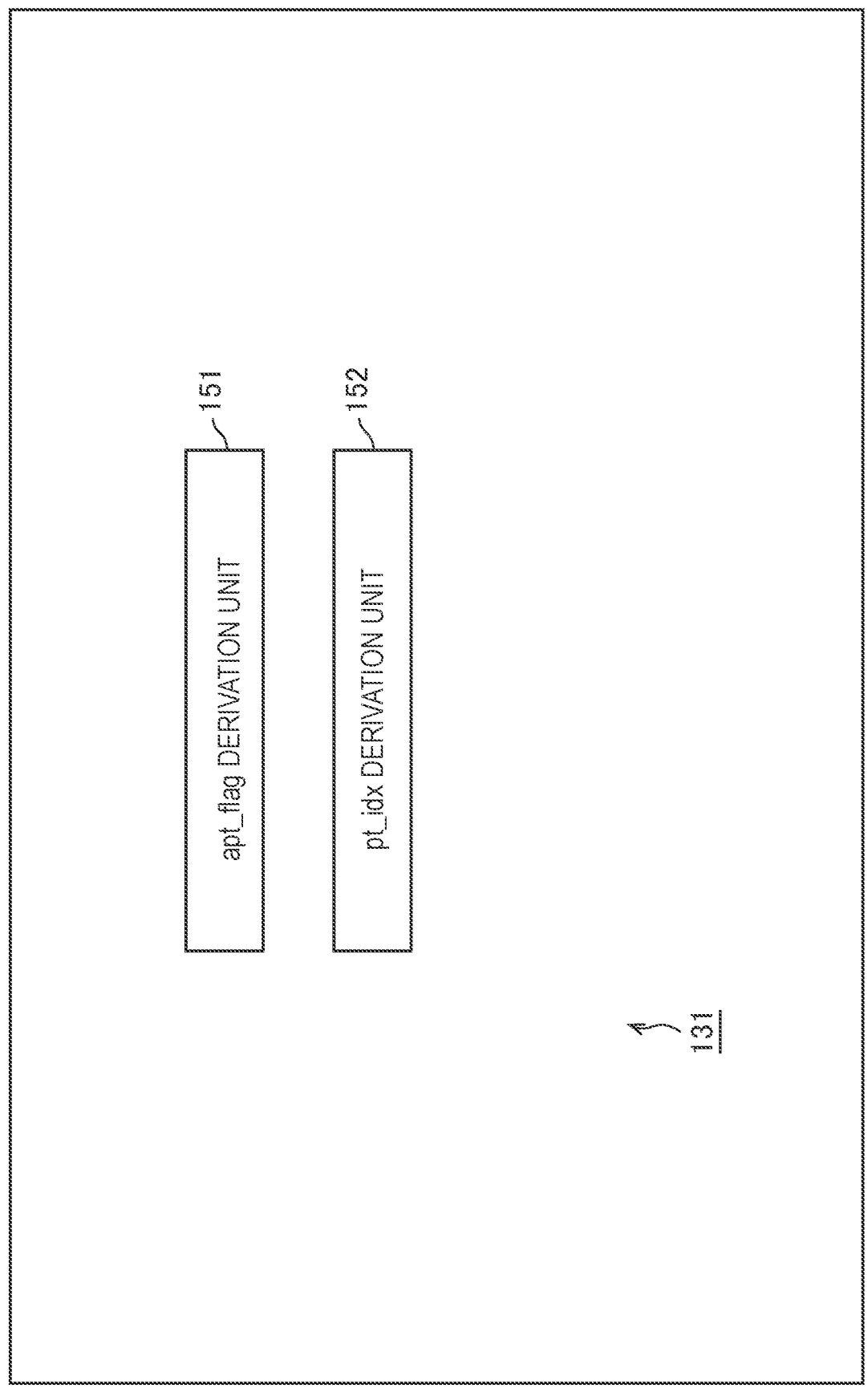
FIG. 11 is a block diagram illustrating an example of the main configuration of a chrominance adaptive primary transform information derivation unit.

The inverse primary transform unit 123 has a chrominance adaptive primary transform information derivation unit 131, an inverse primary transform selection unit 132, an inverse primary vertical transform unit 133, and an inverse primary horizontal transform unit 134 as illustrated in FIG. 11.

The chrominance adaptive primary transform information derivation unit 131 derives adaptive primary transform information of a chrominance (apt_flag[compID] and pt_idx[compID] (compID=COMPONENT_Cb or COMPONENT_Cr)) using the adaptive primary transform information (apt_flag[COMPONENT_Y], pt_idx[COMPONENT_Y]) of the luminance transform block corresponding to the chrominance transform block in a case in which the color signal identifier compID indicates the chrominance (compID=COMPONENT_Cb or COMPONENT_Cr), and supplies the result to the inverse primary transform selection unit 132.

<Chrominance Adaptive Primary Transform Information Derivation Unit>

FIG. 11 is a function block diagram illustrating an example of the main configuration of functions of the chrominance adaptive primary transform information derivation unit 131. The chrominance adaptive primary transform information derivation unit 131 has an apt_flag derivation unit 151 and a pt_idx derivation unit 152 as illustrated in FIG. 11. The apt_flag derivation unit 151 performs a process relating to derivation of the adaptive primary transform flag apt_flag of a chrominance.

For example, the apt_flag derivation unit 151 derives an adaptive primary transform flag apt_flag[compID] (compID=COMPONET_Cb or COMPONENT_Cr) regarding a chrominance transform block to be processed as illustrated in the following formula (9) on the basis of an adaptive primary transform flag apt_flag[COMPONENT_Y] relating to a luminance transform block corresponding to the transform block of the chrominance.

$$\text{apt\_flag}[\text{compID}]=\text{apt\_flag}[\text{COMPONENT\_Y}]$$

(here, compID=COMPONENT_Cb or COMPONENT_Cr) (9)

That is, the apt_flag derivation unit 151 sets a value of an adaptive primary transform flag apt_flag [COMPONENT_Y] of luminance corresponding to the adaptive primary transform flag apt_flag[compID] of the chrominance (compID=COMPONENT_Cb or COMPONENT_Cr).

Note that, as a modified example of the formula (9), the apt_flag derivation unit 151 may derive the adaptive primary transform flag apt_flag[compID] of the chrominance as illustrated in the following formula (10) with reference to a residual data presence flag cbf_luma of luminance.

$$\text{apt\_flag}[\text{compID}]=\text{cbf\_luma?apt\_flag}[\text{COMPONENT\_Y}]:0 \quad (10)$$

That is, the apt_flag derivation unit 151 sets the value of the adaptive primary transform flag apt_flag [COMPONENT_Y] of luminance corresponding to the adaptive primary transform flag apt_flag[compID] of the chrominance (compID=COMPONENT_Cb or COMPONENT_Cr) in a case in which residual data presence flag cbf_luma of luminance is 1 (true), and sets 0 in other cases (in a case in which the residual data presence flag cbf_luma of luminance is 0 (false)).

Note that, in a case in which apt_flag[COMPONENT_Y] is not present in the encoded data and the value of the flag is set to 0, it is not necessary to refer to the residual data presence flag of luminance. However, in a case in which there is no operation of initializing apt_flag[COMPONENT_Y] to 0, the value of apt_flag[COMPONENT_Y] becomes indefinite, and thus it is desirable to control whether or not the value of the adaptive primary transform flag apt_flag [COMPONENT_Y] of luminance is to be referred to, with reference to the residual data presence flag cbf_luma of luminance.

In addition, the pt_idx derivation unit 152 performs a process relating to the derivation of a primary transform identifier pt_idx of a chrominance. For example, the pt_idx derivation unit 152 derives a primary transform identifier pt_idx[compID] of a transform block of a chrominance as illustrated in the following formula (11) on the basis of the adaptive primary transform flag apt_flag[compID] of the chrominance transform block (compID=COMPONET_Cb or COMPONENT_Cr) and a primary transform identifier pt_idx[COMPONENT_Y] of a luminance transform block corresponding to the chrominance transform block.

$$\text{pt\_idx}[\text{compID}]=\text{apt\_flag}[\text{compID}]?\text{pt\_idx}[\text{COMPONENT\_Y}]: \text{predetermined value} \quad (11)$$

That is, in a case in which the adaptive primary transform flag apt_flag[compID] of the chrominance transform block is 1 (true), the pt_idx derivation unit 152 further sets the primary transform identifier pt_idx[compID] of the chrominance transform block to the value of the primary transform identifier for the luminance transform block pt_idx[COMPONENT_Y] corresponding to the chrominance transform block. In other cases, a predetermined value is set.

As described above, the chrominance adaptive primary transform information derivation unit 131 can derive the adaptive primary transform information of the chrominance transform block on the basis of the adaptive primary transform information of luminance corresponding to the chrominance transform block. Therefore, it is possible to reduce the decoding processing amount without decoding the adaptive primary transform information of the chrominance transform block from the encoded data.

<Inverse Primary Transform Unit>

Returning to FIG. 10, the inverse primary transform selection unit 132 receives an input of the prediction mode information PInfo, the color signal identifier compID, the adaptive primary transform flag apt_flag[compID] of the color signal corresponding to the color signal identifier compID, and the primary transform identifier pt_idx[compID] of the color signal corresponding to the color signal identifier compID. The inverse primary transform selection unit 132 derives the transform type TrTypeIdxH of the inverse primary horizontal transform and the transform type TrTypeIdxV of the inverse primary vertical transform of the color signal specified by the color signal identifier compID with reference to the prediction mode information PInfo, the color signal identifier compID, the adaptive primary transform flag apt_flag[compID] of the color signal corresponding to the color signal identifier compID, and the primary transform identifier pt_idx[compID] of the color signal corresponding to the color signal identifier compID, and supplies the results to the inverse primary horizontal transform unit 134 and the inverse primary vertical transform unit 133.

The inverse primary vertical transform unit 133 receives an input of the transform coefficient Coeff_IS that has undergone the inverse secondary transform, the transform type TrTypeIdxV of the inverse primary vertical transform, and the log2TBHSize (the logarithmic value of the picture height) indicating the picture height of the transform block for each transform block of each color signal. The inverse primary vertical transform unit 133 executes an inverse primary vertical transform IPver defined by the transform type TrTypeIdxV and the picture height of the transform block on the transform coefficient Coeff_IS that has undergone the inverse secondary transform and supplies the result to the inverse primary horizontal transform unit 134 as a transform coefficient Coeff_IPver that has undergone the inverse primary vertical transform. Note that the inverse primary vertical transform IPver is the inverse transform to a primary vertical transform Pver.

The inverse primary horizontal transform unit 134 receives inputs of the transform coefficient Coeff_IPver that has undergone the inverse primary vertical transform, the transform type TrTypeIdxH of the inverse primary horizontal transform, and log2TBWSize (the logarithmic value of the picture width) indicating the picture height of the transform block for each transform block of each color signal. The inverse primary horizontal transform unit 134 executes an inverse primary horizontal transform IPhor defined by the transform type TrTypeIdxH and the picture width of the transform block on the transform coefficient Coeff_IPver that has undergone the inverse primary vertical transform, and outputs the result to the outside of the inverse transform unit 113 as the predictive residual D' (supplies the result to the arithmetic operation unit 114). Note that the inverse primary horizontal transform IPhor is the inverse transform of a primary horizontal transform Phor.

<Process of Inverse Primary Transform Selection Unit>

Next, the derivation of the type of the inverse primary horizontal transform TrTypeIdxH and the type of the inverse primary vertical transform TrTypeIdxV of a color signal specified by a color signal identifier compID by the inverse primary transform selection unit 132 will be described in detail.

Specifically, in a case in which the adaptive primary transform flag apt_flag[compID] of the color signal specified by the color signal identifier compID is 1 (true), the inverse primary transform selection unit 132 selects a transform set TrSet including an orthogonal transform serving as a candidate for a primary transform from the four transform sets TrSet with the transform set identifiers TrSetSetIdx=0 . . . 3 shown in the table of FIG. 1 in each of the horizontal direction and vertical direction with reference to the prediction mode information PInfo. Note that correspondence between the types of orthogonal transform and corresponding values of identifiers TrTypeIdx is not limited to the table of FIG. 2 and may be changed in an executable range.

Note that, in a case in which the adaptive primary transform flag apt_flag[compID] is 0 (false), it indicates that an adaptive primary transform will not be executed, and thus the inverse primary transform selection unit 132 sets a value of the identifier of the transform type indicating the type of a predetermined (e.g., DCT-II) orthogonal transform for the transform type TrTypeIdxH of the inverse primary horizontal transform and the transform type TrTypeIdxV of the inverse primary vertical transform (TrIdxTypeH=TrIdxTypeV=predetermined value).

<Selection of Transform Set>

In a case in which a prediction type of a CU to which a transform block to be processed belongs CuPredMode is intra prediction (CuPredMode==MODE_INTRA), setting is made on the basis of an intra prediction mode (IntraPredMode) as in the table (LUT_IntraModeToTrSet) shown in FIG. 3. For example, setting of a transform set identifier TrSetIdx specifying a corresponding transform set TrSet is made for a transform set in each of the directions (TrSetH and TrSetV) using the following formulas (12) and (13). In addition, in a case in which the prediction type of the CU to which the transform block to be processed belongs is inter prediction, a transform set identifier TrSetIdx specifying a transform set TrSet for inter prediction (=InterTrSetIdx) is set as in the following formula (14). Note that, if the intra prediction mode IntraPredMode is for luminance, a value of a luminance intra prediction mode IntraPredModeY is assumed to be set, and if the intra prediction mode is for a chrominance, a value of a chrominance intra prediction mode IntraPredModeC is assumed to be set.

```
if (CuPredMode == MODE_INTRA) {
TrSetH = LUT_IntraModeToTrSet [ IntraPredMode ]
[ H (=0) ] ... (12)
TrSetV = LUT_IntraModeToTrSet [ IntraPredMode ]
[ V (=1) ] ... (13)
} else {// CuPredMode==MODE_INTER
TrSetH = InterTrSetIdx
TrSetV = InterTrSetIdx ... (14)
}
```

Here, TrSetH represents a transform set of a primary horizontal transform PThor (referred to as a primary horizontal transform set), and TrSetV represents a transform set of a primary vertical transform PTver (also referred to as a primary vertical transform set). In addition, a lookup table LUT_IntraModeToTrSet is the correspondence table of FIG. 3. The first array of the lookup table LUT_IntraModeToTr- Set[ ][ ] has an intra prediction mode IntraPredMode as an argument and the second array has {H=0, V=1} as an argument.

In a case of the intra prediction mode number 18 (IntraPredMode=18), the transform set of the transform set identifier TrSetIdx=2 indicated in the table (LUT_TrSetToTrTypeIdx) of FIG. 1 is selected as a primary horizontal transform set TrSetH, and the transform set of the transform set identifier TrSetIdx=0 indicated in the table of FIG. 1 is selected as a primary vertical transform set TrSetV.

Note that, in a case in which the intra prediction mode IntraPredMode indicates intra block copy (IBC or IntraBC; also referred to as "in-screen motion compensation") (in the table of FIG. 3, IntraPredMode==67 corresponds to IntraBC) in FIG. 3, a transform set identifier dedicated to inter prediction may be allocated. Since inter prediction and intra block copy tend to have similar residual in general, it is reasonable to allocate the same transform set. In addition, a transform set identifier dedicated to intra block copy may be allocated.

<Derivation of Primary (Horizontal/Vertical) Transform Specifying Flag>

Furthermore, the inverse primary transform selection unit 132 derives a primary horizontal transform specifying flag pt_hor_flag and a primary vertical transform specifying flag pt_ver_flag from a primary transform identifier pt_idx[compID] (compID=COMPONENT_Y, COMPONENT_Cb, COMPONENT_Cr) of a color signal specified by a color signal identifier compID in accordance with, for example, the following formula (15).

$$pt\_hor\_flag = pt\_dx[compID] \ \& \ 0x01$$

$$pt\_ver\_flag = pt\_idx[compID] >> 1 \ (= (pt\_idx[compID] \ \& \ 0x10) << 1) \quad (15)$$

That is, the primary transform identifier pt_idx[compID] has a 2-bit value, the upper 1 bit thereof corresponds to the primary vertical transform specifying flag pt_ver_flag, and the lower 1 bit thereof corresponds to the primary horizontal transform specifying flag pt_hor_flag.

<Selection of Transform Type of Inverse Primary (Horizontal/Vertical) Transform>

Furthermore, the inverse primary transform selection unit 132 selects the transform type of the orthogonal transform to be used in the inverse primary transform from the transform sets TrSetH and TrSetV selected in each of horizontal/vertical direction using each of the primary horizontal transform specifying flag pt_hor_flag and the primary vertical transform specifying flag pt_ver_flag.

Specifically, the inverse primary transform selection unit 132 determines the transform type TrTypeIdxH of the orthogonal transform to be applied to the inverse primary horizontal transform on the basis of the correspondence table for the transform sets and the transform types (LUT_TrSetToTrTypeIdx) illustrated in FIG. 1, the primary horizontal transform set TrSetH, and the primary horizontal transform specifying flag pt_hor_flag as illustrated in the following formula (16).

$$TrTypeIdxH = LUT\_TrSetToTrTypeIdx[TrSetH][pt\_hor\_flag] \quad (16)$$

Likewise, the inverse primary transform selection unit 132 determines the transform type TrTypeIdxV of the orthogonal transform to be applied to the inverse primary vertical transform on the basis of the correspondence table for the transform sets and the transform types (LUT_TrSetToTrTypeIdx) illustrated in FIG. 1, the primary vertical transform set TrSetVx, and the primary vertical transform specifying flag pt_ver_flag as illustrated in the following formula (17).

$$TrTypeIdxV = LUT\_TrSetToTrTypeIdx[TrSetV][pt\_ver\_flag] \quad (17)$$

If the value of the transform set identifier TrSetIdx indicated by the primary horizontal transform set TrSetH is 2, an orthogonal transform to be applied to the primary horizontal transform is selected from the transform set having the transform set identifier TrSetIdx=2 on the transform set definition table LUT_TrSetToTrTypeIdx of FIG. 1. That is, in a case in which the primary horizontal transform specifying flag pt_hor_flag is 0, the value "4" of the transform type identifier TrTypeIdx indicating DST-VII is set for the horizontal transform type identifier TrTypeIdxH designating the type of the orthogonal transform of the primary horizontal transform PThor as illustrated in FIG. 1, and in a case in which the primary horizontal transform specifying flag pt_hor_flag is 1, the value "1" of the transform type identifier TrTypeIdx indicating DCT-V is set for the horizontal transform type identifier TrTypeIdxH.

Note that, a transform type determined with the values of the transform set identifier TrSetIdx of the table shown in FIG. 1, the primary horizontal transform specifying flag, and the primary vertical transform specifying flag may be set to be changeable within an executable range.

Thereafter, the inverse primary transform selection unit 132 supplies the transform type TrTypeIdxH of the inverse primary horizontal transform IPThor and the transform type TrTypeIdxV of the inverse primary vertical transform IPTver of the color signal specified by the color signal identifier compID to each of the inverse primary vertical transform unit 133 and the inverse primary horizontal transform unit 134.

As described above, the inverse primary transform unit 123 can apply an inverse adaptive primary transform selected for luminance to a transform block of the chrominance in a case in which a residual signal of the color signal shows a similar tendency to a residual signal of luminance. Thus, it is possible to perform an inverse primary transform process on the residual signal of the chrominance with higher coding efficiency than in the related art.

In addition, it is possible to reduce a processing amount of an encoder while preventing a decrease in coding efficiency for chrominance in comparison to a case in which an adaptive primary transform flag apt_flag and a primary transform identifier pt_idx are explicitly decoded for each of luminance and the chrominance.

<Flow of Image Decoding Process>

Next, the flow of each process executed by the image decoding apparatus 100 as described above will be described. First, an example of the flow of an image decoding process will be described with reference to the flowchart of FIG. 12.

When the image decoding process is started, the decoding unit 111 decodes a bit stream (encoded data) supplied to the image decoding apparatus 100 and thereby obtains information such as header information Hinfo, prediction mode information Pinfo, transform information Tinfo, residual information Rinfo, and a quantized transform coefficient level level in Step S101.

In Step S102, the inverse quantization unit 112 performs inverse quantization on the quantized transform coefficient level level obtained from the process of Step S101 and thus derives a transform coefficient Coeff_IQ. The inverse quantization is the inverse process to quantization performed in an image encoding process, which will be described below, and is a similar process to inverse quantization performed in the image encoding process.

In Step S103, the inverse transform unit 113 performs an inverse transform on the transform coefficient Coeff_IQ obtained from the process of Step S102 and thus derives predictive residual D'. The inverse transform is the inverse process to a transform process performed in the image encoding process, which will be described below, and is a similar process to an inverse transform performed in the image encoding process.

In Step S104, the prediction unit 116 performs prediction in the same prediction mode as the prediction performed at the time of encoding on the basis of the prediction mode information Pinfo and generates a predictive image.

In Step S105, the arithmetic operation unit 114 adds the predictive image obtained from the process of Step S104 to the predictive residual D' obtained from the process of Step S103 and thus obtains a decoded image.

In Step S106, the arithmetic operation unit 114 outputs the decoded image obtained from the process of Step S105 to the outside of the image decoding apparatus 100.

In Step S107, the frame memory 115 stores the decoded image obtained from the process of Step S105.

When the process of Step S107 ends, the image decoding process ends.

<Primary Transform Information Decoding Process>

Figure 12:
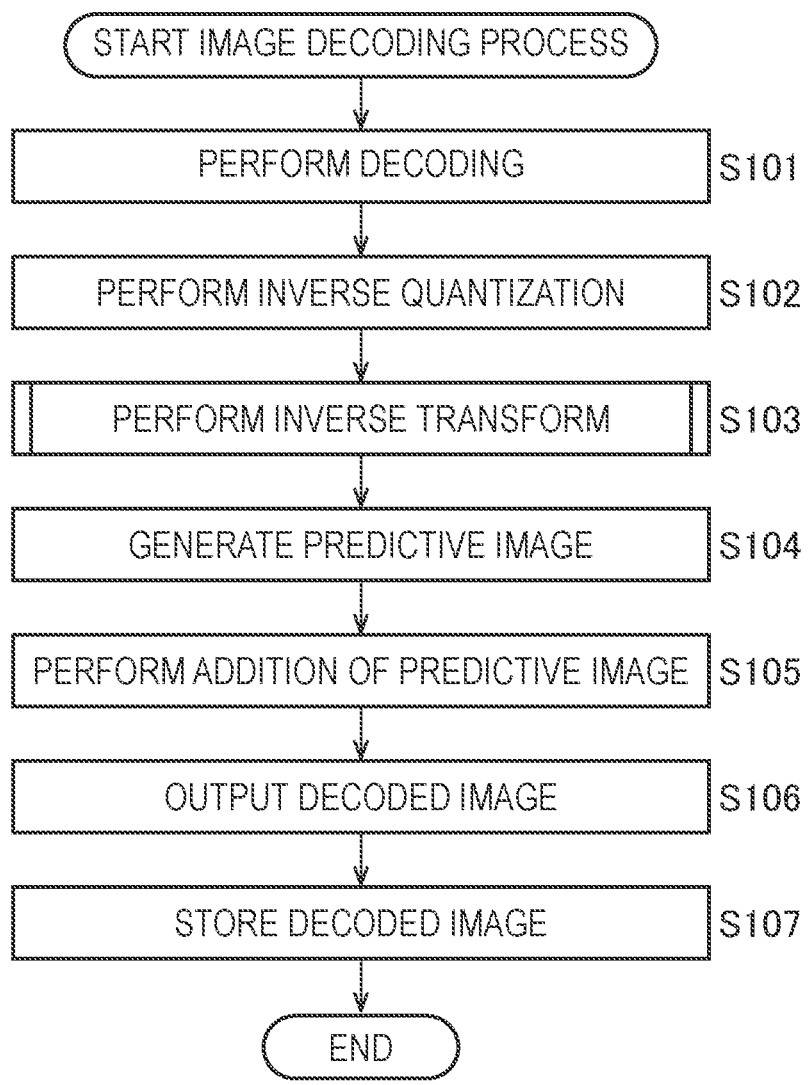
FIG. 12 is a flowchart describing an example of the flow of an image decoding process.

Various types of information included in the encoded data #1 are decoded in Step S101 of FIG. 12 as described above. At this time, the decoding unit 111 also appropriately decodes information such as the adaptive primary transform flag apt_flag, the primary transform identifier pt_idx, and the like. The decoding unit 111 decodes, for example, the adaptive primary transform flag apt_flag [COMPONENT_Y] of luminance and the primary transform identifier pt_idx[COMPONENT_Y] of luminance. However, the encoded data #1 does not include the adaptive primary transform flag apt_flag [compID] of a chrominance (compID=COMPONET_Cb or COMPONENT_Cr) and the primary transform identifier pt_idx [compID] of the chrominance (compID=COMPONET_Cb or COMPONENT_Cr) as described above. Thus, the decoding unit 111 omits decoding of the information of the elements.

Figure 13:
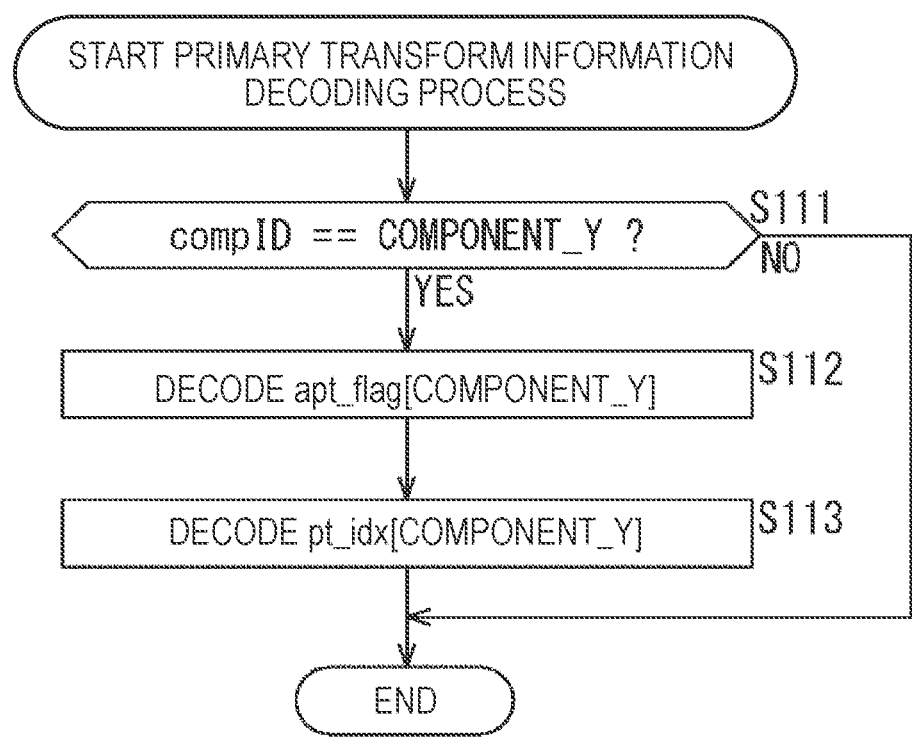
FIG. 13 is a flowchart describing an example of the flow of a primary transform information decoding process.

In order to perform decoding as described above, the decoding unit 111 executes a primary transform information decoding process in Step S101. An example of the flow of the primary transform information decoding process will be described with reference to the flowchart of FIG. 13.

When the primary transform information decoding process is started, the decoding unit 111 determines whether or not a component to be processed is luminance (compID=COMPONENT_Y) in Step S111. In a case in which the component is determined as luminance, the process proceeds to Step S112.

In Step S112, the decoding unit 111 can decode the adaptive primary transform flag apt_flag [COMPONENT_Y] of luminance included in the encoded data #1. In Step S113, the decoding unit 111 can decode the primary transform identifier pt_idx[COMPONENT_Y] of luminance included in the encoded data #1. When the process of Step S113 ends, the primary transform information decoding process ends.

In addition, in a case in which the component to be processed is determined as a chrominance (compID!=COMPONENT_Y) in Step S111, the processes of Step S112 and Step S113 are omitted, and the primary transform information decoding process ends. That is, in the case of the chrominance, decoding of the adaptive primary transform flag apt_flag and the primary transform identifier pt_idx is omitted. Therefore, an increase in a load of decoding can be curbed.

<Flow of Inverse Transform Process>

Figure 14:
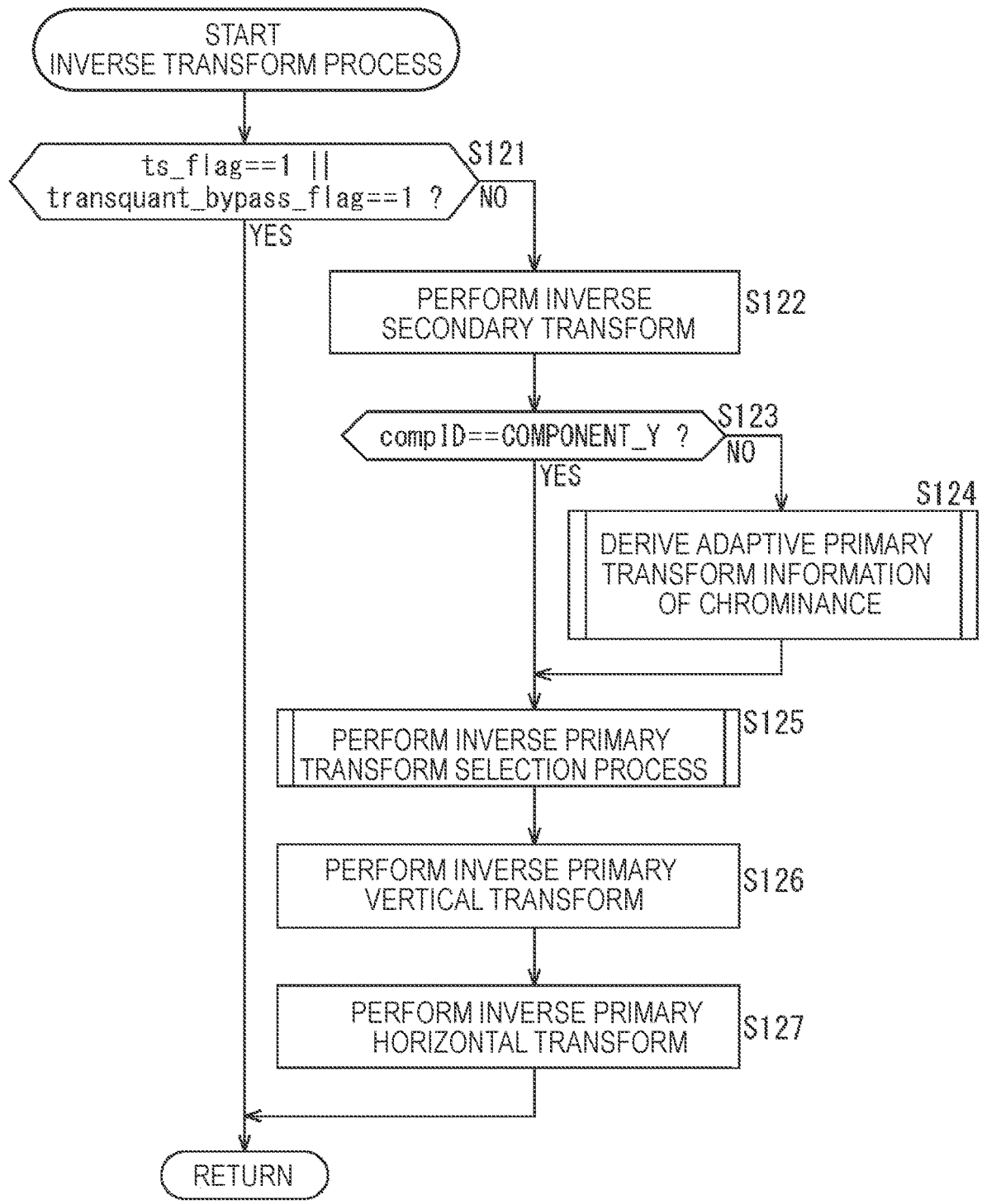
FIG. 14 is a flowchart describing an example of the flow of an inverse transform process.

Next, an example of the flow of the inverse transform process executed in Step S103 of FIG. 12 will be described with reference to the flowchart of FIG. 14. When the inverse transform process is started, the switch 121 determines whether the transform skip flag ts_flag is 2D_TS (a mode of two-dimensional transform skip) or the transform quantization bypass flag transquant_bypass_flag is 1 (true) in Step S121. In a case in which it is determined that the transform skip identifier ts_idx is 2D_TS or the transform quantization bypass flag is 1 (true), the switch 121 outputs the transform coefficient Coeff_IQ to the outside as predictive residual D' (supplied to the arithmetic operation unit 114), the inverse transform process ends and the process returns to FIG. 12.

In addition, in a case in which it is determined that the transform skip identifier ts_idx is not 2D_TS (a mode other than two-dimensional transform skip) and the transform quantization bypass flag is 0 (false) in Step S121, the switch 121 supplies the transform coefficient Coeff_IQ to the inverse secondary transform unit 122, and the process proceeds to Step S122.

In Step S122, the inverse secondary transform unit 122 performs the inverse secondary transform on the input transform coefficient Coeff_IQ on the basis of the secondary transform identifier st_idx, and derives and outputs the transform coefficient Coeff_IS that has undergone the inverse secondary transform.

In Step S123, the inverse primary transform selection unit 132 determines whether the color signal identifier compID indicates luminance or a chrominance. In a case in which the color signal identifier compID indicates the chrominance (compID!=COMPONENT_Y), the process proceeds to Step S124. In Step S124, the chrominance adaptive primary transform information derivation unit 131 derives a primary transform identifier pt_idx[compID] for a transform block of the chrominance on the basis of the adaptive primary transform flag apt_flag[compID] (compID=COMPONET_Cb or COMPONENT_Cr) of the chrominance transform block and the primary transform identifier pt_idx[COMPONENT_Y] for a luminance transform block corresponding to the chrominance transform block. When the process of Step S124 ends, the process proceeds to Step S125.

In addition, in Step S123, in a case in which the color signal identifier compID indicates luminance (compID==COMPONENT_Y), the process proceeds to Step S125.

In Step S125, the inverse primary transform selection unit 132 derives the transform type TrTypeIdxH of the inverse primary horizontal transform and the transform type TrTypeIdxV of the inverse primary vertical transform of the color signal specified by the color signal identifier compID with reference to the prediction mode information Pinfo, the color signal identifier compID, the adaptive primary transform flag apt_flag[compID] of the color signal corresponding to the color signal identifier compID, and the primary transform identifier pt_idx[compID] of the color signal corresponding to the color signal identifier compID.

In Step S126, the inverse primary vertical transform unit 133 executes the inverse primary vertical transform IPver defined by the transform type TrTypeIdxV of the inverse primary vertical transform and the picture height of the transform block on the transform coefficient Coeff_IS that has undergone the inverse secondary transform of the transform block for each transform block specified by the color signal identifier compID and outputs the result as a transform coefficient Coeff_IPver that has undergone the inverse primary vertical transform.

In Step S127, the inverse primary horizontal transform unit 134 executes the inverse primary horizontal transform IPhor defined by the transform type TrTypeIdxH of the inverse primary horizontal transform and the picture height of the transform block on the transform coefficient CoefT_IPver that has undergone the inverse primary vertical transform of the transform block for each transform block specified by the color signal identifier compID and outputs the result as predictive residual D'. When the process of Step S127 ends, the inverse transform process ends, and the process returns to FIG. 12.

<Flow of Chrominance Adaptive Primary Transform Information Derivation Process>

Next, an example of the flow of the chrominance adaptive primary transform information derivation process executed in Step S124 of FIG. 14 will be described with reference to the flowchart of FIG. 15. When the chrominance adaptive primary transform information derivation process is started, the apt_flag derivation unit 151 of the chrominance adaptive primary transform information derivation unit 131 sets a value of the adaptive primary transform flag apt_flag [COMPONENT_Y] of luminance for a value of the adaptive primary transform flag apt_flag[compID] of the chrominance in Step S131.

In Step S132, the pt_idx derivation unit 152 of the chrominance adaptive primary transform information derivation unit 131 determines whether or not the adaptive primary transform flag apt_flag[compID] of the chrominance is true. When it is determined to be true, the process proceeds to Step S133. In Step S133, the pt_idx derivation unit 152 sets a value of the primary transform identifier pt_idx[COMPONENT_Y] of luminance for the primary transform identifier pt_idx[compID] of the chrominance. When the process of Step S133 ends, the chrominance adaptive primary transform information derivation process ends, and the process returns to FIG. 14.

Figure 15:
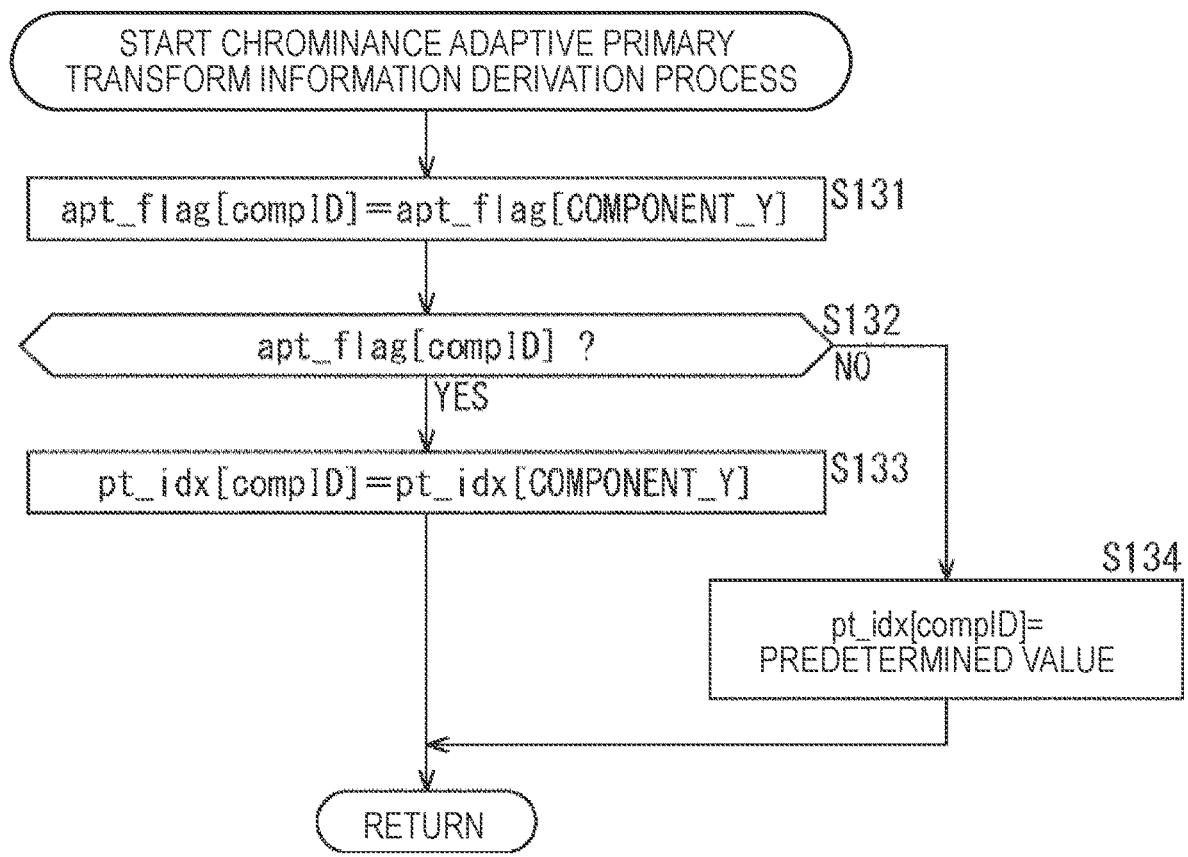
FIG. 15 is a flowchart describing an example of the flow of a chrominance adaptive primary transform information derivation process.

In addition, in a case in which the adaptive primary transform flag apt_flag[compID] of the chrominance is determined to be false in Step S132 of FIG. 15, the process proceeds to Step S134. In Step S134, the pt_idx derivation unit 152 sets a predetermined value for the primary transform identifier pt_idx[compID] of the chrominance. When the process of Step S134 ends, the chrominance adaptive primary transform information derivation process ends, and the process returns to FIG. 14.

<Flow of Inverse Primary Transform Selection Process>

Next, an example of the flow of the inverse primary transform selection process executed in Step S125 of FIG. 14 will be described with reference to the flowchart of FIG. 16.

When the inverse primary transform selection process is started, the inverse primary transform selection unit 132 determines whether or not the adaptive primary transform flag apt_flag[compID] of the color signal corresponding to the color signal identifier compID is 1 (true) in Step S141. In a case in which the adaptive primary transform flag apt_flag[compID] is determined to be 1 (true), the process proceeds to Step S142.

In Step S142, the inverse primary transform selection unit 132 selects a transform set TrSetV (primary horizontal transform set) of the inverse primary vertical transform and a transform set TrSetH (primary vertical transform set) of the inverse primary horizontal transform on the basis of the prediction mode information PInfo.

In Step S143, the inverse primary transform selection unit 132 derives a primary horizontal transform specifying flag pt_hor_flag and a primary vertical transform specifying flag pt_ver_flag from the primary transform identifier pt_idx [compID] of the color signal corresponding to the color signal identifier compID.

In Step S144, the inverse primary transform selection unit 132 selects the transform type TrTypeIdxH of an orthogonal transform applied as the inverse primary horizontal transform IPThor with reference to the primary horizontal transform set TrSetH and the primary horizontal transform specifying flag pt_hor_flag.

In Step S145, the inverse primary transform selection unit 132 selects the transform type TrTypeIdxV of an orthogonal transform applied as the inverse primary vertical transform IPTver with reference to the primary vertical transform set TrSetV and the primary vertical transform specifying flag pt_ver_flag. When the process of Step S145 ends, the inverse primary transform selection process ends, and the process returns to FIG. 14.

In addition, in Step S141, in a case in which it is determined that the adaptive primary transform flag apt_flag [compID] is 0 (false), the process proceeds to Step S146. In Step S146, the inverse primary transform selection unit 132 selects a predetermined orthogonal transform as the transform type TrTypeIdxH of the inverse primary horizontal transform IPThor (TrTypeIdxH=predetermined value).

In Step S147, the inverse primary transform selection unit 132 selects a predetermined orthogonal transform as the transform type TrTypeIdxV of the inverse primary vertical transform IPTver (TrTypeIdxV=predetermined value). When the process of Step S147 ends, the inverse primary transform selection process ends, and the process returns to FIG. 14.

That is, the inverse primary transform selection unit 132 derives the transform type TrTypeIdxH of the inverse primary horizontal transform IPThor and the transform type TrTypeIdxV of the inverse primary vertical transform IPTver using the method in accordance with the value of the adaptive primary transform flag apt_flag[compID] of the chrominance.

As described above, the inverse transform unit 113 included in the image decoding apparatus 100 can apply the inverse adaptive primary transform selected for luminance to the transform block of the chrominance in a case in which a residual signal of a chrominance shows a similar tendency to a residual signal of luminance. Therefore, the inverse primary transform process can be performed on the residual signal of the chrominance with further improved coding efficiency than in the related art. In addition, the processing amounts of encoding and decoding can be reduced while mitigating deterioration in coding efficiency for the chrominance in comparison to the case in which the adaptive primary transform flag apt_flag and the primary transform identifier pt_idx are explicitly decoded for each of luminance and the chrominance.

Modified Example #1

Note that the derivation of the adaptive primary transform flag of the chrominance may be limited to a case in which the prediction type is an inter CU. For example, the adaptive primary transform flag apt_flag[compID] (compID=COMPONET_Cb or COMPONENT_Cr) with respect to a chrominance transform block to be processed may be derived on the basis of the adaptive primary transform flag apt_flag[COMPONENT_Y] with respect to a luminance transform block corresponding to the transform block of the chrominance and a prediction type CuPredMode of the CU (a coding unit) to which the transform block of the chrominance belongs as illustrated in the following formula (18).

```
if ( CuPredMode == MODE_INTER ) {
   apt_flag[compID] = apt_flag[COMPONENT_Y]
} else {
   apt_flag[compID] = 0
}
... (18)
```

In a case in which the prediction type CuPredMode of a CU to which the transform block of the chrominance belongs is inter prediction (CuPredMode=MODE_INTER), for example, the adaptive primary transform flag apt_flag[compID] with respect to the transform block of the chrominance is set on the basis of the adaptive primary transform flag apt_flag[COMPONENT_Y] of a transform block of luminance corresponding to the transform block of the chrominance. On the other hand, in a case in which the prediction type CuPredMode of the CU to which the transform block of the chrominance belongs is not inter prediction (but is intra prediction), the value of the adaptive primary transform flag apt_flag[compID] with respect to the transform block of the chrominance is set to 0 (false).

An example of the flow of the chrominance adaptive primary transform information derivation process of such a case will be described with reference to the flowchart of FIG. 17. The flowchart corresponds to the flowchart of FIG. 15. In this case, when the chrominance adaptive primary transform information derivation process is started, the apt_flag derivation unit 151 determines whether or not the prediction type CUPredMode of a CU to which a transform block to be processed belongs is inter prediction (MODE_INTER) in Step S151. In a case in which the prediction type is determined to be inter prediction, the process proceeds to Step S152.

In Step S152, the apt_flag derivation unit 151 sets a value of the adaptive primary transform flag apt_flag [COMPONENT_Y] of luminance for the value of the adaptive primary transform flag apt_flag[compID] of the chrominance as in the case of Step S131 of FIG. 15. When the process of Step S152 ends, the process proceeds to Step S154.

In addition, in a case in which the prediction type CUPredMode of the CU to which the transform block to be processed belongs is determined to be intra prediction in Step S151, the process proceeds to Step S153. In Step S153, the apt_flag derivation unit 151 sets the adaptive primary transform flag apt_flag[compID] of the chrominance to 0 (false). When the process of Step S153 ends, the process proceeds to Step S154.

Each of the processes of Step S154 to Step S156 is executed similarly to each of the processes of Step S132 to Step S134 of FIG. 15. Thus, when the process of Step S155 or Step S156 ends, the chrominance adaptive primary transform information derivation process ends, and the process returns to FIG. 14.

In the case in which the prediction type is intra prediction, there may be a case in which intra prediction modes are different between luminance and the chrominance. At this time, since the residual signals of the luminance and the chrominance show different tendencies, if the adaptive primary transform information of the luminance is applied to the chrominance, there is a possibility of coding efficiency deteriorating. Therefore, by applying the adaptive primary transform information of the luminance to the chrominance only in the case in which the chrominance adaptive primary transform information derivation process is executed as illustrated in FIG. 17 and the prediction type is inter prediction, a decrease in coding efficiency can be further curbed than in the case of FIG. 15.

Modified Example #2

In addition, the derivation of the adaptive primary transform flag of the chrominance may be limited to an inter CU or an intra CU and when a luminance intra prediction mode is intra block copy (in-screen motion compensation). For example, the adaptive primary transform flag apt_flag[compID](compID=COMPONET_Cb or COMPONENT_Cr) of a transform block of a chrominance to be processed may be set on the basis of the adaptive primary transform flag apt_flag[COMPONENT_Y] of a transform block of luminance corresponding to the transform block of the chrominance and the prediction type CUPredMode of a CU (a coding unit) to which the transform block of the chrominance belongs, and the prediction mode information Pinfo as illustrated in the following formula (19).

```
if ( CuPredMode == MODE_INTER ) {
   apt_flag[compID] = apt_flag[COMPONENT_Y]
} else if (IntraPredModeC == "IntraBC") { //
CuPredMODE == MODE_INTRA
   apt_flag[compID] = apt_flag[COMPONENT_Y]
} else {
   apt_flag[compID] = 0
}
... (19)
```

That is, in a case in which the prediction type CUPredMode of the CU to which the transform block of the chrominance belongs is inter prediction, or a case in which the prediction type of the CU is intra prediction and the intra prediction mode IntraPredModeC of the chrominance is intra block copy (IntraBC), the adaptive primary transform flag apt_flag[compID] with respect to the transform block of the chrominance is set on the basis of the adaptive primary transform flag apt_flag[COMPONENT_Y] with respect to the transform block of luminance corresponding to the transform block of the chrominance. On the other hand, in other cases (a case in which the prediction type CUPredMode of the CU is intra prediction and the intra prediction mode IntraPredModeC is not intra block copy), the value of the adaptive primary transform flag apt_flag[compID] with respect to the transform block of the chrominance is set to 0 (false). Note that, in a case in which the information of luminance and the chrominance is included in the same CU, instead of the intra prediction mode IntraPredModeC of the chrominance, the conditional determination may be performed using the intra prediction mode IntraPredModeY of luminance in the above-described formula (19).

An example of the flow of the chrominance adaptive primary transform information derivation process of such a case will be described with reference to the flowchart of FIG. 18. The flowchart corresponds to the flowchart of FIG. 15. In this case, when the chrominance adaptive primary transform information derivation process is started, the apt_flag derivation unit 151 determines whether or not the prediction type CUPredMode of a CU to which a transform block to be processed belongs is inter prediction (MODE_INTER) in Step S171. In a case in which the prediction type is determined to be intra prediction, the process proceeds to Step S172.

In Step S172, the apt_flag derivation unit 151 determines whether or not the intra prediction mode IntraPredModeC of the chrominance is intra block copy (IntraBC). In a case in which the mode is determined to be intra block copy (IntraBC), the process proceeds to Step S173. In addition, the prediction type CUPredMode of the CU to which the transform block to be processed belongs is determined to be inter prediction (MODE_INTER) in Step S171, the process proceeds to Step S173.

In Step S173, the apt_flag derivation unit 151 sets a value of the adaptive primary transform flag apt_flag [COMPONENT_Y] of luminance for the value of the adaptive primary transform flag apt_flag[compID] of the chrominance as in the case of Step S131 of FIG. 15. When the process of Step S173 ends, the process proceeds to Step S175.

In addition, in a case in which the intra prediction mode IntraPredModeC of the chrominance is determined not to be intra block copy (IntraBC) in Step S172, the process proceeds to Step S174. In Step S174, the apt_flag derivation unit 151 sets the value of the adaptive primary transform flag apt_flag[compID] of the chrominance to 0 (false). When the process of Step S174 ends, the process proceeds to Step S175.

Each of the processes of Step S175 to Step S177 is executed similarly to each of the processes of Step S132 to Step S134 of FIG. 15. Thus, when the process of Step S176 or Step S177 ends, the chrominance adaptive primary transform information derivation process ends, and the process returns to FIG. 14.

In the case in which the prediction type is intra prediction and the intra prediction mode IntraPredMode is intra block copy, tendencies of the residual of luminance and the residual of the chrominance are similar as in the case of inter prediction. Therefore, since the adaptive primary transform of luminance can be applied to the chrominance in the case in which the prediction type is intra prediction and the intra prediction mode IntraPredMode is IntraBC, coding efficiency can be further improved in comparison to <Modified example #1>.

Modified Example #3

In addition, the derivation of the adaptive primary transform flag of the chrominance may be limited to an inter CU or an intra CU and when a luminance intra prediction mode are equivalent to a chrominance intra prediction mode. For example, the adaptive primary transform flag apt_flag[compID](compID=COMPONET_Cb or COMPONENT_Cr) of a transform block of a chrominance to be processed may be set on the basis of the adaptive primary transform flag apt_flag[COMPONENT_Y] with respect to a transform block of luminance corresponding to the transform block of the chrominance, the prediction type CUPredMode of the CU (a coding unit) to which the transform block of the chrominance belongs, the luminance intra prediction mode IntraPredModeY of the CU, and the chrominance intra mode IntraPredModeC of the CU as illustrated in the following formula (20).

```
if ( CuPredMode == MODE_INTER ) {
  apt_flag[compID] = apt_flag[COMPONENT_Y]
  } else if (IntraPredModeY == IntraPredModeC) {  //
CuPredMode==MODE_INTRA
  apt_flag[compID] = apt_flag[COMPONENT_Y]
  } else {
  apt_flag[compID] = 0
  }
  ... (20)
```

That is, in a case in which the prediction type CUPredMode of the CU to which the transform block of the chrominance is inter prediction, or the prediction type of the CU is intra prediction and the intra prediction mode IntraPredModeC of the chrominance is equal to the intra prediction mode IntraPredModeY of luminance, the adaptive primary transform flag apt_flag[compID] of the transform block of the chrominance is set on the basis of the adaptive primary transform flag apt_flag[COMPONENT_Y] with respect to the transform block of luminance corresponding to the transform block of the chrominance. On the other hand, in other cases (a case in which the prediction type CUPredMode of the CU is intra prediction and the intra prediction mode of the chrominance is different from the intra prediction mode of luminance), the value of the adaptive primary transform flag apt_flag[compID] with respect to the transform block of the chrominance is set to 0 (false).

An example of the flow of the chrominance adaptive primary transform information derivation process of such a case will be described with reference to the flowchart of FIG. 19. The flowchart corresponds to the flowchart of FIG. 15. In this case, when the chrominance adaptive primary transform information derivation process is started, the apt_flag derivation unit 151 determines whether or not the prediction type CUPredMode of a CU to which a transform block to be processed belongs is inter prediction (MODE_INTER) in Step S181. In a case in which the prediction type is determined to be intra prediction, the process proceeds to Step S182.

In Step S182, the apt_flag derivation unit 151 determines whether or not the intra prediction mode IntraPredModeC of the chrominance is equal to the intra prediction mode IntraPredModeY of luminance. In a case in which the modes are equal, the process proceeds to Step S183. In addition, the intra prediction mode IntraPredModeC of the chrominance is determined not to be equal to the intra prediction mode IntraPredModeY of luminance in Step S182, the process proceeds to Step S184.

Each of the processes of Step S183 to Step S187 is executed similarly to each of the processes of Step S173 to Step S177 of FIG. 18. Thus, when the process of Step S186 or Step S187 ends, the chrominance adaptive primary transform information derivation process ends, and the process returns to FIG. 14.

In the case in which the prediction type of the CU is intra prediction, that is, luminance and the chrominance have the equal intra prediction mode, residual signals of luminance and the chrominance have similar tendencies. Thus, by applying the adaptive primary transform information of luminance to the chrominance only in the case in which the intra prediction mode of luminance has the same value as the intra prediction mode of the chrominance, the adaptive primary transform of luminance can be applied to the chrominance in the case in which the prediction type is intra prediction and the intra prediction mode of luminance has the same value as the intra prediction mode of the chrominance, and thus coding efficiency can be further improved than in the case of <Modified example #1>.

Modified Example #4

In addition, a flag indicating whether or not information regarding an adaptive primary transform of a chrominance is set on the basis of an adaptive primary transform of luminance may be added and the setting of the information regarding the adaptive primary transform of the chrominance may be controlled using the flag. For example, the adaptive primary transform flag apt_flag[compID] (compID=COMPONET_Cb or COMPONENT_Cr) with respect to a transform block of a chrominance to be processed may be set on the basis of a chrominance adaptive primary transform information inference flag chroma_apt_infer_flag indicating whether or not to perform the setting (inference) using adaptive primary transform information of a transform block of luminance corresponding to the transform block of the chrominance and an adaptive primary transform flag apt_flag[COMPONENT_Y] with respect to the transform block of luminance corresponding to the transform block of the chrominance as illustrated in the following formula (21).

```
if ( chroma_apt_info_infer_flag [compID] ) {
    apt_flag[compID] = apt_flag[COMPONENT_Y] : 0
} else {
    apt_flag[compID] = 0
}
... (21)
```

That is, in a case in which the chrominance adaptive primary transform information inference flag chroma_apt_info_infer_flag[compID] is 1 (true), the adaptive primary transform flag apt_flag[compID] with respect to the transform block of the chrominance is set on the basis of the adaptive primary transform flag apt_flag[COMPONENT_Y] with respect to the transform block of luminance of the transform block of the chrominance. On the other hand, in other cases (a case in which the chrominance adaptive primary transform information inference flag chroma_apt_info_infer_flag[compID] is 0 (false)), the value of the adaptive primary transform flag apt_flag[compID] with respect to the transform block of the chrominance is set to 0 (false).

An example of syntax of a TU in that case is illustrated in A of FIG. 20. Semantics of each parameter is as illustrated in B of FIG. 20. In addition, an example of syntax of residual coding included in the syntax of A of FIG. 20 is illustrated in FIG. 21. The chrominance adaptive primary transform information inference flag chroma_apt_info_infer_flag is decoded by the decoding unit 111 in accordance with the syntax table shown in FIG. 21.

That is, in a case in which a color signal identifier compID indicates a chrominance, the adaptive primary transform flag apt_flag [COMPONENT_Y] of luminance is 1 (true), the transform skip flag ts_flag[compID] of the color signal corresponding to the color signal identifier compID is 0 (false), and the transform quantization bypass flag flag is 0 (false), the chrominance adaptive primary transform information inference flag chroma_apt_info_infer_flag is decoded. In a case of other conditions, the value of the chrominance adaptive primary transform information inference flag chroma_apt_info_infer_flag is inferred to be 0.

The decoding unit 111 performs such decoding in Step S101 of FIG. 12 by executing the chrominance adaptive primary transform information inference flag decoding process. An example of the flow of the chrominance adaptive primary transform information inference flag decoding process will be described with reference to the flowchart of FIG. 22.

When the chrominance adaptive primary transform information inference flag decoding process is started, the decoding unit 111 determines whether or not the color signal identifier compID is of luminance in Step S191. In a case in which the color signal identifier compID is determined to be of a chrominance (compID!=COMPONENT_Y), the process proceeds to Step S192. In Step S192, the decoding unit 111 determines whether or not the adaptive primary transform flag apt_flag [COMPONENT_Y] of luminance is 1 (true). In the case in which the adaptive primary transform flag apt_flag [COMPONENT_Y] of luminance is determined to be 1 (true), the process proceeds to Step S193.

In Step S193, the decoding unit 111 determines whether or not the transform quantization bypass flag transquant_bypass_flag is 1 (true). In a case in which the transform quantization bypass flag is determined to be 0 (false) (!transquant_bypass_flag), the process proceeds to Step S194. In Step S194, the decoding unit 111 determines whether or not the transform skip flag ts_flag[compID] of the color signal corresponding to the color signal identifier compID is 1 (true). In a case in which the transform skip flag ts_flag[compID] is determined to be 0 (false) (! ts_flag [compID]), the process proceeds to Step S195.

In Step S195, the decoding unit 111 decodes the chrominance adaptive primary transform information inference flag chroma_apt_info_infer_flag[compID] corresponding to the color signal identifier compID from a bit string of the encoded data #1 and outputs the result as a part of transform information Tinfo. When the process of Step S195 ends, the chrominance adaptive primary transform information inference flag decoding process ends, and the process returns to FIG. 12.

In addition, in a case in which the color signal identifier compID is of luminance (compID==COMPONENT_Y) in Step S191, the process proceeds to Step S196. In addition, in a case in which the adaptive primary transform flag apt_flag [COMPONENT_Y] of luminance is determined to be 0 (false) in Step S192 (!apt_flag[COMPONENT_Y]), the process proceeds to Step S196. In addition, in a case in which the transform quantization bypass flag is determined to be 1 (true) (transquant_bypass_flag) in Step S193, the process proceeds to Step S196. In addition, in a case in which the transform skip flag ts_flag[compID] is 1 (true) (ts_flag[compID]) in Step S194, the process proceeds to Step S196.

In Step S196, the decoding unit 111 omits decoding of the chrominance adaptive primary transform information inference flag chroma_apt_info_infer_flag[compID] corresponding to the color signal identifier compID and sets the value of the flag to 0 (false) (chroma_apt_info_infer_flag[compID]=0). When the process of Step S196 ends, the chrominance adaptive primary transform information inference flag decoding process ends, and the process returns to FIG. 12.

The chrominance adaptive primary transform information derivation unit 131 performs the chrominance adaptive primary transform information derivation process using the chrominance adaptive primary transform information inference flag chroma_apt_info_infer_flag[compID] decoded or set as described above. An example of the flow of the chrominance adaptive primary transform information derivation process of the case will be described with reference to the flowchart of FIG. 23. This flowchart corresponds to the flowchart of FIG. 15. In this case, when the chrominance adaptive primary transform information derivation process is started, the apt_flag derivation unit 151 determines whether or not the value of the chrominance adaptive primary transform information inference flag chroma_apt_info_infer_flag[compID] is true in Step S201. In a case in which it is determined to be true, the process proceeds to Step S202. In addition, in a case in which the value of the chrominance adaptive primary transform information inference flag chroma_apt_info_infer_flag[compID] is determined to be false in Step S201, the process proceeds to Step S203.

Each of the processes of Step S202 to Step S206 is executed similarly to each of the processes of Step S183 to Step S187 of FIG. 19. Thus, when the process of Step S205 or Step S206 ends, the chrominance adaptive primary transform information derivation process ends, and the process returns to FIG. 14.

Whether or not adaptive primary transform information of luminance is to be applied to a chrominance can be explicitly controlled on the basis of the chrominance adaptive primary transform information inference flag with respect to signals showing difference tendencies in residual of luminance and residual of the chrominance. Therefore, the adaptive primary transform can be applied to the chrominance with higher efficiency than in the case of FIG. 15, and thus coding efficiency can be improved.

Modified Example #5

In addition, the derivation of the adaptive primary transform flag of a chrominance may be limited to a case in which the size of a short side of a transform block of the chrominance is greater than or equal to a predetermined threshold value. For example, the adaptive primary transform flag apt_flag[compID](compID=COMPONET_Cb or COMPONENT_Cr) with respect to a transform block of a chrominance to be processed may be set on the basis of the adaptive primary transform flag apt_flag[COMPONENT_Y] with respect to a transform block of luminance corresponding to the transform block of the chrominance and the size of the short side of the transform block of the chrominance as illustrated in the following formula (22).

```
if ( min (log2TBWSize, log2TBHSize) >= TH ) {
    apt_flag[compID] = apt_flag[COMPONENT_Y]
} else {
    apt_flag[compID] = 0
}
    ... (22)
```

That is, in a case in which the size of the short side of the transform block of the chrominance is greater than or equal to the threshold value (min (log2TBWSize, log2TBHSize)>=TH), the adaptive primary transform flag apt_flag[compID] with respect to the transform block of the chrominance is set on the basis of the adaptive primary transform flag apt_flag[COMPONENT_Y] with respect to the transform block of luminance corresponding to the transform block of the chrominance. On the other hand, in other cases (a case in which the size of the short side of the transform block of the chrominance is smaller than the threshold value), the value of the adaptive primary transform flag apt_flag[compID] with respect to the transform block of the chrominance is set to 0 (false).

An example of the flow of the chrominance adaptive primary transform information derivation process of that case will be described with reference to the flowchart of FIG. 24. This flowchart corresponds to the flowchart of FIG. 15. In this case, when the chrominance adaptive primary transform information derivation process is started, the apt_flag derivation unit 151 determines whether or not the size of a short side of a transform block to be processed (min (log2TBWSize, log2TBHSize)) is greater than or equal to a predetermined threshold value TH in Step S211. In a case in which the size of the short side of the transform block to be processed is determined to be greater than or equal to the predetermined threshold value (min (log2TBWSize, log2TBHSize)>=TH), the process proceeds to Step S212. In addition, in a case in which the size of the short side of the transform block to be processed is determined to be smaller than the predetermined threshold value (min (log2TBWSize, log2TBHSize)<TH) in Step S211, the process proceeds to Step S213.

Each of the processes of Step S212 to Step S216 is executed similarly to each of the processes of Step S202 to Step S206 of FIG. 23. Thus, when the process of Step S215 or Step S216 ends, the chrominance adaptive primary transform information derivation process ends, and the process returns to FIG. 14.

In the case in which the size of the short side of the transform block of the chrominance is smaller than the predetermined value (e.g., 4), even if an adaptive primary transform of DST-7/DST-1/DCT-5/DCT-8 or the like for a size equal to the size of the short side is applied to the short side, the improvement range of coding efficiency is small. For this reason, by not applying the adaptive primary transform in a case in which the size of the short side of the transform block of the chrominance is smaller than the predetermined value, a circuit scale with respect to the transform used in the adaptive primary transform for a size smaller than the predetermined value can be reduced while mitigating a decrease in coding efficiency.

Modified Example #6

In addition, it is possible to select the transform type of the inverse primary horizontal transform IPhor and the inverse primary vertical transform IPver using the sizes of the picture height and the picture width of a transform block of a chrominance. For example, although it has been described above that the inverse primary transform selection unit 132 determines the type of an orthogonal transform to be applied to an inverse transform of each direction on the basis of the correspondence table of transform sets and transform types (LUT_TrSetToTrTypeIdx) shown in FIG. 1, a primary {horizontal, vertical} transform set TrSet{H,V}, and a primary {horizontal, vertical} transform specifying flag pt_{hor, ver}_flag, the technology is not limited thereto. For example, in a case of a transform block of a chrominance, the transform type of each direction may be determined further with reference to the size of the transform block of the chrominance.

In a case in which the picture width of the transform block of the chrominance (here, a logarithmic value of the picture width log2TBWSize) is equal to or smaller than a threshold value TH in Step S144 of FIG. 16 as illustrated in the following formula (23), for example, the transform type TrTypeIdxH of the (inverse) primary horizontal transform may be set to a predetermined transform type (DCT-2), and in other cases, the transform type TrTypeIdxH of the (inverse) primary horizontal transform may be set on the basis of the horizontal transform set TrSetH, and the primary horizontal transform specifying flag pt_hor_flag. Note that, in the formula (23), a specific example of the threshold value TH may be set to, for example, 1 or 2. Note that, in the formula (23), the logarithmic value log2TBWSize of the picture width of the transform block may be replaced with a picture width TBW. In this case, a threshold value TH' is set to 1<<TH.

```
if (compID==COMPONENT_Y ) {
  TrTypeIdxH = LUT_TrSetToTrTypeIdx[ TrSetH ][ pt_hor_flag ]
} else if (log2TBWSize<=TH) {
  TrTypeIdxH = predetermined value (set to the value of the
transform type indicating DCT-II)
} else {
  TrTypeIdxH = LUT_TrSetToTrTypeIdx[ TrSetH ][ pt_hor_flag ]
}
... (23)
```

An example of the flow of the primary horizontal transform type derivation process executed in Step S144 of FIG. 16 as described above will be described with reference to the flowchart of FIG. 25. When the primary horizontal transform type derivation process is started, the inverse primary transform selection unit 132 determines whether or not the processing object is a transform block of luminance in Step S221. In a case in which the processing object is determined to be a transform block of a chrominance, the process proceeds to Step S222. In Step S222, the inverse primary transform selection unit 132 determines whether or not the picture width of the transform block of the chrominance (the logarithmic value log2TBWSize of the picture width) is equal to or smaller than the threshold value TH. In a case in which the picture width of the transform block of the chrominance is determined to be greater than the threshold value (log2TBWSize>TH), the process proceeds to Step S223. In addition, in a case in which the processing object is determined to be a transform block of luminance in Step S221, the process proceeds to Step S223.

In Step S223, the inverse primary transform selection unit 132 sets the transform type TrTypeIdxH of the (inverse) primary horizontal transform on the basis of the correspondence table of transform sets and transform types (LUT_TrSetToTrTypeIdx) shown in FIG. 1, the primary horizontal transform set TrSetH, and the primary horizontal transform specifying flag pt_hor_flag. When the process of Step S223 ends, the primary horizontal transform type derivation process ends, and the process returns to FIG. 16.

In addition, in a case in which the picture width of the transform block of the chrominance is determined to be equal to or smaller than the threshold value (log2TBWSize<=TH) in Step S222, the process proceeds to Step S224. In Step S224, the inverse primary transform selection unit 132 sets the transform type TrTypeIdxH of the (inverse) primary horizontal transform to a predetermined value. When the process of Step S224 ends, the primary horizontal transform type derivation process ends, and the process returns to FIG. 16.

The same also applies to the vertical direction. In a case in which the picture height of the transform block of the chrominance (here, a logarithmic value of the picture height log2TBHSize) is equal to or smaller than the threshold value TH in Step S145 of FIG. 16 as illustrated in the following formula (24), for example, the predetermined transform type (DCT-2) may be set as the transform type TrTypeIdxV of the (inverse) primary vertical transform, and in other cases, the transform type TrTypeIdxV of the (inverse) primary vertical transform may be set on the basis of the vertical transform set identifier TrSetV and the primary vertical transform specifying flag pt_ver_flag. Note that, in the formula (24), a specific example of the threshold value TH may be set to, for example, 1 or 2. In addition, in the formula (24), the logarithmic value log2TBHSize of the picture height of the transform block may be replaced with a picture height TBH. In this case, a threshold value TH' is set to 1<<TH.

```
if (compID==COMPONENT_Y ) {
  TrTypeIdxV = LUT_TrSetToTrTypeIdx[ TrSetV ][ pt_ver_flag ]
} else if (log2TBHSize<=TH) {
  TrTypeIdxV = predetermined value (a value of the transform
type indicating DCT-II is set)
} else {
  TrTypeIdxV = LUT_TrSetToTrTypeIdx[ TrSetV ][ pt_ver_flag ]
}
... (24)
```

An example of the flow of the primary vertical transform type derivation process executed in Step S145 of FIG. 16 as described above will be described with reference to the flowchart of FIG. 26. When the primary vertical transform type derivation process is started, the inverse primary transform selection unit 132 determines whether or not the processing object is a transform block of luminance in Step S231. In a case in which the processing object is determined to be a transform block of a chrominance, the process proceeds to Step S232. In Step S232, the inverse primary transform selection unit 132 determines whether or not the picture height of the transform block of the chrominance (the logarithmic value log2TBHSize of the picture height) is equal to or smaller than the threshold value TH. In a case in which the picture height of the transform block of the chrominance is determined to be greater than the threshold value (log2TBHSize>TH), the process proceeds to Step S233. In addition, in a case in which the processing object is determined to be a transform block of luminance in Step S231, the process proceeds to Step S233.

In Step S233, the inverse primary transform selection unit 132 sets the transform type TrTypeIdxV of the (inverse) primary vertical transform on the basis of the correspondence table of transform sets and transform types (LUT_TrSetToTrTypeIdx) shown in FIG. 1, the primary vertical transform set TrSetV, and the primary vertical transform specifying flag pt_ver_flag. When the process of Step S233 ends, the primary vertical transform type derivation process ends, and the process returns to FIG. 16.

In addition, in a case in which the picture width of the transform block of the chrominance is determined to be equal to or smaller than the threshold value (log2TBHSize<=TH) in Step S232, the process proceeds to Step S234. In Step S234, the inverse primary transform selection unit 132 sets the transform type TrTypeIdxV of the (inverse) primary vertical transform to a predetermined value. When the process of Step S234 ends, the primary vertical transform type derivation process ends, and the process returns to FIG. 16.

In a case in which the picture width (picture height) of the transform block of the chrominance is smaller than the predetermined value (e.g., 4), there is a small difference in coding efficiency between DST-7/DST-1/DCT-5/DCT-8 and DCT-2 as an (inverse) primary horizontal (vertical) transform. Therefore, by selecting a predetermined orthogonal transform (DCT-2) as an (inverse) primary horizontal (vertical) transform in the case in which the picture width (picture height) of the transform block of the chrominance is smaller than the predetermined value (e.g., 4), a circuit scale with respect to the orthogonal transform used in the adaptive primary transform for a size smaller than the predetermined value can be reduced.

3. Second Embodiment

<ts_flag>

Note that, although the examples of the adaptive primary transform flag apt_flag and the primary transform identifier pt_idx have been described as information regarding the (inverse) orthogonal transform in the first embodiment, details of the information regarding the (inverse) orthogonal transform are arbitrary and are not limited to the parameters. For example, a transform skip flag ts_flag indicating whether the (inverse) orthogonal transform process is to be skipped may be included as illustrated in the table of FIG. 6. By deriving each of a transform skip flag ts_flag[Cb] of a chrominance (Cb) and a transform skip flag ts_flag[Cr] of a chrominance (Cr) on the basis of a transform skip flag ts_flag[Y] of luminance, for example, an increase in overhead of the code amount of the syntax signaled by the chrominance (Cb/Cr) can be curbed as well.

Description of the flag will be further provided with reference to the table of FIG. 27. In the related art, a transform skip flag ts_flag of a chrominance is transmitted (signaled) from an encoding side to a decoding side as indicated in the row of No. #0. If transform skip flags ts_flag not only of luminance but also a chrominance are explicated encoded as described above, there is concern of the code amount increasing and coding efficiency deteriorating. In this case, the encoding side also should perform the settings and encoding of the transform skip flag ts_flag for each of signals (Y, Cb, and Cr) and thus there is also concern of the processing amount increasing. In addition, the decoding side should decode the transform skip flag ts_flag for each of the signals (Y, Cb, and Cr) and thus there is concern of the processing amount increasing.

Thus, the transform skip flag ts_flag of a chrominance is inferred from the transform skip flag ts_flag of luminance at all times, for example, as indicated in the row of No. #1. For example, a value of the transform skip flag ts_flag[compID] of a chrominance may be set to a value of the transform skip flag ts_flag[COMPONENT_Y] of luminance. In this manner, transmission (encoding and decoding) of the transform skip flag ts_flag of the chrominance can be omitted, and thus deterioration in coding efficiency can be curbed. In addition, an increase in a load of encoding and decoding can be curbed as well.

In addition, in a case in which the prediction type of a coding block to which a transform block to be processed belongs is inter prediction, for example, as indicated in the row of No. #2, the value of the transform skip flag ts_flag [compID] of the chrominance may be set to the value of the transform skip flag ts_flag[COMPONENT_Y] of luminance, and in a case in which the prediction type of the coding block is intra prediction, the transform skip flag ts_flag[compID] of the chrominance may be signaled (i.e., the transform skip flag ts_flag[compID] of the chrominance can be decoded from encoded data). In this manner, the value of the transform skip flag ts_flag of luminance can be used only in a case of the inter prediction mode in which residual signals thereof show similar tendencies, and thus deterioration in coding efficiency can be further curbed.

Furthermore, in a case in which the prediction type of the coding block to which the transform block to be processed belongs is inter prediction, for example, as indicated in the row of No. #3 or intra prediction in which the prediction modes for luminance and the chrominance match each other, the value of the transform skip flag ts_flag[compID] of the chrominance may be set to the value of the transform skip flag ts_flag[COMPONENT_Y] of luminance, and in a case in which the prediction type of the coding block is intra prediction in which the prediction modes for luminance and the chrominance do not match each other, the transform skip flag ts_flag[compID] of the chrominance may be signaled (i.e., the transform skip flag ts_flag[compID] of the chrominance can be decoded from the encoded data). In this manner, the value of the transform skip flag ts_flag of luminance can be used only in the case of the prediction mode in which the residual signals thereof show similar tendencies, and thus deterioration in coding efficiency can be further curbed.

In addition, in a case in which the prediction type of the coding block to which the transform block to be processed belongs is inter prediction, for example, as indicated in the row of No. #4 or intra prediction of which the prediction mode is intra block copy, the value of the transform skip flag ts_flag[compID] of the chrominance may be set to the value of the transform skip flag ts_flag[COMPONENT_Y] of luminance, and in a case in which the prediction type of the coding block is intra prediction of which the prediction mode is not intra block copy, the transform skip flag ts_flag[compID] of the chrominance may be signaled (i.e., the transform skip flag ts_flag[compID] of the chrominance can be decoded from the encoded data). In this manner, the value of the transform skip flag ts_flag of luminance can be used only in the case of the prediction mode in which residual signals thereof show similar tendencies, and thus deterioration in coding efficiency can be further curbed.

In addition, in a case in which a chrominance transform skip information inference flag chroma_ts_info_infer_flag indicating whether the transform skip flag ts_flag[compID] of the chrominance is to be inferred on the basis of the transform skip flag ts_flag[COMPONENT_Y] of luminance is 1 (true), for example, as indicated in the row of No. #5, the value of the transform skip flag ts_flag[compID] of the chrominance may be set to the value of the transform skip flag ts_flag[COMPONENT_Y] of luminance, and in a case in which the chrominance transform skip information inference flag chroma_ts_info_infer_flag is 0 (false), the transform skip flag ts_flag[compID] of the chrominance may be signaled (i.e., the transform skip flag ts_flag[compID] of the chrominance can be decoded from the encoded data). In this manner, it is possible to explicitly control whether or not the value of the transform skip flag of luminance is to be used using the chrominance transform skip information inference flag chroma_ts_info_infer_flag. Therefore, it is possible to easily make the value of the transform skip flag of luminance used only in a case in which a sufficiently large effect can be obtained, and thus deterioration in coding efficiency can be further curbed.

Note that each of the above-described cases can be arbitrarily combined similarly to the case of FIG. 7. In this manner, the effects obtained in each of the cases can be exhibited. In addition, each of the above-described cases can also be combined with other cases that are not described above.

Basic Example 1

The transform skip flag ts_flag of the chrominance may be inferred from the transform skip flag ts_flag of luminance at all times as described with reference to the row of No. #1 of FIG. 27. An example of syntax of residual_coding of that case is illustrated in FIG. 28. In that case, "compID==COMPONENT_Y" is included in the condition for signaling the transform skip flag ts_flag as illustrated in FIG. 28. In other words, in the case of the chrominance (compID!=COMPONENT_Y), the setting is performed using the transform skip flag of luminance without signaling the transform skip flag ts_flag.

In such a case, the decoding unit 111 sets the transform skip flag ts_flag[compID] of the chrominance by executing a transform skip flag derivation process. An example of the flow of the transform skip flag derivation process will be described with reference to the flowchart of FIG. 29.

When the transform skip flag derivation process is started, the decoding unit 111 determines whether or not the transform skip flag enabled flag ts_enabled_flag is true in Step S241. In a case in which the transform skip flag enabled flag ts_enabled_flag is determined to be true, the process proceeds to Step S242. In Step S242, the decoding unit 111 determines whether or not the transform quantization bypass enabled flag transquant_bypass_enabled_flag is false. In a case in which the transform quantization bypass enabled flag transquant_bypass_enabled_flag is false, the process proceeds to Step S243. In Step S243, the decoding unit 111 determines whether or not the size of the transform block to be processed is equal to or smaller than a maximum transform skip block size. In a case in which the size is determined to be equal to or smaller than the maximum transform skip block size, the process proceeds to Step S244.

In Step S244, the decoding unit 111 determines whether or not the processing object is a chrominance (compID!=COMPONENT_Y). In a case in which the processing object is determined to be a chrominance (compID!=COMPONENT_Y), the process proceeds to Step S245. In Step S245, the decoding unit 111 sets a value of the transform skip flag ts_flag[COMPONENT_Y] of luminance for a value of the transform skip flag ts_flag[compID] of the chrominance. When the process of Step S245 ends, the transform skip flag derivation process ends.

In addition, in a case in which the processing object is determined to be luminance (compID==COMPONENT_Y) in Step S244, the process proceeds to Step S246. Since the transform skip flag ts_flag[compID] of luminance is signaled, the decoding unit 111 decodes the encoded data and thereby obtains the transform skip flag ts_flag[compID] of luminance in Step S246. When the process of Step S246 ends, the transform skip flag derivation process ends.

Note that, in a case in which the transform skip flag enabled flag ts_enabled_flag is determined to be false in Step S241, a case in which the transform quantization bypass enabled flag transquant_bypass_enabled_flag is determined to be true in Step S242, or a case in which the size of the transform block of the processing object is determined to be greater than the maximum transform skip block size in Step S243, the transform skip flag derivation process ends.

In this manner, transmission (encoding and decoding) of the transform skip flag ts_flag of the chrominance can be omitted, and thus deterioration in coding efficiency can be curbed. In addition, an increase in a load of encoding and decoding can be curbed.

Modified Example 1

As described with reference to the row of No. #2 of FIG. 27, in the case in which the prediction type of the coding block to which the transform block to be processed belongs is inter prediction, the value of the transform skip flag ts_flag[compID] of the chrominance may be set to the value of the transform skip flag ts_flag[COMPONENT_Y] of luminance, and in the case in which the prediction type of the coding block is intra prediction, the transform skip flag ts_flag[compID] of the chrominance may be signaled (i.e., the transform skip flag ts_flag[compID] of the chrominance can be decoded from the encoded data).

An example of syntax of residual_coding of that case is illustrated in FIG. 30. In that case, "&& (CuPreMode==MODE_INTRA||CuPreMode==MODE_INTER && compID==COMPONENT_Y)" is included in the condition for signaling the transform skip flag ts_flag as illustrated in FIG. 30. That is, even if the prediction mode is intra prediction or the prediction mode is inter prediction, the transform skip flag ts_flag is signaled in the case of luminance. In other words, the transform skip flag ts_flag is not signaled only in the case in which the prediction mode for the chrominance is inter prediction. That is, in this case, the transform skip flag ts_flag is set using the transform skip flag ts_flag of luminance.

An example of the flow of the transform skip flag derivation process of this case will be described with reference to the flowchart of FIG. 31. Each of the processes of Step S251 to Step S254 is executed similarly to each of the processes of Step S241 to Step S244 of FIG. 29.

In Step S255, the decoding unit 111 further determines whether or not the prediction mode is inter prediction. In a case in which the prediction mode is determined to be inter prediction (CuPredMode==MODE_INTER), the process proceeds to Step S256. In addition, in a case in which the prediction mode is determined to be intra prediction (CuPredMode==MODE_INTRA), the process proceeds to Step S257.

The process of Step S256 is executed similarly to the process of Step S245 of FIG. 29. That is, the decoding unit 111 sets the value of the transform skip flag ts_flag[compID] of the chrominance to the value of the transform skip flag ts_flag[COMPONENT_Y] of luminance. When the process of Step S256 ends, the transform skip flag derivation process ends.

In addition, the process of Step S257 is executed similarly to the process of Step S246 of FIG. 29. That is, the decoding unit 111 decodes the encoded data and thereby obtains the signaled transform skip flag ts_flag[compID]. When the process of Step S257 ends, the transform skip flag derivation process ends.

In this manner, transmission (encoding and decoding) of the transform skip flag ts_flag of the chrominance can be omitted using the value of the transform skip flag ts_flag of luminance only in the case of the inter prediction mode in which the tendencies of the residual signals are similar, and thus deterioration in coding efficiency can be curbed. In addition, an increase in a load of encoding and decoding can be curbed as well.

Modified Example 2

In the case in which the prediction type of the coding block to which the transform block to be processed belongs is inter prediction as described with reference to the row of No. #3 of FIG. 27 or intra prediction in which the prediction modes for luminance and the chrominance match each other, the value of the transform skip flag ts_flag[compID] of the chrominance may be set to the value of the transform skip flag ts_flag[COMPONENT_Y] of luminance, in the case in which the prediction type of the coding block is intra prediction in which the prediction modes for luminance and the chrominance do not match each other, the transform skip flag ts_flag[compID] of the chrominance may be signaled (i.e., the transform skip flag ts_flag[compID] of the chrominance can be decoded from the encoded data).

An example of syntax of residual_coding in that case is illustrated in FIG. 32. As illustrated in FIG. 32, "&& (CuPreMode==MODE_INTRA && compID==COMPONENT_Y||CuPreMode==MODE_INTRA && compID!=COMPONENT_Y && IntraPredModeY !=IntraPredModeC CuPredMode==MODE_INTER && compID==COMPONENT_Y)" is included in the condition for signaling the transform skip flag ts_flag in that case. That is, regardless of whether the flag is of luminance or chrominance, the transform skip flag ts_flag is signaled in the case in which the prediction type is intra prediction in which the prediction modes for luminance and the chrominance do not match each other. In other words, only in a case in which the prediction type is inter prediction for a chrominance or intra prediction for the chrominance in which the prediction modes for luminance and the chrominance match each other, the transform skip flag ts_flag is not signaled. That is, the transform skip flag ts_flag is set using the transform skip flag ts_flag of luminance in that case.

An example of the flow of the transform skip flag derivation process in that case will be described with reference to the flowchart of FIG. 33. Each of the processes of Step S261 to Step S265 is executed similarly to each of the processes of Step S251 to Step S255 of FIG. 31.

In a case in which the prediction type is determined to be intra prediction in Step S265, the process proceeds to Step S266. In Step S266, the decoding unit 111 determines whether or not the prediction modes for luminance and the chrominance match each other. In a case in which the prediction modes are determined to match each other (IntraPredModeY==IntraPredModeC), the process proceeds to Step S267. In addition, in a case in which the prediction modes are determined not to match each other, the process proceeds to Step S268.

The process of Step S267 is executed similarly to the process of Step S256 of FIG. 31. That is, the decoding unit 111 sets the value of the transform skip flag ts_flag[compID] of the chrominance to the value of the transform skip flag ts_flag[COMPONENT_Y] of luminance. When the process of Step S267 ends, the transform skip flag derivation process ends.

In addition, the process of Step S268 is executed similarly to the process of Step S257 of FIG. 31. That is, the decoding unit 111 decodes the encoded data and thereby obtains the signaled transform skip flag ts_flag[compID]. When the process of Step S268 ends, the transform skip flag derivation process ends.

In this manner, transmission (encoding and decoding) of the transform skip flag ts_flag of the chrominance can be omitted using the value of the transform skip flag ts_flag of luminance only in the case of the prediction mode in which the tendencies of the residual signals are similar, and thus deterioration in coding efficiency can be curbed. In addition, an increase in a load of encoding and decoding can be curbed as well.

Modified Example 3

In the case in which the prediction type of the coding block to which the transform block to be processed belongs is inter prediction as described with reference to the row of No. #4 of FIG. 27 or intra prediction of which the prediction mode is intra block copy, the value of the transform skip flag ts_flag[compID] of the chrominance may be set to the value of the transform skip flag ts_flag[COMPONENT_Y] of luminance, in the case in which the prediction type of the coding block is intra prediction of which the prediction mode is not intra block copy, the transform skip flag ts_flag[compID] of the chrominance may be signaled (i.e., the transform skip flag ts_flag[compID] of the chrominance can be decoded from the encoded data).

An example of syntax of residual_coding in that case is illustrated in FIG. 34. As illustrated in FIG. 34, "&& (CuPreMode==MODE_INTRA && compID==COMPONENT_Y||CuPreMode=MODE_INTRA && compID!=COMPONENT_Y && IntraPredModeY !=IntraBC CuPredMode==MODE_INTER && compID==COMPONENT_Y)" is included in the condition for signaling the transform skip flag ts_flag in that case. That is, regardless of whether the flag is of luminance or chrominance, the transform skip flag ts_flag is signaled in the case in which the prediction type is intra prediction of which the prediction mode is not intra block copy. In other words, only in a case in which the prediction type is inter prediction for a chrominance or intra prediction for the chrominance of which the prediction mode is intra block copy, the transform skip flag ts_flag is not signaled. That is, the transform skip flag ts_flag is set using the transform skip flag ts_flag of luminance in that case.

Figure 35:
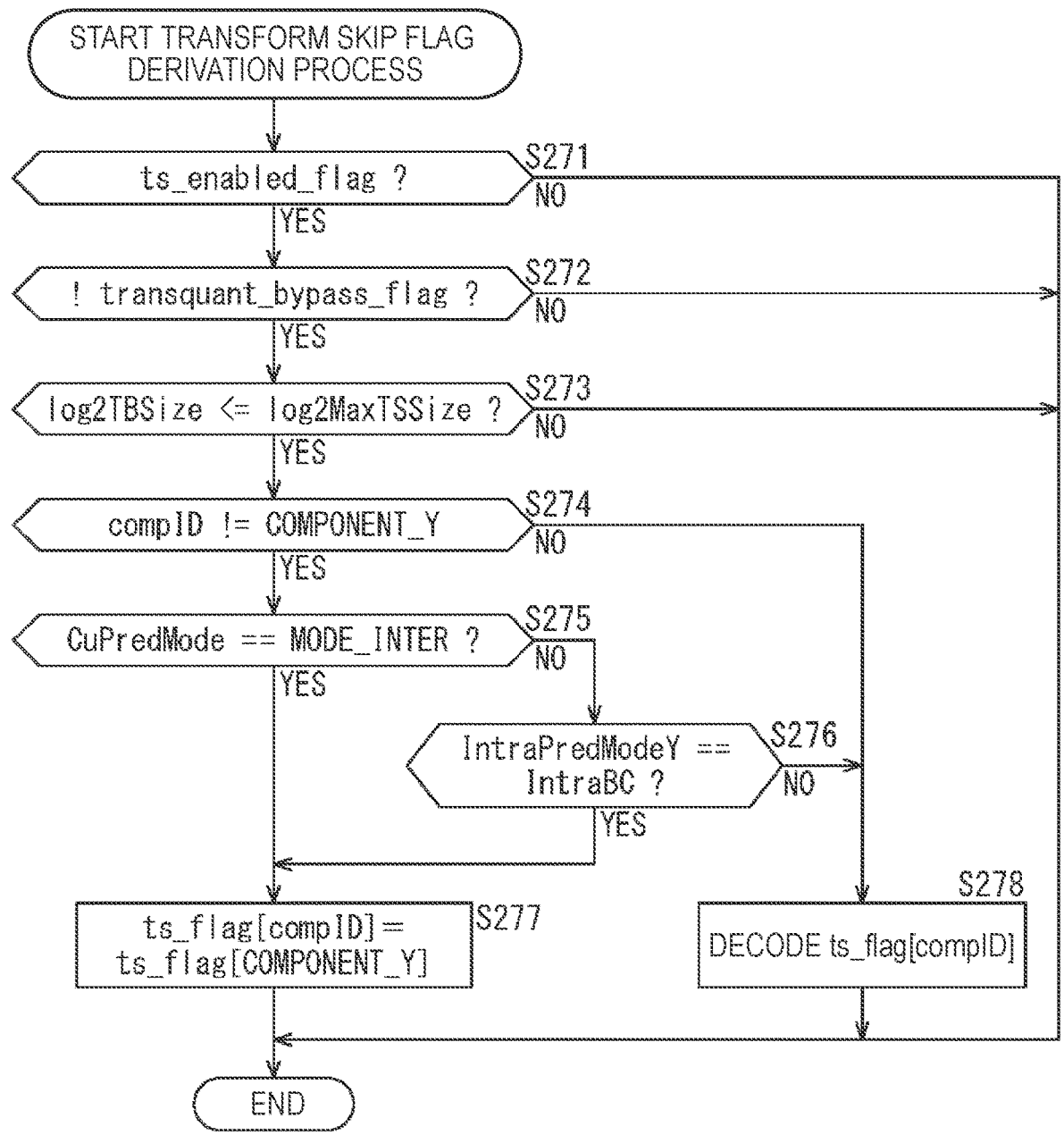
FIG. 35 is a flowchart describing an example of the flow of a transform skip flag derivation process.

An example of the flow of the transform skip flag derivation process in that case will be described with reference to the flowchart of FIG. 35. Each of the processes of Step S271 to Step S275 is executed similarly to each of the processes of Step S261 to Step S265 of FIG. 33.

In a case in which the prediction type is determined to be intra prediction in Step S275, the process proceeds to Step S276. In Step S276, the decoding unit 111 determines whether or not the prediction mode is intra block copy. In a case in which the prediction mode is determined to be intra block copy (IntraPredModeY=IntraBC), the process proceeds to Step S277. In addition, in a case in which the prediction mode is determined to be intra block copy, the process proceeds to Step S278.

Figure 33:
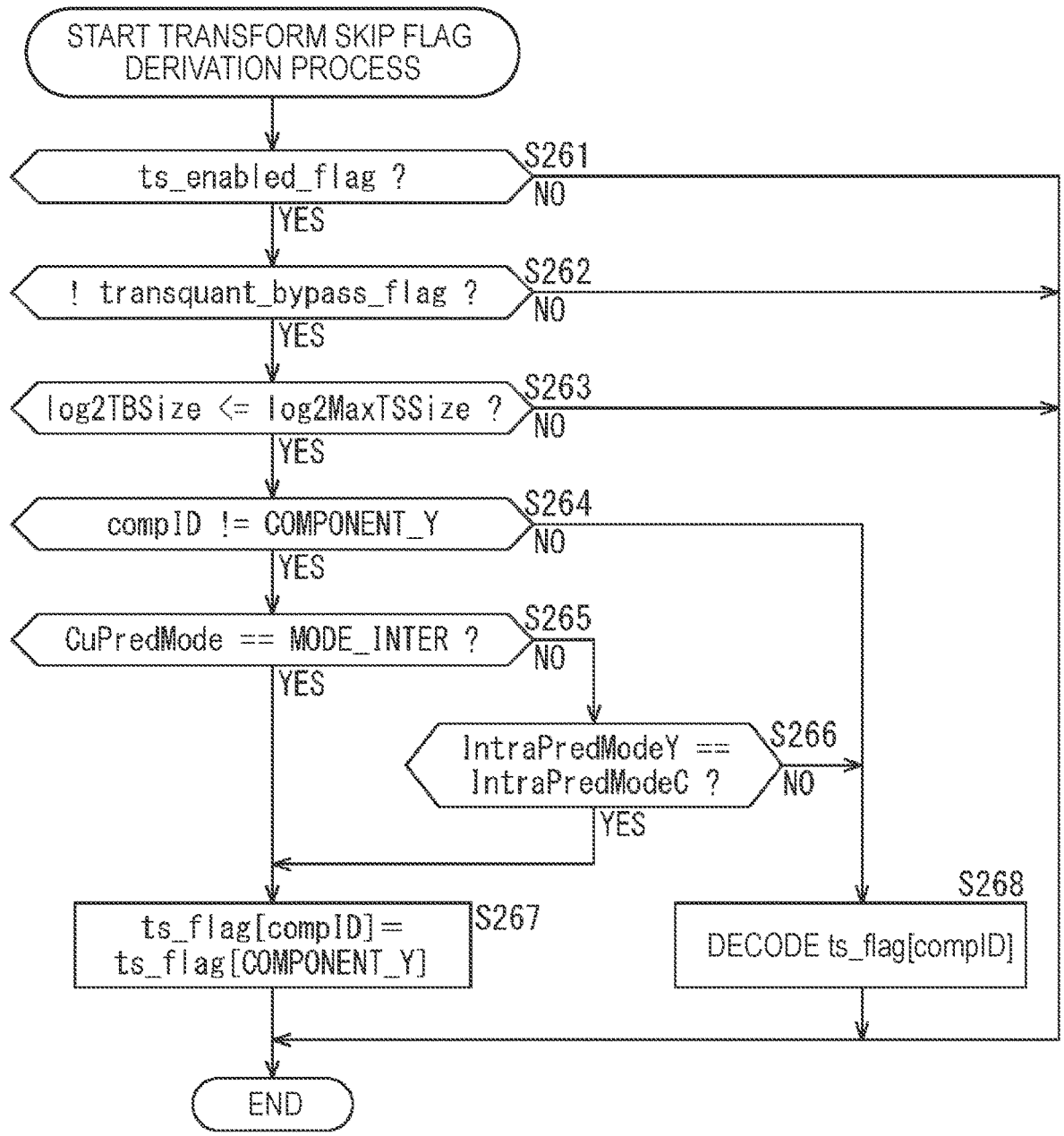
FIG. 33 is a flowchart describing an example of the flow of a transform skip flag derivation process.

The process of Step S277 is executed similarly to the process of Step S267 of FIG. 33. That is, the decoding unit 111 sets the value of the transform skip flag ts_flag[compID] of the chrominance to the value of the transform skip flag ts_flag[COMPONENT_Y] of luminance. When the process of Step S277 ends, the transform skip flag derivation process ends.

In addition, the process of Step S278 is executed similarly to the process of Step S268 of FIG. 33. That is, the decoding unit 111 decodes the encoded data and thereby obtains the signaled transform skip flag ts_flag[compID]. When the process of Step S278 ends, the transform skip flag derivation process ends.

In this manner, transmission (encoding and decoding) of the transform skip flag ts_flag of the chrominance can be omitted using the value of the transform skip flag ts_flag of luminance only in the case of the prediction mode in which the tendencies of the residual signals are similar, and thus deterioration in coding efficiency can be curbed. In addition, an increase in a load of encoding and decoding can be curbed as well.

Modified Example 4

In the case in which the chrominance transform skip information inference flag chroma_ts_info_infer_flag is 1

(true) as described with reference to the row of No. #5 of FIG. 27, the value of the transform skip flag ts_flag[compID] of the chrominance may be set to the value of the transform skip flag ts_flag[COMPONENT_Y] of luminance, and in the case in which the chrominance transform skip information inference flag chroma_ts_info_infer_flag is 0 (false), the transform skip flag ts_flag[compID] of the chrominance may be signaled (i.e., the transform skip flag ts_flag[compID] of the chrominance can be decoded from the encoded data).

An example of syntax of a transform unit in that case is illustrated in FIG. 36. As illustrated in FIG. 36, a chrominance transform skip information inference flag chroma_ts_info_infer_flag is set. In addition, an example of syntax of residual_coding is illustrated in FIG. 37. As illustrated in FIG. 37, "&& compID!=COMPONENT_Y && !chroma_ts_info_infer_flag" is included in the condition for signaling the transform skip flag ts_flag in that case. That is, regardless of whether the flag is of luminance or a chrominance, the transform skip flag ts_flag is signaled in a case in which the chrominance transform skip information inference flag chroma_ts_info_infer_flag is false. In other words, only in a case in which the flag is of a chrominance and the chrominance transform skip information inference flag chroma_ts_info_infer_flag is true, the transform skip flag ts_flag is not signaled. That is, the transform skip flag ts_flag is set using the transform skip flag ts_flag of luminance in that case.

Figure 38:
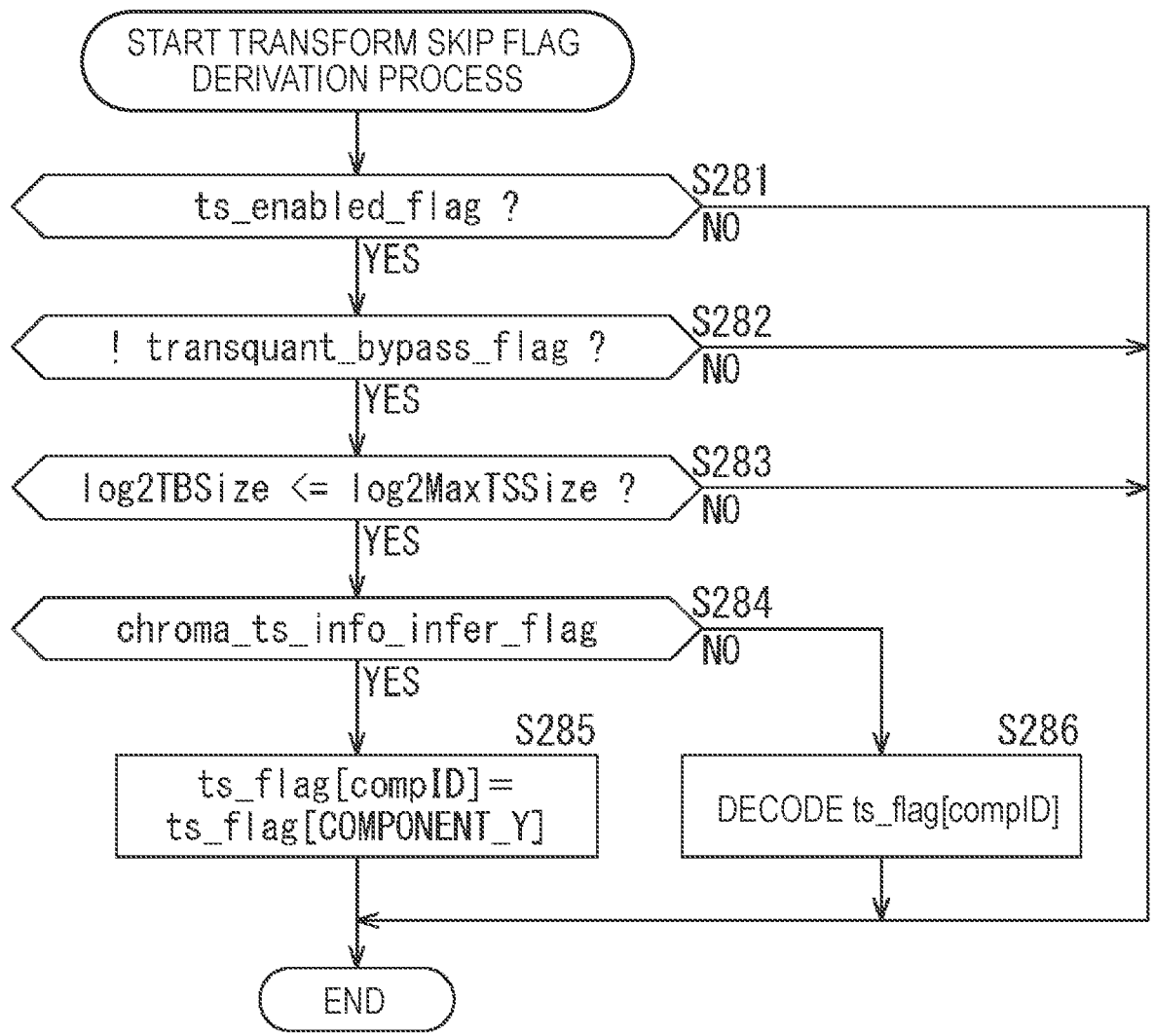
FIG. 38 is a flowchart describing an example of the flow of a transform skip flag derivation process.

An example of the flow of the transform skip flag derivation process in that case will be described with reference to the flowchart of FIG. 38. Each of the processes of Step S281 to Step S283 is executed similarly to each of the processes of Step S241 to Step S245 of FIG. 29.

In Step S284, the decoding unit 111 determines whether the processing object is a chrominance and the chrominance transform skip information inference flag chroma_ts_info_infer_flag is true. In a case in which the flag is determined to be of a chrominance and true, the process proceeds to Step S285. In addition, in a case in which the processing object is determined to be luminance or the chrominance transform skip information inference flag chroma_ts_info_infer_flag is determined to be false in Step S284, the process proceeds to Step S286.

The process of Step S285 is executed similarly to the process of Step S245 of FIG. 29. That is, the decoding unit 111 sets the value of the transform skip flag ts_flag[compID] of the chrominance to the value of the transform skip flag ts_flag[COMPONENT_Y] of luminance. When the process of Step S285 ends, the transform skip flag derivation process ends.

In addition, the process of Step S286 is executed similarly to the process of Step S246 of FIG. 29. That is, the decoding unit 111 decodes the encoded data and thereby obtains the signaled transform skip flag ts_flag[compID]. When the process of Step S286 ends, the transform skip flag derivation process ends.

In this manner, whether or not the value of the transform skip flag of luminance is to be used can be explicitly controlled using the chrominance transform skip information inference flag chroma_ts_info_infer_flag. Therefore, it is possible to easily make the value of the transform skip flag of luminance used only in a case in which a sufficiently large effect can be obtained, and thus deterioration in coding efficiency can be further curbed. In addition, an increase in a load of encoding and decoding can be curbed as well.

4. Third Embodiment

<st_idx>

In addition, as information regarding an (inverse) orthogonal transform, for example, a secondary transform identifier st_idx indicating which (inverse) secondary transform is to be applied may be included as shown in the table of FIG. 6. By deriving a secondary transform identifier chroma_st_idx of a chrominance (common for Cb and Cr) on the basis of a secondary transform identifier st_idx[Y] of luminance, for example, an increase in overhead of the code amount of the syntax by which the chrominance (Cb or Cr) is signaled can be curbed as well.

Further description will be provided with reference to the table of FIG. 39. In the related art, the secondary transform identifier st_idx of a chrominance is also transmitted (signaled) to the decoding side from the encoding side as indicated in the row of No. #0. FIG. 40 is an example of syntax of a TU in the related art. As is indicated in the syntax of FIG. 40, the secondary transform identifier chroma_st_idx of the chrominance is signaled as well. If the secondary transform identifier st_idx is explicitly encoded not only for luminance but also for the chrominance, there is concern of the code amount increasing the coding efficiency deteriorating. In addition, in this case, the encoding side should perform the settings and encoding of the secondary transform identifier st_idx for each of signals (Y, Cb, and Cr), and thus there is concern of the processing amount increasing. In addition, the decoding side should decode the secondary transform identifier st_idx for each of the signals (Y, Cb, and Cr), and thus there is concern of the processing amount increasing.

Thus, the secondary transform identifier chroma_st_idx of the chrominance is inferred from the secondary transform identifier st_idx of luminance at all times, for example, as indicated in the row of No. #1. For example, the value of the secondary transform identifier chroma_st_idx of the chrominance may be set to the value of the secondary transform identifier st_idx of luminance. In this manner, the transmission (encoding and decoding) of the secondary transform identifier chroma st_idx of the chrominance can be omitted, and thus overhead of the code amount can be reduced and deterioration in coding efficiency can be curbed. In addition, an increase in a load of encoding and decoding can be curbed as well.

In addition, in a case in which the prediction type of a coding block to which a transform block to be processed belongs is inter prediction as indicated in the row of No. #2, for example, the value of the secondary transform identifier chroma_st_idx of the chrominance may be set to the value of the secondary transform identifier st_idx of luminance, and in a case in which the prediction type of the coding block is intra prediction, the secondary transform identifier chroma_st_idx of the chrominance may be signaled (i.e., the secondary transform identifier chroma_st_idx of the chrominance can be decoded from the encoded data). In this manner, the value of the secondary transform identifier st_idx of luminance can be used only in the case of the inter prediction mode in which the tendencies of the residual signals are similar, and thus deterioration in coding efficiency can be further curbed.

Furthermore, in a case in which the prediction type of a coding block to which a transform block to be processed belongs is inter prediction, for example, as indicated in the row of No. #3, or intra prediction in which the prediction modes for luminance and the chrominance match each other, the value of the secondary transform identifier chroma_s- t_idx of the chrominance may be set to the value of the secondary transform identifier st_idx of luminance, and in a case in which the prediction type of the coding block is intra prediction in which the prediction modes for luminance and the chrominance do not match each other, the secondary transform identifier chroma_st_idx of the chrominance may be signaled (i.e., the secondary transform identifier chroma_st_idx of the chrominance can be decoded from the encoded data). In this manner, the value of the secondary transform identifier st_idx of luminance can be used only in the case of the prediction mode in which the tendencies of the residual signals are similar, and thus deterioration in coding efficiency can be further curbed.

In addition, in a case in which the prediction type of a coding block to which a transform block to be processed belongs is inter prediction, for example, as indicated in the row of No. #4, or intra prediction of which the prediction mode is intra block copy, the value of the secondary transform identifier chroma_st_idx of the chrominance may be set to the value of the secondary transform identifier st_idx of luminance, and in a case in which the prediction type of the coding block is intra prediction of which the prediction mode is not intra block copy, the secondary transform identifier chroma_st_idx of the chrominance may be signaled (i.e., the secondary transform identifier chroma_st_idx of the chrominance can be decoded from the encoded data). In this manner, the value of the secondary transform identifier st_idx of luminance can be used only in the case of the prediction mode in which the tendencies of the residual signals are similar, and thus deterioration in coding efficiency can be further curbed.

In addition, for example, in a case in which a chrominance secondary transform identifier inference flag chroma_st_idx_infer_flag indicating whether the secondary transform identifier chroma_st_idx of the chrominance is to be inferred on the basis of the secondary transform identifier st_idx of luminance is 1 (true), the value of the secondary transform identifier st_idx of the chrominance may be set to the value of the secondary transform identifier st_idx of luminance, and in a case in which the chrominance secondary transform identifier inference flag chroma_st_idx_infer_flag is 0 (false), the secondary transform identifier chroma_st_idx of the chrominance may be signaled (i.e., the secondary transform identifier chroma_st_idx of the chrominance can be decoded from the encoded data) as indicated in the row of No. #5. In this manner, whether or not the value of the secondary transform identifier st_idx of luminance is to be used can be explicitly controlled using the chrominance secondary transform identifier inference flag chroma_st_idx_infer_flag. Therefore, it is possible to easily make the value of the chrominance secondary transform identifier inference flag chroma_st_idx_infer_flag of luminance used only in a case in which a sufficiently large effect can be obtained, and thus deterioration in coding efficiency can be further curbed.

Note that each of the above-described cases can be arbitrarily combined similarly to the case of FIG. 7. In this manner, the effects obtained in each of the cases can be exhibited. In addition, each of the above-described cases can also be combined with other cases that are not described above.

Basic Example 1

The secondary transform identifier chroma_st_idx of the chrominance may be inferred from the secondary transform identifier st_idx of luminance at all times as described with reference to the row of No. #1 of FIG. 39. An example of syntax of a TU in that case is illustrated in FIG. 41. In that case, the setting is performed using the secondary transform identifier st_idx of luminance without signaling the secondary transform identifier chroma_st_idx of the chrominance as illustrated in FIG. 41.

In such a case, the decoding unit 111 executes a secondary transform identifier derivation process for the chrominance and thereby sets the secondary transform identifier chroma_st_idx of the chrominance. An example of the flow of the secondary transform identifier derivation process for the chrominance will be described with reference to the flowchart of FIG. 42.

When the secondary transform identifier derivation process for the chrominance is started, the decoding unit 111 determines whether or not the secondary transform enabled flag st_enabled_flag is true in Step S291. In a case in which the secondary transform enabled flag st_enabled_flag is determined to be true, the process proceeds to Step S292. In Step S292, the decoding unit 111 determines whether or not a transform quantization bypass enabled flag transquant_bypass_enabled_flag is false. In a case in which the transform quantization bypass enabled flag transquant_bypass_enabled_flag is determined to be false, the process proceeds to Step S293. In Step S293, the decoding unit 111 determines whether or not the number of non-zero coefficients (numNonZeroCoeffTH) of the chrominance is greater than or equal to a predetermined threshold value (stNumZeroCoeffTH). In a case in which the number of non-zero coefficients of the chrominance is determined to be greater than or equal to the predetermined threshold value, the process proceeds to Step S294.

In Step S294, the decoding unit 111 sets the value of the secondary transform identifier chroma_st_idx of the chrominance to the value of the secondary transform identifier st_idx of luminance. When the process of Step S294 ends, the secondary transform identifier derivation process for the chrominance ends.

Note that, in a case in which the secondary transform enabled flag st_enabled_flag is determined to be false in Step S291, the secondary transform identifier derivation process for the chrominance ends. In addition, in a case in which the transform quantization bypass enabled flag transquant_bypass_enabled_flag is determined to be true in Step S292, the secondary transform identifier derivation process for the chrominance ends. Furthermore, in a case in which the number of non-zero coefficients of the chrominance is determined to be smaller than the predetermined threshold value in Step S293, the secondary transform identifier derivation process for the chrominance ends.

In this manner, transmission (encoding and decoding) of the secondary transform identifier chroma_st_idx of the chrominance can be omitted, and thus deterioration in coding efficiency can be curbed. In addition, an increase in a load of encoding and decoding can be curbed as well.

Modified Example 1

In the case in which the prediction type of the coding block to which the transform block to be processed belongs is inter prediction, the value of the secondary transform identifier chroma_st_idx of the chrominance may be set to the value of the secondary transform identifier st_idx of luminance as described with reference to the row of No. #2 of FIG. 39, and in the case in which the prediction type of the coding block is intra prediction, the secondary transform identifier chroma_st_idx of the chrominance may be signaled (i.e., the secondary transform identifier chroma st_idx of the chrominance can be decoded from the encoded data).

An example of syntax of a TU in that case is illustrated in FIG. 43. As illustrated in FIG. 43, in a case in which the prediction mode is intra prediction (CuPreMode==MODE_INTRA) in that case, the secondary transform identifier chroma_st_idx of the chrominance is signaled. In addition, in a case in which the prediction mode is intra prediction (CuPreMode==MODE_INTER), the secondary transform identifier chroma_st_idx of the chrominance is set using the secondary transform identifier st_idx of luminance.

An example of the flow of the secondary transform identifier derivation process for the chrominance in that case will be described with reference to the flowchart of FIG. 44. Each of the processes of Step S301 to Step S303 is executed similarly to each of the processes of Step S291 to Step S293 of FIG. 42.

In Step S304, the decoding unit 111 further determines whether or not the prediction mode is intra prediction. In a case in which the prediction mode is inter prediction (CuPredMode==MODE_INTER), the process proceeds to Step S305.

Figure 42:
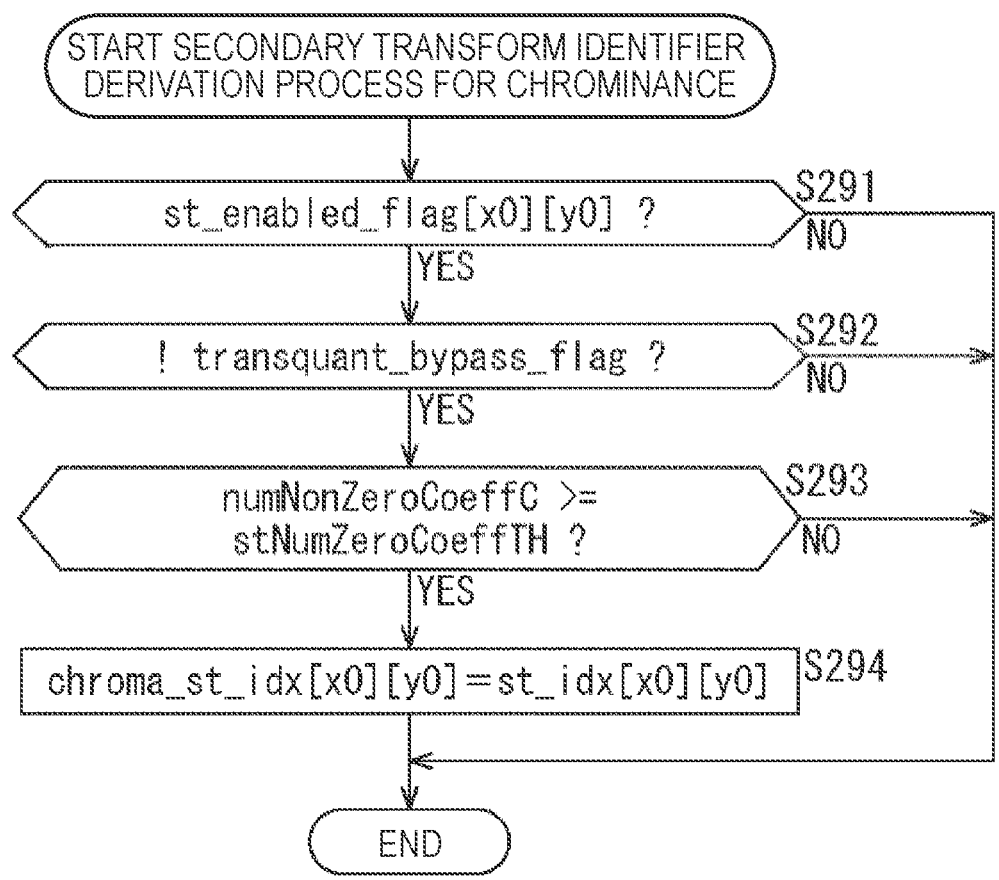
FIG. 42 is a flowchart describing an example of the flow of a secondary transform identifier derivation process for a chrominance.

The process of Step S305 is executed similarly to the process of Step S294 of FIG. 42. That is, the decoding unit 111 sets the value of the secondary transform identifier chroma_st_idx of the chrominance to the value of the secondary transform identifier st_idx of luminance. When the process of Step S305 ends, the secondary transform identifier derivation process for the chrominance ends.

In addition, in a case in which the prediction mode is determined to be intra prediction (CuPredMode==MODE_INTRA), the process proceeds to Step S306. In Step S306, the decoding unit 111 decodes the encoded data and thereby obtains the signaled secondary transform identifier st_idx. When the process of Step S306 ends, the secondary transform identifier derivation process for the chrominance ends.

In this manner, transmission (encoding and decoding) of the secondary transform identifier chroma_st_idx of the chrominance can be omitted using the value of the secondary transform identifier st_idx of luminance only in the case of the inter prediction mode in which the tendencies of the residual signals are similar, and thus deterioration in coding efficiency can be curbed. In addition, an increase in a load of encoding and decoding can be curbed as well.

Modified Example 2

In the case in which the prediction type of the coding block to which the transform block to be processed belongs is inter prediction or intra prediction in which the prediction modes for luminance and the chrominance match each other as described with reference to the row of No. #3 of FIG. 39, the decoding unit 11*l* sets the value of the secondary transform identifier chroma_st_idx of the chrominance to the value of the secondary transform identifier st_idx of luminance. In addition, in the case in which the prediction type of the coding block is intra prediction in which the prediction modes for luminance and the chrominance do not match each other, the secondary transform identifier chroma_st_idx of the chrominance may be signaled (i.e., the secondary transform identifier chroma_st_idx of the chrominance can be decoded from the encoded data).

An example of syntax of a TU in that case is illustrated in FIG. 45. As illustrated in FIG. 45, in a case in which the prediction mode is intra prediction mode (CuPredMode==MODE_INTRA) and the prediction modes for luminance and the chrominance do not match each other, the secondary transform identifier chroma_st_idx is signaled. In other cases, the secondary transform identifier chroma_st_idx of the chrominance is set to the secondary transform identifier st_idx of luminance.

An example of the flow of the secondary transform identifier derivation process for the chrominance in that case will be described with reference to the flowchart of FIG. 46. Each of the processes of Step S311 to Step S314 is executed similarly to each of the processes of Step S301 to Step S304 of FIG. 44.

In a case in which the prediction mode is determined to be intra prediction in Step S314, the process proceeds to Step S315. In addition, in a case in which it is determined to be inter prediction, the process proceeds to Step S316. In Step S315, the decoding unit 111 determines whether or not the prediction modes for luminance and the chrominance match each other. In a case in which the prediction modes match each other (IntraPredModeY=IntraPredModeC), the process proceeds to Step S316. In addition, in a case in which the prediction modes do not match each other (IntraPredModeY !=IntraPredModeC), the process proceeds to Step S317.

The process of Step S316 is executed similarly to the process of Step S305 of FIG. 44. In addition, the process of Step S317 is executed similarly to the process of Step S306 of FIG. 44.

In this manner, transmission (encoding and decoding) of the secondary transform identifier chroma_st_idx of the chrominance can be omitted using the value of the secondary transform identifier st_idx of luminance only in the case of the prediction mode in which the tendencies of the residual signals are similar, and thus deterioration in coding efficiency can be curbed. In addition, an increase in a load of encoding and decoding can be curbed as well.

Modified Example 3

In the case in which the prediction type of the coding block to which the transform block to be processed belongs is inter prediction or intra prediction of which the prediction mode is intra block copy as described with reference to the row of No. #4 of FIG. 39, the value of the secondary transform identifier chroma_st_idx of the chrominance is set to the value of the secondary transform identifier st_idx of luminance. In addition, in the case in which the prediction type of the coding block is intra prediction of which the prediction mode is not intra block copy, the secondary transform identifier chroma_st_idx of the chrominance may be signaled (i.e., the secondary transform identifier chroma_st_idx of the chrominance can be decoded from the encoded data).

An example of syntax of a TU in that case is illustrated in FIG. 47. As illustrated in FIG. 47, the transform skip flag ts_flag secondary transform identifier st_idx is signaled in the case in which the prediction type is intra prediction of which the prediction mode is not intra block copy (CuPredMode==MODE_INTRA && IntraPredModeY !=IntraBC) regardless of whether the identifier is of luminance or chrominance. In other words, the secondary transform identifier st_idx is not signaled only in a case in which the identifier is of the chrominance and the prediction type is inter prediction, or a case in which the identifier is of the chrominance and prediction type is intra prediction of which the prediction mode is intra block copy.

That is, in this case, the secondary transform identifier chroma_st_idx is set using the secondary transform identifier st_idx of luminance.

An example of the flow of the secondary transform identifier derivation process for the chrominance in that case will be described with reference to the flowchart of FIG. 48. Each of the processes of Step S321 to Step S324 is executed similarly to each of the processes of Step S311 to Step S314 of FIG. 46.

In a case in which the prediction type is determined to be intra prediction in Step S324, the process proceeds to Step S325. In addition, in a case in which the prediction type is determined to be inter prediction, the process proceeds to Step S326.

In Step S325, the decoding unit 111 determines whether or not the prediction mode is intra block copy. In a case in which the prediction mode is determined to be intra block copy (IntraPredModeY=IntraBC), the process proceeds to Step S326. In addition, in a case in which the prediction mode is determined to be intra block copy, the process proceeds to Step S327.

Figure 46:
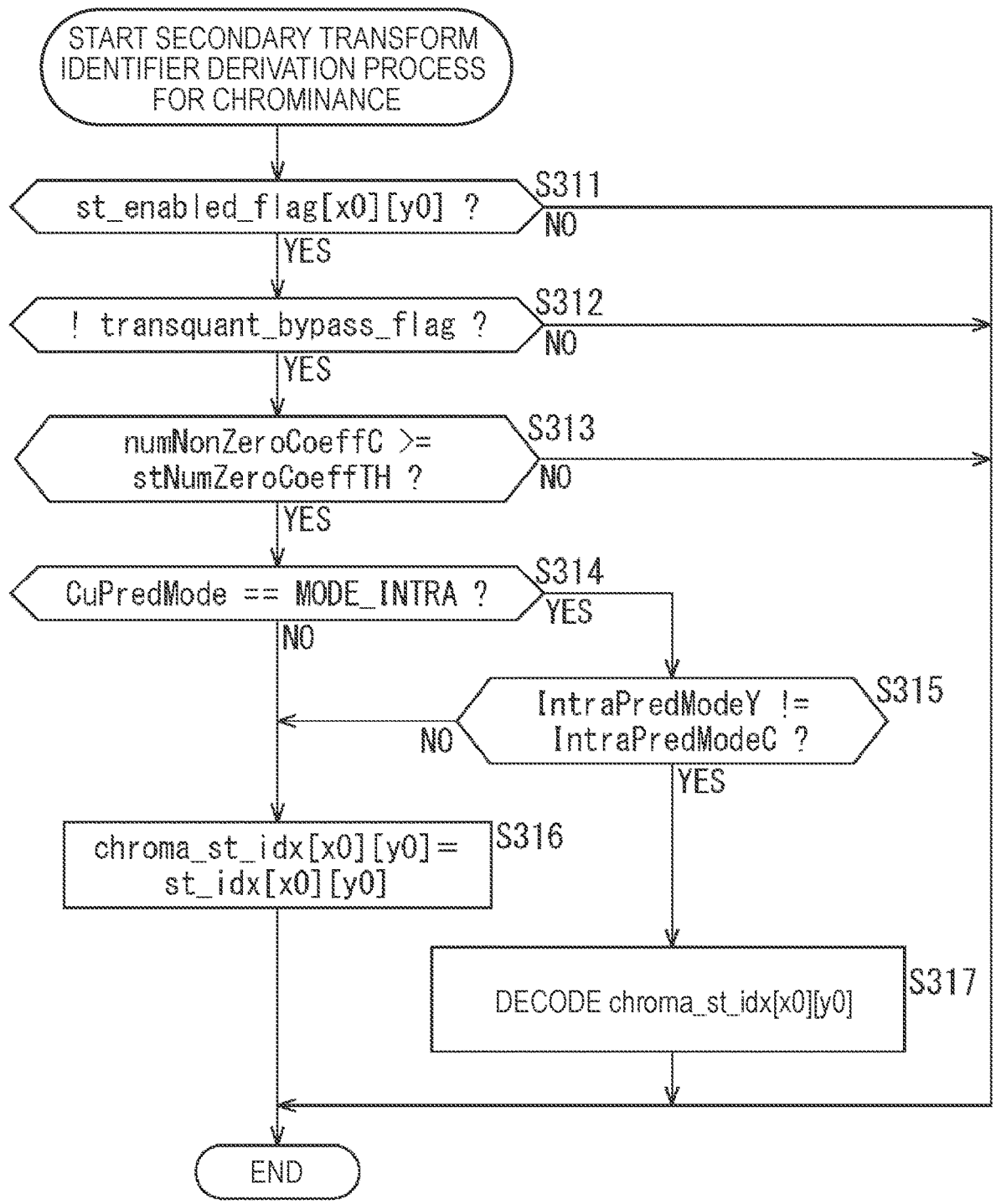
FIG. 46 is a flowchart describing an example of the flow of a secondary transform identifier derivation process for a chrominance.

The process of Step S326 is executed similarly to the process of Step S316 of FIG. 46. That is, the decoding unit 111 sets the value of the secondary transform identifier chroma_st_idx of the chrominance to the secondary transform identifier st_idx of luminance. When the process of Step S326 ends, the secondary transform identifier derivation process for the chrominance ends.

In addition, the process of Step S327 is executed similarly to the process of Step S317 of FIG. 46. That is, the decoding unit 111 can decode the encoded data and thereby obtains the signaled secondary transform identifier st_idx. When the process of Step S327 ends, the secondary transform identifier derivation process for the chrominance ends.

In this manner, transmission (encoding and decoding) of the secondary transform identifier st_Idx of the chrominance can be omitted using the value of the secondary transform identifier st_idx of luminance only in the case of the prediction mode in which the tendencies of the residual signals are similar, and thus deterioration in coding efficiency can be curbed. In addition, an increase in a load of encoding and decoding can be curbed as well.

Modified Example 4

As described with reference to the row of No. #5 of FIG. 39, in the case in which the chrominance secondary transform identifier inference flag chroma_st_idx_infer_flag is 1 (true), the value of the secondary transform identifier chroma_st_idx of the chrominance may be set to the value of the secondary transform identifier st_idx of luminance, and in the case in which the chrominance secondary transform identifier inference flag chroma_st_idx_infer_flag is 0 (false), the secondary transform identifier st_idx of the chrominance may be signaled (i.e., the secondary transform identifier chroma_st_idx of the chrominance can be decoded from the encoded data).

An example of syntax of a TU in that case is illustrated in FIG. 49. As illustrated in FIG. 49, whether the chrominance secondary transform identifier inference flag chroma_st_idx_infer_flag is set and then the secondary transform identifier chroma_st_idx of the chrominance is signaled in accordance with the value, or the identifier is obtained from the secondary transform identifier st_idx of luminance is controlled.

Figure 50:
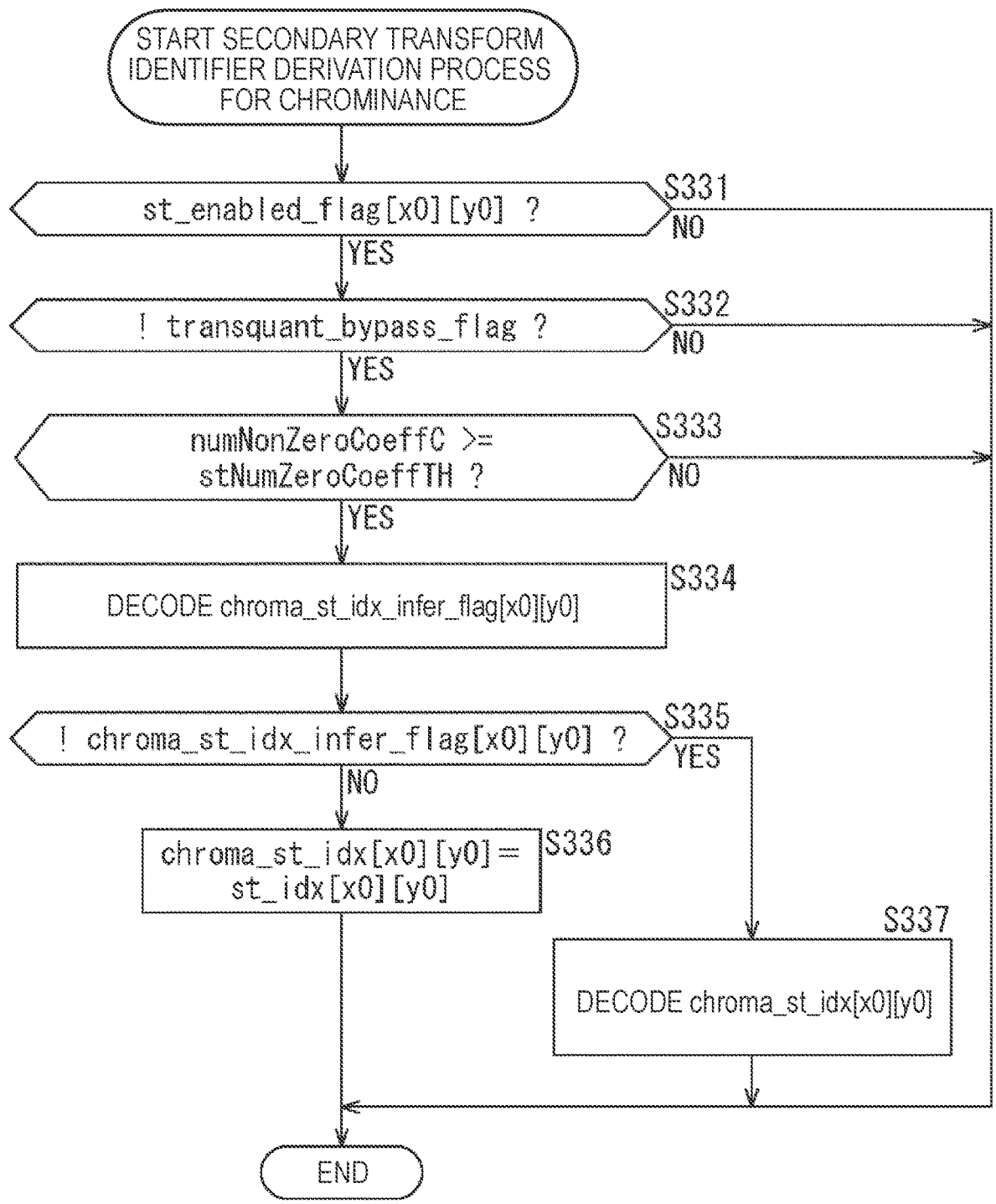
FIG. 50 is a flowchart describing an example of the flow of a secondary transform identifier derivation process for a chrominance.

An example of the flow of the secondary transform identifier derivation process for the chrominance in that case will be described with reference to the flowchart of FIG. 50. Each of the processes of Step S331 to Step S333 is executed similarly to each of the processes of Step S321 to Step S323 of FIG. 48.

In Step S334, the decoding unit 111 decodes and acquires the chrominance secondary transform identifier inference flag chroma_st_idx_infer_flag. In Step S335, the decoding unit 111 determines whether or not the acquired chrominance secondary transform identifier inference flag chroma_st_idx_infer_flag is true. In a case in which the chrominance secondary transform identifier inference flag chroma_st_idx_infer_flag is determined to be true, the process proceeds to Step S336. In addition, chrominance secondary transform identifier inference flag chroma_st_idx_infer_flag is determined to be false, the process proceeds to Step S337.

Figure 48:
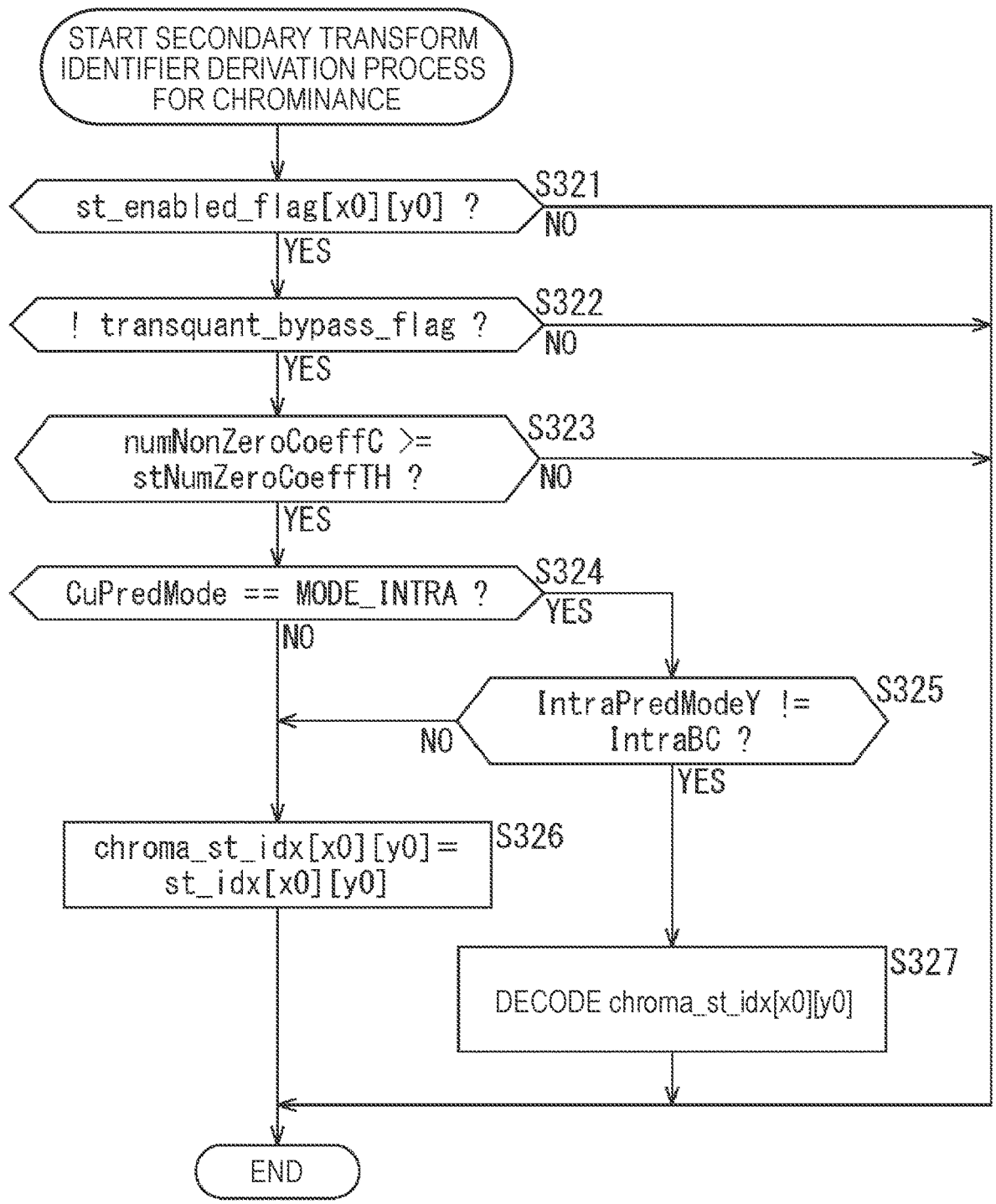
FIG. 48 is a flowchart describing an example of the flow of a secondary transform identifier derivation process for a chrominance.

The process of Step S336 is executed similarly to the process of Step S326 of FIG. 48. That is, the decoding unit 111 sets the value of the secondary transform identifier chroma_st_idx of the chrominance to the value of the secondary transform identifier st_idx of luminance. When the process of Step S336 ends, the secondary transform identifier derivation process for the chrominance ends.

In addition, the process of Step S337 is executed similarly to the process of Step S327 of FIG. 48. That is, the decoding unit 111 can decode the encoded data and thereby obtains the signaled secondary transform identifier chroma_st_idx of the chrominance. When the process of Step S337 ends, the secondary transform identifier derivation process for the chrominance ends.

In this manner, it is possible to explicitly control whether or not the value of the secondary transform identifier st_idx of luminance is to be used using the chrominance secondary transform identifier inference flag chroma_st_idx_infer_flag. Therefore, it is possible to easily make the value of the secondary transform identifier of luminance used only in the case in which a sufficiently large effect is obtained, and thus deterioration in coding efficiency can be further curbed. In addition, an increase in a load of encoding and decoding can be curbed as well.

5. FOURTH EMBODIMENT

<Image Encoding Apparatus>

Figure 51:
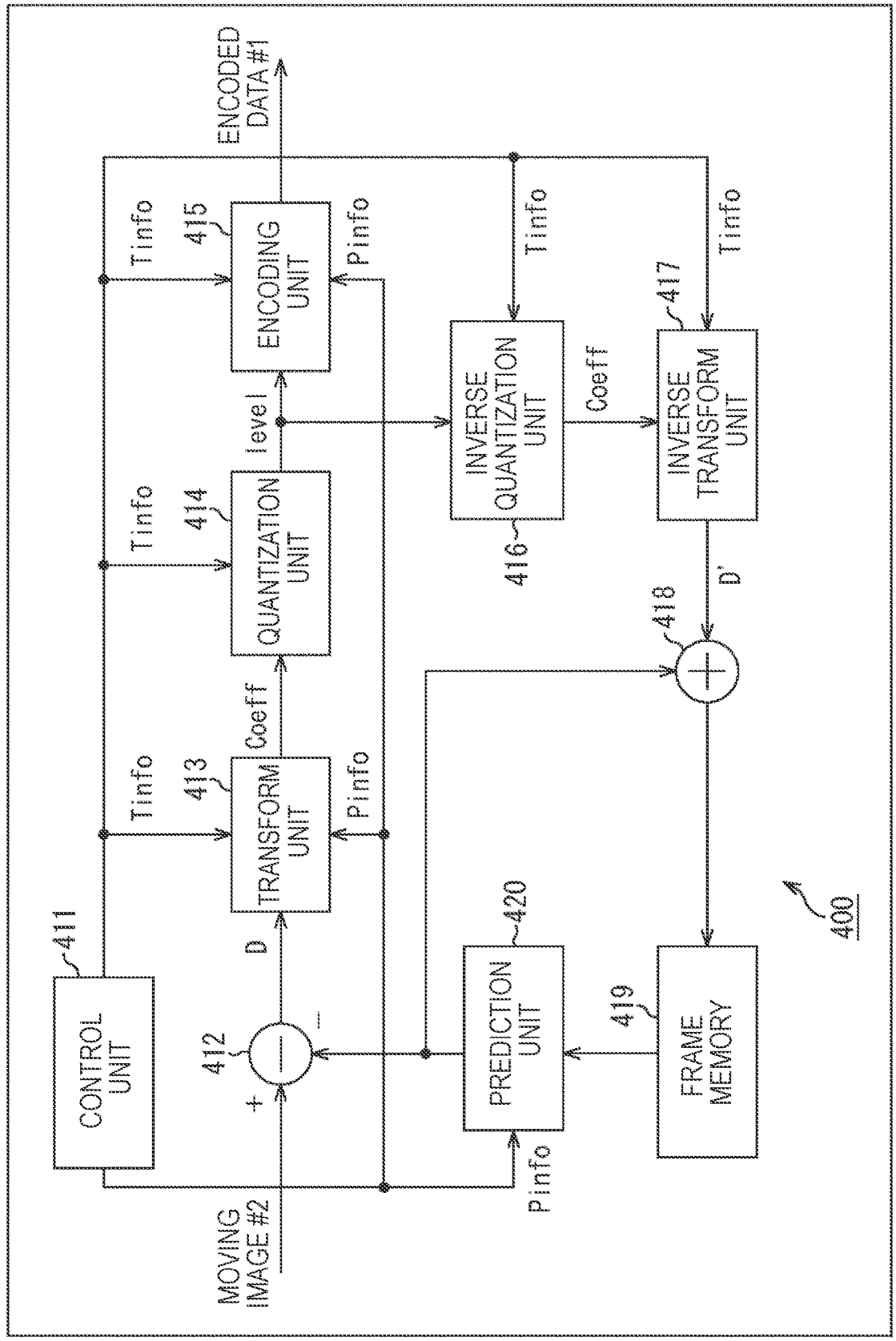
FIG. 51 is a block diagram illustrating an example of the main configuration of an image encoding apparatus.

Next, encoding for generating encoded data to be decoded as described above will be described. FIG. 51 is a block diagram illustrating an example of the main configuration of an image encoding apparatus which is an aspect of the image processing apparatus to which the present technology is applied. The image encoding apparatus 400 illustrated in FIG. 51 is an image encoding apparatus corresponding to the image decoding apparatus 100 of FIG. 9 and generates encoded data (bit stream) which has been decoded by the image decoding apparatus 100 by encoding an imaging using an encoding method corresponding to a decoding method used by the image decoding apparatus 100. The image encoding apparatus 400 implements, for example, a technology proposed by HEVC or VET.

Note that FIG. 51 illustrates main configurations such as flows of processing units and data, and the like, and FIG. 51 is not illustrating entire configurations. That is, there may be processing units in the image encoding apparatus 400 that are not illustrated as blocks in FIG. 51 or flows of processes and data that are not indicated by arrows and the like in FIG. 51.

The image encoding apparatus 400 has a control unit 411, an arithmetic operation unit 412, a transform unit 413, a quantization unit 414, an encoding unit 415, an inverse quantization unit 416, an inverse transform unit 417, an arithmetic operation unit 418, a frame memory 419, and a prediction unit 420 as illustrated in FIG. 51.

The control unit 411 divides a moving image #2 into blocks which are units of processing (CUs, PUs, transform blocks, etc.) on the basis of the block size of the units of processing specified from the outside or in advance, and inputs an image I corresponding to the divided blocks to the arithmetic operation unit 412. In addition, the control unit 411 determines encoding parameters (header information Hinfo, prediction mode information Pinfo, transform information Tinfo, etc.) to be supplied to each of the blocks, for example, on the basis of Rate-Distortion Optimization (RDO). The determined encoding parameters are supplied to each of the blocks. Details of the parameters are as follows.

The header information Hinfo is supplied to each of the blocks. The prediction mode information Pinfo is supplied to the transform unit 413, the encoding unit 415, and the prediction unit 420. The transform information Tinfo is supplied to the encoding unit 415, the transform unit 413, the quantization unit 414, the inverse quantization unit 416, and the inverse transform unit 417.

The arithmetic operation unit 412 receives the input of the image I corresponding to the blocks which are the units of processing and a predictive image P supplied from the prediction unit 420, subtracts the predictive image P from the image I as indicated in the formula (25), thereby derives predictive residual D, and supplies the predictive residual to the transform unit 413.

$$D=I-P \quad (25)$$

The transform unit 413 is a processing unit that performs an inverse transform which is an inverse process to a transform process performed by the inverse transform unit 417, receives the input of the predictive residual D, the prediction mode information Pinfo, and the transform information Tinfo, applies a transform to the predictive residual D on the basis of the prediction mode information Pinfo and the transform information Tinfo, thereby derives a transform coefficient Coeff, and supplies the transform coefficient to the quantization unit 414.

The quantization unit 414 is an inverse process to the inverse quantization unit 416, receives the input of the transform information Tinfo and the transform coefficient Coeff, scales (quantizes) the transform coefficient Coeff on the basis of the transform information Tinfo, and supplies the quantized transform coefficient, that is, a quantized transform coefficient level level to the encoding unit 415.

The encoding unit 415 is an inverse process to the decoding unit 111 (FIG. 9), transforms the encoding parameters (the header information, the prediction mode information Pinfo, and the transform information Tinfo) supplied from the control unit 411, and the quantized transform coefficient level level supplied from the quantization unit 414 into syntax values of each of syntax elements in accordance with the definitions of a syntax table, makes each of the syntax values into variable length codes (e.g., arithmetic code), and thereby generates bit strings.

Note that the encoding unit 415 derives residual information Rinfo from the quantized transform coefficient level level, makes the residual information Rinfo into variable length codes, and generates bit strings. In addition, the encoding unit 415 multiplexes the bit strings of each of the syntax elements that have been made into variable length codes, and then generates and outputs encoded data #1.

The inverse quantization unit 416 is a processing unit similar to the inverse quantization unit 112 (FIG. 9) and performs a process similar to that of the inverse quantization unit 112 in the image encoding apparatus 400. The inverse transform unit 417 is a processing unit similar to the inverse transform unit 113 (FIG. 9) and performs a process similar to that of the inverse transform unit 113d in the image encoding apparatus 400. The frame memory 419 is a processing unit similar to the frame memory 115 (FIG. 9) and performs a process similar to that of the frame memory 115 in the image encoding apparatus 400. The prediction unit 420 is a processing unit similar to the prediction unit 116 (FIG. 9) and performs a process similar to that of the prediction unit 116 in the image encoding apparatus 400.

<Transform Unit>

Figure 52:
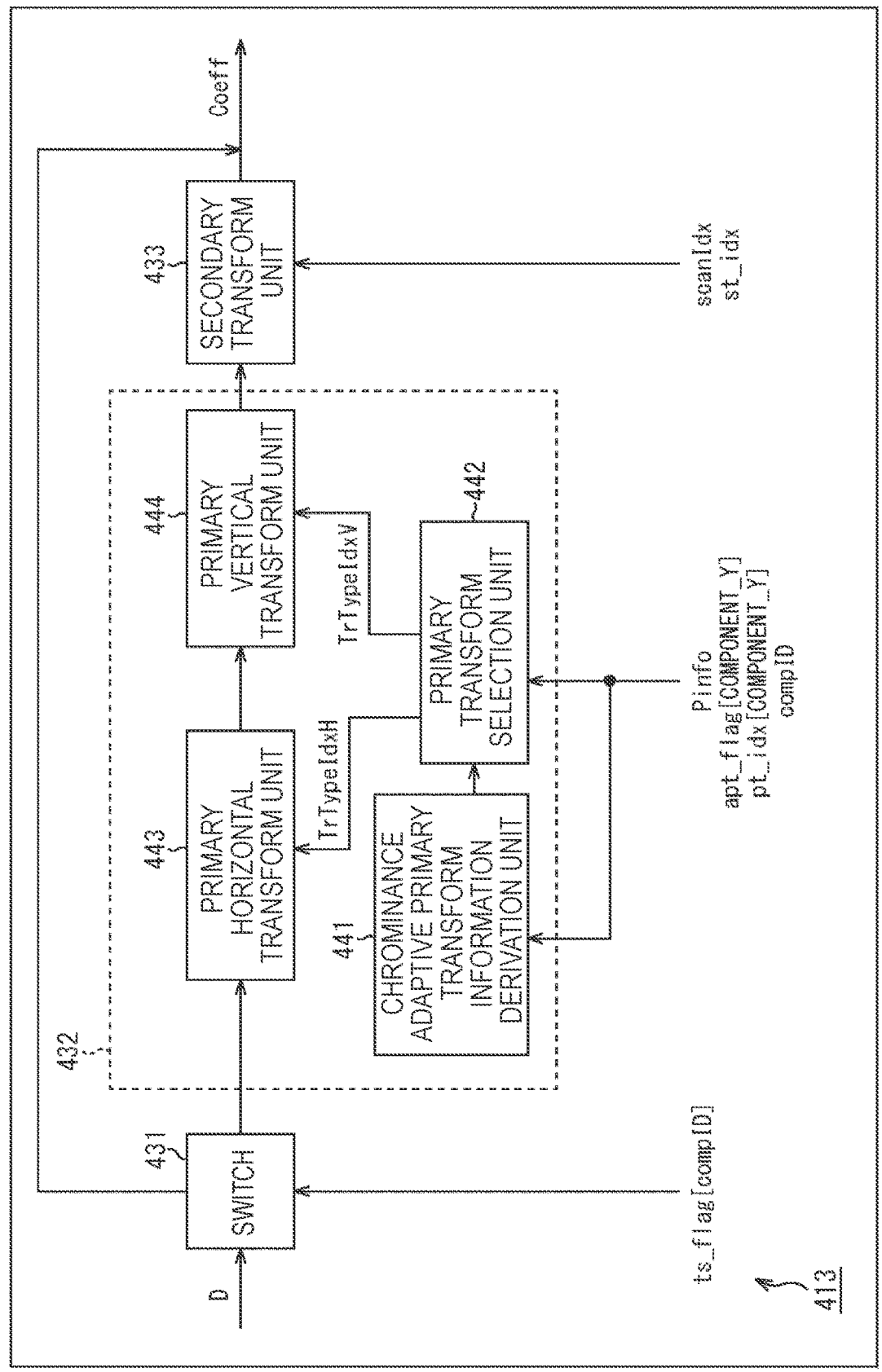
FIG. 52 is a block diagram illustrating an example of the main configuration of a transform unit.

FIG. 52 is a block diagram illustrating an example of the main configuration of the transform unit 413. As illustrated in FIG. 52, the transform unit 413 has a switch 431, a primary transform unit 432, and a secondary transform unit 433.

The switch 431 receives the input of the predictive residual D and a transform skip flag ts_flag[compID] of a color signal corresponding to a color signal identifier compID, and outputs the predictive residual D to the primary transform unit 432 in a case in which the value of the transform skip flag ts_flag[compID] is NO_TS (=0) (a case in which a transform skip is not applied). In addition, in a case in which the value of the transform skip flag ts_flag[compID] is 2D_TS (=1) (a case in which the flag indicates that a two-dimensional transform skip is applied), the primary transform unit 432 and the secondary transform unit 433 are skipped, and the predictive residual D is output as a transform coefficient Coeff.

The primary transform unit 432 performs a process relating to a primary transform that is a predetermined transform process, for example, an orthogonal transform. The primary transform is an inverse process of the inverse primary transform executed by the inverse primary transform unit 123 or the like of the image decoding apparatus 100. The primary transform unit 432 receives inputs of, for example, the color signal identifier compID, the adaptive primary transform flag apt_flag[COMPONENT_Y] of luminance, the primary transform identifier pt_idx[COMPONENT_Y] of luminance, the prediction mode information PInfo, sizes of the transform block (a logarithmic value log2TBWSize of the picture width and a logarithmic value log2TBHSize of a picture height), and predictive residual D. The primary transform unit 432 selects a transform type TrTypeIdxH of a primary horizontal transform and a transform type TrTypeIdxV of a primary vertical transform of the color signal specified by the color signal identifier compID with reference to the prediction mode information PInfo, the color signal identifier compID, the adaptive primary transform flag apt_flag[COMPONENT_Y] of luminance, the primary transform identifier pt_idx[COMPONENT_Y] of luminance, and the primary transform identifier pt_idx[COMPONENT_Y] of luminance, performs the primary horizontal transform defined by the primary horizontal transform type TrTypeIdxH and the picture width log2TBWSize of the transform block and the primary vertical transform defined by the primary vertical transform type TrTypeIdxV and the picture height log2TBHSize of the transform block on the predictive residual D. and thereby derives and outputs a transform coefficient Coeff_P that has undergone the primary transform (also referred to as a primary transform coefficient)

The primary transform unit 432 will be described below in more detail. As illustrated in FIG. 52, the primary transform unit 432 has a chrominance adaptive primary transform information derivation unit 441, a primary transform selection unit 442, the primary horizontal transform unit 443, and the primary vertical transform unit 444.

The chrominance adaptive primary transform information derivation unit 441 derives adaptive primary transform information of a chrominance (apt_flag[compID] and pt_idx [compID] (compID=COMPONENT_Cb or COMPONENT_Cr)) using the adaptive primary transform information (apt_flag[COMPONENT_Y], pt_idx [COMPONENT_Y]) of the luminance transform block corresponding to the chrominance transform block in a case in which the color signal identifier compID indicates the chrominance (compID==COMPONENT_Cb or COMPONENT_Cr), and supplies the result to the primary transform selection unit 442.

<Chrominance Adaptive Primary Transform Information Derivation Unit>

Figure 53:
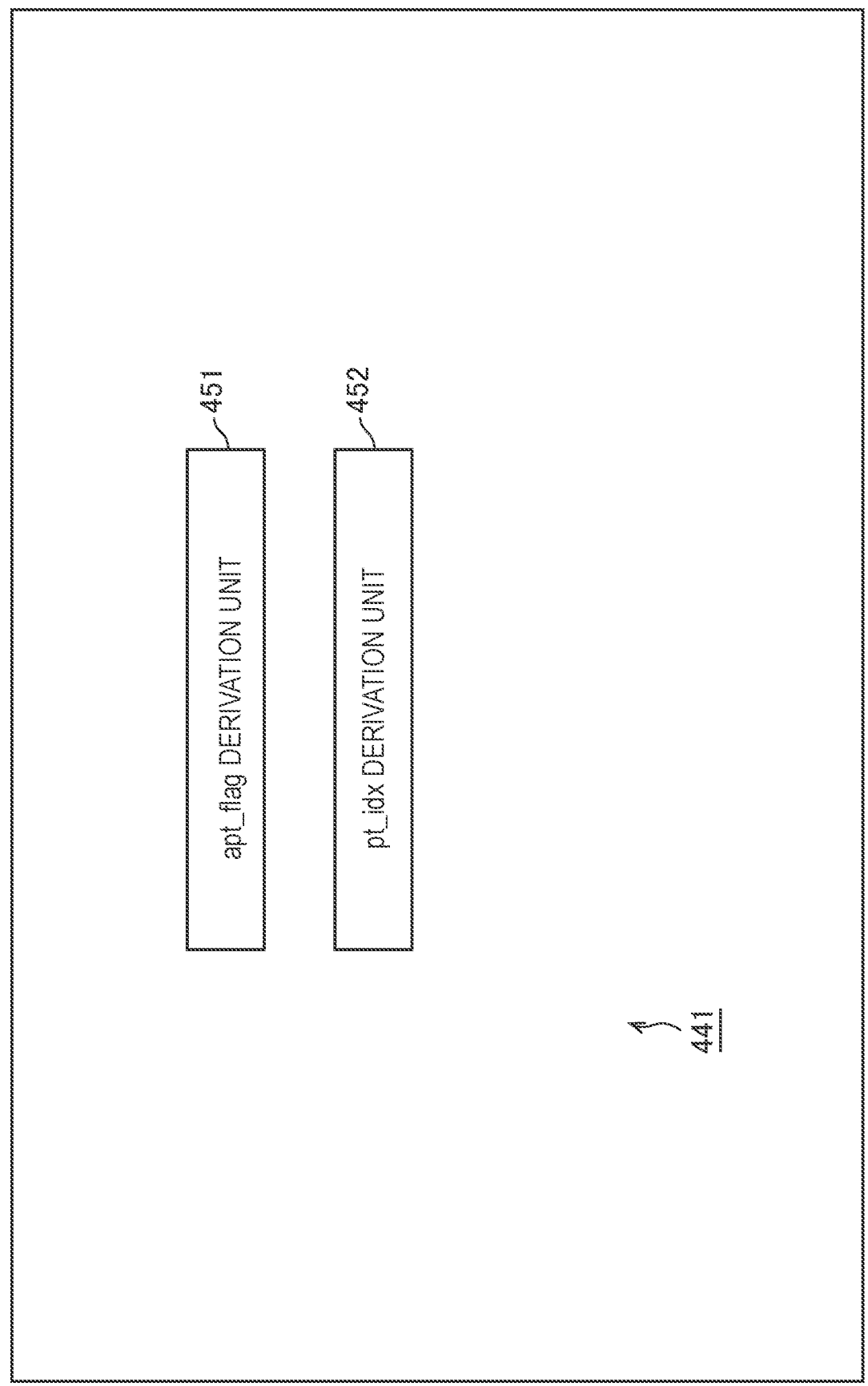
FIG. 53 is a block diagram illustrating an example of the main configuration of a chrominance adaptive primary transform information derivation unit.

FIG. 53 is a functional block diagram illustrating an example of the main configuration of the chrominance adaptive primary transform information derivation unit 441. As illustrated in FIG. 53, the chrominance adaptive primary transform information derivation unit 441 has an apt_flag derivation unit 451 and a pt_idx derivation unit 452. The apt_flag derivation unit 451 performs a process relating to the derivation of the adaptive primary transform flag apt_flag of the chrominance. In addition, the pt_idx derivation unit 452 performs a process relating to the derivation of the primary transform identifier pt_idx of the chrominance. That is, each of the apt_flag derivation unit 451 and the pt_idx derivation unit 452 has a similar configuration and performs similar processes to those of the apt_flag derivation unit 151 and the pt_idx derivation unit 152 (FIG. 11). That is, the chrominance adaptive primary transform information derivation unit 441 has a similar configuration and performs similar processes to those of the chrominance adaptive primary transform information derivation unit 131. Therefore, detailed description of operations of the chrominance adaptive primary transform information derivation unit 441 (the apt_flag derivation unit 151 and the pt_idx derivation unit 152) is similar to that of the chrominance adaptive primary transform information derivation unit 131 in the first embodiment, and thus it is omitted.

The chrominance adaptive primary transform information derivation unit 441 can derive the adaptive primary transform information of the chrominance transform block on the basis of the adaptive primary transform information of luminance corresponding to the chrominance transform block. Therefore, it is possible to reduce the encoding processing amount without encoding the adaptive primary transform information of the chrominance transform block.

The primary transform selection unit 442 receives an input of the prediction mode information PInfo, the color signal identifier compID, the adaptive primary transform flag apt_flag[compID] of the color signal corresponding to the color signal identifier compID, and the primary transform identifier pt_idx[compID] of the color signal corresponding to the color signal identifier compID. The primary transform selection unit 442 derives the transform type TrTypeIdxH of the primary horizontal transform and the transform type TrTypeIdxV of the primary vertical transform of the color signal specified by the color signal identifier compID with reference to the prediction mode information Pinfo, the color signal identifier compID, the adaptive primary transform flag apt_flag[compID] of the color signal corresponding to the color signal identifier compID, and the primary transform identifier pt_idx[compID] of the color signal corresponding to the color signal identifier compID. The primary transform selection unit 442 supplies the derived transform type TrTypeIdxH of the primary horizontal transform to the primary horizontal transform unit 443. In addition, the primary transform selection unit 442 supplies the derive transform type TrTypeIdxV of the primary vertical transform to the primary vertical transform unit 444.

Note that operations of the primary transform selection unit 442 are basically similar to those of the inverse primary transform selection unit 132 of the image decoding apparatus 100. That is, the description with respect to the inverse primary transform selection unit 132 in the first embodiment can be description with respect to the primary transform selection unit 442 by replacing the inverse primary horizontal transform IPThor with a primary horizontal transform PThor, replacing the inverse primary vertical transform IPTver with the primary vertical transform PTver, and replacing the inverse primary transform with the primary transform.

The primary horizontal transform unit 443 receives an input of the predictive residual D, the transform type TrTypeIdxH of the primary horizontal transform, and log2TBWSize indicating the picture width of the transform block (the logarithmic value of the picture width) for each transform block of each color signal. The primary horizontal transform unit 443 executes the primary horizontal transform Phor defined by the transform type TrTypeIdxH and the picture width of the transform block on the predictive residual D and outputs the result as a transform coefficient Coeff_Phor that has undergone the primary horizontal transform.

The primary vertical transform unit 444 receives an input of the transform coefficient Coeff_Phor that has undergone the primary horizontal transform, the transform type TrTypeIdxV of the primary vertical transform and log2TBHSize indicating the picture height of the transform block (the logarithmic value of the picture height) for each transform block of each color signal. The primary vertical transform Pver defined by the transform type TrTypeIdxV and the picture height of the transform block is executed on the transform coefficient Coeff_Phor that has undergone the primary horizontal transform and the result is output as a transform coefficient Coeff_P that has undergone the primary transform.

As described above, the primary transform unit 432 can apply an adaptive primary transform selected for luminance to a transform block of the chrominance in a case in which a residual signal of the color signal shows a similar tendency to a residual signal of luminance. Thus, it is possible to perform a primary transform process on the residual signal of the chrominance with higher coding efficiency than in the related art.

In addition, it is possible to reduce a processing amount of an encoder while preventing a decrease in coding efficiency for chrominance in comparison to a case in which an adaptive primary transform flag apt_flag and a primary transform identifier pt_idx are explicitly decoded for each of luminance and the chrominance.

The secondary transform unit 433 performs a process relating to a secondary transform which is a predetermined transform process, for example, an orthogonal transform. The secondary transform is an inverse process to the inverse secondary transform executed by the inverse secondary transform unit 122, or the like of the image decoding apparatus 10. The secondary transform unit 433 receives an input of, for example, a secondary transform identifier st_idx, a scan identifier scanIdx indicating a scanning method of the transform coefficient, and a primary transform coefficient Coeff_P, and derives and outputs a transform coefficient Coeff that has undergone the secondary transform (also referred to as a secondary transform coefficient). More specifically, in a case in which the secondary transform identifier st_idx indicates applying the secondary transform (st_idx>0), the secondary transform unit 433 executes the process of the secondary transform corresponding to the secondary transform identifier st_idx on the primary transform coefficient Coeff_P. and outputs a transform coefficient Coeff_S that has undergone the secondary transform.

In a case in which the secondary transform identifier st_idx indicates not applying the secondary transform (st_idx=0), the secondary transform unit 433 skips the secondary transform, and outputs the transform coefficient Coeff_P that has undergone the primary transform as the transform coefficient Coeff_S that has undergone the secondary transform.

<Flow of Image Encoding Process>

Next, the flows of each of the processes executed by the image encoding apparatus 400 as described above will be described. First, an example of the flow of the image encoding process will be described with reference to the flowchart of FIG. 54.

When the image encoding process is started, the control unit 411 performs an encoding control process and performs block division, a setting of encoding parameters, and the like in Step S401.

In Step S402, the prediction unit 420 performs a prediction process and generates a predictive image and the like in an optimum prediction mode. For example, in the prediction process, the prediction unit 420 generates performs intra prediction and generates a predictive image and the like in an optimum intra prediction mode, and performs inter prediction and generates a predictive image and the like in an optimum inter prediction mode, and selects an optimum prediction mode among the modes on the basis of a cost function value or the like.

In Step S403, the arithmetic operation unit 412 calculates the difference between the input image and the predictive image in the optimum mode selected in the prediction process of Step S402. That is, the arithmetic operation unit 412 generates predictive residual D between the input image and the predictive image. The data amount of the predictive residual D obtained as described above is reduced more than that of the original image data. Therefore, the data amount can be more compressed than in a case in which the image is encoded without change.

In Step S404, the transform unit 413 performs a transform process on the predictive residual D generated in the process of Step S403 and derives a transform coefficient Coeff. Note that the transform process is an inverse process to the inverse transform process of Step S407 and an inverse process of the inverse transform process executed in the above-described image decoding process. Details of the process of Step S404 will be described below.

In Step S405, the quantization unit 414 quantizes the transform coefficient Coeff obtained from the process of Step S404 by using a quantization parameter calculated by the control unit 411 or the like and derives a quantized transform coefficient level level.

In Step S406, the inverse quantization unit 416 performs inverse quantization on the quantized transform coefficient level level generated from the process of Step S405 using characteristics corresponding to those of the quantization of Step S405 and derives a transform coefficient Coeff_IQ.

In Step S407, the inverse transform unit 417 performs an inverse transform on the transform coefficient Coeff_IQ obtained from the process of Step S406 using a method corresponding to the transform process of Step S404 and derives predictive residual D'. Note that the inverse transform process is executed similarly to the inverse transform process executed in the above-described image decoding process.

In Step S408, the arithmetic operation unit 418 generates a decoded image that has been locally decoded by adding the predictive image obtained from the prediction process of Step S402 to the predictive residual D' derived from the process of Step S407.

In Step S409, the frame memory 419 stores the decoded image that has been locally decoded obtained from the process of Step S408.

In Step S410, the encoding unit 415 encodes the quantized transform coefficient level level obtained from the process of Step S405. For example, the encoding unit 415 encodes the quantized transform coefficient level level which is information regarding the image using arithmetic encoding or the like and generates encoded data. In addition, at this time, the encoding unit 415 encodes various encoding parameters (header information Hinfo, prediction mode information Pinfo, and transform information Tinfo). Furthermore, the encoding unit 415 derives residual information Rinfo from the quantized transform coefficient level level and encodes the residual information RInfo.

In Step S411, the encoding unit 415 puts the encoded data of the various kinds of information generated as described above and outputs the data as a bit stream to the outside of the image encoding apparatus 400. The bit stream is transmitted to the decoding side via, for example, a transmission path or a recording medium. When the process of Step S411 ends, the image encoding process ends.

<Flow of Transform Process>

Next, an example of the flow of the transform process executed in Step S404 of FIG. 54 will be described with reference to the flowchart of FIG. 55. When the transform process is started, the switch 431 determines whether or not the transform skip flag ts_flag is 2D_TS (a case in which the flag indicates two-dimensional transform skip) in Step S421 or the transform quantization bypass flag transquant_bypass_flag is (true). In a case in which the transform skip flag ts_flag is determined to be 2D_TS or the transform quantization bypass flag is determined to be 1 (true), the transform process ends, and the process returns to FIG. 54. In this case, the switch 431 omits the orthogonal transform process (the primary transform or the secondary transform) and outputs the input predictive residual D to the outside of the transform unit 413 (supplies it to the quantization unit 414) as a transform coefficient Coeff.

Figure 55:
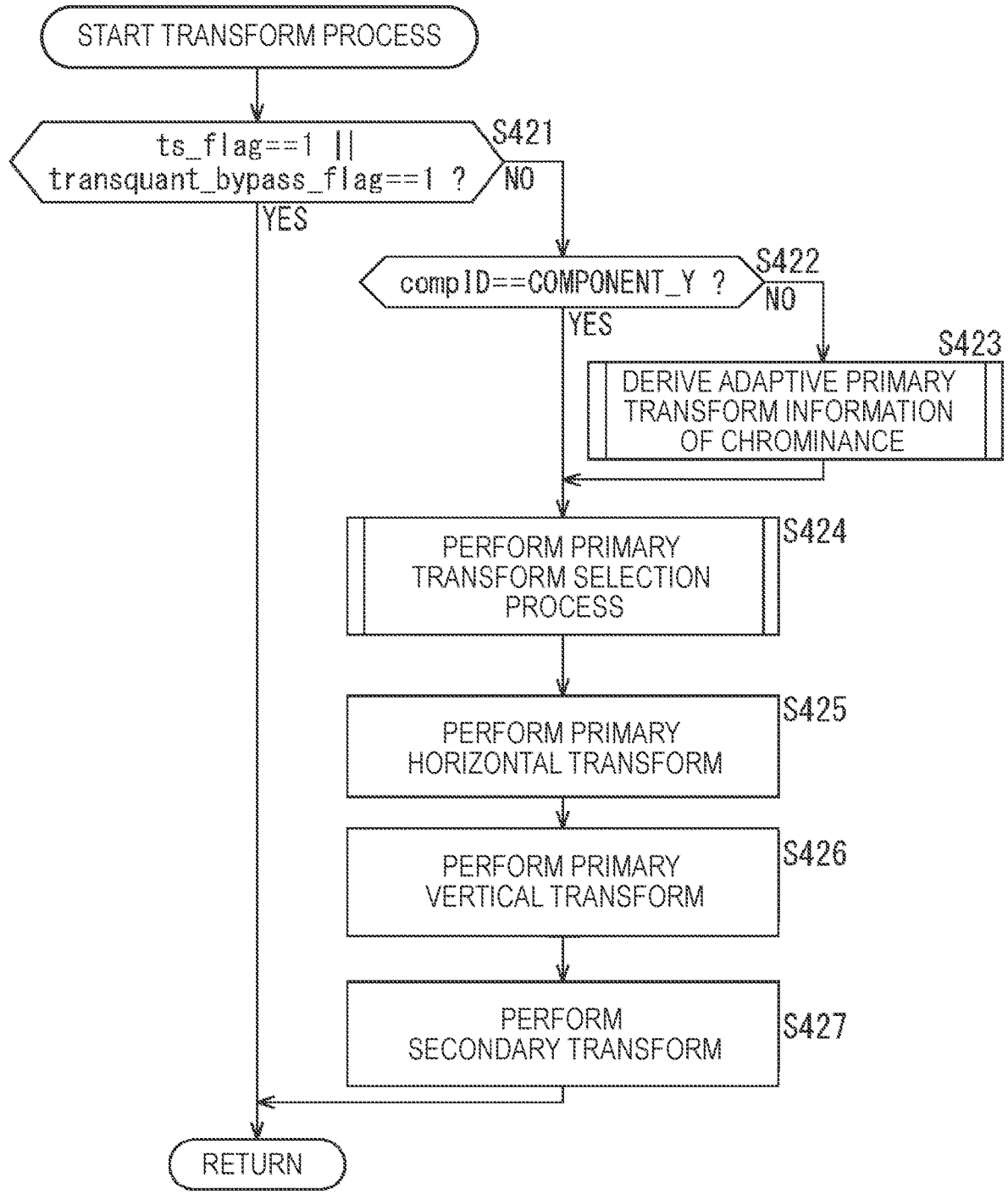
FIG. 55 is a flowchart describing an example of the flow of a transform process.

In addition, in a case in which the transform skip flag ts_flag is determined not to be 2D_TS (not indicating the two-dimensional transform skip) and the transform quantization bypass flag is determined to be 0 (false) in Step S421 of FIG. 55, the process proceeds to Step S422. In this case, the switch 431 supplies the input predictive residual D to the primary transform unit 432.

The primary transform unit 432 performs the primary transform on the predictive residual D on the basis of adaptive primary transform information of a color signal specified by the color signal identifier compID and outputs the transform coefficient Coeff_P that has undergone the primary transform. More specifically, in Step S422, the primary transform unit 432 identifies whether the color signal identifier compID is of luminance or a chrominance. In a case in which the color signal identifier compID is determined to indicate a chrominance (compID!=COMPONENT_Y), the process proceeds to Step S423.

In Step S423, chrominance adaptive primary transform information derivation unit 441 executes a chrominance adaptive primary transform information derivation process and derives the primary transform identifier pt_idx[compID] of a transform block of the chrominance on the basis of an adaptive primary transform flag apt_flag[compID] (compID=COMPONET_Cb or COMPONENT_Cr) of the transform block of the chrominance and a primary transform identifier pt_idx[COMPONENT_Y] of a transform block of luminance corresponding to the transform block of the chrominance. Note that, since the process is similar to the chrominance adaptive primary transform information derivation process (FIG. 15) executed by the image decoding apparatus 100 (the chrominance adaptive primary transform information derivation unit 131) described in the first embodiment, description thereof will be omitted. In other words, the description provided with reference to the flowchart of FIG. 15 can also be applied to the description of the chrominance adaptive primary transform information derivation process executed by the chrominance adaptive primary transform information derivation unit 441.

When the process of Step S423 ends, the process proceeds to Step S424. In addition, in a case in which the color signal identifier compID is determined to indicate luminance (compID==COMPONENT_Y) in Step S422, the process proceeds to Step S424.

In Step S424, the primary transform selection unit 442 executes a primary transform selection process, derives a transform type TrTypeIdxH of a primary horizontal transform and a transform type TrTypeIdxV of a primary vertical transform of the color signal specified by the color signal identifier compID with reference to the prediction mode information Pinfo, the color signal identifier compID, the adaptive primary transform flag apt_flag[compID] of the color signal corresponding to the color signal identifier compID, and the primary transform identifier pt_idx[compID] of the color signal corresponding to the color signal identifier compID, and outputs each of the transform types to the primary horizontal transform unit 443 and the primary vertical transform unit 444.

In Step S425, the primary horizontal transform unit 443 executes the primary horizontal transform Phor defined by the transform type TrTypeIdxH of the primary horizontal transform and the picture height of the transform block on the predictive residual D of the transform block for each transform block specified by the color signal identifier compID and outputs the result as the transform coefficient Coeff_Phor that has undergone the primary horizontal transform.

In Step S426, the primary vertical transform unit 444 executes the primary vertical transform Pver defined by the transform type TrTypeIdxV of the primary vertical transform and the picture height of the transform block on the transform coefficient Coeff_Phor of the transform block that has undergone the primary horizontal transform for each transform block specified by the color signal identifier compID and outputs the result as the transform coefficient Coeff_P that has undergone the primary transform.

In Step S427, the secondary transform unit 433 performs the secondary transform on the input primary transform coefficient Coeff_P on the basis of the secondary transform identifier st_idx and derives and outputs the transform coefficient Coeff. When the process of Step S427 ends, the transform process ends and the process returns to FIG. 54.

<Flow of Primary Transform Selection Process>

Figure 56:
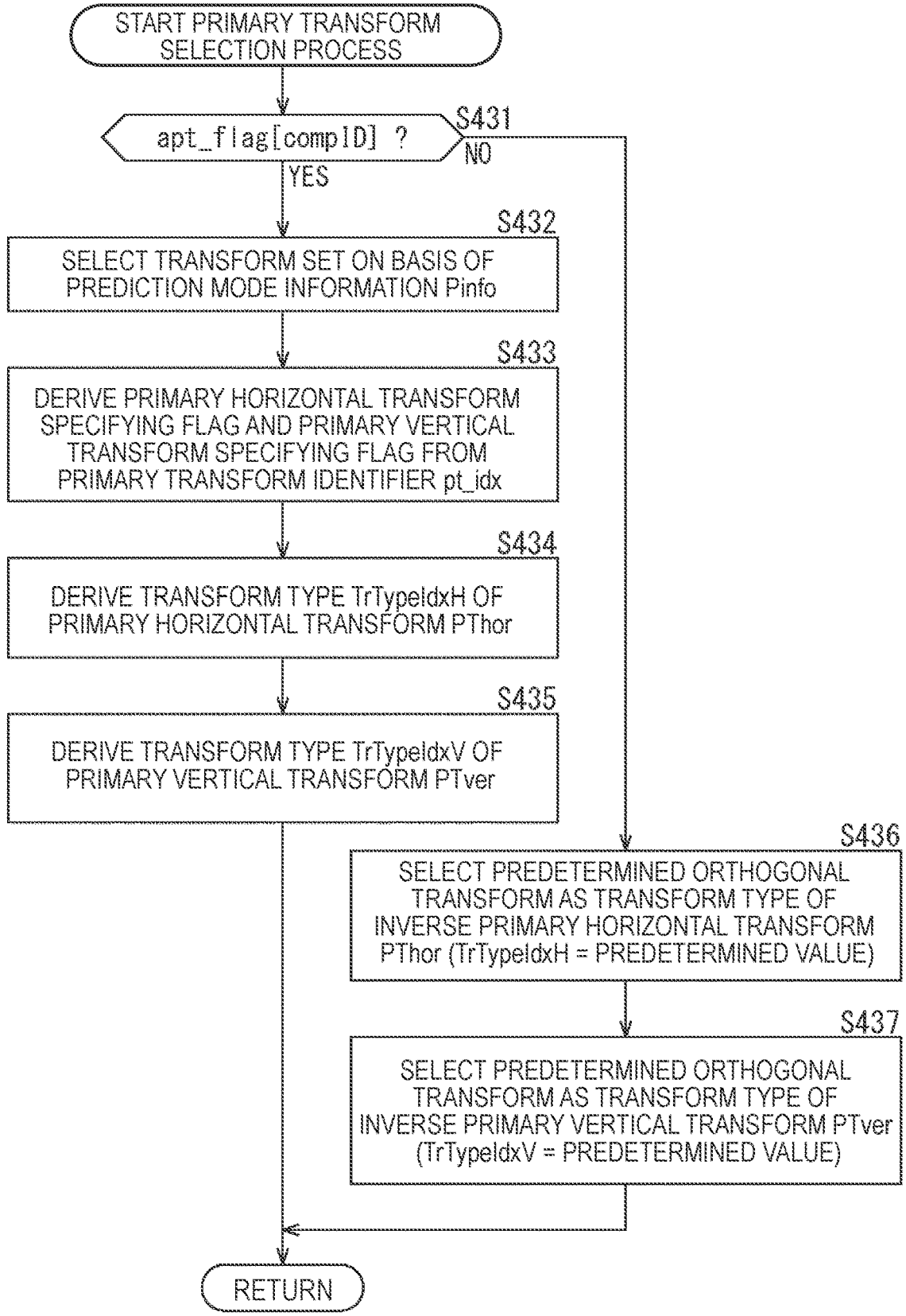
FIG. 56 is a flowchart describing an example of the flow of a primary transform selection process.

Next, an example of the flow of the primary transform selection process executed in Step S424 of FIG. 55 will be described with reference to the flowchart to FIG. 56.

When the primary transform selection process is started, the primary transform selection unit 442 determines whether or not the adaptive primary transform flag apt_flag[compID] of the color signal corresponding to the color signal identifier compID is 1 (true) in Step S431. In a case in which the adaptive primary transform flag apt_flag[compID] is determined to be 1 (true), the process proceeds to Step S432.

In Step S432, the primary transform selection unit 442 selects a transform set TrSetV (primary horizontal transform set) of the primary vertical transform and a transform set TrSetH (primary vertical transform set) of the primary horizontal transform on the basis of the prediction mode information Pinfo.

In Step S433, the primary transform selection unit 442 derives a primary horizontal transform specifying flag pt_hor_flag and a primary vertical transform specifying flag pt_ver_flag from the primary transform identifier pt_idx [compID] of the color signal corresponding to the color signal identifier compID.

In Step S434, the primary transform selection unit 442 selects the transform type TrTypeIdxH of an orthogonal transform applied as the primary horizontal transform IPThor with reference to the primary horizontal transform set TrSetH and the primary horizontal transform specifying flag pt_hor_flag.

In Step S435, the primary transform selection unit 442 selects the transform type TrTypeIdxV of an orthogonal transform applied as the inverse primary vertical transform IPTver with reference to the primary vertical transform set TrSetV and the primary vertical transform specifying flag pt_ver_flag. When the process of Step S435 ends, the primary transform selection process ends, and the process returns to FIG. 55.

In addition, in Step S431, in a case in which it is determined that the adaptive primary transform flag apt_flag [compID] is 0 (false), the process proceeds to Step S436. In Step S436, the primary transform selection unit 442 selects a predetermined orthogonal transform as the transform type TrTypeIdxH of the primary horizontal transform IPThor (TrTypeIdxH=predetermined value).

In addition, in Step S437, the primary transform selection unit 442 selects a predetermined orthogonal transform as the transform type TrTypeIdxV of the primary vertical transform IPTver (TrTypeIdxV=predetermined value). When the process of Step S437 ends, the primary transform selection process ends, and the process returns to FIG. 56.

That is, the primary transform unit 432 derives the transform type TrTypeIdxH of the inverse primary horizontal transform IPThor and the transform type TrTypeIdxV of the inverse primary vertical transform IPTver using the method in accordance with the value of the adaptive primary transform flag apt_flag[compID] of the chrominance.

<Flow of Primary Transform Information Encoding Process>

The encoding unit 415 encodes the adaptive primary transform flag apt_flag and the primary transform identifier pt_idx generated by the transform unit 413. However, the encoding unit 415 may encode the adaptive primary transform flag apt_flag and the primary transform identifier pt_idx of luminance and cause the flag and the identifier to be signaled, and may not encode the adaptive primary transform flag apt_flag and the primary transform identifier pt_idx of the chrominance.

Figure 57:
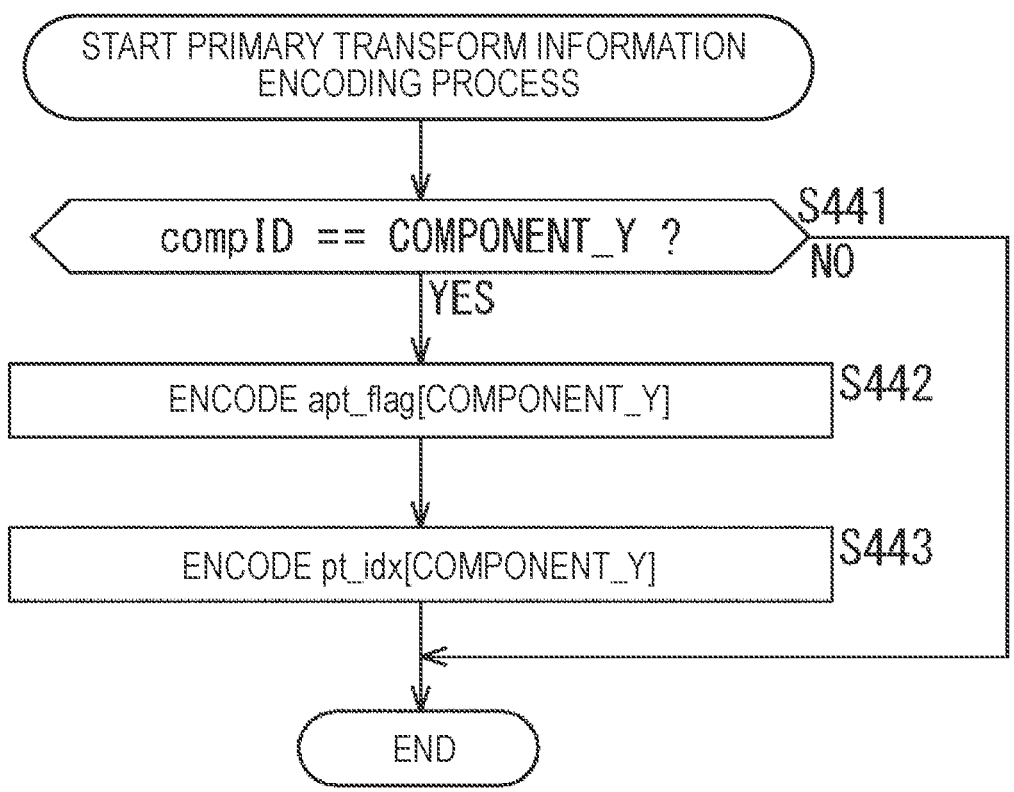
FIG. 57 is a flowchart describing an example of the flow of a primary transform information encoding process.

An example of the flow of a primary transform information encoding process executed by the encoding unit 415 to perform the encoding described above will be described with reference to the flowchart of FIG. 57. When the primary transform information encoding process is started, the encoding unit 415 determines whether or not a processing object is luminance in Step S441. In a case in which the processing object is determined to be luminance (compID=COMPONENT_Y), the process proceeds to Step S442. In Step S442, the encoding unit 415 encodes the adaptive primary transform flag apt_flag[COMPONENT_Y] of luminance (causes the flag to be signaled). In addition, the encoding unit 415 encodes the primary transform identifier pt_idx[COMPONENT_Y] of luminance (causes the flag to be signaled) in Step S443. When the process of Step S443 ends, the primary transform information encoding process ends.

Note that the encoding unit 415 determines whether or not the processing object is a chrominance in Step S441. In a case in which the processing object is determined to be a chrominance (compID!=COMPONENT_Y), the processes of Step S442 and Step S443 are omitted, that is, the adaptive primary transform flag apt_flag and the primary transform identifier pt_idx are not signaled, and the primary transform information encoding process ends.

By executing each process as described above, the adaptive primary transform selected for luminance can be applied to the transform block of the chrominance in the case in which the residual signal of the chrominance has a similar tendency to the residual signal of luminance. Therefore, the primary transform process with further improved coding efficiency can be performed on the residual signal of the chrominance in comparison to technologies of the related art. In addition, since it is not necessary to encode the adaptive primary transform information of the chrominance, the amount of the encoding process can be reduced more than in the case in which the adaptive primary transform flag apt_flag and the primary transform identifier pt_idx are explicitly encoded for each of luminance and the chrominance.

<Chrominance Adaptive Primary Transform Information Derivation Process>

Note that the chrominance adaptive primary transform information derivation unit 441 has a similar configuration and performs similar processes to those of the chrominance adaptive primary transform information derivation unit 131. That is, the chrominance adaptive primary transform information derivation unit 441 can execute the chrominance adaptive primary transform information derivation process, similarly to the chrominance adaptive primary transform information derivation unit 131. Therefore, the image encoding apparatus 400 can make it possible to apply the adaptive primary transform also to the chrominance and further infer the adaptive primary transform flag apt_flag and the primary transform identifier pt_idx of the chrominance from the adaptive primary transform flag apt_flag and the primary transform identifier pt_idx of luminance at all times as indicated in the row of No. #1 in the table of FIG. 7, and therefore similar effects to those in the case of the image decoding apparatus 100 can be obtained.

Likewise, the image encoding apparatus 400 can make it possible to apply the adaptive primary transform also to the chrominance, further can set the value of the adaptive primary transform flag apt_flag[Cb/Cr] of the chrominance to the value of the adaptive primary transform flag apt_flag[Y] of luminance in the case in which the prediction type of a coding block to which a transform block to be processed belongs is inter prediction (CuPredMode==MODE_INTER), for example, and can set the adaptive primary transform flag apt_flag[Cb/Cr] of the chrominance to 0 (false) in the case in which the prediction type of the coding block is intra prediction as indicated in the row of No. #2 in the table of FIG. 7. That is, similar effects to those in the case of the image decoding apparatus 100 can be obtained in the case as well.

Likewise, the image encoding apparatus 400 can make it possible to apply the adaptive primary transform also so the chrominance and further can set the value of the adaptive primary transform flag of apt_flag[Cb/Cr] of the chrominance to the value of adaptive primary transform flag apt_flag[Y] of luminance in the case in which the prediction type of the coding block to which the transform block to be processed belongs is inter prediction or intra prediction in which the prediction modes for luminance and the chrominance match each other, for example, and can set the adaptive primary transform flag of apt_flag[Cb/Cr] of the chrominance to 0 (false) in the case in which the prediction type of the coding block is intra prediction in which the prediction modes for luminance and the chrominance do not match each other as indicated in the row of No. #3 in the table of FIG. 7. That is, similar effects to those in the case of the image decoding apparatus 100 can be obtained in that case as well.

Likewise, the image encoding apparatus 400 can make it possible to apply the adaptive primary transform also to the chrominance, and further can set the value of the adaptive primary transform flag apt_flag[Cb/Cr] of the chrominance to the value of the adaptive primary transform flag apt_flag[Y] of luminance in the case in which the prediction type of the coding block to which the transform block to be processed belongs is inter prediction or intra prediction of which the prediction mode is intra block copy, for example, and can set the value of the adaptive primary transform flag apt_flag[Cb/Cr] of the chrominance to 0 (false) in the case in which the prediction type of the coding block is intra prediction of which the prediction mode is not intra block copy (IntraBC, also referred to as in-screen motion compensation), as indicated in the row of No. #4 in the table of FIG. 7. That is, similar effects to those in the case of the image decoding apparatus 100 can be obtained in that case as well.

Likewise, the image encoding apparatus 400 can make it possible to apply the adaptive primary transform also to the chrominance, and further, can set the adaptive primary transform flag apt_flag[Cb/Cr] of the chrominance to the value of the adaptive primary transform flag apt_flag [Y] of luminance in a case in which a chrominance adaptive primary transform information inference flag chroma_apt_info_infer_flag indicating whether the adaptive primary transform flag apt_flag[Cb/Cr] of a chrominance is inferred on the basis of the adaptive primary transform flag apt_flag[Y] of luminance is 1 (true), for example, and can set the value of the adaptive primary transform flag apt_flag[Cb/Cr] of a chrominance to 0 (false) in a case in which the chrominance adaptive primary transform information inference flag chroma_apt_info_infer_flag is 0 (false), as indicated in the row of No. #5 in the table of FIG. 7. In this manner, it is possible to explicitly control whether the value of the adaptive primary transform flag of luminance is to be used using the chrominance adaptive primary transform information inference flag chroma_apt_info_infer_flag.

That is, similar effects to those in the case of the image decoding apparatus 100 can be obtained in that case as well.

An example of the flow of a chrominance adaptive primary transform information inference flag encoding process to encode a chrominance adaptive primary transform information inference flag chroma_apt_info_infer_flag will be described with reference to the flowchart of FIG. 58.

When the chrominance adaptive primary transform information inference flag encoding process is started, the encoding unit 415 determines whether or not a processing object is a chrominance in Step S451. In a case in which the processing object is determined to be the chrominance, the process proceeds to Step S452. In Step S452, the encoding unit 415 determines whether or not the adaptive primary transform flag apt_flag[COMPONENT_Y] of luminance is true. In a case in which the flag is determined to be true, the process proceeds to Step S453. In Step S453, the encoding unit 415 determines whether or not the transform quantization bypass enabled flag transquant_bypass_enabled_flag is false. In a case in which the flag is determined to be false, the process proceeds to Step S454. In Step S454, the encoding unit 415 determines whether or not the transform skip flag ts_flag of the chrominance is false. In a case in which the transform skip flag ts_flag of the chrominance is determined to be false, the process proceeds to Step S455. In Step S455, the encoding unit 415 encodes the chrominance adaptive primary transform information inference flag chroma_apt_info_infer_flag. When the process of Step S455 ends, the chrominance adaptive primary transform information inference flag encoding process ends, and the process returns to FIG. 54.

Figure 54:
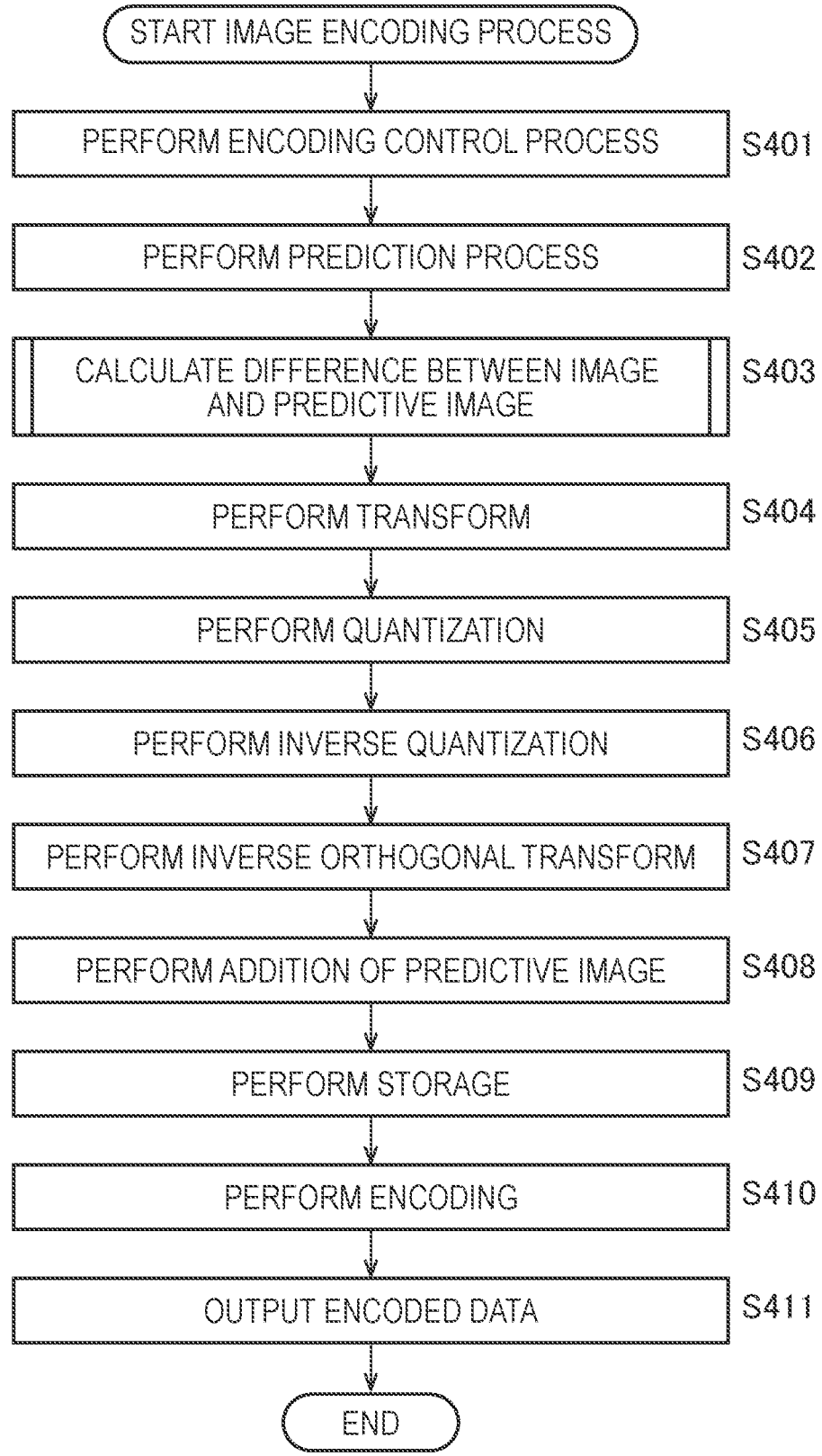
FIG. 54 is a flowchart describing an example of the flow of an image decoding process.
Figure 58:
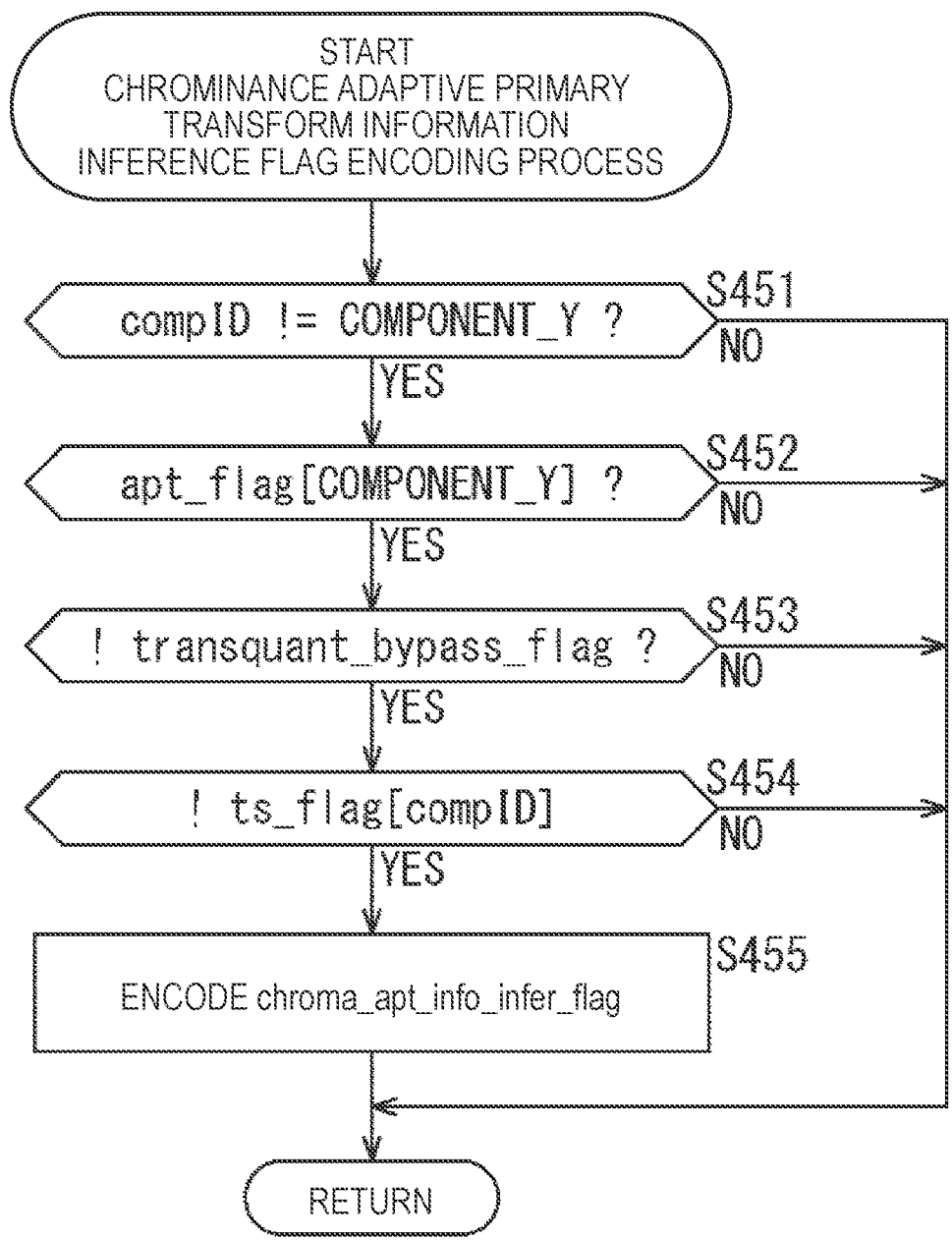
FIG. 58 is a flowchart describing an example of the flow of a chrominance adaptive primary transform information inference flag encoding process.

Note that, in the case in which the processing object is determined to be luminance in Step S451 of FIG. 58, the chrominance adaptive primary transform information inference flag encoding process ends, and the process returns to FIG. 54. In addition, in a case in which the adaptive primary transform flag apt_flag[COMPONENT_Y] of luminance is determined to be false in Step S452, the chrominance adaptive primary transform information inference flag encoding process ends, and the process returns to FIG. 54. In addition, in a case in which the transform quantization bypass enabled flag transquant_bypass_enabled_flag is determined to be true in Step S453, the chrominance adaptive primary transform information inference flag encoding process ends, and the process returns to FIG. 54. In addition, in a case in which the transform skip flag ts_flag of the chrominance is determined to be true in Step S454, the chrominance adaptive primary transform information inference flag encoding process ends, and the process returns to FIG. 54.

In addition, the image encoding apparatus 400 can make it possible to apply the adaptive primary transform also to the chrominance, and further can set the value of the adaptive primary transform flag apt_flag[Cb/Cr] of the chrominance to the value of the adaptive primary transform flag apt_flag[Y] of luminance in the case in which the size of the short side of the transform block to be processed of the chrominance is greater than or equal to a predetermined threshold value, for example, and can set the value of the adaptive primary transform flag apt_flag[Cb/Cr] of the chrominance to 0 (false) in a case in which the size of the short side of the transform block is smaller than the threshold value, as indicated in the row of No. #6 in the table of FIG. 7. That is, similar effects to those in the case of the image decoding apparatus 100 can be obtained in that case as well.

Likewise, the image encoding apparatus 400 can make it possible to apply the adaptive (inverse) primary transform also to the chrominance, and further, can set the transform type of the (inverse) primary horizontal transform to a predetermined transform type in a case in which the size of the picture width of a transform block with the chrominance to be processed is equal to or smaller than a predetermined threshold value, for example, and can set the transform type of the (inverse) primary horizontal transform on the basis of a horizontal transform set and a primary horizontal transform specifying flag in a case in which the size of the picture width of the transform block is greater than the threshold value, as indicated in the row of No. #7 in the table of FIG. 7. Furthermore, likewise, in a case in which the size of the picture height of the transform block with a chrominance to be processed is equal to or smaller than a predetermined threshold value, the transform type of the (inverse) primary vertical transform can be set to a predetermined transform type, and in a case in which the size of the picture height of the transform block is greater than the threshold value, the transform type of the (inverse) primary vertical transform can be set on the basis of a vertical transform set and a primary vertical transform specifying flag. That is, similar effects to those in the case of the image decoding apparatus 100 can be obtained in that case as well.

Of course, the plurality of above-described cases can be arbitrarily combined as well in the case of the image encoding apparatus 400. In addition, each of the above-described cases can also be combined with other cases that are not described above. That is, similar effects to those in the case of the image decoding apparatus 100 can be obtained in that case as well.

6. Fifth Embodiment

<ts_flag>

Information regarding an (inverse) orthogonal transform may include a transform skip flag ts_flag indicating whether an (inverse) orthogonal transform process is to be skipped, as in the case of decoding. By deriving each of a transform skip flag ts_flag[Cb] of a chrominance (Cb) and a transform skip flag ts_flag[Cr] of a chrominance (Cr) on the basis of a transform skip flag ts_flag[Y] of luminance, for example, an increase in overhead of the code amount of the syntax signaled by the chrominance (Cb/Cr) can be curbed as well.

Basic Example 1

The transform skip flag ts_flag of a chrominance is inferred from the transform skip flag ts_flag of luminance at all times, for example, as indicated in the row of No. #1 in FIG. 27. For example, a value of the transform skip flag ts_flag[compID] of a chrominance may be set to a value of the transform skip flag ts_flag[COMPONENT_Y] of luminance.

In this case, the control unit 411 executes a transform skip flag encoding process and controls encoding of the transform skip flag ts_flag. An example of the flow of the transform skip flag encoding process will be described with reference to the flowchart of FIG. 59.

Figure 59:
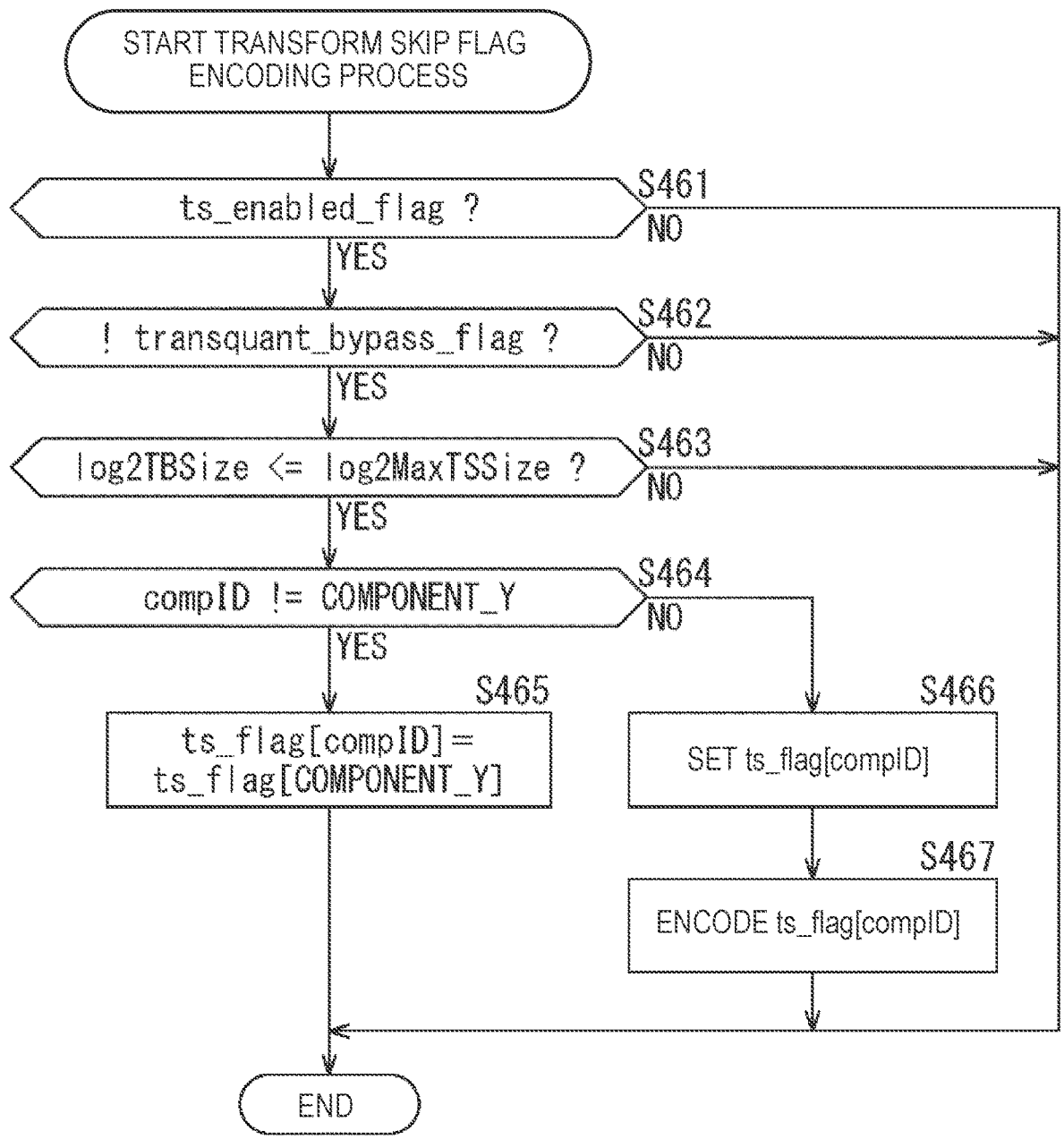
FIG. 59 is a flowchart describing an example of the flow of a transform skip flag encoding process.

When the transform skip flag encoding process is started, each of the processes of Step S461 to Step S464 of FIG. 59 is executed similarly to each of the processes of Step S241 to Step S244 of the transform skip flag derivation process of FIG. 29.

When the processing object is determined to be a chrominance (compID!=COMPONENT_Y) in Step S464, the process proceeds to Step S465. In Step S465, the control unit 411 sets the value of the transform skip flag ts_flag[compID] of the chrominance to the value of the transform skip flag ts_flag[COMPONENT_Y] of luminance (ts_flag[compID]=ts_flag[COMPONENT_Y]). When the process of Step S465 ends, the transform skip flag encoding process ends. That is, in this case, the transform skip flag ts_flag[compID] of the chrominance can be derived from the transform skip flag ts_flag[COMPONENT_Y] of luminance likewise on the decoding side, and thus the flag is not signaled.

In addition, in a case in which the processing object is determined to be luminance (compID==COMPONENT_Y) in Step S464, the process proceeds to Step S466. In Step S466, the control unit 411 sets an arbitrary value for the transform skip flag ts_flag[compID] of luminance. Then, the control unit 411 supplies the transform skip flag ts_flag[compID] of luminance to the encoding unit 415 to cause the flag to be encoded in Step S467. When the process of Step S467 ends, the transform skip flag encoding process ends. That is, in this case, the transform skip flag ts_flag[compID] of luminance is signaled (transmitted). The decoding side obtains the transform skip flag ts_flag[compID] of luminance through extraction and decoding using a bit stream.

That is, in the case of <Basic example 1>, all transform skip flags ts_flag of luminance are signaled, and all transform skip flags ts_flag of the chrominance are not signaled. In this manner, transmission (encoding and decoding) of the transform skip flag ts_flag of the chrominance can be omitted, and thus deterioration in coding efficiency can be curbed. In addition, an increase in a load of encoding and decoding can be curbed as well.

Modified Example 1

In addition, as in the row of No. #2 of FIG. 27, for example, in the case in which the prediction type of the coding block to which the transform block to be processed belongs is inter prediction, the value of the transform skip flag ts_flag[compID] of the chrominance may be set to the value of the transform skip flag ts_flag[COMPONENT_Y] of luminance, and in the case in which the prediction type of the coding block is intra prediction, the transform skip flag ts_flag[compID] of the chrominance may be signaled (i.e., the transform skip flag ts_flag[compID] of the chrominance can be decoded from the encoded data).

Figure 60:
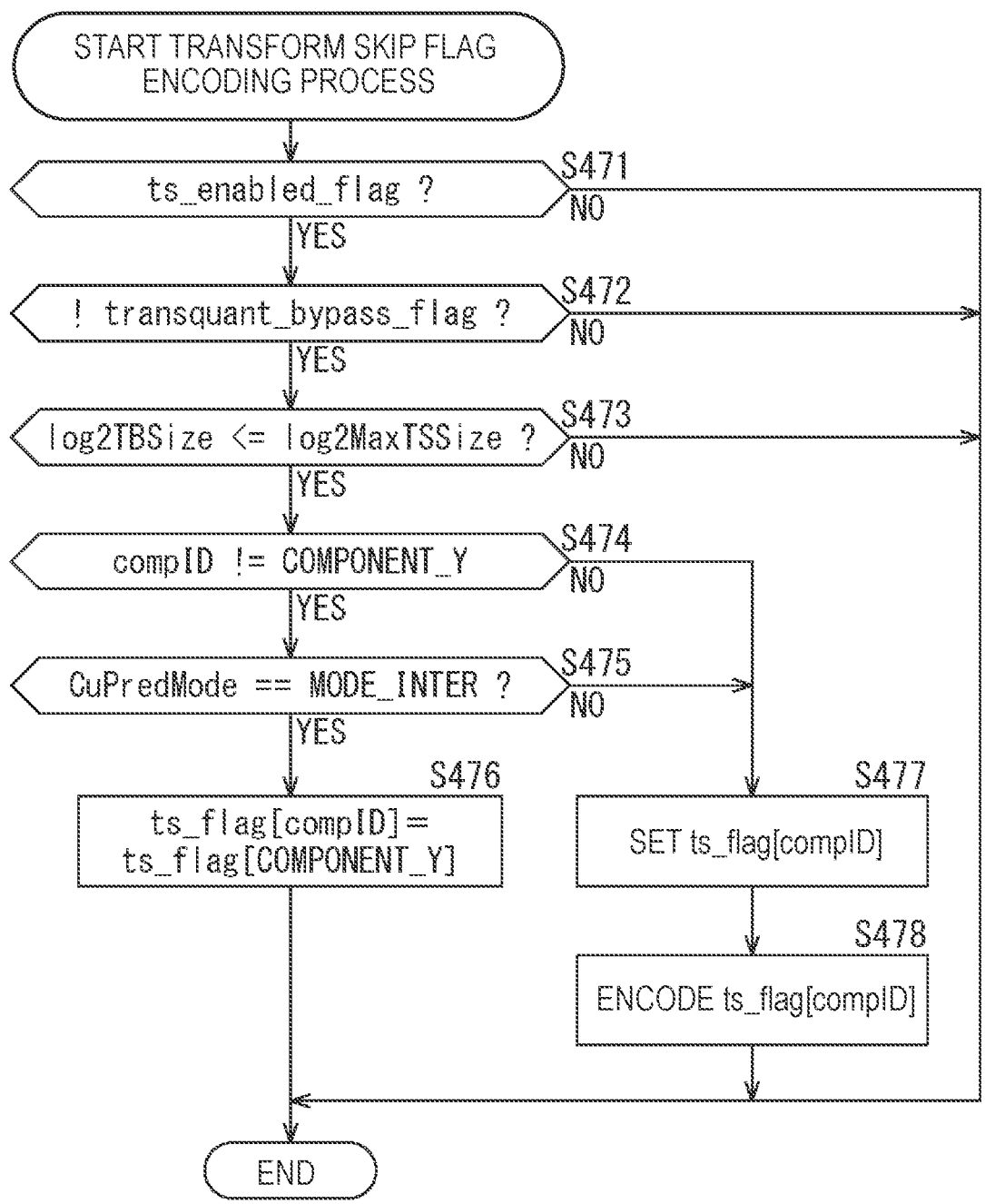
FIG. 60 is a flowchart describing an example of the flow of a transform skip flag encoding process.

An example of the flow of the transform skip flag encoding process in that case will be described with reference to the flowchart of FIG. 60. Each of the processes of Step S471 to Step S475 is executed similarly to each of the processes of Step S251 to Step S255 of FIG. 31.

That is, in a case in which the processing object is determined to be the chrominance in Step S474 and the prediction type is inter prediction in Step S475, the process proceeds to Step S476. In Step S476, the control unit 411 sets the value of the transform skip flag ts_flag[compID] of the chrominance to the value of the transform skip flag ts_flag[COMPONENT_Y] of luminance (ts_flag[compID]=ts_flag[COMPONENT_Y]). When the process of Step S476 ends, the transform skip flag encoding process ends. That is, in this case, the decoding side can similarly derive the transform skip flag ts_flag[compID] of the transform block in the case of the chrominance and inter prediction from the transform skip flag ts_flag[COMPONENT_Y] of luminance, and thus the flag is not signaled.

On the other hand, in a case in which the processing object is determined to be luminance (compID==COMPONENT_Y) in Step S474 or a case in which the prediction type is determined to be intra prediction in Step S475, the process proceeds to Step S477. In Step S477, the control unit 411 sets an arbitrary value for the transform skip flag ts_flag[compID]. Then, in Step S478, the control unit 411 supplies the transform skip flag ts_flag[compID] to the encoding unit 415 to cause the flag to be encoded. When the process of Step S478 ends, the transform skip flag encoding process ends. That is, in this case, the transform skip flag ts_flag[compID] of the transform block in the case of luminance or intra prediction is signaled (transmitted). The decoding side can obtain the transform skip flag ts_flag[compID] through extraction and decoding using a bit stream.

That is, in the case of <Modified example 1>, the transform skip flag ts_flag of luminance and the transform skip flag ts_flag of the transform block of which the prediction mode is intra prediction are signaled, and the transform skip flag ts_flag of the chrominance of which the prediction mode is inter prediction is not signaled. In this manner, transmission (encoding and decoding) of the transform skip flag ts_flag of the chrominance can be omitted only in the case of the inter prediction mode in which the tendencies of the residual signals are similar, and thus deterioration in coding efficiency can be curbed. In addition, an increase in a load of encoding and decoding can be curbed as well.

Modified Example 2

In addition, in the case in which the prediction type of the coding block to which the transform block to be processed belongs is inter prediction as in the row of No. #3 of FIG. 27 or intra prediction in which the prediction modes for luminance and the chrominance match each other, for example, the value of the transform skip flag ts_flag[compID] of the chrominance may be set to the value of the transform skip flag ts_flag[COMPONENT_Y] of luminance, in the case in which the prediction type of the coding block is intra prediction in which the prediction modes for luminance and the chrominance do not match each other, the transform skip flag ts_flag[compID] of the chrominance may be signaled (i.e., the transform skip flag ts_flag[compID] of the chrominance can be decoded from the encoded data).

Figure 61:
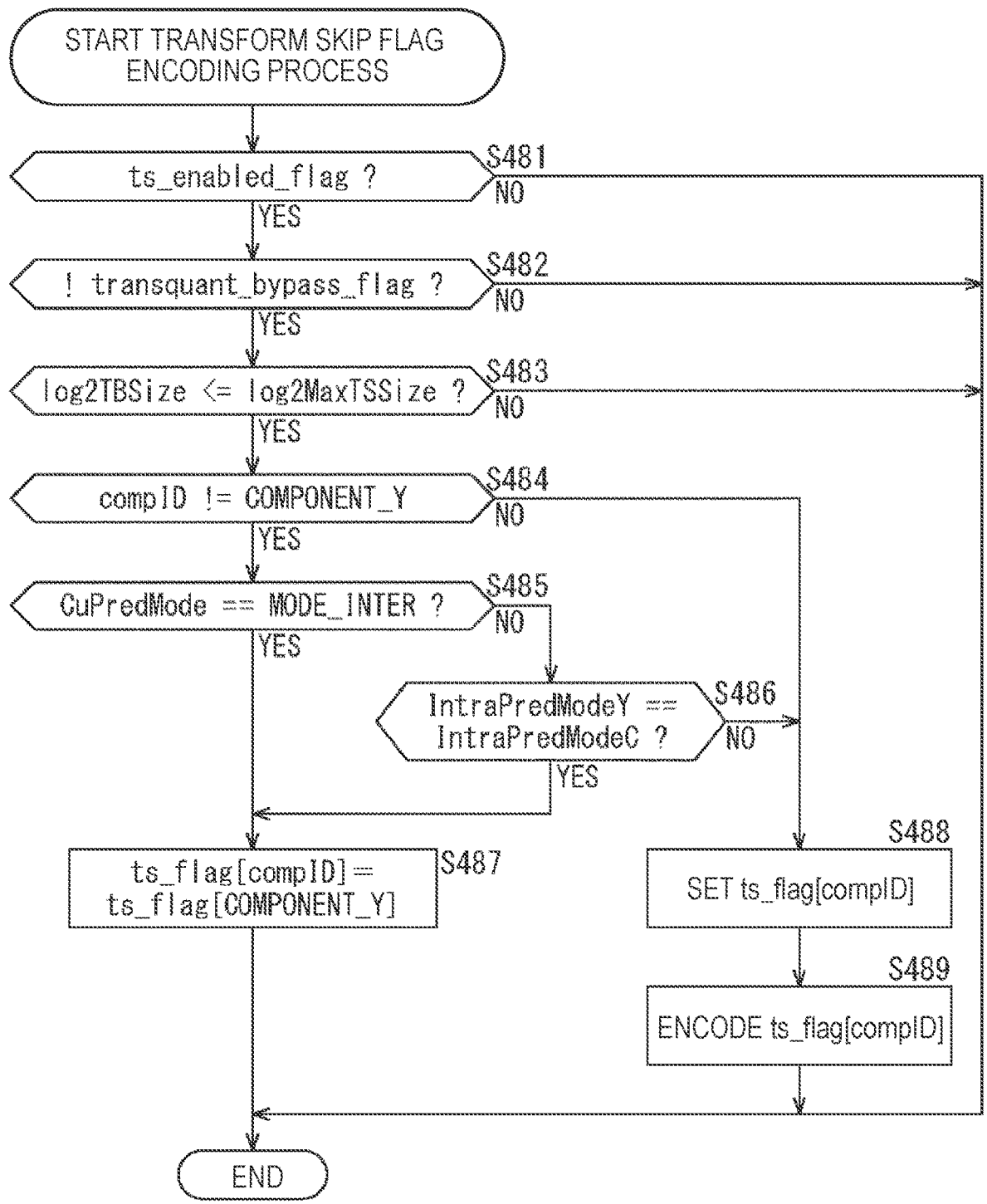
FIG. 61 is a flowchart describing an example of the flow of a transform skip flag encoding process.

An example of the flow of the transform skip flag encoding process in that case will be described with reference to the flowchart of FIG. 61. Each of the processes of Step S481 to Step S486 is executed similarly to each of the processes of Step S261 to Step S266 of FIG. 33.

That is, in a case in which the processing object is determined to be a chrominance in Step S484 and the prediction type is determined to be inter prediction in Step S485 or determined to be intra prediction in Step S485, and a case in which the prediction modes for luminance and the chrominance match each other in Step S486, the process proceeds to Step S487. In Step S487, the control unit 411 sets the value of the transform skip flag ts_flag[compID] of the chrominance to the value of the transform skip flag ts_flag[COMPONENT_Y] of luminance (ts_flag[compID]==ts_flag[COMPONENT_Y]). When the process of Step S487 ends, the transform skip flag encoding process ends. That is, in this case, also in the case of intra prediction in which the prediction modes for luminance and the chrominance match each other as well as under the condition of <Modified example 1>, the tendencies of the residual signals are similar, and thus, the transform skip flag ts_flag[compID] is not signaled.

On the other hand, in a case in which the processing object is determined to be luminance (compID==COMPONENT_Y) in Step S484 or a case in which the prediction type is determined to be intra prediction in which the prediction modes for luminance and the chrominance do not match each other in Step S486, the process proceeds to Step S488. In Step S488, the control unit 411 sets an arbitrary value for the transform skip flag ts_flag[compID]. Then, in Step S489, the control unit 411 supplies the transform skip flag ts_flag[compID] to the encoding unit 415 to cause the flag to be encoded. When the process of Step S489 ends, the transform skip flag encoding process ends. That is, in this case, the transform skip flag ts_flag[compID] of luminance and the transform skip flag ts_flag[compID] of the transform block for intra prediction in which the prediction modes for luminance and the chrominance do not match each other are signaled (transmitted). The decoding side can obtain the transform skip flag ts_flag[compID] through extraction and decoding using a bit stream.

That is, in the case of <Modified example 2>, the transform skip flag ts_flag of luminance and the transform skip flag ts_flag of the transform block for intra prediction in which the prediction modes for luminance and the chrominance do not match each other are signaled, and other transform skip flags ts_flag are not signaled. In this manner, transmission (encoding and decoding) of the transform skip flag ts_flag of the chrominance can be omitted only in the case of the inter prediction mode in which the tendencies of the residual signals are similar, and thus deterioration in coding efficiency can be curbed. In addition, an increase in a load of encoding and decoding can be curbed as well.

Modified Example 3

In addition, in the case in which the prediction type of the coding block to which the transform block to be processed belongs is inter prediction as in the row of No. #4 of FIG. 27 or intra prediction of which the prediction mode is intra block copy, for example, the value of the transform skip flag ts_flag[compID] of the chrominance may be set to the value of the transform skip flag ts_flag[COMPONENT_Y] of luminance, in the case in which the prediction type of the coding block is intra prediction in which the prediction modes for luminance and the chrominance do not match each other, the transform skip flag ts_flag[compID] of the chrominance may be signaled (i.e., the transform skip flag ts_flag[compID] of the chrominance can be decoded from the encoded data).

Figure 62:
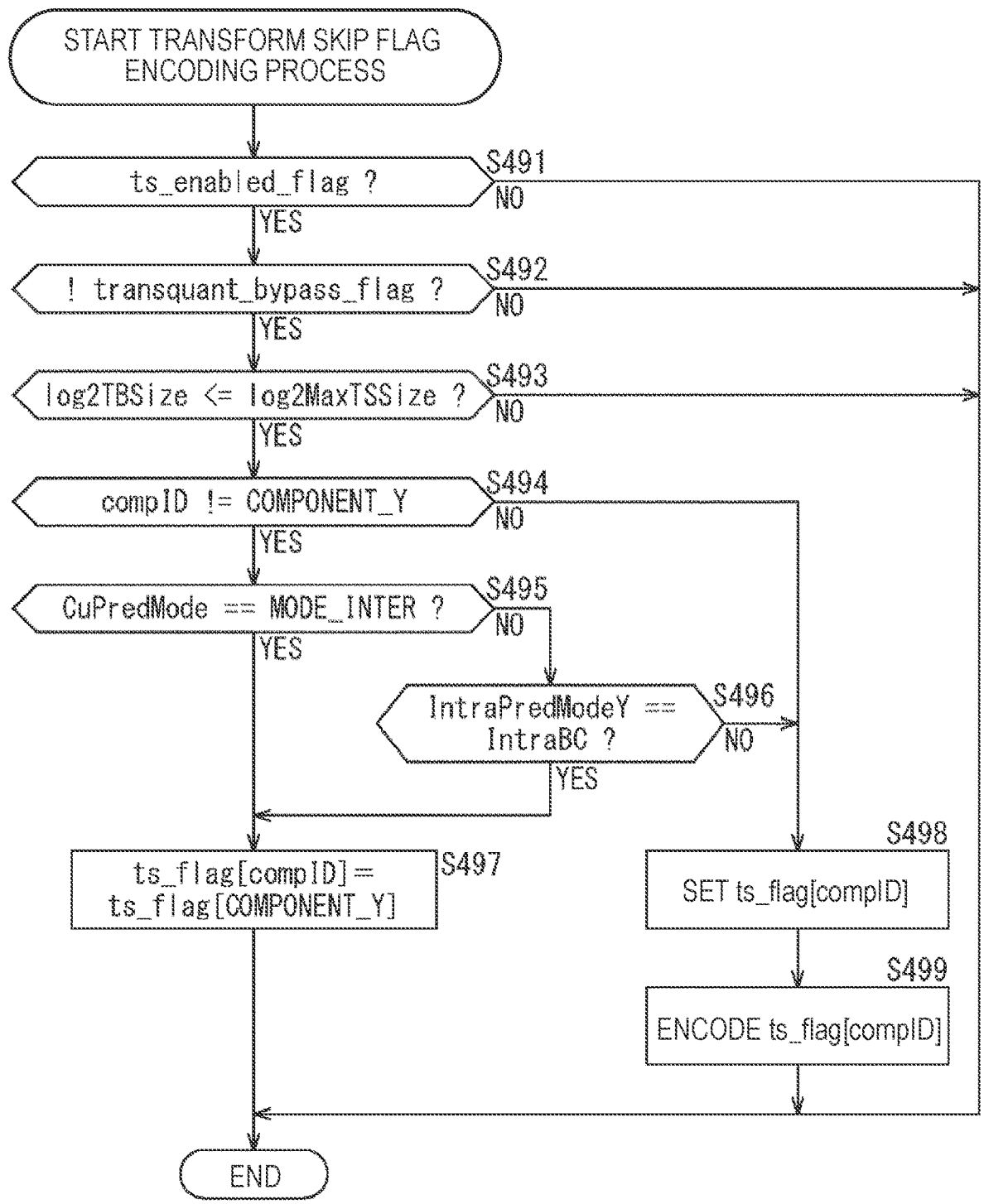
FIG. 62 is a flowchart describing an example of the flow of a transform skip flag encoding process.

An example of the flow of the transform skip flag encoding process in that case will be described with reference to the flowchart of FIG. 62. Each of the processes of Step S491 to Step S496 is executed similarly to each of the processes of Step S271 to Step S276 of FIG. 35.

That is, in a case in which the processing object is determined to be a chrominance in Step S494 and the prediction type is determined to be inter prediction in Step S495 or a case in which the prediction type is determined to be intra prediction of which the prediction mode is intra block copy in Step S495 and Step S496, the process proceeds to Step S497. In Step S497, the control unit 411 sets the value of the transform skip flag ts_flag[compID] of the chrominance to the value of the transform skip flag ts_flag[COMPONENT_Y] of luminance (ts_flag[compID]== ts_flag[COMPONENT_Y]). When the process of Step S497 ends, the transform skip flag encoding process ends. That is, in this case, also in the case of intra prediction of which the prediction mode is intra block copy as well as under the condition of <Modified example 1>, the tendencies of the residual signals are similar, and thus, the transform skip flag ts_flag[compID] is not signaled.

On the other hand, in a case in which the processing object is determined to be luminance (compID==COMPONENT_Y) in Step S494 or a case in which the prediction type is determined to be intra prediction of which the prediction mode is not intra block copy in Step S495 and Step S496, the process proceeds to Step S498. In Step S498, the control unit 411 sets an arbitrary value for the transform skip flag ts_flag[compID]. Then, in Step S499, the control unit 411 supplies the transform skip flag ts_flag[compID] to the encoding unit 415 to cause the flag to be encoded. When the process of Step S489 ends, the transform skip flag encoding process ends. That is, in this case, the transform skip flag ts_flag[compID] of luminance and the transform skip flag ts_flag[compID] of the transform block for intra prediction of which the prediction mode is not intra block copy are signaled (transmitted). The decoding side can obtain the transform skip flag ts_flag[compID] through extraction and decoding using a bit stream.

That is, in the case of <Modified example 3>, the transform skip flag ts_flag of luminance and the transform skip flag ts_flag of the transform block for intra prediction of which the prediction mode is not intra block copy are signaled, and other transform skip flags ts_flag are not signaled. In this manner, transmission (encoding and decoding) of the transform skip flag ts_flag of the chrominance can be omitted only in the case of the inter prediction mode in which the tendencies of the residual signals are similar, and thus deterioration in coding efficiency can be curbed. In addition, an increase in a load of encoding and decoding can be curbed as well.

Modified Example 4

In addition, in the case in which the chrominance transform skip information inference flag chroma_ts_info_infer_flag is 1 (true) as in the row of No. #5 of FIG. 27, for example, the value of the transform skip flag ts_flag[compID] of the chrominance may be set to the value of the transform skip flag ts_flag[COMPONENT_Y] of luminance, and in the case in which the chrominance transform skip information inference flag chroma_ts_info_infer_flag is 0 (false), the transform skip flag ts_flag[compID] of the chrominance may be signaled (i.e., the transform skip flag ts_flag[compID] of the chrominance can be decoded from the encoded data).

Figure 63:
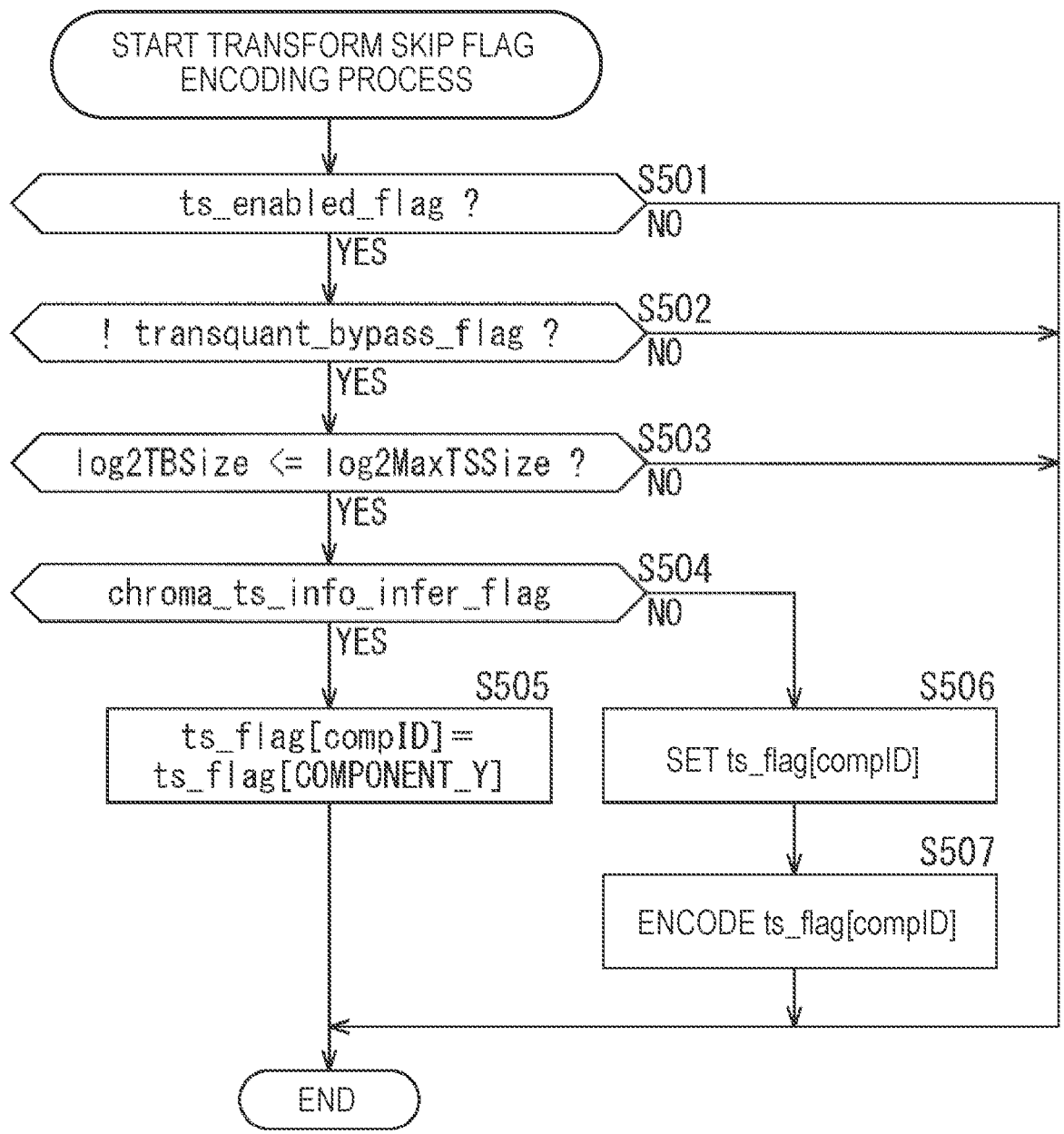
FIG. 63 is a flowchart describing an example of the flow of a transform skip flag encoding process.

An example of the flow of the transform skip flag encoding process in that case will be described with reference to the flowchart of FIG. 63. Each of the processes of Step S501 to Step S504 is executed similarly to each of the processes of Step S281 to Step S284 of FIG. 38.

That is, in a case in which the chrominance transform skip information inference flag chroma_ts_info_infer_flag is determined to be true in Step S504, the process proceeds to Step S505. In Step S505, the control unit 411 sets the value of the transform skip flag ts_flag[compID] of the chrominance to the value of the transform skip flag ts_flag[COMPONENT_Y] of luminance (ts_flag[compID]==ts_flag [COMPONENT_Y]). When the process of Step S4505 ends, the transform skip flag encoding process ends.

On the other hand, the chrominance transform skip information inference flag chroma_ts_info_infer_flag is determined to be false Step S504, the process proceeds to Step S506. In Step S506, the control unit 411 sets an arbitrary value for the transform skip flag ts_flag[compID]. Then, the control unit 411 supplies the transform skip flag ts_flag [compID] to the encoding unit 415 and causes the flag to be encoded in Step S507. When the process of Step S507 ends, the transform skip flag encoding process ends.

That is, in the case of <Modified example 4>, whether or not to signal the transform skip flag ts_flag[compID] is explicitly controlled by using the chrominance transform skip information inference flag chroma_ts_info_infer_flag. Therefore, it is possible to easily make the value of the transform skip flag of luminance used only in a case in which a sufficiently large effect can be obtained, and thus deterioration in coding efficiency can be further curbed. In addition, an increase in a load of encoding and decoding can be curbed as well.

7. Sixth Embodiment

<st_idx>

As in the case of decoding, a secondary transform identifier st_idx indicating which (inverse) secondary transform is to be applied may be included in information regarding an (inverse) orthogonal transform. By deriving a secondary transform identifier chroma_st_idx of a chrominance (common for Cb and Cr) on the basis of a secondary transform identifier st_idx[Y] of luminance, for example, an increase in overhead of the code amount of the syntax by which the chrominance (Cb or Cr) is signaled can be curbed as well.

Basic Example 1

For example, a secondary transform identifier st_idx of a chrominance may be inferred from a secondary transform identifier st_idx of luminance at all times as indicated in the row of No. #1 of FIG. 39. For example, the secondary transform identifier chroma_st_idx of the chrominance may be set to the value of secondary transform identifier st_idx of luminance.

In this case, the control unit 411 executes the secondary transform identifier encoding process for the chrominance and controls encoding of the secondary transform identifier chroma_st_idx for the chrominance. An example of the flow of the secondary transform identifier encoding process for the chrominance will be described with reference to the flowchart of FIG. 64.

Figure 64:
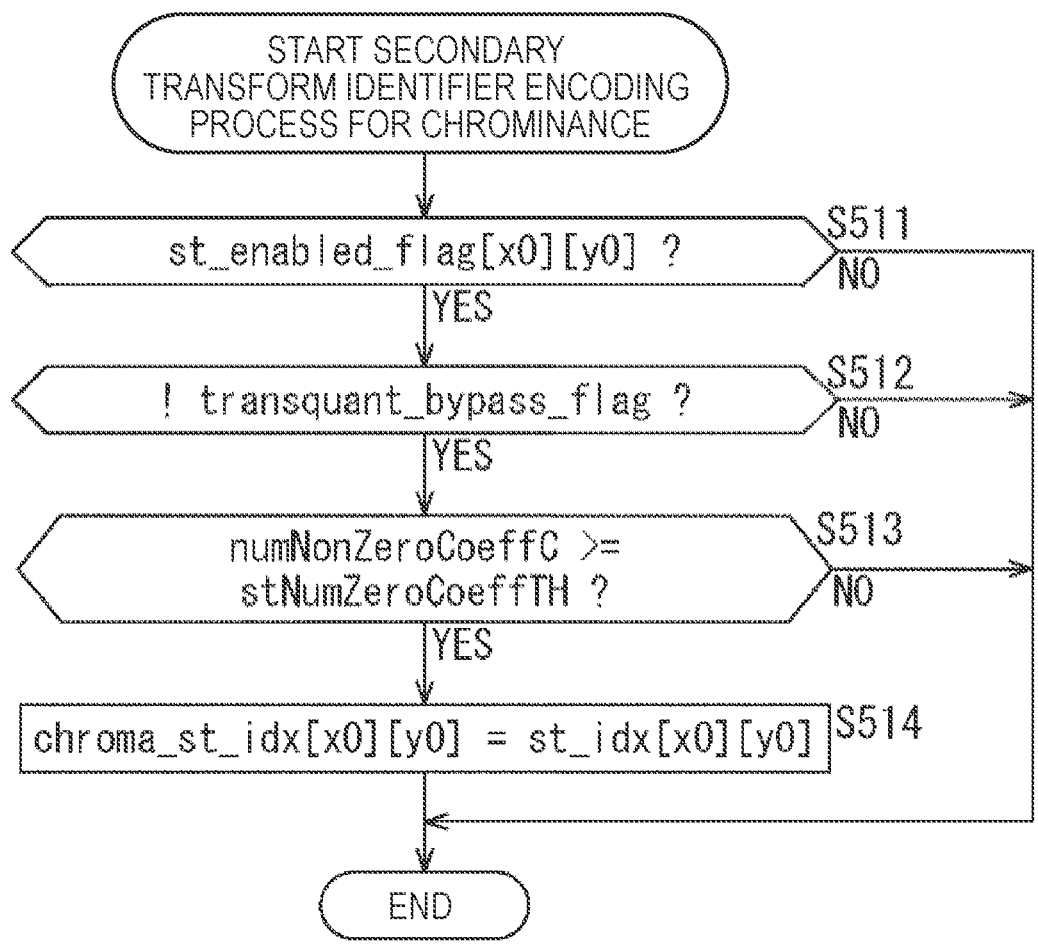
FIG. 64 is a flowchart describing an example of the flow of a secondary transform identifier encoding process for a chrominance.

When the secondary transform identifier encoding process for the chrominance is started, each of the processes of Step S511 to Step S514 of FIG. 64 is executed similarly to each of the processes of Step S291 to Step S294 of the chrominance secondary transform identifier encoding process of FIG. 42.

In this manner, transmission (encoding and decoding) of the secondary transform identifier chroma ts_flag of the chrominance can be omitted, and thus deterioration in coding efficiency can be curbed. In addition, an increase in a load of encoding and decoding can be curbed as well.

Modified Example 1

In the case in which the prediction type of the coding block to which the transform block to be processed belongs is inter prediction, the value of the secondary transform identifier chroma_st_idx of the chrominance may be set to the value of the secondary transform identifier st_idx of luminance as described with reference to the row of No. #2 of FIG. 39, and in the case in which the prediction type of the coding block is intra prediction, the secondary transform identifier chroma_st_idx of the chrominance may be signaled (i.e., the secondary transform identifier chroma_st_idx of the chrominance can be decoded from the encoded data).

In this case, the control unit 411 executes the secondary transform identifier encoding process for the chrominance and controls encoding of the secondary transform identifier chroma_st_idx of the chrominance. An example of the flow of the secondary transform identifier encoding process for the chrominance will be described with reference to the flowchart of FIG. 65.

Figure 65:
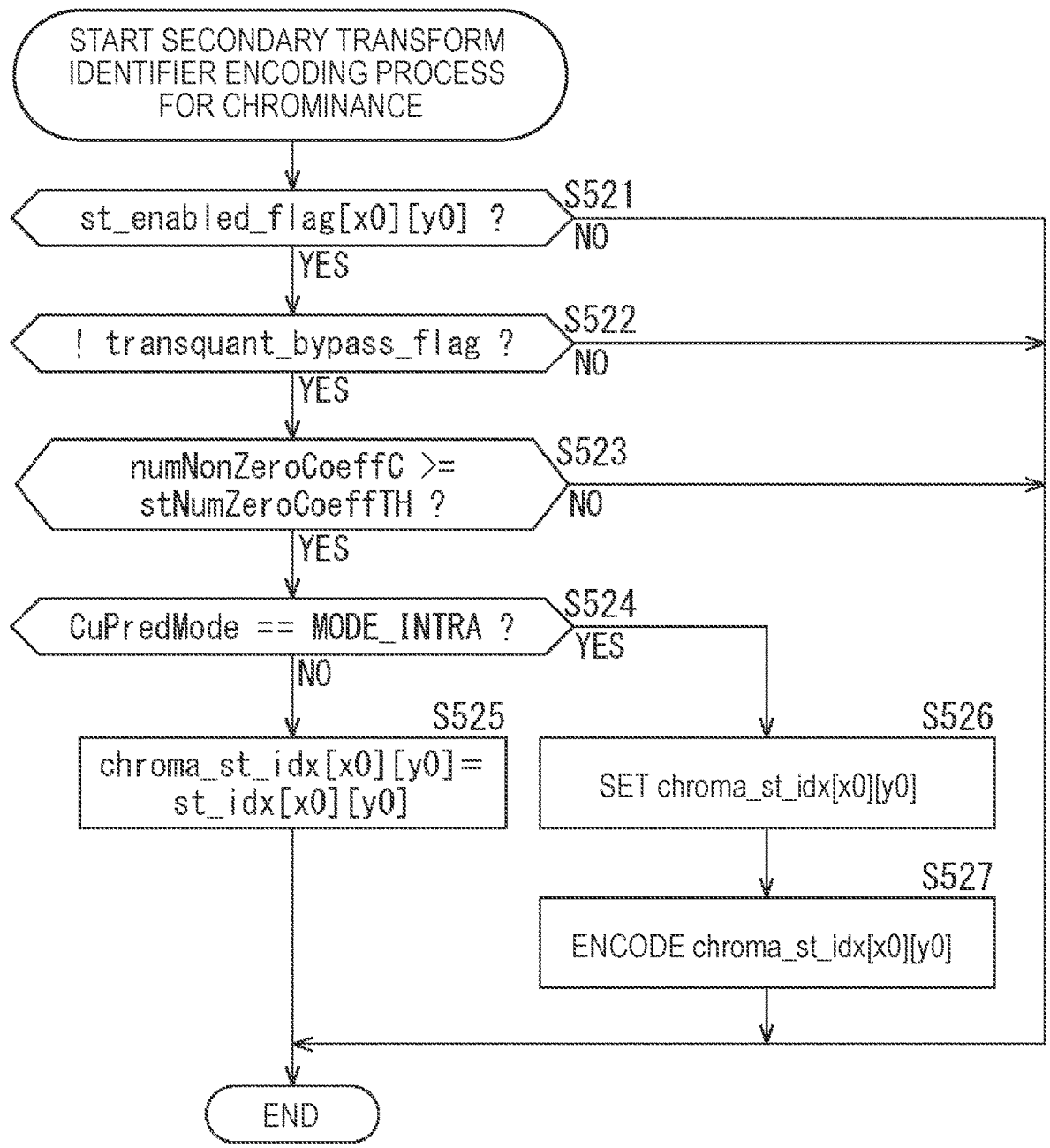
FIG. 65 is a flowchart describing an example of the flow of a secondary transform identifier encoding process for a chrominance.

When the secondary transform identifier encoding process for the chrominance is started, each of the processes of Step S521 to Step S524 of FIG. 65 is executed similarly to each of the processes of Step S301 to Step S304 of the chrominance secondary transform identifier encoding process of FIG. 44.

That is, in a case in which the prediction type is determined to be inter prediction in Step S524, the process proceeds to Step S525. In Step S525, the control unit 411 sets the value of the secondary transform identifier chroma_st_idx of the chrominance to the value of the secondary transform identifier st_idx of luminance (chroma_st_idx==st_idx). When the process of Step S525 ends, the secondary transform identifier encoding process for the chrominance ends. That is, in this case, the decoding side can similarly derive the secondary transform identifier chroma_st_idx of the transform block in the case of the chrominance and inter prediction from the secondary transform identifier st_idx of luminance, and thus the identifier is not signaled.

On the other hand, in a case in which the prediction type is determined to be intra prediction in Step S524, the process proceeds to Step S526. In Step S526, the control unit 411 sets an arbitrary value for the secondary transform identifier chroma_st_idx of the chrominance. Then, in Step S527, the control unit 411 supplies the secondary transform identifier chroma_st_idx of the chrominance to the encoding unit 415 to cause the identifier to be encoded. When the process of Step S527 ends, the secondary transform identifier encoding process for the chrominance ends. That is, in this case, the secondary transform identifier chroma_st_idx of the chrominance of the transform block for intra prediction is signaled (transmitted). The decoding side can obtain the secondary transform identifier chroma_st_idx of the chrominance through extraction and decoding using a bit stream.

In this manner, transmission (encoding and decoding) of the secondary transform identifier chroma_st_idx of the chrominance can be omitted only in the case of the inter prediction mode in which the tendencies of the residual signals are similar, and thus deterioration in coding efficiency can be curbed. In addition, an increase in a load of encoding and decoding can be curbed as well.

Modified Example 2

In addition, in the case in which the prediction type of the coding block to which the transform block to be processed belongs is inter prediction or intra prediction in which the prediction modes for luminance and the chrominance match each other as in the row of No. #3 of FIG. 39, for example, the value of the secondary transform identifier chroma_st_idx of the chrominance is set to the value of the secondary transform identifier st_idx of luminance. In addition, in the case in which the prediction type of the coding block is intra prediction in which the prediction modes for luminance and the chrominance do not match each other, the secondary transform identifier chroma_st_idx of the chrominance may be signaled (i.e., the secondary transform identifier chroma st_idx of the chrominance can be decoded from the encoded data).

Figure 66:
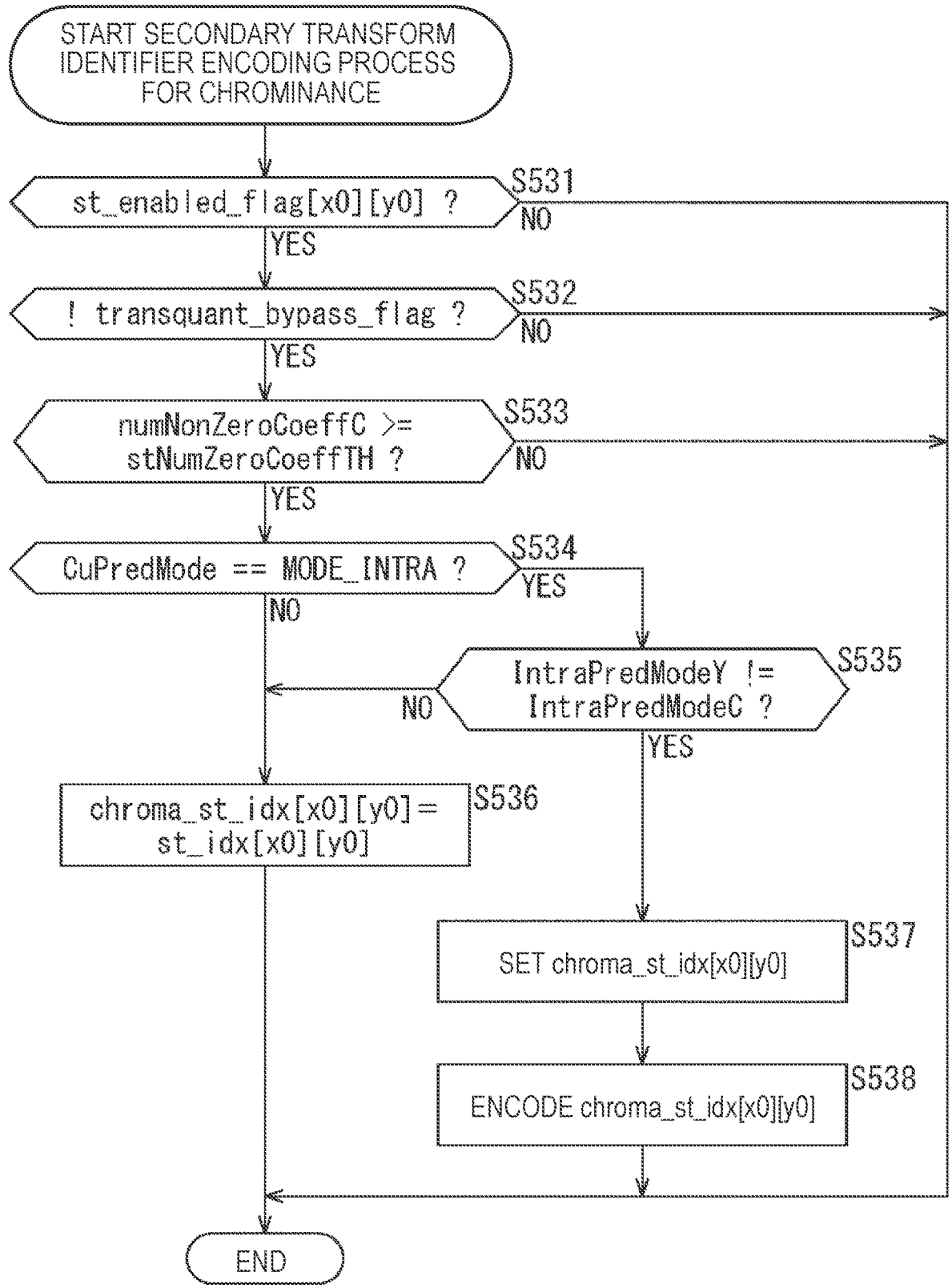
FIG. 66 is a flowchart describing an example of the flow of a secondary transform identifier encoding process for a chrominance.

An example of the flow of the secondary transform identifier encoding process for the chrominance will be described with reference to the flowchart of FIG. 66. Each of the processes of Step S531 to Step S535 is executed similarly to each of the processes of Step S311 to Step S315 of FIG. 46.

That is, in a case in which it is determined that the prediction type is inter prediction in Step S534, or a case in which the prediction type is determined to be intra prediction in which the prediction modes for luminance and the chrominance match each other in Step S534 and S535, the process proceeds to Step S536. In Step S536, the control unit 411 sets the value of the secondary transform identifier chroma_st_idx of the chrominance to the value of the secondary transform identifier st_idx of luminance (chroma_st_idx=st_idx). When the process of Step S536 ends, the secondary transform identifier encoding process for the chrominance ends. That is, also in the case of intra prediction in which the prediction modes for luminance and the chrominance match each other as well as under the condition of <Modified example 1>, the tendencies of the residual signals are similar, and thus the secondary transform identifier chroma_st_idx of the chrominance may not be signaled.

On the other hand, in a case in which the prediction type is determined to be intra prediction in which the prediction modes for luminance and the chrominance do not match each other in Step S535 (compID!=COMPONENT_Y), the process proceeds to Step S537. In Step S537, the control unit 411 sets an arbitrary value for secondary transform identifier chroma_st_idx of the chrominance. Then, in Step S538, the control unit 411 supplies the secondary transform identifier chroma_st_idx of the chrominance to the encoding unit 415 to cause the identifier to be encoded. When the process of Step S538 ends, the secondary transform identifier encoding process for the chrominance ends.

In this manner, transmission (encoding and decoding) of the secondary transform identifier chroma_st_idx of the chrominance can be omitted only in the case of the prediction mode in which the tendencies of the residual signals are similar, and thus deterioration in coding efficiency can be curbed. In addition, an increase in a load of encoding and decoding can be curbed as well.

Modified Example 3

In addition, in the case in which the prediction type of the coding block to which the transform block to be processed belongs is inter prediction or intra prediction of which the prediction mode is intra block copy as in the row of No. #4 of FIG. 39, for example, the value of the secondary transform identifier chroma_st_idx of the chrominance is set to the value of the secondary transform identifier st_idx of luminance. In addition, in the case in which the prediction type is intra prediction of which the prediction mode is not intra block copy, the secondary transform identifier chroma_st_idx of the chrominance may be signaled (i.e., the secondary transform identifier chroma_st_idx of the chrominance can be decoded from the encoded data).

Figure 67:
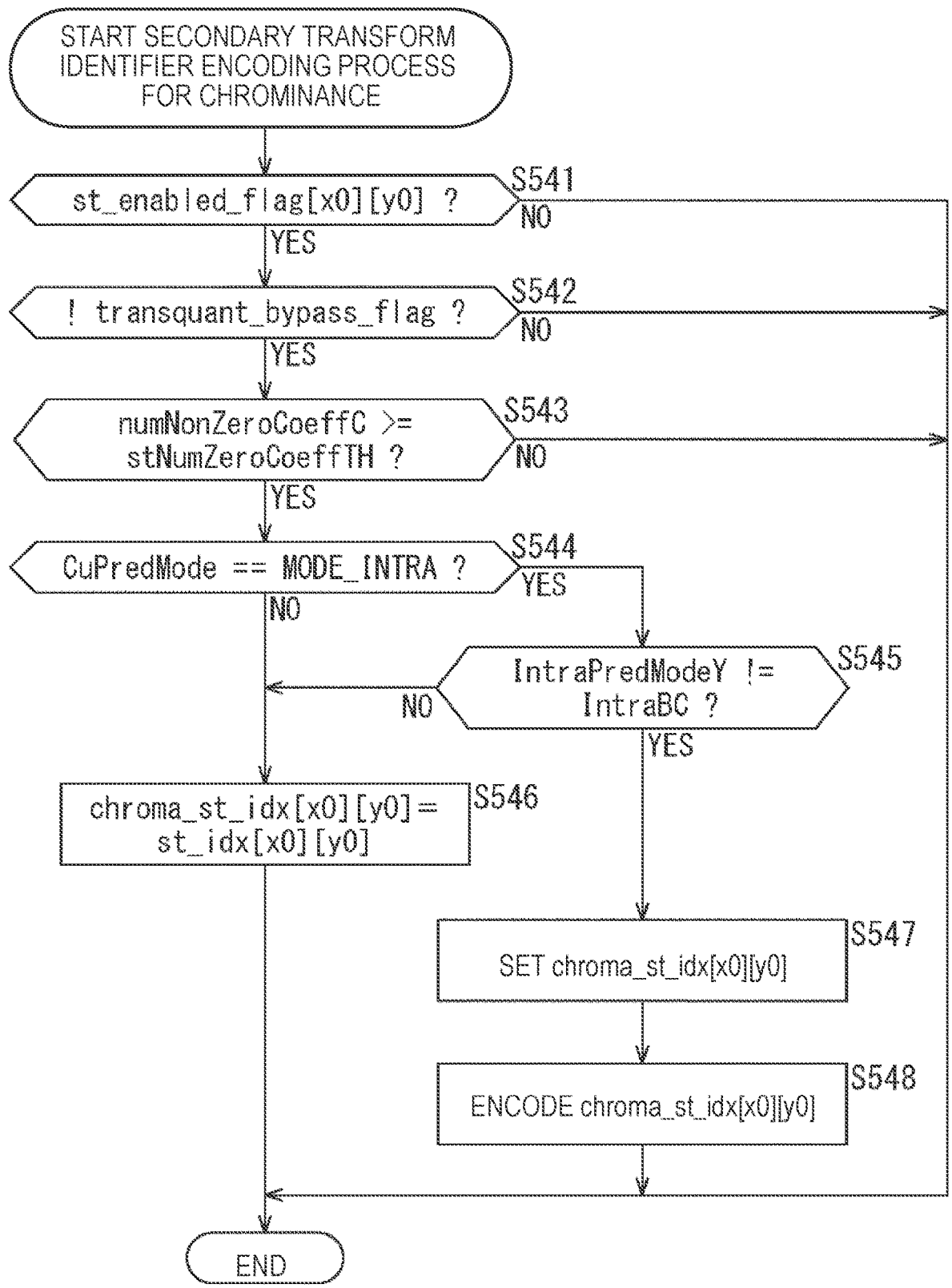
FIG. 67 is a flowchart describing an example of the flow of a secondary transform identifier encoding process for a chrominance.

An example of the flow of the secondary transform identifier encoding process for the chrominance will be described with reference to the flowchart of FIG. 67. Each of the processes of Step S541 to Step S545 is executed similarly to each of the processes of Step S321 to Step S325 of FIG. 48.

That is, in a case in which it is determined that the prediction type is inter prediction in Step S544, or a case in which the prediction type is determined to be intra prediction of which the prediction mode is intra block copy in Step S544 and S545, the process proceeds to Step S546. In Step S546, the control unit 411 sets the value of the secondary transform identifier chroma_st_idx of the chrominance to the value of the secondary transform identifier st_idx of luminance (chroma_st_idx=st_idx). When the process of Step S546 ends, the secondary transform identifier encoding process for the chrominance ends. That is, also in the case of intra prediction of which the prediction mode is intra block copy as well as under the condition of <Modified example 1>, the tendencies of the residual signals are similar, and thus the secondary transform identifier chroma_st_idx of the chrominance may not be signaled.

On the other hand, in a case in which the prediction type is determined to be intra prediction of which the prediction mode is not intra block copy in Step S545, the process proceeds to Step S547. In Step S547, the control unit 411 sets an arbitrary value for secondary transform identifier chroma_st_idx of the chrominance. Then, in Step S548, the control unit 411 supplies the secondary transform identifier chroma_st_idx of the chrominance to the encoding unit 415 to cause the identifier to be encoded. When the process of Step S548 ends, the secondary transform identifier encoding process for the chrominance ends.

In this manner, transmission (encoding and decoding) of the secondary transform identifier chroma_st_idx of the chrominance can be omitted only in the case of the prediction mode in which the tendencies of the residual signals are similar, and thus deterioration in coding efficiency can be curbed. In addition, an increase in a load of encoding and decoding can be curbed as well.

Modified Example 5

In addition, as in the row of No. #5 of FIG. 39, for example, in the case in which the chrominance secondary transform identifier inference flag chroma_st_idx_infer_flag is 1 (true), the value of the secondary transform identifier chroma_st_idx of the chrominance may be set to the value of the secondary transform identifier st_idx of luminance, and in the case in which the chrominance secondary transform identifier inference flag chroma_st_idx_infer_flag is 0 (false), the secondary transform identifier chroma_st_idx of the chrominance may be signaled (i.e., the secondary transform identifier chroma_st_idx of the chrominance can be decoded from the encoded data).

Figure 68:
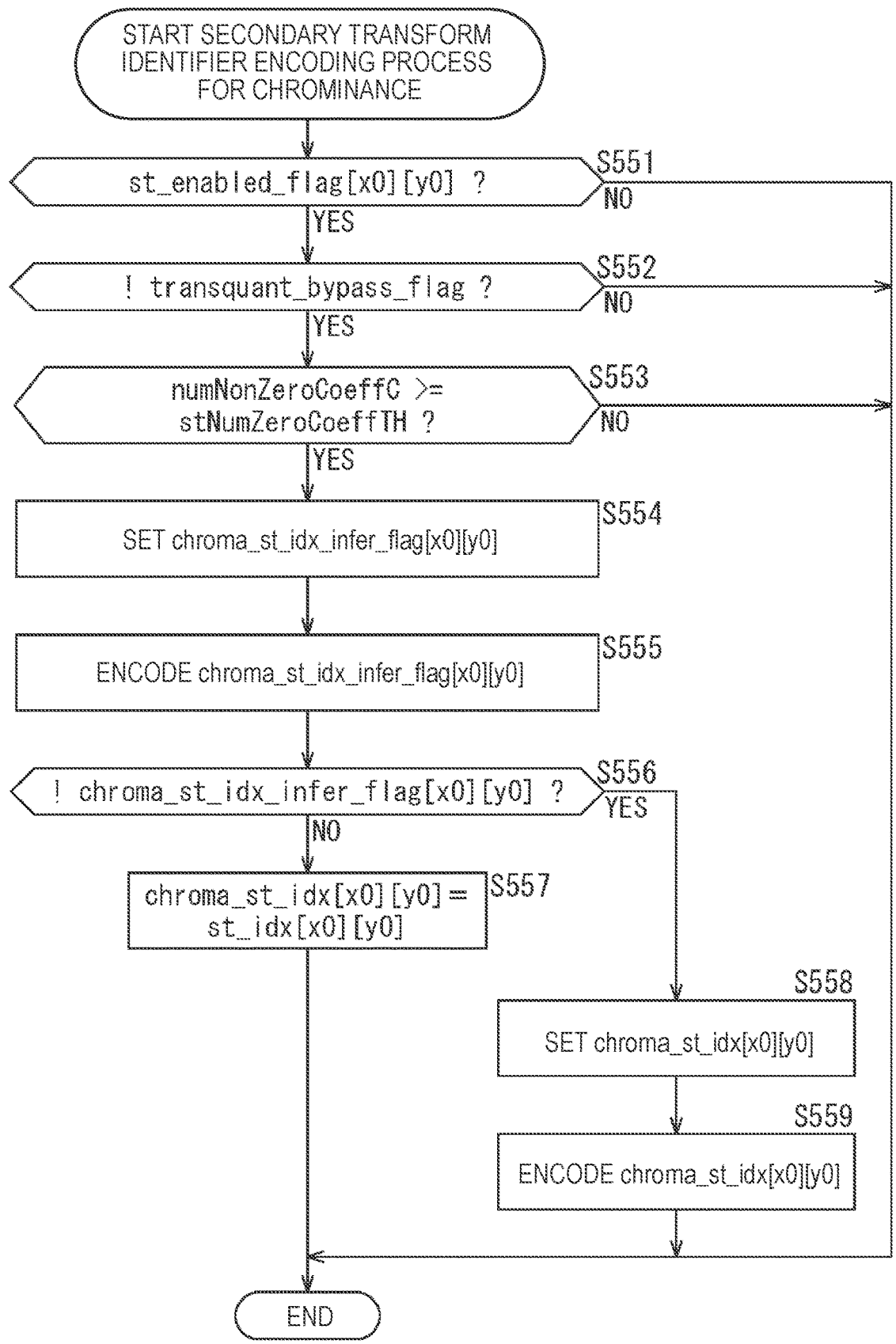
FIG. 68 is a flowchart describing an example of the flow of a secondary transform identifier encoding process for a chrominance.

An example of the flow of the chrominance secondary transform identifier inference flag encoding process in that case will be described with reference to the flowchart of FIG. 68. Each of the processes of Step S551 to Step S553 is executed similarly to each of the processes of Step S331 to Step S333 of FIG. 50.

That is, the control unit 411 sets the chrominance secondary transform identifier inference flag chroma_st_idx_infer_flag in Step S554 and supplies the chrominance secondary transform identifier inference flag chroma_st_idx_infer_flag to the encoding unit 415 so as to be encoded in Step S555.

In Step S556, the control unit 411 determines whether or not the value of the chrominance secondary transform identifier inference flag chroma_st_idx_infer_flag is true. In a case in which the value of the chrominance secondary transform identifier inference flag chroma_st_idx_infer_flag is determined to be true, the process proceeds to Step S557. In Step S557, the control unit 411 applies the secondary transform identifier st_idx for luminance to the secondary transform identifier chroma_st_idx of the chrominance.

In addition, in a case in which the value of the chrominance secondary transform identifier inference flag chroma_st_idx_infer_flag is determined to be false in Step S556, the process proceeds to Step S558. In Step S558, the control unit 411 sets the secondary transform identifier chroma_st_idx of the chrominance. In addition, in Step S559, the control unit 411 supplies the identifier to the encoding unit 415 to cause the identifier to be encoded. When the process of Step S559 ends, the transform skip flag encoding process ends.

That is, in the case of <Modified example 5>, whether or not to signal the secondary transform identifier chroma_st_idx of the chrominance is explicitly controlled using the chrominance secondary transform identifier inference flag. Therefore, it is possible to select a more effective method easily and reliably. Therefore, deterioration in coding efficiency can be further curbed. In addition, an increase in a load of encoding and decoding can be controlled as well.

8. Others

<Data Unit of Information>

A data unit by which information regarding an image and information regarding encoding and decoding of the image described above are set (or a data unit of target data) is arbitrary in each case and not limited to the above-described examples. For example, the information may be set in each of a transform unit (TU), a transform block (TB), a prediction unit (PU), a prediction block (PB), a coding unit (CU), a largest coding unit (LCU), a sub-block, a block, a tile, a slice, a picture, a sequence, or a component, or data of the data units may be targeted. Of course, a data unit is set for each piece of information. That is, all pieces of information may not be set (or targeted) in the same data unit. Note that a storage place of information is arbitrary, and information may be stored in the header of the above-described data unit, a parameter set, or the like. In addition, information may be stored in a plurality of places.

<Control Information>

Control information related to the present technology described in each of the above embodiments may be transmitted from the encoding side to the decoding side. For example, control information that controls whether or not to allow (or deny) the application of the present technology described above may be transmitted. Also, for example, control information that specifies an upper limit, a lower limit, or both of a block size that allows (or denies) the application of the present technology described above may be transmitted.

<Encoding and Decoding>

The present technology can be applied to arbitrary image encoding and decoding in which a primary transform and a secondary transform (an inverse secondary change and an inverse primary transform) are performed. That is, specifications of a transform (inverse transform), quantization (inverse quantization), encoding (decoding), prediction, and the like are arbitrary and are not limited to the above-described examples. For example, with respect to a transform (inverse transform), (inverse) transforms (i.e., three or more (inverse) transforms) other than an (inverse) primary transform and an (inverse) secondary transform may be performed. In addition, encoding (decoding) may be of a reversible method or an irreversible method. Furthermore, quantization (inverse quantization), prediction, or the like may be omitted. In addition, a process which is not described above such as a filtering process may be performed.

<Fields of Application of Present Technology>

The system, apparatus, processor, and the like to which the present technology is applied can be used in any fields, such as traffic, medical care, crime prevention, agriculture, livestock industry, mining industry, beauty, factory, household appliance, weather, natural surveillance, or the like.

In one example, the present technology is applicable to systems and devices that transmit an image provided for viewing. In addition, in one example, the present technology is applicable to systems and devices provided for traffic. Furthermore, in one example, the present technology is applicable to systems and devices provided for security. In addition, in one example, the present technology is applicable to systems and devices provided for sports. Furthermore, in one example, the present technology is applicable to systems and devices provided for agriculture. In addition, in one example, the present technology is applicable to systems and devices provided for livestock industry. Furthermore, in one example, the present technology is also applicable to systems and devices for monitoring conditions of natural such as volcanoes, forests, oceans, and the like. In addition, in one example, the present technology is applicable to weather observation systems and weather observation devices for observing weather, temperature, humidity, wind speed, sunshine duration, and the like. Furthermore, in one example, the present technology is also applicable to systems, devices, or the like for observing ecology of wildlife such as birds, fish, reptiles, amphibians, mammals, insects, plants, and the like.

<Application to Multi-View Image Encoding and Decoding System>

The series of processes described above can be applied to a multi-view image encoding and decoding system that performs encoding and decoding of multi-view images including images with a plurality of views (view). In this case, the present technology may be applied to encoding and decoding of each view (view).

<Application to Hierarchical Image Encoding and Decoding System>

In addition, the series of processes described above can be applied to a hierarchical image encoding (scalable encoding) and decoding system that performs encoding and decoding on hierarchical images that have been made into a plurality of layers (hierarchies) to have a scalability function with respect to a predetermined parameter. In this case, the present technology may be applied to encoding and decoding of each of the hierarchies (layers).

<Computer>

The series of processes described above can be executed by hardware, and can also be executed in software. In the case of executing the series of processes by software, a program forming the software is installed on a computer. Herein, the term computer includes a computer built into special-purpose hardware, a computer able to execute various functions by installing various programs thereon, such as a general-purpose personal computer, for example, and the like.

Figure 69:
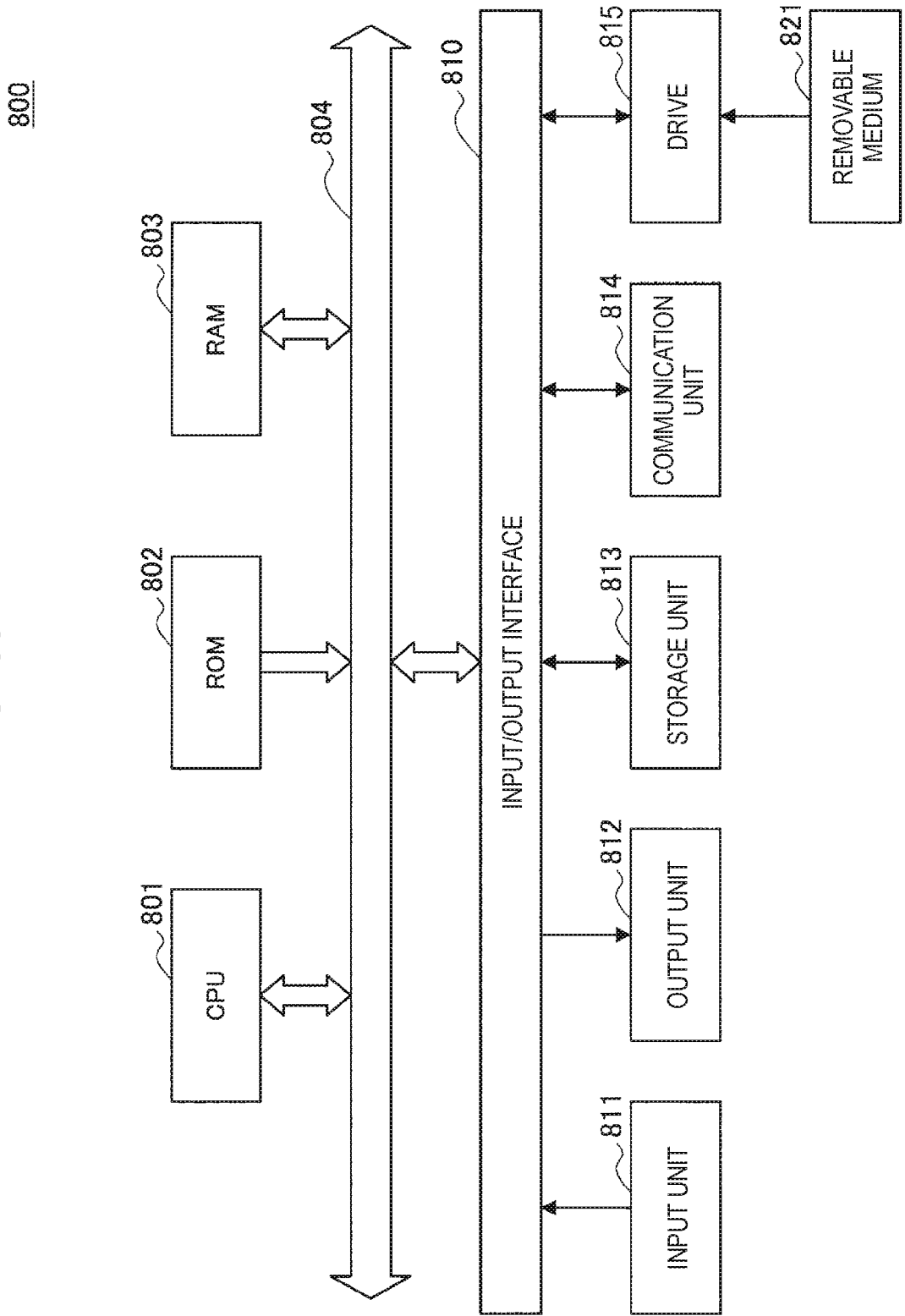
FIG. 69 is a block diagram illustrating a principal configuration example of a computer.

FIG. 69 is a block diagram illustrating an exemplary hardware configuration of a computer that executes the series of processes described above according to a program.

In the computer 800 illustrated in FIG. 69, a central processing unit (CPU) 801, read-only memory (ROM) 802, and random access memory (RAM) 803 are interconnected through a bus 804.

Additionally, an input/output interface 810 is also connected to the bus 804. An input unit 811, an output unit 812, a storage unit 813, a communication unit 814, and a drive 815 are connected to the input/output interface 810.

The input unit 811 includes a keyboard, a mouse, a microphone, a touch panel, an input terminal, and the like, for example. The output unit 812 includes a display, a speaker, an output terminal, and the like, for example. The storage unit 813 includes a hard disk, a RAM disk, non-volatile memory, and the like, for example. The communication unit 814 includes a network interface, for example. The drive 815 drives a removable medium 821 such as a magnetic disk, an optical disc, a magneto-optical disc, or semiconductor memory.

In a computer configured as above, the series of processes described above are performed by having the CPU 801 load a program stored in the storage unit 813 into the RAM 803 via the input/output interface 810 and the bus 804, and execute the program, for example. Additionally, data required for the CPU 801 to execute various processes and the like is also stored in the RAM 803 as appropriate.

The program executed by the computer (CPU 801) may be applied by being recorded onto the removable medium 821 as an instance of packaged media or the like, for example. In this case, the program may be installed in the storage unit 813 via the input/output interface 810 by inserting the removable medium 821 into the drive 815.

In addition, the program may also be provided via a wired or wireless transmission medium such as a local area network, the Internet, or digital satellite broadcasting. In this case, the program may be received by the communication unit 814 and installed in the storage unit 813.

Otherwise, the program may also be preinstalled in the ROM 802 or the storage unit 813.

<Application of Present Technology>

The image encoding apparatus 400 and the image decoding apparatus 100 according to the above-described embodiments can be applied to, for example, various electronic apparatuses such as: transmitters or receivers for satellite broadcasting, wired broadcasting such as cable TV, distribution on the Internet and distribution to terminals through cellular communication; recording devices which record images on media such as optical discs, magnetic disks, and flash memories; or reproduction devices which reproduce images from the foregoing storage media.

First Application Example: Television Receiver

Figure 70:
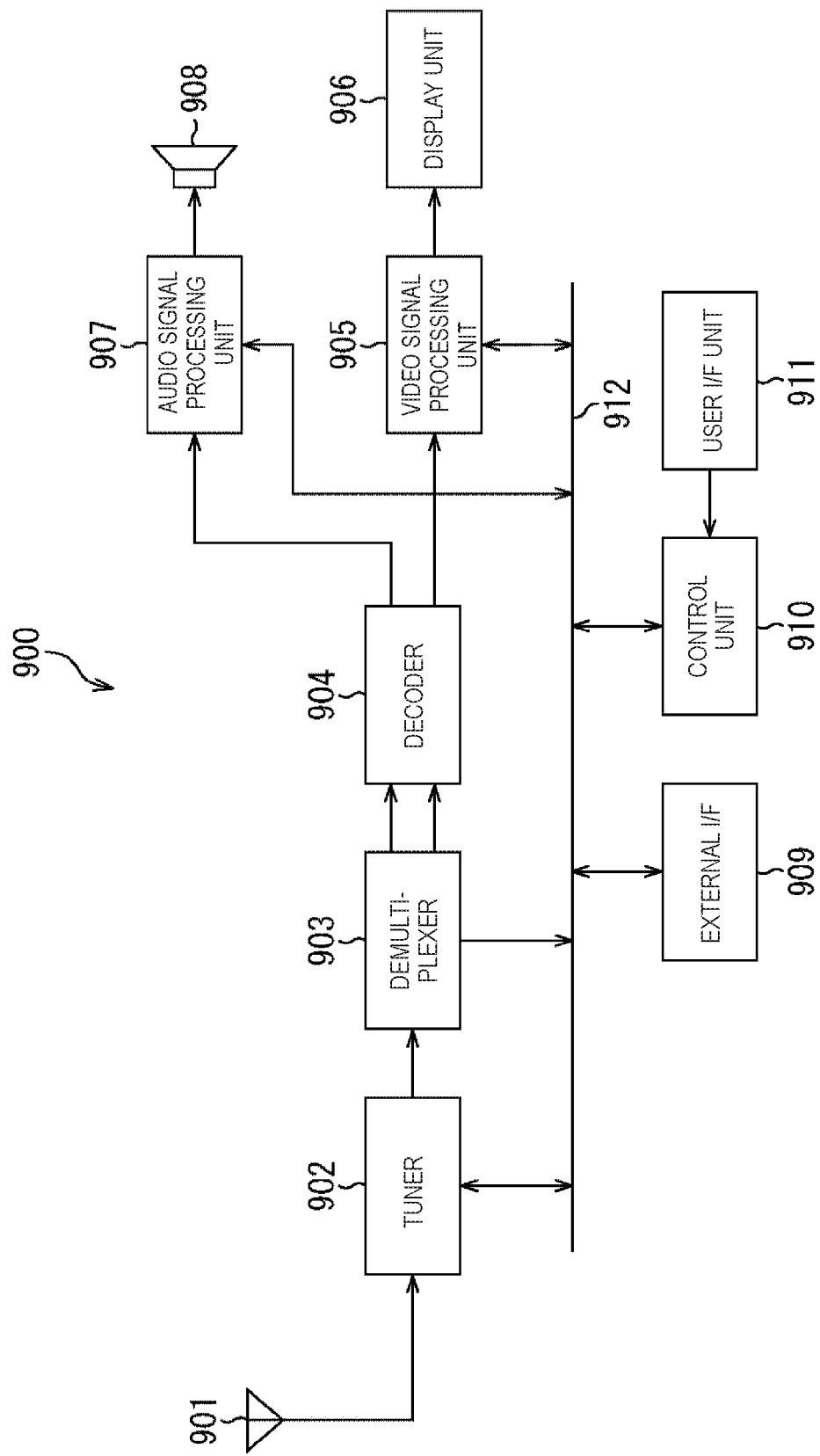
FIG. 70 is a block diagram illustrating an example of a schematic configuration of a television apparatus.

FIG. 70 illustrates an example of a schematic configuration of a television apparatus to which the above-described embodiment is applied. The television apparatus 900 has an antenna 901, a tuner 902, a demultiplexer 903, a decoder 904, a video signal processing unit 905, a display unit 906, an audio signal processing unit 907, a speaker 908, an external interface (I/F) unit 909, a control unit 910, a user interface (I/F) unit 911, and a bus 912.

The tuner 902 extracts a signal of a desired channel from a broadcasting signal received via the antenna 901 and demodulates the extracted signal. Then, the tuner 902 outputs an encoded bit stream obtained from the demodulation to the demultiplexer 903. That is, the tuner 902 plays a role as a transmission section of the television apparatus 900 which receives an encoded stream in which images are encoded.

The demultiplexer 903 demultiplexes a video stream and an audio stream of a program to be viewed from the encoded stream and outputs the demultiplexed streams to the decoder 904. In addition, the demultiplexer 903 extracts auxiliary data such as an electronic program guide (EPG) from the encoded bit stream and supplies the extracted data to the control unit 910. Note that, in the case where the encoded bit stream has been scrambled, the demultiplexer 903 may perform descrambling.

The decoder 904 decodes the video stream and the audio stream input from the demultiplexer 903. Then, the decoder 904 outputs video data generated from the decoding process to the video signal processing unit 905. In addition, the decoder 904 outputs audio data generated from the decoding process to the audio signal processing unit 907.

The video signal processing unit 905 reproduces the video data input from the decoder 904 to cause the display unit 906 to display a video. In addition, the video signal processing unit 905 may cause the display unit 906 to display an application screen supplied via a network. Furthermore, the video signal processing unit 905 may perform an additional process, for example, noise reduction, on the video data in accordance with a setting. Moreover, the video signal processing unit 905 may generate an image of a graphical user interface (GUI), for example, a menu, a button, or a cursor and superimpose the generated image on an output image.

The display unit 906 is driven with a driving signal supplied from the video signal processing unit 905 and displays a video or an image on a video plane of a display device (e.g., a liquid crystal display, a plasma display, an organic electroluminescence display (OLED), etc.).

The audio signal processing unit 907 performs a reproduction process including D/A conversion and amplification on the audio data input from the decoder 904 and causes the speaker 908 to output a sound. In addition, the audio signal processing unit 907 may perform an additional process such as noise removal on the audio data.

The external interface unit 909 is an interface for connecting the television apparatus 900 to an external apparatus or a network. For example, a video stream or an audio stream received via the external interface unit 909 may be decoded by the decoder 904. In other words, the external interface unit 909 also plays the role as a transmission sections of the television apparatus 900 which receives an encoded stream in which images are encoded.

The control unit 910 has a processor such as a CPU and a memory such as a RAM and a ROM. The memory stores a program executed by the CPU, program data, EPG data, and data acquired via a network. The program stored in the memory is read and executed by the CPU at the time of, for example, start-up of the television apparatus 900. The CPU controls operations of the television apparatus 900 by executing the program in response to, for example, operation signals input from the user interface section 911.

The user interface section 911 is connected to the control unit 910. The user interface section 911 includes, for example, buttons and switches with which a user operates the television apparatus 900, a reception unit for remote control signals, and the like. The user interface section 911 generates an operation signal by detecting an operation by a user via any aforementioned constituent element and outputs the generated operation signal to the control unit 910.

The bus 912 connects the tuner 902, the demultiplexer 903, the decoder 904, the video signal processing unit 905, the audio signal processing unit 907, the external interface unit 909, and the control unit 910 to one another.

In the television apparatus 900 configured in this way, the decoder 904 may also include the functions of the image decoding apparatus 100 described above. In other words, the decoder 904 may be configured to decode encoded data according to the method described in each of the above embodiments. In this manner, the television apparatus 900 can obtain similar effects to those of each of the embodiments described above with reference to FIG. 1 to FIG. 68.

Also, in the television apparatus 900 configured in this way, the video signal processing unit 905 may be able to encode image data provided from the decoder 904, and cause the obtained encoded data to be output externally to the television apparatus 900 through external interface unit 909. Additionally, the video signal processing unit 905 may also include the functions of the image encoding apparatus 400 described above. In other words, the video signal processing unit 905 may be configured to encode image data provided from the decoder 904 according to the method described in each of the above embodiments. With this arrangement, the television apparatus 900 becomes able to further decrease the amount of transmission related to the transmission (transmission) of parameters. In this manner, the television apparatus 900 can obtain similar effects to those of each of the embodiments described above with reference to FIG. 1 to FIG. 68.

Second Application Example: Mobile Telephone

Figure 71:
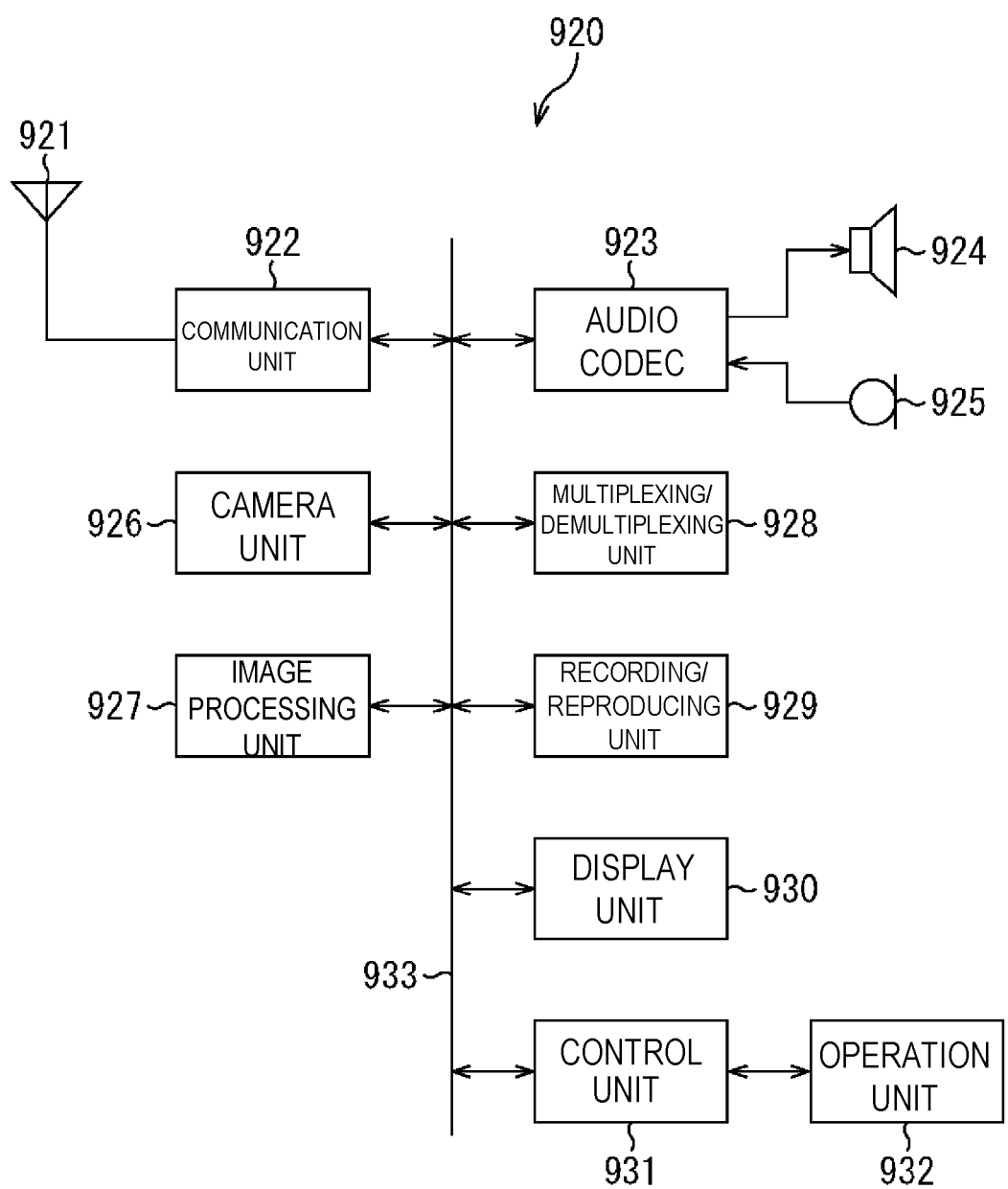
FIG. 71 is a block diagram illustrating an example of a schematic configuration of a mobile telephone.

FIG. 71 illustrates an example of a schematic configuration of a mobile telephone to which the above-described embodiments are applied. A mobile telephone 920 includes an antenna 921, a communication unit 922, an audio codec 923, a speaker 924, a microphone 925, a camera unit 926, an image processing unit 927, a multiplexing/demultiplexing unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the multiplexing/demultiplexing unit 928, the recording/reproducing unit 929, the display unit 930, and the control unit 931.

The mobile telephone 920 performs actions such as transmitting/receiving an audio signal, transmitting/receiving an electronic mail or image data, capturing an image, and recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, performs frequency conversion, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then supplies the generated audio signal to the speaker 924 to cause it to output the audio.

In the data communication mode, for example, the control unit 931 generates character data configuring an electronic mail, in accordance with a user operation detected through the operation unit 932. The control unit 931 further displays characters on the display unit 930. Moreover, the control unit 931 generates electronic mail data in accordance with an instruction to send it obtained from a user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not shown) through the antenna 921. The communication unit 922 further amplifies a radio signal received through the antenna 921, performs frequency conversion, and acquires a reception signal. The communication unit 922 thereafter demodulates and decodes the reception signal, restores the electronic mail data, and outputs the restored electronic mail data to the control unit 931. The control unit 931 displays the content of the electronic mail on the display unit 930 as well as supplies the electronic mail data to a storage medium of the recording/reproducing unit 929 to cause the data to be recorded in the medium.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB memory, or a memory card.

In the photography mode, for example, the camera unit 926 images an object to generate image data and outputs the generated image data to the image processing unit 927. The image processing unit 927 encodes the image data input from the camera unit 926 and supplies an encoded stream to the storage medium of the recording/reproducing unit 929 to cause the encoded stream to be recorded in the medium.

Furthermore, in the image display mode, the recording/reproducing unit 929 reads out an encoded stream recorded on a storage medium, and outputs to the image processing unit 927. The image processing unit 927 decodes the encoded stream input from the recording/reproducing unit 929, supplies image data to the display unit 930, and causes the image to be displayed.

In the videophone mode, for example, the multiplexing/demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 then transmits the generated transmission signal to the base station (not shown) through the antenna 921. Moreover, the communication unit 922 amplifies a radio signal received through the antenna 921, performs frequency conversion, and acquires a reception signal. The transmission signal and the reception signal can include an encoded bit stream. The communication unit 922 thus demodulates and decodes the reception signal to restore the stream, and outputs the restored stream to the multiplexing/demultiplexing unit 928. The multiplexing/demultiplexing unit 928 demultiplexes the video stream and the audio stream from the input stream and outputs the video stream and the audio stream to the image processing unit 927 and the audio codec 923, respectively. The image processing unit 927 decodes the video stream to generate video data. The video data is then supplied to the display unit 930, which displays a series of images. The audio codec 923 expands and performs D/A conversion on the audio stream to generate an analog audio signal. The audio codec 923 then supplies the generated audio signal to the speaker 924 to cause it to output the audio.

In the mobile telephone 920 configured in this way, the image processing unit 927 may include the functions of the image encoding apparatus 400 described above, for example. In other words, the image processing unit 927 may be configured to encode image data according to the method described in each of the above embodiments. In this manner, the mobile phone 920 can obtain similar effects to those of each of the embodiments described above with reference to FIG. 1 to FIG. 68.

In addition, in the mobile telephone 920 configured in this way, the image processing unit 927 may include the functions of the image decoding apparatus 100 described above, for example. In other words, the image processing unit 927 may be configured to decode encoded data according to the method described in each of the above embodiments. In this manner, the mobile phone 920 can obtain similar effects to those of each of the embodiments described above with reference to FIG. 1 to FIG. 68.

Third Application Example: Recording/Reproducing Apparatus

Figure 72:
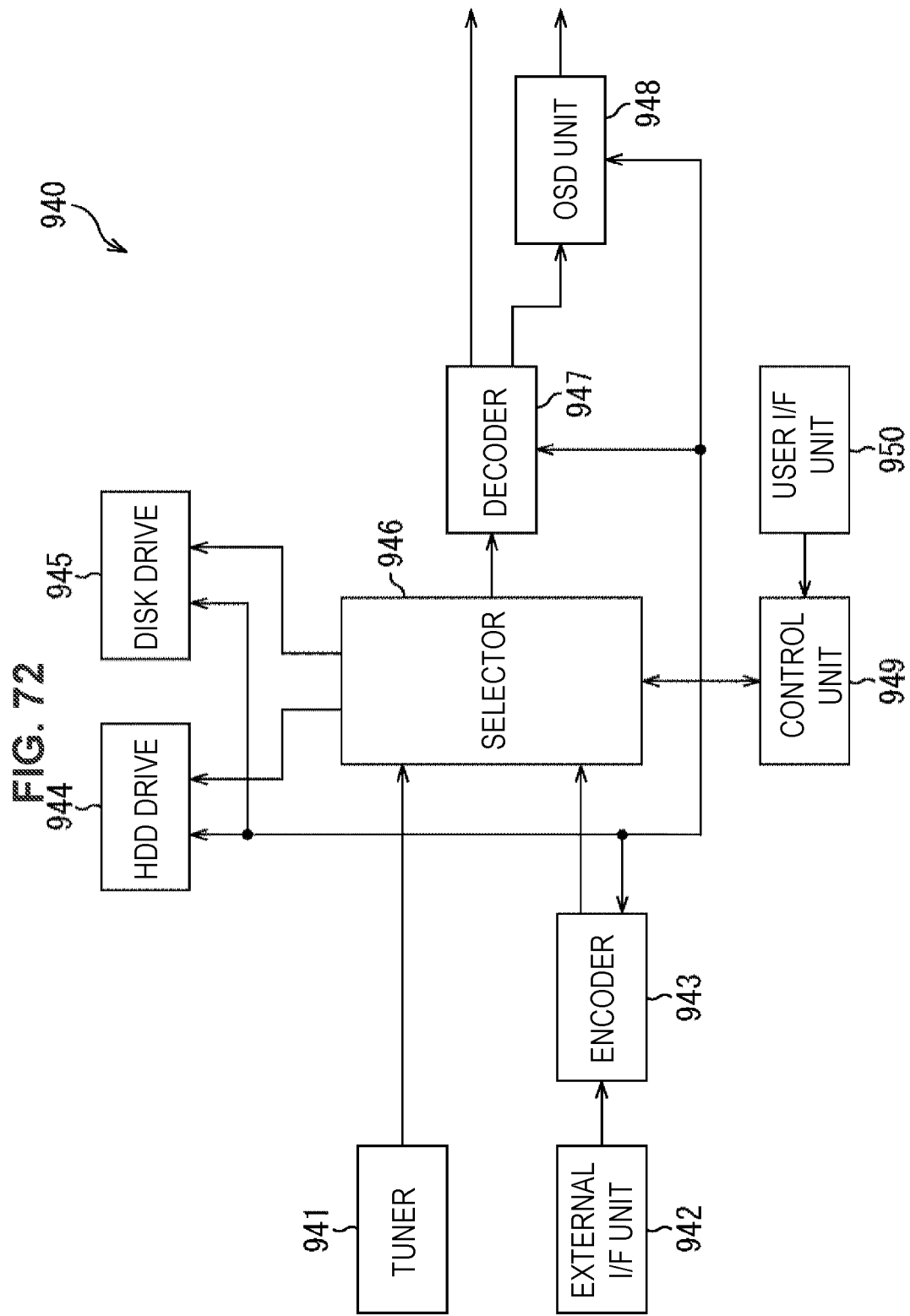
FIG. 72 is a block diagram illustrating an example of a schematic configuration of a recording/reproducing apparatus.

FIG. 72 illustrates an example of a schematic configuration of a recording/reproducing apparatus to which the above-described embodiments are applied. The recording/reproducing apparatus 940 encodes audio data and video data of a received broadcast program and records the data into a recording medium, for example. The recording/reproducing apparatus 940 may also encode audio data and video data acquired from another apparatus and record the data into the recording medium, for example. The recording/reproducing apparatus 940 reproduces the data recorded in the recording medium on a monitor and a speaker, for example, in response to a user instruction. In this case, recording/reproducing apparatus 940 decodes the audio data and the video data.

The recording/reproducing apparatus 940 includes a tuner 941, an external interface unit 942, an encoder 943, a hard disk drive (HDD) 944, a disk drive 945, a selector 946, a decoder 947, an on-screen display (OSD) unit 948, a control unit 949, and a user interface unit 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as a transmission unit in the recording/reproducing apparatus 940.

The external interface unit 942 is an interface which connects the recording/reproducing apparatus 940 with an external device or a network. The external interface unit 942 may be, for example, an institute of electrical and electronic engineers (IEEE) 1394 interface, a network interface, a USB interface, or a flash memory interface. The video data and the audio data received through the external interface unit 942 are input to the encoder 943, for example. That is, the external interface unit 942 has a role as a transmission unit in the recording/reproducing apparatus 940.

The encoder 943 encodes the video data and the audio data in the case where the video data and the audio data input from the external interface unit 942 are not encoded. The encoder 943 thereafter outputs an encoded bit stream to the selector 946.

The HDD unit 944 records, into an internal hard disk, the encoded bit stream in which content data such as video and audio is compressed, various programs, and other data. The HDD unit 944 reads these data from the hard disk when the video and the audio are reproduced.

The disk drive 945 records and reads data into/from a recording medium attached to the disk drive. The recording medium attached to the disk drive 945 may be, for example, a digital versatile disc (DVD) disc (such as DVD-Video, DVD-random access memory (DVD-RAM), DVD-recordable (DVD-R), DVD-rewritable (DVD-RW), DVD+recordable (DVD+R), or DVD+rewritable (DVD+RW)) or a Blu-ray (Registered Trademark) disk.

The selector 946 selects the encoded bit stream input from the tuner 941 or the encoder 943 when recording the video and audio, and outputs the selected encoded bit stream to the HDD unit 944 or the disk drive 945. When reproducing the video and audio, on the other hand, the selector 946 outputs the encoded bit stream input from the HDD unit 944 or the disk drive 945 to the decoder 947.

The decoder 947 decodes the encoded bit stream to generate the video data and the audio data. The decoder 947 then outputs the generated video data to the OSD unit 948 and the generated audio data to an external speaker.

The OSD unit 948 reproduces the video data input from the decoder 947 and displays the video. The OSD unit 948 may also superpose an image of a GUI such as a menu, buttons, or a cursor onto the displayed video.

The control unit 949 includes a processor such as a CPU and a memory such as a RAM and a ROM. The memory stores a program executed by the CPU as well as program data. The program stored in the memory is read by the CPU at the start-up of the recording/reproducing apparatus 940 and executed, for example. By executing the program, the CPU controls the operation of the recording/reproducing apparatus 940 in accordance with an operation signal that is input from the user interface unit 950, for example.

The user interface unit 950 is connected to the control unit 949. The user interface unit 950 includes a button and a switch for a user to operate the recording/reproducing apparatus 940 as well as a reception part which receives a remote control signal, for example. The user interface unit 950 detects a user operation through these components to generate an operation signal, and outputs the generated operation signal to the control unit 949.

In the recording/reproducing apparatus 940 configured in this way, the encoder 943 may include the functions of the image encoding apparatus 400 described above, for example. In other words, the encoder 943 may be configured to encode image data according to the method described in each of the above embodiments. In this manner, the recording/reproducing apparatus 940 can obtain similar effects to those of each of the embodiments described above with reference to FIG. 1 to FIG. 68.

In addition, in the recording/reproducing apparatus 940 configured in this way, the decoder 947 may include the functions of the image decoding apparatus 100 described above, for example. In other words, the decoder 947 may be configured to decode encoded data according to the method described in each of the above embodiments. In this manner, the recording/reproducing apparatus 940 can obtain similar effects to those of each of the embodiments described above with reference to FIG. 1 to FIG. 68.

Fourth Application Example: Imaging Apparatus

Figure 73:
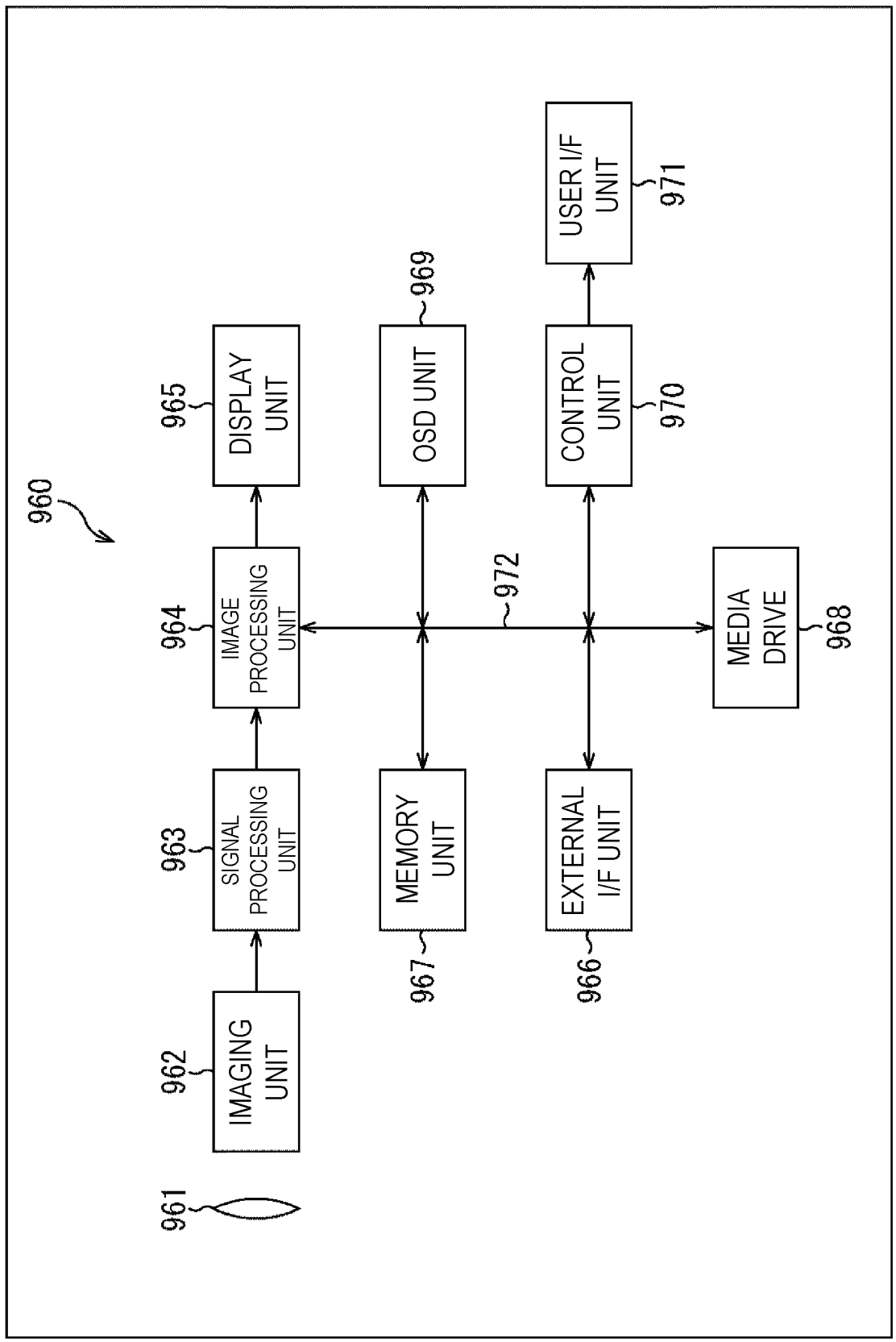
FIG. 73 is a block diagram illustrating an example of a schematic configuration of an imaging apparatus.

FIG. 73 illustrates an example of a schematic configuration of an imaging apparatus to which the above-described embodiments are applied. The imaging apparatus 960 images an object to generate an image, encodes image data, and records the data into a recording medium.

The imaging apparatus 960 includes an optical block 961, an imaging unit 962, a signal processing unit 963, an image processing unit 964, a display unit 965, an external interface unit 966, a memory unit 967, a media drive 968, an OSD unit 969, a control unit 970, a user interface unit 971, and a bus 972.

The optical block 961 is connected to the imaging unit 962. The imaging unit 962 is connected to the signal processing unit 963. The display unit 965 is connected to the image processing unit 964. The user interface unit 971 is connected to the control unit 970. The bus 972 mutually connects the image processing unit 964, the external interface unit 966, the memory unit 967, the media drive 968, the OSD unit 969, and the control unit 970.

The optical block 961 includes a focus lens and a diaphragm mechanism. The optical block 961 forms an optical image of an object on an imaging plane of the imaging unit 962. The imaging unit 962 includes an image sensor such as a Charge Coupled Device (CCD) or a Complementary Metal Oxide Semiconductor (CMOS) and performs photoelectric conversion to convert the optical image formed on the imaging plane into an image signal as an electric signal. Then, the imaging unit 962 outputs the image signal to the signal processing unit 963.

The signal processing unit 963 performs various camera signal processes such as a knee correction, a gamma correction and a color correction on the image signal input from the imaging unit 962. The signal processing unit 963 outputs the image data, on which the camera signal processes have been performed, to the image processing unit 964.

The image processing unit 964 encodes the image data input from the signal processing unit 963 and generates the encoded data. The image processing unit 964 then outputs the generated encoded data to the external interface unit 966 or the media drive 968. The image processing unit 964 also decodes the encoded data input from the external interface unit 966 or the media drive 968 to generate image data. The image processing unit 964 then outputs the generated image data to the display unit 965. Moreover, the image processing unit 964 may output to the display unit 965 the image data input from the signal processing unit 963 to cause the display unit 965 to display the image. Furthermore, the image processing unit 964 may superpose display data acquired from the OSD unit 969 onto the image that is output on the display unit 965.

The OSD unit 969 generates an image of a GUI such as a menu, buttons, or a cursor and outputs the generated image to the image processing unit 964.

The external interface unit 966 is configured as a USB input/output terminal, for example. The external interface unit 966 connects the imaging apparatus 960 with a printer when printing an image, for example. Moreover, a drive is connected to the external interface unit 966 as needed. A removable medium such as a magnetic disk or an optical disk is attached to the drive, for example, so that a program read from the removable medium can be installed to the imaging apparatus 960. The external interface unit 966 may also be configured as a network interface that is connected to a network such as a LAN or the Internet. That is, the external interface unit 966 has a role as a transmission unit in the imaging apparatus 960.

The recording medium attached to the media drive 968 may be an arbitrary removable medium that is readable and writable such as a magnetic disk, a magneto-optical disk, an optical disk, or a semiconductor memory. Furthermore, the recording medium may be attached to the media drive 968 in a fixed manner so that a non-transportable storage unit such as a built-in hard disk drive or a solid state drive (SSD) is configured, for example.

The control unit 970 includes a processor such as a CPU and a memory such as a RAM and a ROM. The memory stores a program executed by the CPU as well as program data. The program stored in the memory is read by the CPU at the start-up of the imaging apparatus 960 and then executed. By executing the program, the CPU controls the operation of the imaging apparatus 960 in accordance with an operation signal that is input from the user interface unit 971, for example.

The user interface unit 971 is connected to the control unit 970. The user interface unit 971 includes buttons and switches for a user to operate the imaging apparatus 960, for example. The user interface unit 971 detects a user operation through these components to generate an operation signal, and outputs the generated operation signal to the control unit 970.

In the imaging apparatus 960 configured in this way, the image processing unit 964 may include the functions of the image encoding apparatus 400 described above, for example. In other words, the image processing unit 964 may be configured to encode image data according to the method described in each of the above embodiments. In this manner, the imaging apparatus 960 can obtain similar effects to those of each of the embodiments described above with reference to FIG. 1 to FIG. 68.

In addition, in the imaging apparatus 960 configured in this way, the image processing unit 964 may include the functions of the image decoding apparatus 100 described above, for example. In other words, the image processing unit 964 may be configured to decode encoded data according to the method described in each of the above embodiments. In this manner, the imaging apparatus 960 can obtain similar effects to those of each of the embodiments described above with reference to FIG. 1 to FIG. 68.

Fifth Application Example: Video Set

Figure 74:
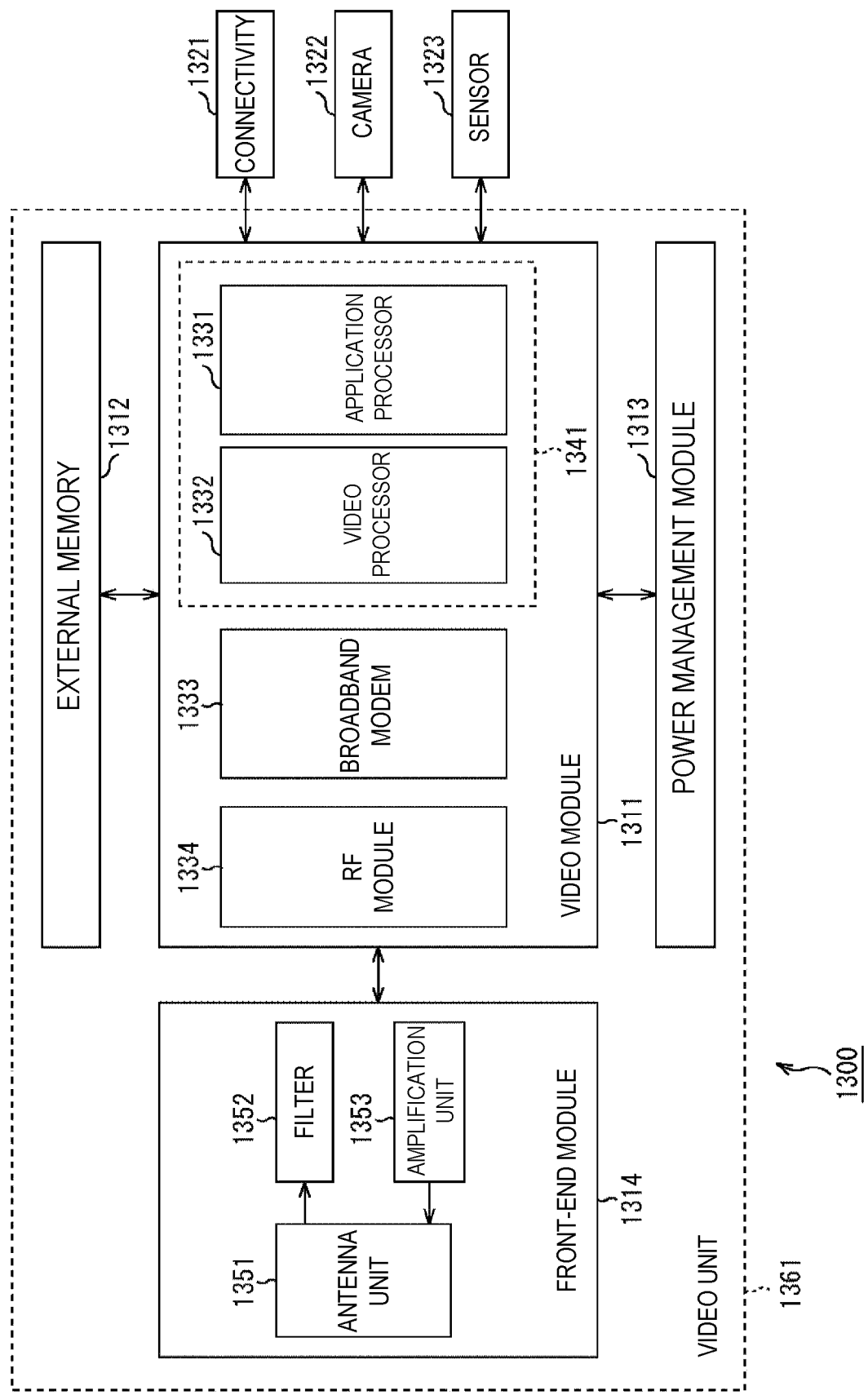
FIG. 74 is a block diagram illustrating one example of a schematic configuration of a video set.

Additionally, the present technology may also be implemented as any kind of configuration installed in any apparatus or an apparatus included in a system, such as a processor provided as a large-scale integration (LSI) chip or the like, a module that uses multiple processors or the like, a unit that uses multiple modules or the like, a set that further adds other functions to a unit (i.e., a configuration of a part of an apparatus), or the like. FIG. 74 illustrates one example of a schematic configuration of a video set applying the present technology.

Recently, electronic devices are becoming more multi-functional, and in the development and manufacture of such electronic devices, in the case of implementing a partial configuration thereof for sale, offer, or the like, it has become commonplace not only to carry out the implementation as a configuration that includes a single function, but also to combine multiple configurations that include related functions and carry out the implementation as a single set including multiple functions.

The video set 1300 illustrated in FIG. 74 is such a multifunctional configuration, and is a combination of a device that includes functions related to image encoding and decoding (either one, or both) with a device that includes other functions related to such functions.

As illustrated in FIG. 74, the video set 1300 includes a module group such as a video module 1311, external memory 1312, a power management module 1313, and a front-end module 1314, and a device that includes related functions such as connectivity 1321, a camera 1322, and a sensor 1323.

A module is a part that collects several interrelated partial functions into a unified function. The specific physical configuration may be any configuration, but for example, it is conceivable to dispose and integrate multiple processors with respective functions, electronic circuit elements such as resistors and capacitors, other devices, and the like onto a circuit board or the like. It is also conceivable to combine a module with another module, processor, or the like to create a new module.

In the case of the example in FIG. 74, the video module 1311 is a combination of configurations that include functions related to image processing, and includes an application processor, a video processor, a broadband modem 1333, and an RF module 1334.

The processor is an integration of configurations having predetermined functions into a semiconductor chip as a system on a chip (SoC), and may also be designated a large-scale integration (LSI) chip or the like, for example. The configurations having predetermined functions may be logic circuits (hardware configurations), but may also be a CPU, ROM, RAM, and the like as well as a program executed using these (software configurations), and may also be a combination of both. For example, a processor may include logic circuits and CPU, ROM, RAM, and the like, and may be configured to realize a subset of the functions with the logic circuits (hardware configurations) while realizing other functions with programs (software configurations) executed on the CPU.

The application processor 1331 in FIG. 74 is a processor that executes an application related to image processing. To realize a predetermined function, the application executed in the application processor 1331 is able to not only execute computational processing, but is also able to control configurations inside and outside the video module 1311, such as the video processor 1332, for example, as necessary.

The video processor 1332 is a processor that includes functions related to image encoding/decoding (either one, or both).

The broadband modem 1333 performs digital modulation and the like to convert data (a digital signal) transmitted by wired or wireless (or both) broadband communication performed over a broadband connection such as the Internet or the public telephone network into an analog signal, and also performs demodulation to convert an analog signal received by such broadband communication into data (a digital signal). The broadband modem 1333 processes any kind of information, such as image data processed by the video processor 1332, a stream in which image data is encoded, application programs, and settings data, for example.

The RF module 1334 is a module that performs frequency conversion, modulation/demodulation, amplification, filter processing, and the like on radio frequency (RF) signals transmitted and received through an antenna. For example, the RF module 1334 generates an RF signal by performing frequency conversion and the like on a baseband signal generated by the broadband modem 1333. Also, for example, the RF module 1334 generates a baseband signal by performing frequency conversion and the like on an RF signal received via the front-end module 1314.

Note that as illustrated by the dashed line 1341 in FIG. 74, the application processor 1331 and the video processor 1332 may also be unified and configured as a single processor.

The external memory 1312 is a module provided externally to the video module 1311 that includes a storage device utilized by the video module 1311. The storage device of the external memory 1312 may be realized by any kind of physical configuration, but since the storage device typically is used to store large amounts of data such as image data in units of frames, it is desirable to realize the storage device with relatively inexpensive and high-capacity semiconductor memory such as dynamic random access memory (DRAM), for example.

The power management module 1313 manages and controls the supply of power to the video module 1311 (each configuration inside the video module 1311).

The front-end module 1314 is a module that provides a front-end function (a circuit on the antenna-side transmit/receive port) to the RF module 1334. As illustrated in FIG. 74, the front-end module 1314 includes an antenna unit 1351, a filter 1352, and an amplification unit 1353, for example.

The antenna unit 1351 includes an antenna that transmits and receives wireless signals, and a peripheral configuration thereof. The antenna unit 1351 transmits a signal supplied from the amplification unit 1353 as a wireless signal, and supplies a received wireless signal to the filter 1352 as an electric signal (RF signal). The filter 1352 performs filter processing and the like on the RF signal received through the antenna unit 1351, and supplies the processed RF signal to the RF module 1334. The amplification unit 1353 amplifies and supplies the RF signal supplied from the RF module 1334 to the antenna unit 1351.

The connectivity 1321 is a module that includes functions related to external connections. The physical configuration of the connectivity 1321 may be any configuration. For example, the connectivity 1321 includes a configuration having a communication function other than the communication standard supporting by the broadband modem 1333, an external input/output terminal, or the like.

For example, the connectivity 1321 may include a module having a communication function conforming to a wireless communication standard such as Bluetooth (registered trademark), IEEE 802.11 (for example. Wireless Fidelity (Wi-Fi (registered trademark))), near field communication (NFC), or Infrared Data Association (IrDA), and an antenna or the like that transmits and receives signals conforming to the standard. Also, for example, the connectivity 1321 may include a module having a communication function conforming to a wired communication function such as Universal Serial Bus (USB) or High-Definition Multimedia Interface (HDMI) (registered trademark), and a port conforming to the standard. Furthermore, for example, the connectivity 1321 may include a function of transmitting another kind of data (signal), such as an analog input/output terminal.

Note that the connectivity 1321 may include the transmission destination device of the data (signal). For example, the connectivity 1321 may include a drive (not only a drive for removable media, but also including a hard disk, a solid-state drive (SSD), network-attached storage (NAS), and the like) that reads and writes data with respect to a recording medium such as a magnetic disk, an optical disc, a magneto-optical disc, or semiconductor memory. Also, the connectivity 1321 may include devices (such as a monitor and a speaker) that output images and sound.

The camera 1322 is a module that has a function of imaging a subject and obtaining image data of the subject. The image data obtained by the imaging by the camera 1322 is supplied to the video processor 1332 and encoded, for example.

The sensor 1323 is a module having any type of sensor function, such as a sound sensor, an ultrasonic sensor, a light sensor, an illumination sensor, an infrared sensor, an image sensor, a rotation sensor, an angle sensor, an angular velocity sensor, a speed sensor, an acceleration sensor, an inclination sensor, a magnetic field sensor, a shock sensor, or a temperature sensor, for example. Data detected by the sensor 1323 is supplied to the application processor 1331 and utilized by an application and the like, for example.

The configurations described as a module above may also be realized as a processor, while conversely, the configurations described as a processor may also be realized as a module.

In the video set 1300 with a configuration like the above, the present technology can be applied to the video processor 1332 as described later. Consequently, the video set 1300 may be carried out as a set applying the present technology.

<Exemplary Configuration of Video Processor>

Figure 75:
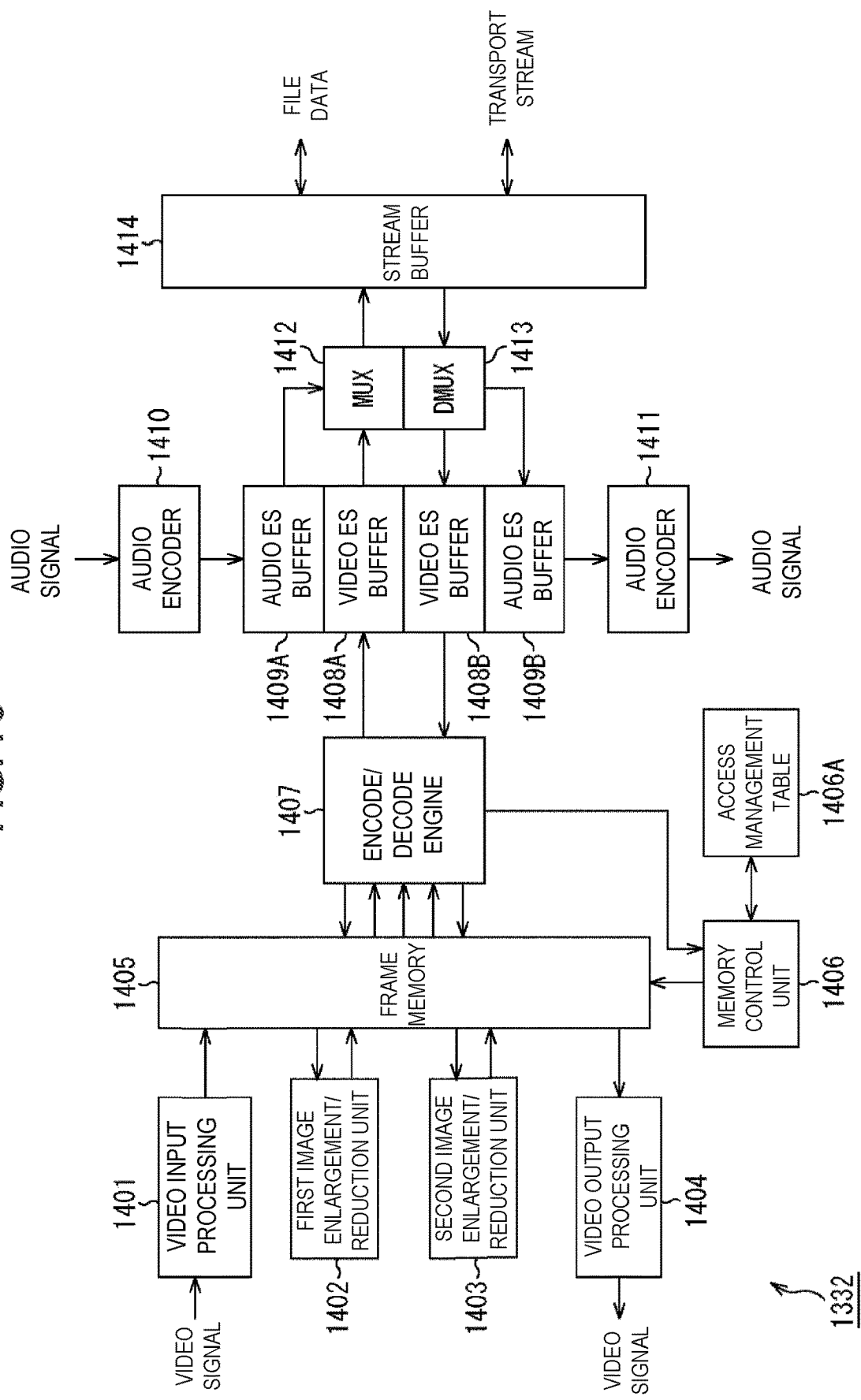
FIG. 75 is a block diagram illustrating one example of a schematic configuration of a video processor.

FIG. 75 illustrates one example of a schematic configuration of the video processor 1332 (FIG. 74) applying the present technology.

In the case of the example in FIG. 75, the video processor 1332 includes a function of receiving the input of a video signal and an audio signal and encoding these signals according to a predetermined method, and a function of decoding encoded video data and audio data, and reproducing and outputting a video signal and an audio signal.

As illustrated in FIG. 75, the video processor 1332 includes a video input processing unit 1401, a first image enlargement/reduction unit 1402, a second image enlargement/reduction unit 1403, a video output processing unit 1404, frame memory 1405, and a memory control unit 1406. Also, the video processor 1332 includes an encode/decode engine 1407, video elementary stream (ES) buffers 1408A and 1408B, and audio ES buffers 1409A and 1409B. Additionally, the video processor 1332 includes an audio encoder 1410, an audio decoder 1411, a multiplexer (MUX) 1412, a demultiplexer (DMUX) 1413, and a stream buffer 1414.

The video input processing unit 1401 acquires a video signal input from the connectivity 1321 (FIG. 74) or the like, for example, and converts the video signal into digital image data. The first image enlargement/reduction unit 1402 performs format conversion, image enlargement/reduction processing, and the like on the image data. The second image enlargement/reduction unit 1403 performs a process of enlarging or reducing the image according to the format at the destination to which to output through the video output processing unit 1404, format conversion and image enlargement/reduction processing similar to the first image enlargement/reduction unit 1402, and the like on the image data. The video output processing unit 1404 performs format conversion, conversion to an analog signal, and the like on the image data, and outputs the result to the connectivity 1321 for example as a reproduced video signal.

The frame memory 1405 is memory for image data shared by the video input processing unit 1401, the first image enlargement/reduction unit 1402, the second image enlargement/reduction unit 1403, the video output processing unit 1404, and the encode/decode engine 1407. The frame memory 1405 is realized as semiconductor memory such as DRAM, for example.

The memory control unit 1406 receives a synchronization signal from the encode/decode engine 1407, and controls the access and writes and reads to the frame memory 1405 in accordance with an access schedule of access to the frame memory 1405 written in an access management table 1406A. The access management table 1406A is updated by the memory control unit 1406 according to processes executed by the encode/decode engine 1407, the first image enlargement/reduction unit 1402, the second image enlargement/reduction unit 1403, and the like.

The encode/decode engine 1407 executes a process of encoding image data as well as a process of decoding a video stream, which is data in which image data is encoded. For example, the encode/decode engine 1407 encodes image data read from the frame memory 1405, and successively writes the encoded data to the video ES buffer 1408A as a video stream. Also, for example, the encode/decode engine 1407 successively reads and decodes a video stream from the video ES buffer 1408B, and writes the decoded data to the frame memory 1405 as image data. During this encoding and decoding, the encode/decode engine 1407 uses the frame memory 1405 as a work area. Also, the encode/decode engine 1407 outputs a synchronization signal to the memory control unit 1406 at the timing of starting the process for each macroblock, for example.

The video ES buffer 1408A buffers and supplies a video stream generated by the encode/decode engine 1407 to the multiplexer (MUX) 1412. The video ES buffer 1408B buffers and supplies a video stream supplied from the demultiplexer (DMUX) 1413 to the encode/decode engine 1407.

The audio ES buffer 1409A buffers and supplies an audio stream generated by the audio encoder 1410 to the multiplexer (MUX) 1412. The audio ES buffer 1409B buffers and supplies an audio stream supplied from the demultiplexer (DMUX) 1413 to the audio decoder 1411.

The audio encoder 1410 for example digitally converts an audio signal input from the connectivity 1321 or the like, for example, and encodes the audio signal according to a predetermined method such as the MPEG Audio method or the AudioCode number 3 (AC3) method, for example. The audio encoder 1410 successively writes an audio stream, which is data in which an audio signal is encoded, to the audio ES buffer 1409A. The audio decoder 1411 decodes an audio stream supplied from the audio ES buffer 1409B, performs conversion to an analog signal and the like, for example, and supplies the result to the connectivity 1321 and the like for example as a reproduced audio signal.

The multiplexer (MUX) 1412 multiplexes a video stream and an audio stream. The multiplexing method (i.e., the format of the bit stream generated by multiplexing) may be any method. Additionally, during this multiplexing, the multiplexer (MUX) 1412 is also able to add predetermined header information or the like to the bit stream. In other words, the multiplexer (MUX) 1412 is able to convert the format of the streams by multiplexing. For example, by multiplexing a video stream and an audio stream, the multiplexer (MUX) 1412 converts the streams to a transport stream, which is a bit stream in a format for transmission. Also, for example, by multiplexing a video stream and an audio stream, the multiplexer (MUX) 1412 converts the streams to data (file data) in a file format for recording.

The demultiplexer (DMUX) 1413 demultiplexes a bit stream in which a video stream and an audio stream are multiplexed, according to a method corresponding to the multiplexed by the multiplexer (MUX) 1412. In other words, the demultiplexer (DMUX) 1413 extracts the video stream and the audio stream (separates the video stream and the audio stream) from a bit stream read out from the stream buffer 1414. In other words, the demultiplexer (DMUX) 1413 is able to convert the format of the stream by demultiplexing (an inverse conversion of the conversion by the multiplexer (MUX) 1412). For example, the demultiplexer (DMUX) 1413 is able to acquire a transport stream supplied from the connectivity 1321, the broadband modem 1333, or the like for example via the stream buffer 1414, and by demultiplexing, is able to convert the transport stream into a video stream and an audio stream. Also, for example, the demultiplexer (DMUX) 1413 is able to acquire file data read out from any of various types of recording media by the connectivity 1321, for example via the stream buffer 1414, and by demultiplexing, is able to convert the file data into a video stream and an audio stream.

The stream buffer 1414 buffers a bit stream. For example, the stream buffer 1414 buffers a transport stream supplied from the multiplexer (MUX) 1412, and at a predetermined timing, or on the basis of an external request or the like, supplies the transport stream to the connectivity 1321, the broadband modem 1333, or the like, for example.

Also, for example, the stream buffer 1414 buffers file data supplied from the multiplexer (MUX) 1412, and at a predetermined timing, or on the basis of an external request or the like, supplies the file data to the connectivity 1321 or the like, for example, and causes the file data to be recorded on any of various types of recording media.

Furthermore, the stream buffer 1414 buffers a transport stream acquired via the connectivity 1321, the broadband modem 1333, and the like, for example, and at a predetermined timing, or on the basis of an external request or the like, supplies the transport stream to the demultiplexer (DMUX) 1413.

Additionally, the stream buffer 1414 buffers file data read out from any of various types of recording media in the connectivity 1321 or the like, for example, and at a predetermined timing, or on the basis of an external request or the like, supplies the file data to the demultiplexer (DMUX) 1413.

Next, an example of the operation of the video processor 1332 with such a configuration will be described. For example, a video signal input into the video processor 1332 from the connectivity 1321 or the like is converted to digital image data of a predetermined format such as 4:2:2 Y/Cb/Cr format in the video input processing unit 1401, and is successively written to the frame memory 1405. The digital image data is read out to the first image enlargement/reduction unit 1402 or the second image enlargement/reduction unit 1403, subjected to a format conversion to a predetermined format such as 4:2:0 Y/Cb/Cr or the like and an enlargement/reduction process, and again written to the frame memory 1405. The image data is encoded by the encode/decode engine 1407, and written to the video ES buffer 1408A as a video stream.

Also, an audio signal input into the video processor 1332 from the connectivity 1321 or the like is encoded by the audio encoder 1410, and written to the audio ES buffer 1409A as an audio stream.

The video stream in the video ES buffer 1408A and the audio stream in the audio ES buffer 1409A are read out and multiplexed by the multiplexer (MUX) 1412, and converted to a transport stream, file data, or the like. The transport stream generated by the multiplexer (MUX) 1412 is buffered in the stream buffer 1414, and then output to an external network via the connectivity 1321, the broadband modem 1333, or the like, for example. Also, the file data generated by the multiplexer (MUX) 1412 is buffered in the stream buffer 1414, and then output to the connectivity 1321 or the like, for example, and recorded to any of various types of recording media.

Also, a transport stream input into the video processor 1332 from an external network via the connectivity 1321, the broadband modem 1333, or the like for example is buffered in the stream buffer 1414, and then demultiplexed by the demultiplexer (DMUX) 1413. Also, file data read out from any of various types of recording media in the connectivity 1321 or the like, for example, and input into the video processor 1332 is buffered in the stream buffer 1414, and then demultiplexed by the demultiplexer (DMUX) 1413. In other words, a transport stream or file data input into the video processor 1332 is separated into a video stream and an audio stream by the demultiplexer (DMUX) 1413.

The audio stream is supplied to the audio decoder 1411 via the audio ES buffer 1409B and decoded, and an audio signal is reproduced. Also, the video stream, after being written to the video ES buffer 1408B, is successively read out and decoded by the encode/decode engine 1407, and written to the frame memory 1405. The decoded image data is subjected to an enlargement/reduction process by the second image enlargement/reduction unit 1403, and written to the frame memory 1405. Subsequently, the decoded image data is read out to the video output processing unit 1404, format-converted to a predetermined format such as 4:2:2 Y/Cb/Cr format, additionally converted to an analog signal, and a video signal is reproduced and output.

In the case of applying the present technology to the video processor 1332 configured in this way, it is sufficient to apply the present technology according to the embodiments described above to the encode/decode engine 1407. In other words, for example, the encode/decode engine 1407 may include the functions of the image encoding apparatus 400 or the functions of the image decoding apparatus 100 described above, or both. With this arrangement, the video processor 1332 is able to obtain effects similar to each of the embodiments described above with reference to FIGS. 1 to 68.

Note that in the encode/decode engine 1407, the present technology (i.e., the functions of the image encoding apparatus 400, the functions of the image decoding apparatus 100, or both) may be realized by hardware such as a logic circuit or the like, may be realized by software such as an embedded program, or may be realized by both of the above.

<Another Exemplary Configuration of Video Processor>

Figure 76:
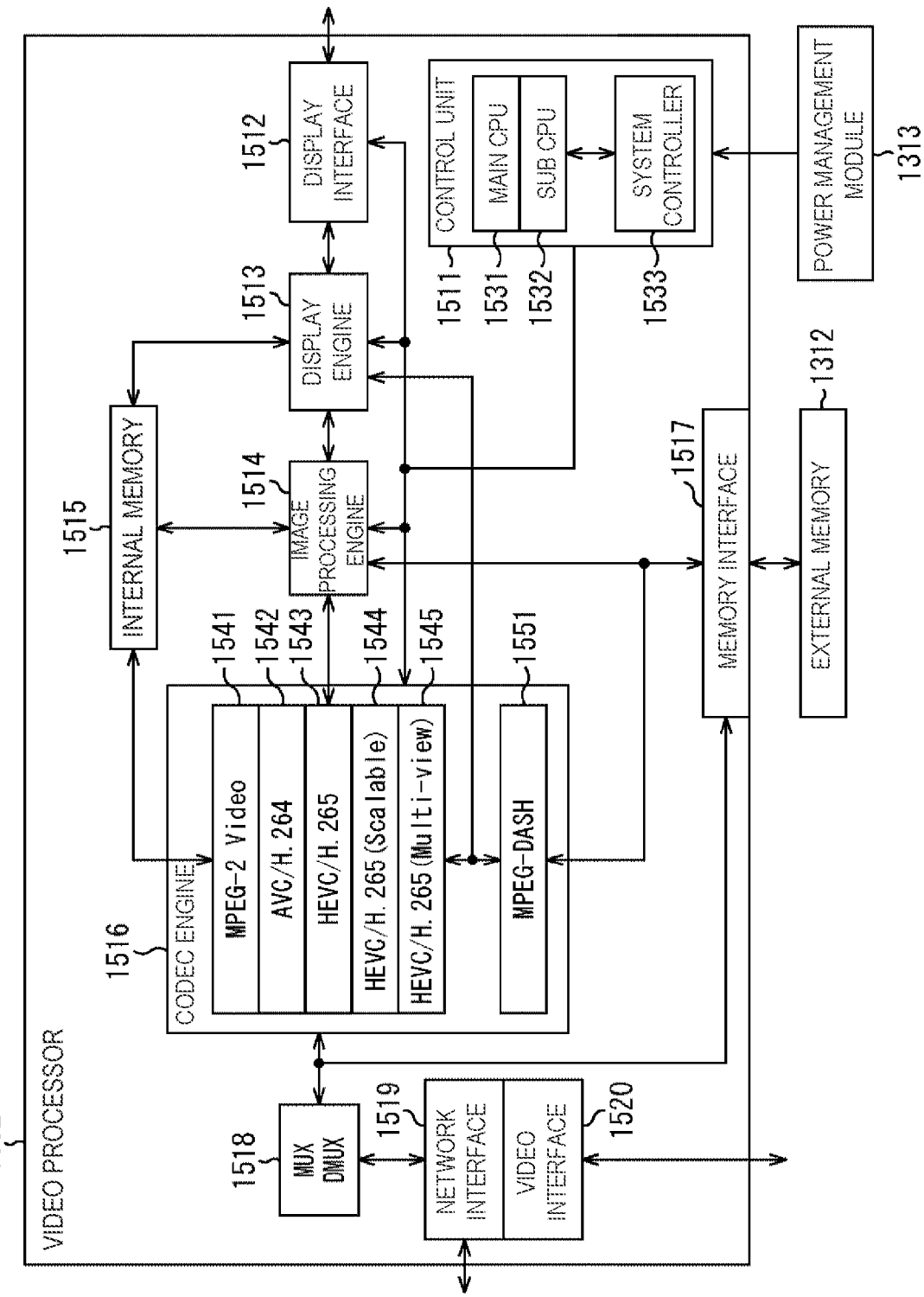
FIG. 76 is a block diagram illustrating another example of a schematic configuration of a video processor.

FIG. 76 illustrates another example of a schematic configuration of the video processor 1332 applying the present technology. In the case of the example in FIG. 76, the video processor 1332 includes a function of encoding/decoding video data according to a predetermined method.

More specifically, as illustrated in FIG. 76, the video processor 1332 includes a control unit 1511, a display interface 1512, a display engine 1513, an image processing engine 1514, and internal memory 1515. Also, the video processor 1332 includes a codec engine 1516, a memory interface 1517, a multiplexer/demultiplexer (MUX DMUX) 1518, a network interface 1519, and a video interface 1520.

The control unit 1511 controls the operation of each processing unit in the video processor 1332, such as the display interface 1512, the display engine 1513, the image processing engine 1514, and the codec engine 1516.

As illustrated in FIG. 76, the control unit 1511 includes a main CPU 1531, a sub CPU 1532, and a system controller 1533, for example. The main CPU 1531 executes a program or the like for controlling the operation of each processing unit in the video processor 1332. The main CPU 1531 generates control signals in accordance with the program or the like, and supplies the control signals to each processing unit (in other words, controls the operation of each processing unit). The sub CPU 1532 fulfills a supplementary role to the main CPU 1531. For example, the sub CPU 1532 executes child processes, subroutines, and the like of the program or the like executed by the main CPU 1531. The system controller 1533 controls the operations of the main CPU 1531 and the sub CPU 1532, such as specifying programs to be executed by the main CPU 1531 and the sub CPU 1532.

The display interface 1512, under control by the control unit 1511, outputs image data to the connectivity 1321 and the like, for example. For example, the display interface 1512 converts digital image data to an analog signal and outputs an analog signal, or outputs the digital image data directly, as a reproduced video signal to a monitor apparatus or the like of the connectivity 1321.

The display engine 1513, under control by the control unit 1511, performs various conversion processes such as format conversion, size conversion, and gamut conversion on the image data to match the hardware specs of the monitor apparatus or the like that is to display the image.

The image processing engine 1514, under control by the control unit 1511 performs predetermined image processing on the image data, such as filter processing for improving image quality, for example.

The internal memory 1515 is memory provided inside the video processor 1332, and shared by the display engine 1513, the image processing engine 1514, and the codec engine 1516. For example, the internal memory 1515 is used to exchange data between the display engine 1513, the image processing engine 1514, and the codec engine 1516. For example, the internal memory 1515 stores data supplied from the display engine 1513, the image processing engine 1514, or the codec engine 1516, and as necessary (for example, in response to a request), supplies the data to the display engine 1513, the image processing engine 1514, or the codec engine 1516. The internal memory 1515 may be realized by any kind of storage device, but since the storage device typically is used to store small amounts of data such as image data in units of blocks, parameters, and the like, it is desirable to realize the storage device with semiconductor memory that is relatively (for example, compared to the external memory 1312) small in capacity but has a fast response speed, such as static random access memory (SRAM), for example.

The codec engine 1516 executes processes related to the encoding and decoding of image data. The encoding/decoding method supported by the codec engine 1516 may be any method, and there may be one or multiple such methods. For example, the codec engine 1516 may be provided with a codec function for multiple encoding/decoding methods, and may be configured to encode or decode image data by selecting from among the multiple methods.

In the example illustrated in FIG. 76, the codec engine 1516 includes MPEG-2 Video 1541, AVC/H.264 1542, HEVC/H.265 1543, HEVC/H.265 (Scalable) 1544, HEVC/H.265 (Multi-view) 1545, and MPEG-DASH 1551 as function blocks of codec-related processing, for example.

The MPEG-2 Video 1541 is a function block that encodes and decodes image data according to the MPEG-2 method. The AVC/H.264 1542 is a function block that encodes and decodes image data according to the AVC method. The HEVC/H.265 1543 is a function block that encodes and decodes image data according to the HEVC method. The HEVC/H.265 (Scalable) 1544 is a function block that scalably encodes and scalably decodes image data according to the HEVC method. The HEVC/H.265 (Multi-view) 1545 is a function block that multi-view encodes and multi-view decodes image data according to the HEVC method.

The MPEG-DASH 1551 is a function block that transmits and receives image data according to the MPEG Dynamic Adaptive Streaming over HTTP (MPEG-DASH) method. MPEG-DASH is a technology that uses the Hypertext Transfer Protocol (HTTP) to stream video, one feature of which being that appropriate encoded data is selected and transmitted in units of segments from among multiple sets of encoded data having different resolutions or the like prepared in advance. The MPEG-DASH 1551 executes the generation, transmission control, and the like of a stream conforming to the standard, w % bile for the encoding/decoding of image data, the MPEG-2 Video 1541 to the HEVC/H.265 (Multi-view) 1545 are used.

The memory interface 1517 is an interface for the external memory 1312. Data supplied from the image processing engine 1514 and the codec engine 1516 is supplied to the external memory 1312 through the memory interface 1517. Also, data read out from the external memory 1312 is supplied to the video processor 1332 (the image processing engine 1514 or the codec engine 1516) through the memory interface 1517.

The multiplexer/demultiplexer (MUX DMUX) 1518 multiplexes and demultiplexes various image-related data, such as a bit stream of encoded data, image data, a video signal, and the like. The multiplexing/demultiplexing method may be any method. For example, when multiplexing, the multiplexer/demultiplexer (MUX DMUX) 1518 is not only able to collect multiple pieces of data into a single piece of data, but also add predetermined header information and the like to the data. Also, when demultiplexing, the multiplexer/demultiplexer (MUX DMUX) 1518 is not only able to divide a single piece of data into multiple pieces of data, but also add predetermined header information and the like to each divided piece of data. In other words, the multiplexer/demultiplexer (MUX DMUX) 1518 is able to convert the format of data by multiplexing/demultiplexing. For example, by multiplexing a bit stream, the multiplexer/demultiplexer (MUX DMUX) 1518 is able to convert the bit stream to a transport stream, which is a bit stream in a format for transmission, or to data in a file format (file data) for recording. Obviously, by demultiplexing, the inverse conversion is also possible.

The network interface 1519 is an interface for the broadband modem 1333, the connectivity 1321, and the like, for example. The video interface 1520 is an interface for the connectivity 1321, the camera 1322, and the like, for example.

Next, an example of the operation of such a video processor 1332 will be described. For example, when a transport stream is received from an external network through the connectivity 1321, the broadband modem 1333, or the like, the transport stream is supplied to the multiplexer/demultiplexer (MUX DMUX) 1518 through the network interface 1519 and demultiplexed, and decoded by the codec engine 1516. The image data obtained by the decoding of the codec engine 1516 is, for example, subjected to predetermined image processing by the image processing engine 1514, subjected to a predetermined conversion by the display engine 1513, supplied to the connectivity 1321 or the like for example through the display interface 1512, and the image is displayed on a monitor. Also, for example, the image data obtained by the decoding of the codec engine 1516 is re-encoded by the codec engine 1516, multiplexed and converted to file data by the multiplexer/demultiplexer (MUX DMUX) 1518, output to the connectivity 1321 or the like for example through the video interface 1520, and recorded on any of various types of recording media.

Furthermore, for example, file data of encoded data in which image data is encoded that is read out from a recording medium not illustrated by the connectivity 1321 or the like is supplied to the multiplexer/demultiplexer (MUX DMUX) 1518 through the video interface 1520 and demultiplexed, and decoded by the codec engine 1516. The image data obtained by the decoding of the codec engine 1516 is subjected to predetermined image processing by the image processing engine 1514, subjected to a predetermined conversion by the display engine 1513, supplied to the connectivity 1321 or the like for example through the display interface 1512, and the image is displayed on a monitor. Also, for example, the image data obtained by the decoding of the codec engine 1516 is re-encoded by the codec engine 1516, multiplexed and converted to a transport stream by the multiplexer/demultiplexer (MUX DMUX) 1518, supplied to the connectivity 1321, the broadband modem 1333, or the like for example through the network interface 1519, and transmitted to another apparatus not illustrated.

Note that the exchange of image data and other data between each of the processing units inside the video processor 1332 is performed by utilizing the internal memory 1515 and the external memory 1312, for example. Additionally, the power management module 1313 controls the supply of power to the control unit 1511, for example.

In the case of applying the present technology to the video processor 1332 configured in this way, it is sufficient to apply the present technology according to the embodiments described above to the codec engine 1516. In other words, for example, it is sufficient for the codec engine 1516 to include the functions of the image encoding apparatus 400 or the functions of the image decoding apparatus 100 described above, or both. With this arrangement, the video processor 1332 is able to obtain effects similar to each of the embodiments described above with reference to FIGS. 1 to 68.

Note that in the codec engine 1516, the present technology (i.e., the functions of the image encoding apparatus 400) may be realized by hardware such as a logic circuit or the like, may be realized by software such as an embedded program, or may be realized by both of the above.

The above illustrates two configurations of the video processor 1332 as examples, but the configuration of the video processor 1332 may be any configuration, and may be a configuration other than the two examples described above. Also, the video processor 1332 may be configured as a single semiconductor chip, but may also be configured as multiple semiconductor chips. For example, a three-dimensionally stacked LSI chip in which multiple semiconductors are stacked is possible. Also, a configuration realized by multiple LSI chips is possible.

Example of Application to Apparatus

The video set 1300 can be embedded into any of various types of apparatus that process image data. For example, the video set 1300 can be embedded into the television apparatus 900 (FIG. 70), the mobile telephone 920 (FIG. 71), the recording/reproducing apparatus 940 (FIG. 72), the imaging apparatus 960 (FIG. 73), and the like. By embedding the video set 1300, the apparatus is able to obtain effects similar to each of the embodiments described above with reference to FIGS. 1 to 68.

Note that as long as the video processor 1332 is included, even a part of each configuration of the video set 1300 described above can be carried out as a configuration applying the present technology. For example, it is possible to carry out only the video processor 1332 as a video processor applying the present technology. Also, for example, the processor illustrated by the dashed line 1341 as described above, the video module 1311, and the like can be carried out as a processor, module, or the like applying the present technology. Furthermore, for example, the video module 1311, the external memory 1312, the power management module 1313, and the front-end module 1314 can also be combined and carried out as a video unit 1361 applying the present technology. With any of these configurations, it is possible to obtain effects similar to each of the embodiments described above with reference to FIGS. 1 to 68.

In other words, as long as the video processor 1332 is included, any type of configuration can be embedded into any of various types of apparatus that process image data, similarly to the case of the video set 1300. For example, the video processor 1332, the processor illustrated by the dashed line 1341, the video module 1311, or the video unit 1361 can be embedded into the television apparatus 900 (FIG. 70), the mobile telephone 920 (FIG. 71), the recording/reproducing apparatus 940 (FIG. 72), the imaging apparatus 960 (FIG. 73), and the like. Additionally, by embedding any configuration applying the present technology, the apparatus is able to obtain effects similar to each of the embodiments described above with reference to FIGS. 1 to 68, similarly to the video set 1300.

Sixth Application Example: Network System

Additionally, the present technology is also applicable to a network system that includes multiple apparatus. FIG. 77 illustrates one example of a schematic configuration of a network system applying the present technology.

The network system 1600 illustrated in FIG. 77 is a system in which devices exchange information regarding images (moving images) with each other over a network. The cloud service 1601 of the network system 1600 is a system that provides a service related to images (moving images) to terminals such as a computer 1611, audio-visual (AV) equipment 1612, a mobile information processing terminal 1613, and an Internet of Things (IoT) device 1614 communicably connected to the cloud service 1601. For example, the cloud service 1601 provides a service of supplying image (moving image) content to terminals, like what is called video streaming (on-demand or live streaming). As another example, the cloud service 1601 provides a backup service that receives and stores image (moving image) content from terminals. As another example, the cloud service 1601 provides a service of mediating the exchange of image (moving image) content between terminals.

The physical configuration of the cloud service 1601 may be any configuration. For example, the cloud service 1601 may include various servers, such as a server that saves and manages moving images, a server that delivers moving images to terminals, a server that acquires moving images from terminals, and a server that manages users (terminals) and payments, as well as any type of network, such as the Internet or a LAN.

The computer 1611 includes an information processing apparatus such as a personal computer, server, or workstation, for example. The AV equipment 1612 includes image processing apparatus such as a television receiver, a hard disk recorder, a game console, or a camera, for example. The mobile information processing terminal 1613 includes a mobile information processing apparatus such as a notebook personal computer, a tablet terminal, a mobile telephone, or a smartphone, for example. The IoT device 1614 includes any object that executes image-related processing, such as a machine, an electric appliance, a piece of furniture, some other thing, an IC tag, or a card-shaped device, for example. These terminals all include a communication function, and are able to connect to (establish a session with) the cloud service 1601 and exchange information with (i.e., communicate with) the cloud service 1601. Also, each terminal is also able to communicate with another terminal. Communication between terminals may be performed by going through the cloud service 1601, or may be performed without going through the cloud service 1601.

When the present technology is applied to the network system 160 as above, and image (moving image) data is exchanged between terminals or between a terminal and the cloud service 1601, the image data may be encoded/decoded as described above in each of the embodiments. In other words, the terminals (from the computer 1611 to the IoT device 1614) and the cloud service 1601 each may include the functions of the image encoding apparatus 400 and the image decoding apparatus 100 described above. In this manner, the terminals (from the computer 1611 to the IoT device 1614) that exchange image data and the cloud service 1601 can obtain similar effects to those of each of the embodiments described above with reference to FIG. 1 to FIG. 68.

<Supplement>

Note that, in the present specification, a "flag" is information for identifying each of a plurality of states including not only information to be used to identify two state of true (1) or false (0) but also information that can identify three or more states. Therefore, a value that the "flag" can have may be, for example, a binary value of 1 or 0, or a ternary or higher value. That is, the number of bits constituting the "flag" is arbitrary, and may be one or more bits. In addition, identification information (also including a flag) is assumed to have a form in which the identification information is included in a bit stream and a form in which differential information between certain reference information and the identification information is included in a bit stream, and thus in the present specification, a "flag" and "identification information" include not only the information but also differential information serving as a reference.

In addition, various kinds of information (metadata, etc.) with respect to encoded data (bit stream) may be transmitted or recorded in any form as long as they are associated with encoded dat. The term "associated with" used herein means, in one example, that when one data is processed, other data can be used (linkable). In other words, the data associated with each other may be collected as one data or may be individual data. In one example, information associated with encoded data (image) may be transmitted on a transmission path different from that of the encoded data (image). In addition, in one example, the information associated with encoded data (image) may be recorded on a recording medium (or other recording areas of the same recording medium) different from that of the encoded data (image). Moreover, this term "associated with" may be a part of data, not the entire data. In one example, an image and information corresponding to the image may be associated with each other in any units such as a plurality of frames, one frame, a part within a frame, or the like.

Further, herein, the terms "combine", "multiplex", "attach", "integrate", "include", "store", "push into", "put into", "insert", and the like mean combining a plurality of objects into one, for example, combining encoded data and metadata into a single data item, which means one usage of "associated with" described above.

In addition, an embodiment of the present technology is not limited to the embodiments described above, and various changes and modifications may be made without departing from the scope of the present technology.

In addition, for example, the present technology can also be implemented by any of configurations constituting an apparatus or a system, for example, a processor as a large scale integration (LSI) and the like, a module using a plurality of processors and the like, a unit using a plurality of modules and the like, a set in which other functions are further added to a set, or the like (i.e., a partial configuration of an apparatus).

Note that, in this specification, a system means a set of a plurality of constituent elements (e.g., devices or modules (parts)), regardless of whether or not all the constituent elements are in the same housing. Accordingly, a plurality of devices that is contained in different housings and connected via a network and one device in which a plurality of modules is contained in one housing are both systems.

Further, for example, an element described as a single device (or processing unit) may be divided and configured as a plurality of devices (or processing units). Conversely, elements described as a plurality of devices (or processing units) above may be configured collectively as a single device (or processing unit). Further, an element other than those described above may be added to the configuration of each device (or processing unit). Furthermore, a part of the configuration of a given device (or processing unit) may be included in the configuration of another device (or another processing unit) as long as the configuration or operation of the system as a whole is substantially the same.

In addition, for example, the present technology can adopt a configuration of cloud computing which performs processing by allocating and sharing one function by a plurality of devices through a network.

In addition, for example, the program described above can be executed in any device. In this case, it is sufficient if the device has a necessary function (functional block or the like) and can obtain necessary information.

In addition, for example, each step described by the above-described flowcharts can be executed by one device or executed by being allocated to a plurality of devices. Furthermore, in the case where a plurality of processes is included in one step, the plurality of processes included in this one step can be executed by one device or executed by being allocated to a plurality of devices. In other words, a plurality of processes included in one step can also be executed as a process of a plurality of steps. Conversely, a process described as a plurality of steps can be collectively executed in one step.

Note that in a program executed by a computer, processing in steps describing the program may be executed chronologically along the order described in this specification, or may be executed concurrently, or individually at necessary timing such as when a call is made. In other words, unless a contradiction arises, processing in the steps may be executed in an order different from the order described above. Furthermore, processing in steps describing the program may be executed concurrently with processing of another program, or may be executed in combination with processing of another program.

Note that the plurality of present technologies described in this specification can be performed alone independently of each other, unless a contradiction arises. Of course, any plurality of the present technologies can be performed in combination. In one example, a part or all of the present technology described in any of the embodiments can be performed in combination with a part or all of the present technology described in another embodiment. In addition, any of a part or all of the present technologies described above can be performed in combination with another technology that is not described above.

Additionally, the present technology may also be configured as below.

(1)
An image processing apparatus including:
an inverse orthogonal transform unit configured to perform an inverse orthogonal transform of chrominance using information regarding the inverse orthogonal transform of chrominance derived on the basis of information regarding an inverse orthogonal transform of luminance.

(2)
The image processing apparatus according to (1), in which the information regarding the inverse orthogonal transform includes an adaptive primary transform flag indicating whether an adaptive inverse primary transform of adaptively selecting one from a plurality of different inverse orthogonal transforms and using the selected transform as an inverse primary transform is to be applied in a transform block to be processed.

(3)
The image processing apparatus according to (2), in which a value of the adaptive primary transform flag of chrominance is set to a value of the adaptive primary transform flag of luminance.

(4)
The image processing apparatus according to (3), in which the information regarding the inverse orthogonal transform includes a primary transform identifier indicating which inverse primary transform is to be applied to inverse primary transforms in a vertical direction and a horizontal direction.

(5)
The image processing apparatus according to (4), in which a value of the primary transform identifier of chrominance is set to a value of the primary transform identifier of luminance in a case in which the adaptive primary transform flag of chrominance is true, and is set to a predetermined value in a case in which the adaptive primary transform flag of chrominance is false.

(6)
The image processing apparatus according to (5), in which the inverse orthogonal transform unit performs the inverse primary transform as the inverse orthogonal transform.

(7)
The image processing apparatus according to (6), in which the inverse orthogonal transform unit performs an inverse primary horizontal transform which is the inverse primary transform in the horizontal direction and an inverse primary vertical transform which is the inverse primary transform in the vertical direction as the inverse orthogonal transform.

(8)
The image processing apparatus according to (7), in which the transform type of the inverse primary horizontal transform of the chrominance and the transform type of the inverse primary vertical transform of the chrominance are each derived using a method in accordance with a value of the adaptive primary transform flag of the chrominance.

(9)
The image processing apparatus according to (8), in which, in a case in which the adaptive primary transform flag of the chrominance is true,
a transform set of the inverse primary horizontal transform and a transform set of the inverse primary vertical transform are selected on the basis of prediction mode information,
a primary horizontal transform specifying flag and a primary vertical transform flag are derived from the primary transform identifier of the chrominance,
a transform type of the inverse primary horizontal transform of the chrominance is selected on the basis of the primary horizontal transform set and the primary horizontal transform specifying flag, and
a transform type of the inverse primary vertical transform of the chrominance is selected on the basis of the primary vertical transform set and the primary vertical transform.

(10)
The image processing apparatus according to (8) or (9), in which, in a case in which the adaptive primary transform flag of the chrominance is false, a predetermined transform type is selected as a transform type of the inverse primary horizontal transform of the chrominance and a predetermined transform type is selected as a transform type of the inverse primary vertical transform of the chrominance.

(11)
The image processing apparatus according to any of (2) to (10), in which a value of the adaptive primary transform flag of the chrominance is set to a value of the adaptive primary transform flag of luminance in a case in which a prediction type of a coding block to which a transform block to be processed belongs is inter prediction, and the flag is set to be false in a case in which the prediction type of the coding block is intra prediction.

(12)
The image processing apparatus according to any of (2) to (11), in which a value of the adaptive primary transform flag of the chrominance is set to a value of the adaptive primary transform flag of luminance in a case in which the prediction type of the coding block to which the transform block to be processed belongs is inter prediction or a case in which a prediction type is intra prediction of which the prediction mode is intra block copy, and the flag is set to be false in a case in which the prediction type of the coding block is intra prediction of which the prediction mode is not intra block copy.

(13)
The image processing apparatus according to any of (2) to (12), in which a value of the adaptive primary transform flag of chrominance is set to a value of the adaptive primary transform flag of luminance in a case in which a prediction type of a coding block to which a transform block to be processed belongs is inter prediction or a case in which the prediction type is intra prediction in which prediction modes for luminance and chrominance match each other, and is set to false in a case in which the prediction type of the coding block is intra prediction in which prediction modes for luminance and chrominance do not match each other.

(14)

The image processing apparatus according to any of (2) to (13), in which a value of the adaptive primary transform flag of chrominance is set to a value of the adaptive primary transform flag of luminance in a case in which a chrominance adaptive primary transform information inference flag indicating whether the adaptive primary transform flag of chrominance is to be inferred on the basis of the adaptive primary transform flag of luminance is true, and is set to false in a case in which the chrominance adaptive primary transform information inference flag is false.

(15)

The image processing apparatus according to (14), in which the chrominance adaptive primary transform information inference flag is decoded from a bit stream in a case in which a processing object component is the chrominance, the adaptive primary transform flag of luminance is true, a transform quantization bypass flag is false, and a transform skip flag is false, and a value of the chrominance adaptive primary transform information inference is set to be false in other cases.

(16)

The image processing apparatus according to any of (2) to (15), in which a value of the adaptive primary transform flag of the chrominance is set to a value of the adaptive primary transform flag of luminance in a case in which a size of a short side of a transform block to be processed of the chrominance is greater than or equal to a predetermined threshold value, and the value is set to be false in a case in which the size of the short side of the transform block is shorter than the threshold value.

(17)

The image processing apparatus according to any of (1) to (16), in which
the inverse orthogonal transform unit is configured to perform the inverse primary horizontal transform which is the inverse primary transform in the horizontal direction and the inverse primary vertical transform which is the inverse primary transform in the vertical direction as the inverse orthogonal transform,
the transform type of the inverse primary horizontal transform is set to a predetermined transform type in a case in which a size of a picture width of the transform block to be processed of the chrominance is equal to or smaller than a predetermined threshold value, and the transport type is set on the basis of a horizontal transform set and a primary horizontal transform specifying flag in a case in which the size of the picture width of the transform block is greater than the threshold value, and
the transform type of the inverse primary vertical transform is set to a predetermined transform type in a case in which a size of a picture height of the transform block to be processed of the chrominance is equal to or smaller than a threshold value, and the transform type is set on the basis of a vertical transform set and a primary vertical transform specifying flag in a case in which the size of the picture height of the transform block is greater than the threshold value.

(18)

The image processing apparatus according to any of (1) to (17), in which the information regarding the inverse orthogonal transform includes a transform skip flag indicating whether an inverse orthogonal transform process is to be skipped.

(19)

The image processing apparatus according to (18), in which a value of the transform skip flag of chrominance is set to a value of the transform skip flag of luminance.

(20)

The image processing apparatus according to (18) or (19), in which a value of the transform skip flag of the chrominance is set to a value of the transform skip flag of luminance in a case in which the prediction type of the coding block to which the transform block to be processed belongs is inter prediction, and the value is set to a value of the transform skip flag of the chrominance that is obtained by decoding a bit stream in a case in which the prediction type of the coding block is intra prediction.

(21)

The image processing apparatus according to any of (18) to (20), in which a value of the transform skip flag of the chrominance is set to a value of the transform skip flag of luminance in a case in which the prediction type of the coding block to which the transform block to be processed belongs is inter prediction or intra prediction in which the prediction modes for luminance and the chrominance match each other, and the value is set to a value of the transform skip flag of the chrominance obtained by decoding a bit stream in a case in which the prediction type of the coding block is intra prediction in which the prediction modes for luminance and the chrominance do not match each other.

(22)

The image processing apparatus according to any of (18) to (21), in which a value of the transform skip flag of the chrominance is set to a value of the transform skip flag of luminance in a case in which the prediction type of the coding block to which the transform block to be processed belongs is inter prediction or intra prediction of which the prediction mode is intra block copy, and the value is set to a value of the transform skip flag of the chrominance in a case in which the prediction type of the coding block is intra prediction of which the prediction mode is not intra block copy.

(23)

The image processing apparatus according to any of (18) to (22), in which a value of the transform skip flag of the chrominance is set to a value of the transform skip flag of luminance in a case in which a chrominance transform skip information inference flag indicating whether the transform skip flag of the chrominance is to be inferred on the basis of the transform skip flag of luminance is true, and the value is set to a value of the transform skip flag of the chrominance obtained by decoding a bit stream in a case in which the chrominance transform skip information inference flag is false.

(24)

The image processing apparatus according to any of (1) to (23), in which the information regarding the inverse orthogonal transform includes a secondary transform identifier indicating which inverse secondary transform is to be applied.

(25)

The image processing apparatus according to (24), in which a value of the secondary transform identifier of chrominance is set to a value of the secondary transform identifier of luminance.

(26)

The image processing apparatus according to (24) or (25), in which a value of the secondary transform identifier of the chrominance is set to a value of the secondary transform identifier of luminance in a case in which the prediction type of the coding block to which the transform block to be processed belongs is inter prediction, and the value is set to a value of the secondary transform identifier of the chrominance obtained by decoding a bit stream in a case in which the prediction type of the coding block is intra prediction.

(27)

The image processing apparatus according to any of (24) to (26), in which a value of the secondary transform identifier of the chrominance is set to a value of the secondary transform identifier of luminance in a case in which the prediction type of the coding block to which the transform block to be processed belongs is inter prediction or intra prediction in which the prediction modes for luminance and the chrominance match each other, and the value is set to a value of the secondary transform identifier of the chrominance obtained by decoding a bit stream in a case in which the prediction type of the coding block is intra prediction in which the prediction modes for luminance and the chrominance do not match each other.

(28)

The image processing apparatus according to any of (24) to (27), in which a value of the secondary transform identifier of the chrominance is set to a value of the secondary transform identifier of luminance in a case in which the prediction type of the coding block to which the transform block to be processed belongs is inter prediction or intra prediction of which the prediction mode is intra block copy, and the value is set to a value of the secondary transform identifier of the chrominance obtained by decoding a bit stream in a case in which the prediction type of the coding block is intra prediction of which the prediction mode is not intra block copy.

(29)

The image processing apparatus according to any of (24) to (28), in which a value of the secondary transform identifier of the chrominance is set to a value of the secondary transform identifier of luminance in a case in which a chrominance secondary transform identification information inference flag indicating whether the secondary transform identifier of the chrominance is to be inferred on the basis of the secondary transform identifier of luminance is true, and the value is set to a value of the secondary transform identifier of the chrominance obtained by decoding a bit stream in a case in which the chrominance secondary transform identification information inference flag is false.

(30)

An image processing method including:
performing an inverse orthogonal transform of chrominance using information regarding the inverse orthogonal transform of chrominance derived on the basis of information regarding an inverse orthogonal transform of luminance.

(31)

An image processing apparatus including:
an orthogonal transform unit configured to perform an orthogonal transform of chrominance using information regarding the orthogonal transform of chrominance derived on the basis of information regarding an orthogonal transform of luminance.

(32)

The image processing apparatus according to (31), in which information regarding the orthogonal transform includes an adaptive primary transform flag indicating whether an adaptive primary transform of adaptively selecting one from a plurality of different orthogonal transforms and using the selected transform as a primary transform is to be applied to a transform block to be processed.

(33)

The image processing apparatus according to (32), in which a value of the adaptive primary transform flag of chrominance is set to a value of the adaptive primary transform flag of luminance.

(34)

The image processing apparatus according to (33), in which the information regarding the orthogonal transform includes a primary transform identifier indicating which primary transform is to be applied to primary transforms in a vertical direction and a horizontal direction.

(35)

The image processing apparatus according to (34), in which a value of the primary transform identifier of chrominance is set to a value of the primary transform identifier of luminance in a case in which the adaptive primary transform flag of chrominance is true, and is set to a predetermined value in a case in which the adaptive primary transform flag of chrominance is false.

(36)

The image processing apparatus according to (35), in which the orthogonal transform unit performs a primary transform as the orthogonal transform.

(37)

The image processing apparatus according to (36), in which the orthogonal transform unit performs a primary horizontal transform which is the primary transform in a horizontal direction and a primary vertical transform which is the primary transform in a vertical direction as the orthogonal transform.

(38)

The image processing apparatus according to (37), in which a transform type of the primary horizontal transform of a chrominance and a transform type of the primary vertical transform of the chrominance are each derived using a method in accordance with a value of the adaptive primary transform flag of the chrominance.

(39)

The image processing apparatus according to (38), in which,
in a case in which the adaptive primary transform flag of the chrominance is true,
a transform set of a primary horizontal transform and a transform set of a primary vertical transform are selected on the basis of prediction mode information.
a primary horizontal transform specifying flag and a primary vertical transform flag are derived from the primary transform identifier of the chrominance,
a transform type of the primary horizontal transform of the chrominance is selected on the basis of the primary horizontal transform set and the primary horizontal transform specifying flag, and
a transform type of the primary vertical transform of the chrominance is selected on the basis of the primary vertical transform set and the primary vertical transform specifying flag.

(40)

The image processing apparatus according to (38) or (39), in which,
in a case in which the adaptive primary transform flag of the chrominance is false, a predetermined transform type is selected of a transform type of the primary horizontal transform of the chrominance, and a predetermined transform type is selected as a transform type of the primary vertical transform of the chrominance (41)

The image processing apparatus according to any of (32) to (40), in which a value of the adaptive primary transform flag of the chrominance is set to a value of the adaptive primary transform flag of luminance in a case in which a prediction type of a coding block to which a transform block to be processed belongs is inter prediction, and the value is set to be false in a case in which the prediction type of the coding block is intra prediction.

(42)

The image processing apparatus according to any of (32) to (41), in which a value of the adaptive primary transform flag of the chrominance is set to a value of the adaptive primary transform flag of luminance in a case in which the prediction type of the coding block to which the transform block to be processed belongs is inter prediction or intra prediction of which the prediction mode is intra block copy, and the value is set to be false in a case in which the prediction type of the coding block is intra prediction of which the prediction mode is not intra block copy.

(43)

The image processing apparatus according to any of (32) to (42), in which a value of the adaptive primary transform flag of the chrominance is set to a value of the adaptive primary transform flag of luminance in a case in which the prediction type of the coding block to which the transform block to be processed belongs is inter prediction or intra prediction in which the prediction modes for luminance and the chrominance match each other, and the value is set to be false in a case in which the prediction type of the coding block is intra prediction in which the prediction modes for luminance and the chrominance do not match each other.

(44)

The image processing apparatus according to any of (32) to (43), in which a value of the adaptive primary transform flag of the chrominance is set to a value of the adaptive primary transform flag of luminance in a case in which a chrominance adaptive primary transform information inference flag indicating whether the adaptive primary transform flag of the chrominance is to be inferred on the basis of the adaptive primary transform flag of luminance is true, and the value is set to be false in a case in which the chrominance adaptive primary transform information inference flag is false.

(45)

The image processing apparatus according to (44), in which, in a case in which a processing object component is a chrominance, the adaptive primary transform flag of luminance is true, a transform quantization bypass flag is false, and a transform skip flag is false, the chrominance adaptive primary transform information inference flag is encoded.

(46)

The image processing apparatus according to any of (32) to (45), in which a value of the adaptive primary transform flag of the chrominance is set to a value of the adaptive primary transform flag of luminance in a case in which a size of a short side of a transform block to be processed of the chrominance is greater than or equal to a predetermined threshold value, and a value is set to be false in a case in which the size of the short side of the transform block is smaller than the threshold value.

(47)

The image processing apparatus according to any of (31) to (46), in which the orthogonal transform unit is configured to perform the primary horizontal transform which is the primary transform in the horizontal direction and the primary vertical transform which is the primary transform in the vertical direction as the orthogonal transform, a transform type of the primary horizontal transform is set to a predetermined transform type in a case in which a size of a picture width of the transform block to be processed of the chrominance is equal to or smaller than a predetermined threshold value, and the transform type is set on the basis of a horizontal transform set and a primary horizontal transform specifying flag in a case in which the size of the picture width of the transform block is greater than the threshold value, and a transform type of the primary vertical transform is set to a predetermined transform type in a case in which a size of a picture height of the transform block to be processed of the chrominance is equal to or smaller than a predetermined threshold value, and the transform type is set on the basis of a vertical transform set and a primary vertical transform specifying flag in a case in which the size of the picture height of the transform block is greater than the threshold value.

(48)

The image processing apparatus according to any of (31) to (47), in which the information regarding the inverse orthogonal transform includes a transform skip flag indicating whether an inverse orthogonal transform process is to be skipped.

(49)

The image processing apparatus according to (48), in which a value of the transform skip flag of chrominance is set to a value of the transform skip flag of luminance.

(50)

The image processing apparatus according to (48) or (49), in which a value of the transform skip flag of the chrominance is set to a value of the transform skip flag of luminance in a case in which the prediction type of the coding block to which the transform block to be processed belongs is inter prediction, and the value is set to an arbitrary value and encoded in a case in which the prediction type of the coding block is intra prediction.

(51)

The image processing apparatus according to any of (48) to (50), in which a value of the transform skip flag of the chrominance is set to a value of the transform skip flag of luminance in a case in which the prediction type of the coding block to which the transform block to be processed belongs is inter prediction or intra prediction in which the prediction modes for luminance and the chrominance match each other, and the value is set to an arbitrary value and encoded in a case in which the prediction type of the coding block is intra prediction in which the prediction modes for luminance and the chrominance do not match each other.

(52)

The image processing apparatus according to any of (48) to (51), in which a value of the transform skip flag of the chrominance is set to a value of the transform skip flag of luminance in a case in which the prediction type of the coding block to which the transform block to be processed belongs is inter prediction or intra prediction of which the prediction mode is intra block copy, and the value is set to an arbitrary value and encoded in a case in which the prediction type of the coding block intra prediction of which the prediction mode is not intra block copy.

(53)

The image processing apparatus according to any of (48) to (52), in which a value of the transform skip flag of the chrominance is set to a value of the transform skip flag of luminance in a case in which a chrominance transform skip information inference flag indicating whether the transform skip flag of the chrominance is to be inferred on the basis of the transform skip flag of luminance is true, and the value is set to an arbitrary value and encoded in a case in which the chrominance transform skip information inference flag is false.

(54)

The image processing apparatus according to any of (31) to (53), in which the information regarding the orthogonal transform includes a secondary transform identifier indicating which secondary transform is to be applied.

(55)

The image processing apparatus according to (54), in which a value of the secondary transform identifier of chrominance is set to a value of the secondary transform identifier of luminance.

(56)

The image processing apparatus according to (54) or (55), in which a value of the secondary transform identifier of the chrominance is set to a value of the secondary transform identifier of luminance in a case in which the prediction type of the coding block to which the transform block to be processed belongs is inter prediction, and the value is set to an arbitrary value and encoded in a case in which the prediction type of the coding block is intra prediction.

(57)

The image processing apparatus according to any of (54) to (56), in which a value of the secondary transform identifier of the chrominance is set to a value of the secondary transform identifier of luminance in a case in which the prediction type of the coding block to which the transform block to be processed belongs is inter prediction or intra prediction in which the prediction modes for luminance and the chrominance match each other, and the value is set to an arbitrary value and encoded in a case in which the prediction type of the coding block is intra prediction in which the prediction modes for luminance and the chrominance do not match each other.

(58)

The image processing apparatus according to any of (54) to (57), in which a value of the secondary transform identifier of the chrominance is set to a value of the secondary transform identifier of luminance in a case in which the prediction type of the coding block to which the transform block to be processed belongs is inter prediction or intra prediction of which the prediction mode is intra block copy, and the value is set to an arbitrary value and encoded in a case in which the prediction type of the coding block is intra prediction of which the prediction mode is not intra block copy.

(59)

The image processing apparatus according to any of (54) to (58), in which a value of the secondary transform identifier of the chrominance is set to a value of the secondary transform identifier of luminance in a case in which a chrominance secondary transform identification information inference flag indicating whether the secondary transform identifier of the chrominance is to be inferred on the basis of the secondary transform identifier of luminance is true, and the value is set to an arbitrary value and encoded in a case in which the chrominance secondary transform identification information inference flag is false.

(60)

An image processing method including:
performing an orthogonal transform of chrominance using information regarding the orthogonal transform of chrominance derived on the basis of information regarding an orthogonal transform of luminance.

REFERENCE SIGNS LIST 100 image decoding apparatus
111 decoding unit
112 inverse quantization unit
113 inverse transform unit
114 arithmetic operation unit
115 frame memory
116 prediction unit
121 switch
122 inverse secondary transform unit
123 inverse primary transform unit
131 chrominance adaptive primary transform information derivation unit
132 inverse primary transform selection unit
133 inverse primary vertical transform unit
134 inverse primary horizontal transform unit
151 apt_flag derivation unit
152 pt_idx derivation unit
400 image encoding apparatus
411 control unit
412 arithmetic operation unit
413 transform unit
414 quantization unit
415 encoding unit
416 inverse quantization unit
417 inverse transform unit
418 arithmetic operation unit
419 frame memory
420 prediction unit
431 switch
432 primary transform unit
433 secondary transform unit
441 chrominance adaptive primary transform information derivation unit
442 primary transform selection unit
443 primary horizontal transform unit
444 primary vertical transform unit
451 apt_flag derivation unit
452 pt_idx derivation unit

The invention claimed is:

1. An image processing apparatus comprising:
circuitry configured to perform an inverse orthogonal transform of chrominance using information regarding the inverse orthogonal transform of chrominance derived on a basis of information regarding an inverse orthogonal transform of luminance,
wherein the information regarding the inverse orthogonal transform of chrominance comprises a primary transform of chrominance identifier inferred from a primary transform of luminance identifier and a secondary transform of chrominance identifier inferred from a secondary transform of luminance identifier, the primary transform of chrominance identifier indicating which inverse primary transform is to be applied and the secondary transform of chrominance identifier indicating which inverse secondary transform is to be applied, the inverse primary transform being carried out on an output of the inverse secondary transform, wherein the information regarding the inverse orthogonal transform includes an adaptive primary transform flag indicating whether an adaptive inverse primary transform of adaptively selecting one inverse orthogonal transform from between a plurality of different inverse orthogonal transforms and using the selected orthogonal transform as an inverse primary transform is to be applied, wherein a value of the adaptive primary transform flag of chrominance is set to a value of the adaptive primary transform flag of luminance, wherein the information regarding the inverse orthogonal transform includes a primary transform identifier indicating which inverse primary transform is to be applied to inverse primary transforms in a vertical direction and a horizontal direction, and wherein a value of the primary transform identifier of chrominance is set to a value of the primary transform identifier of luminance in a case in which the adaptive primary transform flag of chrominance is true, and is set to a predetermined value in a case in which the adaptive primary transform flag of chrominance is false.

2. The image processing apparatus according to claim 1, wherein the circuitry is further configured to perform the inverse primary transform as the inverse orthogonal transform.

3. The image processing apparatus according to claim 2, wherein the circuitry is further configured to perform an inverse primary horizontal transform which is the inverse primary transform in the horizontal direction and an inverse primary vertical transform which is the inverse primary transform in the vertical direction as the inverse orthogonal transform.

4. The image processing apparatus according to claim 1, wherein a value of the adaptive primary transform flag of chrominance is set to a value of the adaptive primary transform flag of luminance in a case in which a prediction type of a coding block to which a transform block to be processed belongs is inter prediction.

5. The image processing apparatus according to claim 1, wherein a value of the adaptive primary transform flag of chrominance is set to a value of the adaptive primary transform flag of luminance in a case in which a prediction type of a coding block to which a transform block to be processed belongs is inter prediction or a case in which the prediction type is intra prediction in which prediction modes for luminance and chrominance match each other.

6. The image processing apparatus according to claim 1, wherein a value of the adaptive primary transform flag of chrominance is set to a value of the adaptive primary transform flag of luminance in a case in which a chrominance adaptive primary transform information inference flag indicating whether the adaptive primary transform flag of chrominance is to be inferred on a basis of the adaptive primary transform flag of luminance is true.

7. The image processing apparatus according to claim 1, wherein a value of the adaptive primary transform flag of chrominance is set to a value of the adaptive primary transform flag of luminance in a case in which a size of a short side of a transform block to be processed of chrominance is greater than or equal to a predetermined threshold value.

8. The image processing apparatus according to claim 1, wherein the circuitry is further configured to perform an inverse primary horizontal transform which is an inverse primary transform in a horizontal direction and an inverse primary vertical transform which is an inverse primary transform in a vertical direction as the inverse orthogonal transform, a transform type of the inverse primary horizontal transform is set on a basis of a horizontal transform set and a primary horizontal transform specifying flag in a case in which a size of a picture width of a transform block to be processed of chrominance is greater than a predetermined threshold value, and a transform type of the inverse primary vertical transform is set on a basis of a vertical transform set and a primary vertical transform specifying flag in a case in which a size of a picture height of the transform block to be processed of chrominance is greater than a predetermined threshold value.

9. The image processing apparatus according to claim 1, wherein the information regarding the inverse orthogonal transform includes a transform skip flag indicating whether an inverse orthogonal transform process is to be skipped.

10. The image processing apparatus according to claim 9, wherein a value of the transform skip flag of chrominance is set to a value of the transform skip flag of luminance.

11. The image processing apparatus according to claim 1, wherein the information regarding the inverse orthogonal transform includes a secondary transform identifier indicating which inverse secondary transform is to be applied.

12. The image processing apparatus according to claim 11, wherein a value of the secondary transform identifier of chrominance is set to a value of the secondary transform identifier of luminance.

13. An image processing method comprising:

performing an inverse orthogonal transform of chrominance using information regarding the inverse orthogonal transform of chrominance derived on a basis of information regarding an inverse orthogonal transform of luminance, wherein the information regarding the inverse orthogonal transform of chrominance comprises a primary transform of chrominance identifier inferred from a primary transform of luminance identifier and a secondary transform of chrominance identifier inferred from a secondary transform of luminance identifier, the primary transform of chrominance identifier indicating which inverse primary transform is to be applied and the secondary transform of chrominance identifier indicating which inverse secondary transform is to be applied, the inverse primary transform being carried out on an output of the inverse secondary transform, wherein the information regarding the inverse orthogonal transform includes an adaptive primary transform flag indicating whether an adaptive inverse primary transform of adaptively selecting one inverse orthogonal transform from between a plurality of different inverse orthogonal transforms and using the selected orthogonal transform as an inverse primary transform is to be applied, wherein a value of the adaptive primary transform flag of chrominance is set to a value of the adaptive primary transform flag of luminance, wherein the information regarding the inverse orthogonal transform includes a primary transform identifier indicating which inverse primary transform is to be applied to inverse primary transforms in a vertical direction and a horizontal direction, and wherein a value of the primary transform identifier of chrominance is set to a value of the primary transform identifier of luminance in a case in which the adaptive primary transform flag of chrominance is true, and is set to a predetermined value in a case in which the adaptive primary transform flag of chrominance is false.

14. A non-transitory computer-readable medium having embodied thereon a program, which when executed by a computer causes the computer to execute an image processing method, the method comprising:

performing an inverse orthogonal transform of chrominance using information regarding the inverse orthogonal transform of chrominance derived on a basis of information regarding an inverse orthogonal transform of luminance, wherein the information regarding the inverse orthogonal transform of chrominance comprises a primary transform of chrominance identifier inferred from a primary transform of luminance identifier and a secondary transform of chrominance identifier inferred from a secondary transform of luminance identifier, the primary transform of chrominance identifier indicating which inverse primary transform is to be applied and the secondary transform of chrominance identifier indicating which inverse secondary transform is to be applied, the inverse primary transform being carried out on an output of the inverse secondary transform, wherein the information regarding the inverse orthogonal transform includes an adaptive primary transform flag indicating whether an adaptive inverse primary transform of adaptively selecting one inverse orthogonal transform from between a plurality of different inverse orthogonal transforms and using the selected orthogonal transform as an inverse primary transform is to be applied, wherein a value of the adaptive primary transform flag of chrominance is set to a value of the adaptive primary transform flag of luminance, wherein the information regarding the inverse orthogonal transform includes a primary transform identifier indicating which inverse primary transform is to be applied to inverse primary transforms in a vertical direction and a horizontal direction, and wherein a value of the primary transform identifier of chrominance is set to a value of the primary transform identifier of luminance in a case in which the adaptive primary transform flag of chrominance is true, and is set to a predetermined value in a case in which the adaptive primary transform flag of chrominance is false.

* * * * *